US006980656B1

(12) United States Patent
Hinton, Sr. et al.

(10) Patent No.: US 6,980,656 B1
(45) Date of Patent: Dec. 27, 2005

(54) CHAOTIC COMMUNICATION SYSTEM AND METHOD USING MODULATION OF NONREACTIVE CIRCUIT ELEMENTS

(75) Inventors: Daniel E. Hinton, Sr., Arnold, MD (US); Nelson R. Dew, Ghent, WV (US); Laurance P. Longtin, Vienna, VA (US); Charles P. Gardner, Dumfries, VA (US); Shannon W. Martin, Richmond, VA (US); Michael C. Edwards, Clifton, VA (US); Antwong L. Berkley, Arlington, VA (US); Steven M. Bowser, Vienna, VA (US)

(73) Assignee: Science Applications International Corporation, San Diego, CA (US)

( * ) Notice: Subject to any disclaimer, the term of this patent is extended or adjusted under 35 U.S.C. 154(b) by 0 days.

(21) Appl. No.: 09/317,124

(22) Filed: May 24, 1999

Related U.S. Application Data

(63) Continuation-in-part of application No. 09/116,661, filed on Jul. 17, 1998, now abandoned.

(51) Int. Cl.⁷ .............................................. H04L 9/00
(52) U.S. Cl. ...................... 380/263; 380/257; 380/259; 380/260; 380/277
(58) Field of Search .............................. 380/31, 34, 263

(56) References Cited

U.S. PATENT DOCUMENTS

| | | | | |
|---|---|---|---|---|
| 5,048,086 A | | 9/1991 | Bianco et al. ................. 380/28 |
| 5,140,670 A | * | 8/1992 | Chua et al. .................... 706/29 |
| 5,245,660 A | | 9/1993 | Pecora et al. ................. 380/48 |
| 5,291,555 A | | 3/1994 | Cuomo et al. .................. 380/6 |
| 5,355,528 A | * | 10/1994 | Roska et al. .................. 706/38 |
| 5,379,346 A | * | 1/1995 | Pecora et al. ............... 380/263 |
| 5,402,334 A | | 3/1995 | Pecora et al. ............... 364/158 |
| 5,432,697 A | | 7/1995 | Hayes ......................... 364/158 |
| 5,473,694 A | * | 12/1995 | Carroll et al. ............... 380/263 |
| 5,655,022 A | | 8/1997 | Carroll ........................ 380/48 |
| 5,680,462 A | | 10/1997 | Miller et al. .................. 380/48 |
| 5,729,607 A | * | 3/1998 | DeFries et al. ............. 380/263 |
| 5,857,165 A | | 1/1999 | Corron et al. |
| 6,064,701 A | | 5/2000 | Tresser et al. ............... 375/285 |
| 6,331,974 B1 | | 12/2001 | Yang et al. |

OTHER PUBLICATIONS

Perez, YU, Kowalski, Albert, Littler, and Song: "Synchronization of Chaos In Coupled Tunnel Diode Relaxation Oscillators" Department of Physics, University of North Texas, pp. 327-332.

Bau and Singer: "Controlling a Chaotic System" Department of Mechanical Engineering and Applied Mechanics, University of Pennsylvania, pp. 145-151.

Hayes (U.S. Army Research Laboratory), Grebogi and Ott (University of Maryland): "Communication with Chaos" Dec. 1992, pp. 385-388.

(Continued)

*Primary Examiner*—Kambiz Zand
(74) *Attorney, Agent, or Firm*—Banner & Witcoff, Ltd.

(57) ABSTRACT

A chaotic communication system employs transmitting and receiving chaotic oscillating circuits. One improvement to first-generation systems is the ability to modulate a nonreactive element in the transmitting circuit, thus increasing modulation bandwidth. Other features include insertion of a gain control amplifier in a chaotic receiver; signal filtering in chaotic transmitters and receivers; use of chaotic modulation techniques for cellular telephony applications; dual-transmitter and receiver systems; a dual receiver synchronization detector; interfaces to communication systems; analog chaotic signal modulation; use of multiple chaotic transmitters and receivers; digital algorithm improvement using a cube-law nonlinear component; a Gb-only receiver; a Gb-only transmitter; and positive slope transmitter and receiver systems.

54 Claims, 88 Drawing Sheets

OTHER PUBLICATIONS

Eweda: "Comparison of RLS, LMS, and Sign Algorithms for Tracking Randomly Time-Varying Channels" Senior Member, IEEE Transactons on Signal Processing, vol.: 42, No. 11, Nov. 1994, pp. 2937-2944.

Haykin and Li: "Detection of Signals in Chaos" Proceedings OfThe IEEE, vol. 83, No. 1, Jan. 1995, pp. 95-122.

Delgado-Restituto, Lopez de Ahumeda and Rodriquez-Vazquez: "Secure Communications through Switched-Current Chaotic Circuits" Department of Analog Design, Spain, IEEE, Feb. 1995, pp. 2237-2240.

Carroll: "Communication With Use of Filtered, Synchronized, Chaotic Signals" US Government Work, IEEE Transactions On Circuits and Systems, Fundamental Theory and Applications, vol.42, No. 3, Mar. 1995, pp. 105-110.

Kocarev (Faulty of Electrical Engineering, Cyril and Methodius University) and ROSKA (Computer and Automation Institute of the Hungarian Academy of Sciences): "Dyamics Of The Lorenz Equation And Chua's Equation: A Tutorial" Chua's Circuit, A Paradigm For Chaos (1993), pp. 25-55.

Madan (Office of Naval Research) and WU (Electronics Research Laboratory and Department of Electrical Engineering and Computer Science, University of California): "Introduction To Experimental Chaos Using Chua's Circuit" Chua's Circuit, A Paradigm For Chaos (1993), pp. 59-89.

Kocarev, Halle, Eckert, Chua (Department of Electrical Engineering and Computer Science, University of California) and PARLITZ (Germany): "Experimental Demonstration Of Secure Communications Via Chaotic Synchronization" Chua's Circuit, A Paradigm For Chaos (1993), pp. 371-378.

Halle, Wu, Itoh (Nagasaki University, Japan) and Chua (Electronics Research Laboratory and Department of Electrical Engineering and Computer Sciences, University of California): "Spread Spectrum Communication Through Modulation Of Chaos In Chua's Circuit", A Paradigm For Chaos (1993), pp. 379-394.

Parlitz (Germany), Chua, Kocarev, Halle and Shang (Department of Electrical and Computer Sciences, University of California): "Transmission of Digital Signals By Chaotic Synchronization" Chua's Circuit, A Paradigm For Chaos (1993), 395-403.

Rodet Ircam and Center for New Music and Audio Technologies, University of California, Music Department: "Sound and Music From Chua's Circuit" Chua's Circuit, A Paradigm For Chaos (1993), pp. 434-446.

Johnson, Tigner and Hunt (Department of Physics and Astronomy, Condensed Matter and Surface Science Program, Ohio University): "Controlling Chaos In Chua's Circuit" Chua's Circuit, A Paradigm For Chaos (1993), pp. 449-457.

Kennedy (Department of Electronic and Electrical Engineering, University College Dublin), WU (Electronics Research Laboratory, University of California), Pau (Department of Electrical Engineering, Stanford University) and Tow (AT&T Bell Laboratories): "Digital Signal Processor-Based Investigation of Chua'Circuit Family" Chua's Circuit, A Paradigm For Chaos (1993), pp. 769-792.

Nasser, Hosny and Sobhy (University of Kent Canterbury, Electronics Laboratories): Maximum Dynamic Range of Bifurcations of Chua's Circuit Chua's Circuit, A Paradigm For Chaos (1993), pp. 821-831.

Leung (Surface Radar Section, Defence Research Establishment Ottawa, Canada) and LAM (Department of Physics, University of Ottawa, Canada) "Receiver Design for Chaotic Modulation System Using Adaptive Filters" SPIE, vol. 2612, pp. 126-135.

Table of Contents from book (1993) entitled "Chua's Circuit: A Paradigm for Chaos."

Co-pending U.S. Appl. No. 09/116,661 filed on Jul. 17, 1998 to Daniel E. Hinton, et al., from which this application claims priority under 35 U.S.C. § 120.

Cuomo and Oppenheim: "Chaotic Signals And Systems For Communications" 1993 IEEE International Conference on Acoustics, Speech, and Signal Processing, Apr. 27-30 1993, pp. 137-140.

Yang and Chua: "Secure Communication via Chaotic Parameter Modulation " IEEE Transactions On Circuits and Systems I: Fundemental Theory and Applications, vol. 43, No. 9, Sep. 1996, pp. 80 817-819.

Parlitz and Kocarev: "Multichannel Communication Using Autosynchronization" International Journal of Bifurcation and Chaos In Applied Sciences and Engineering, vol. 6, No. 3, Mar. 1996, pp. 581-588.

Carroll and Pecora: "Using Multiple Attractor Chaotic Systems For Communication" Chaos, vol. 9, No. 2, Jun. 1999, pp. 445-451.

Pinkney et al.: "Chaos shift keying communications system using self-synchronising Chua oscillators". Electronic Letters, vol. 31, No. 13, Jun. 22, 1995, pp. 1021-1022.

Yang and Chua: "Secure Communication via Chaotic Parameter Modulation", IEEE Transactions on Circuits and Systems, vol. 43, No. 9, Sep. 1996, pp. 817-819.

Koh and Ushio: "Digital communication method based on M-synchronized chaotic systems"IEEE Transactions on Circuits and Systems, vol. 44, No. 5, May 1997, pp. 383-390.

Carroll and Johnson: "Synchronizing Autonomous Chaotic Circuits Using Bandpass Filtered Signals", IEEE, 1998, pp. 558-561.

* cited by examiner

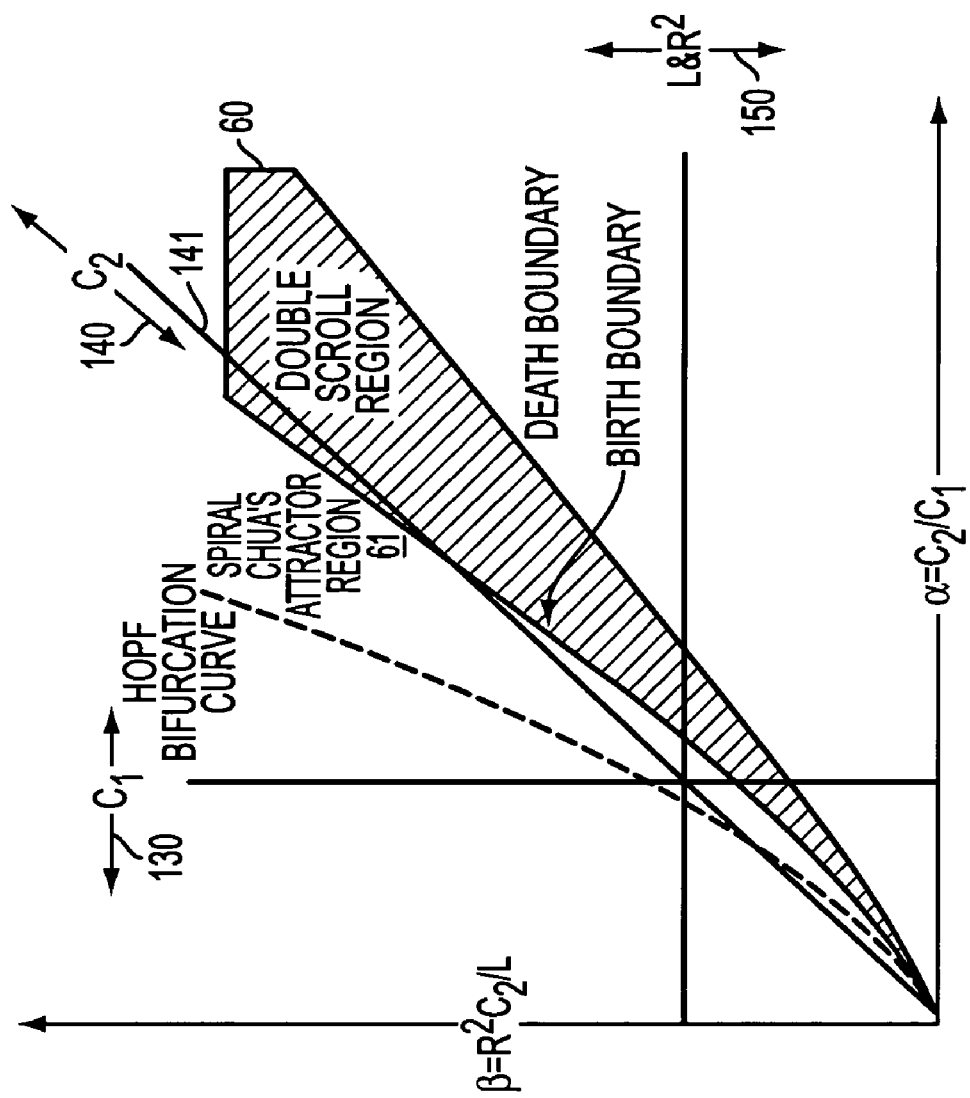

| FIG. 6B CALTECH | R2' | R2 | R1 | R2/R2 | R2/R2/R1 |
|---|---|---|---|---|---|
| ELEMENT | 653 | 654 | 660 | 653/654 | 653/654/660 |
| $G_a$ |  |  | x |  |  |
| $G_b$ UPPER SCROLL |  | x | x | x | x |
| $G_b$ LOWER SCROLL | x |  | x | x | x |

$G_a = -1/R1$
$G_b = (R1-R2)/(R1*R2)$

| FIG. 6A KENNEDY | R4 | R5 | R6 | R1 | R2 | R3 | R1/R3 | R1/R2/R3 | R5/R6 | R1/R2/R3/R4 |
|---|---|---|---|---|---|---|---|---|---|---|
| ELEMENT | 601 | 603 | 604 | 606 | 607 | 608 | 606/608 | 606/608/607 | 603/604 | 606/607/608/601 |
| $G_a$ | x | x | x | x | x | x | x | x | x | x |
| $G_b$ UPPER | x |  |  | x | x | x | x | x |  | x |
| $G_b$ LOWER | x |  |  | x | x | x | x | x |  | x |

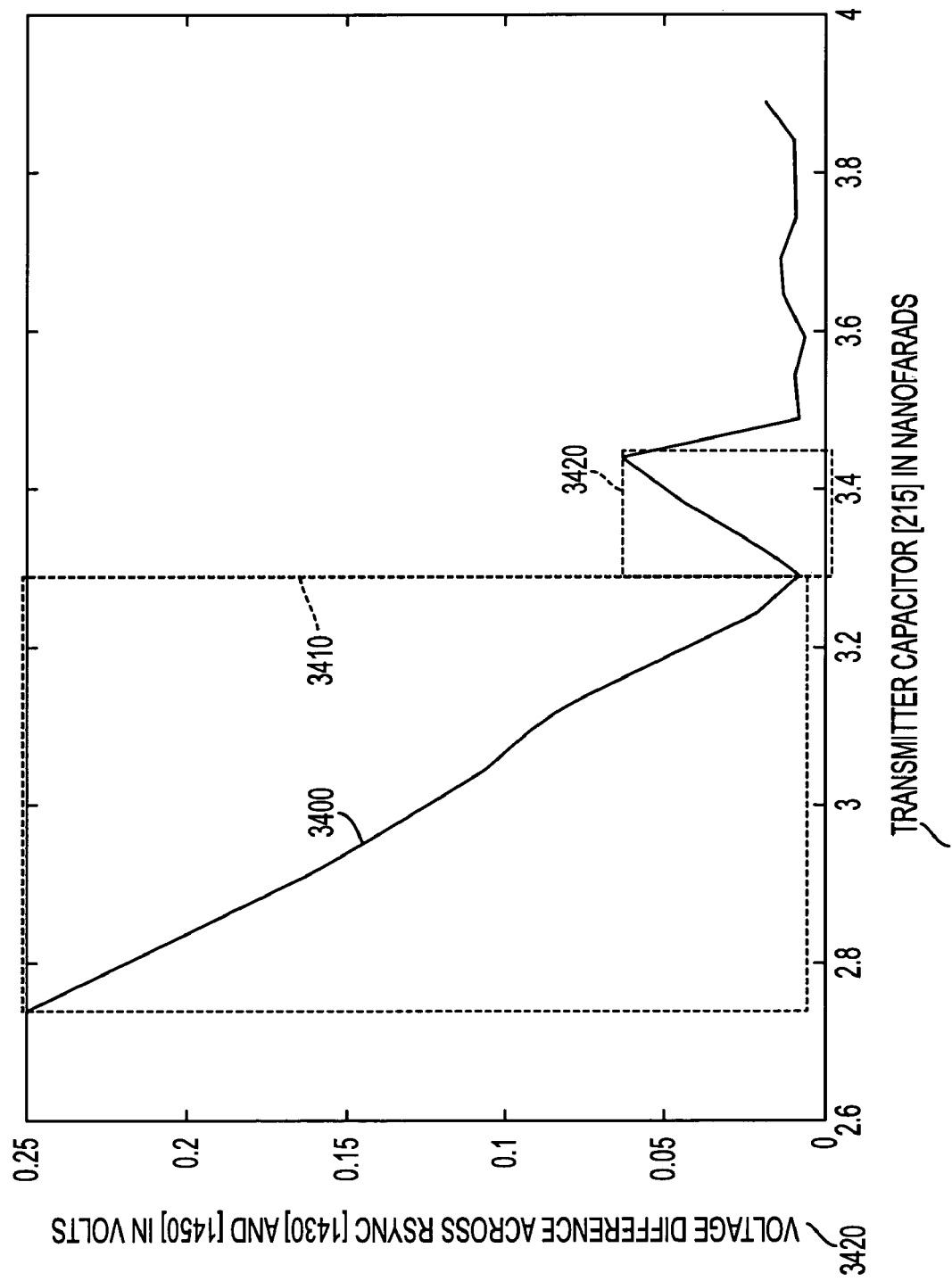

CHAOTIC COMMUNICATION SYSTEM AND METHOD USING MODULATION OF NONREACTIVE CIRCUIT ELEMENTS

This application is a continuation-in-part of commonly-owned, U.S. application Ser. No. 09/116,661, now abandoned entitled "Communications System Using Chaotic Synchronized Circuits," filed on Jul. 17, 1998 and naming as inventors Daniel E. Hinton, Sr. and Aaron Budgor. That application is incorporated into the body of this application with minor changes in the numbering of elements in the figures.

TECHNICAL FIELD

This invention relates generally to information transmission techniques involving modulation and demodulation of a chaotic carrier signal. Many aspects of the invention involve transmitting information by modulating various characteristics of nonreactive circuit elements of a chaotic transmitter. The invention has broad application to communications systems, radar systems and other systems that transmit and receive information over wire, radio frequencies, light (including fiber optic) and acoustic channels.

BACKGROUND OF THE INVENTION

Techniques for modulating carrier signals in order to transmit information between two points are well known. In systems employing frequency modulation, for example, a carrier signal is modulated by changing the frequency of the signal in accordance with an information signal such as a human voice. Amplitude-modulated systems change the amplitude of a fixed-frequency signal in accordance with an information signal. Other modulation techniques have been developed over the years to optimize transmission characteristics, to optimize signal bandwidth, and to overcome noisy transmission environments.

So-called "chaotic" signals provide a particularly interesting, simple, and useful means of modulating information signals in a manner that can increase noise immunity and reduce the power levels needed to transmit information. As explained in the aforementioned application, which is bodily incorporated herein, these signals can be modulated in various ways to transmit information. The modulation bandwidth available when using such techniques, however, has been determined to be generally limited to 10 to 15% of the tank circuit frequency in the transmitting circuit. This limitation is believed to be due to the fact that changing lump parameters in the transmitter causes a certain amount of settling time before the receiver can synchronize with the changed transmitter parameters.

The present inventors have discovered a technique for modulating the transmitting signal in a manner that results in much faster signal stability, thus reducing the amount of time required to synchronize the receiver and increasing the modulation bandwidth dramatically. Other features and advantages provided by the present invention will become apparent upon reading this specification in conjunction with the figures.

The following description begins by reviewing the subject matter of the aforementioned application as a departure point for explaining the principles of the present invention. Circuits, principles and embodiments described in the aforementioned application will be referred generally to as "first-generation," while those newly presented in this application will be referred to generally as "second-generation" or "improved." These labels are not intended in any way to be limiting. Moreover, many of the second-generation circuits and principles can be used in conjunction with first-generation circuits and vice versa.

BRIEF DESCRIPTION OF THE DRAWINGS

FIG. 1D is a diagram of the operating regimes of a Chua circuit mapped into a lump parameter plane.

FIG. 7C shows the effects of changing various resistive values in a Caltech diode (FIG. 6B) and Kennedy diode (FIG. 6A) on slope.

FIG. 37C shows what happens when the transmitter capacitor 215 (FIG. 6B) is varied and the receiver capacitors 355 and 1490 (FIG. 25) are set to fixed values with the nonlinear diode characteristic curve set at a fixed value.

I. FIRST-GENERATION EMBODIMENTS AND TECHNIQUES

Figure 1A:
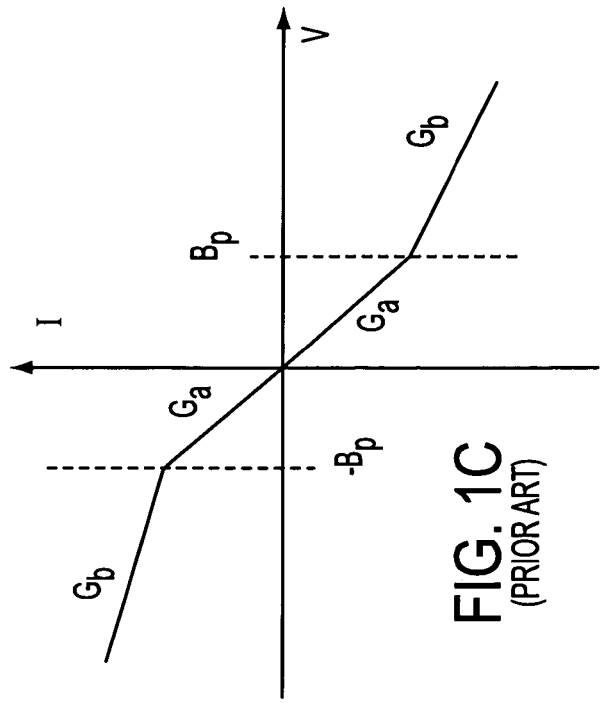
FIG. 1A is a diagram of a Chua circuit according to the prior art.

Referring to FIG. 1A, a circuit 1 known as a "Chua" circuit oscillates chaotically. The term "chaos" applies to dynamic systems that follow simple dynamical rules, but whose state function trajectory is so sensitive to the system's initial conditions that its state after an arbitrary time-period cannot, in practical terms, be predicted. That is, its state could be predicted if it were possible to model the system with an arbitrary degree of precision.

Chaotic systems evolve deterministically, and their chaotic state paths are cyclic, but very complex and with extremely long cycle-lengths. In real systems, however, with extremely long cycle periods, it may be of little practical significance that their behavior is cyclical because the physical systems that generate the behavior may not be sufficiently stable for the system to ever return to the same dynamical system in its same initial state. For example, the component values of an electrical circuit may not remain precisely constant for 600 years.

Figure 1C:
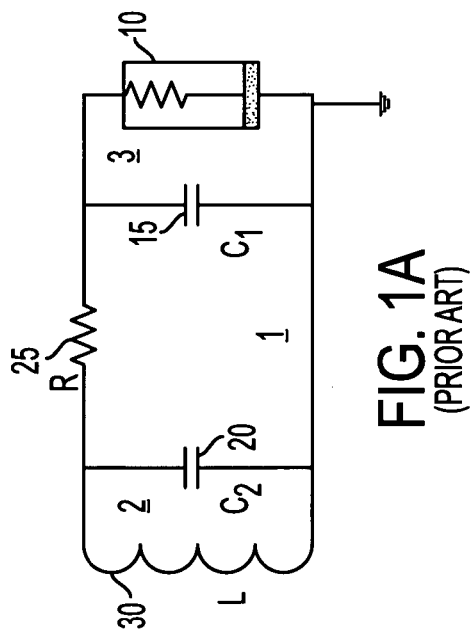
FIG. 1C is a diagram indicating the resistance—voltage characteristic of a non-linear resistor used in a Chua circuit.

The Chua circuit is a simple electrical circuit that exhibits chaotic behavior. It has been studied extensively and used to demonstrate many of the chaotic patterns observed in many physical systems. Referring now also to FIG. 1A, the basic Chua circuit includes a non-linear resistance element 10, characterized by a non-linear voltage-current characteristic curve. In a typical configuration, the curve is piece-wise linear with symmetrical slope discontinuities around the zero-axis. That is: $I_R = G_a V_R + (½)(G_a - G_b)\{|v_R + B_p| - |v_R - B_p|\}$ where $G_a$ and $G_b$ are the slopes of respective linear portions of the piecewise-linear current/voltage curve characterizing the non-linear resistor and BP is the absolute value of the two voltage points at which the discontinuities in the current/voltage curve lie as shown in FIG. 1C. The circuit has a circuit-driving subsystem 2 (e.g., an L-C tank circuit), and a response subsystem 3, which includes for example a capacitance C1 and non-linear resistor 10, wherein the two systems are interconnected through a resistor 25.

Referring to FIG. 1D, a given choice of values of the physical characteristics of the components of the Chua circuit each correspond to a unique operating regime, some values of which may coincide with a chaotic behavior of the Chua circuit. The operating regime may be mapped onto a coordinate system whose axes are the lump parameters, $\alpha = C_2/C_1 = C_2/C$, and $\beta = R^2 C_2/L$. By choosing values of R (25), L (30), $C_1$ (15) and $C_2$ (20) so that $\alpha$ and $\beta$ lie in, for example, a double scroll region 60, a Chua circuit can be made that will oscillate chaotically or quasi-periodically. Any point on the plot corresponds to a different operating behavior and a selected point does not exhaustively define a particular path of state trajectories. A selected point on the curves can correspond to radically different behaviors depending on the initial conditions.

Given a specified physical configuration and a specified initial state specified by $V_1$, $V_2$, and $I_L$, the voltages across $C_1$ (15) and $C_2$ (20) and the current through L (30), the evolution of the Chua circuit's state is deterministic, but chaotic. That is, any Chua circuit with the same physical parameters and initial conditions will follow the same course of states over time and this course will repeat itself over a very long interval (perhaps many years). However, to an observer, the value of (for example) voltage $V_1$ over a period of time shorter than this long interval looks like noise. Also, initial states that differ only slightly can follow widely different state paths. In addition, its power spectral density function is spread over a wide range of frequencies, with a peak at the frequency of the fundamental of the L-C tank circuit formed by L and $C_2$. However, compared to oscillators, such as used to generate carriers for radio transmission, the peak is not pronounced; that is, it is very short and wide.

The Chua circuit, aside from being a classic device for demonstrating, studying, and modeling chaotic real-world systems, has also been proposed as a basis for chaotic signal transmission. Generally a transmitting nonlinear dynamic circuit produces a chaotic signal that can be used to induce a receiving chaotic system to synchronize with it. The parameter of the transmitting chaotic circuit can be modulated or perturbed responsively to an information signal. The parameter can be a scalar, such as a voltage, tapped from the transmitting circuit and used as a signal. The signal is applied to the receiving system, causing the receiving system to synchronize with the transmitted signal. The chaotic signal from the synchronized receiving circuit can be used with the modulated transmitted signal to recover the information signal according to various prior art schemes. The chaotic signals that can be derived from an oscillating Chua circuit are similar to spread-spectrum signals including a range of frequencies. Chua circuits have been made to generate communications signals in frequency bands ranging from audio to radio frequency and in various media.

Figure 1B:
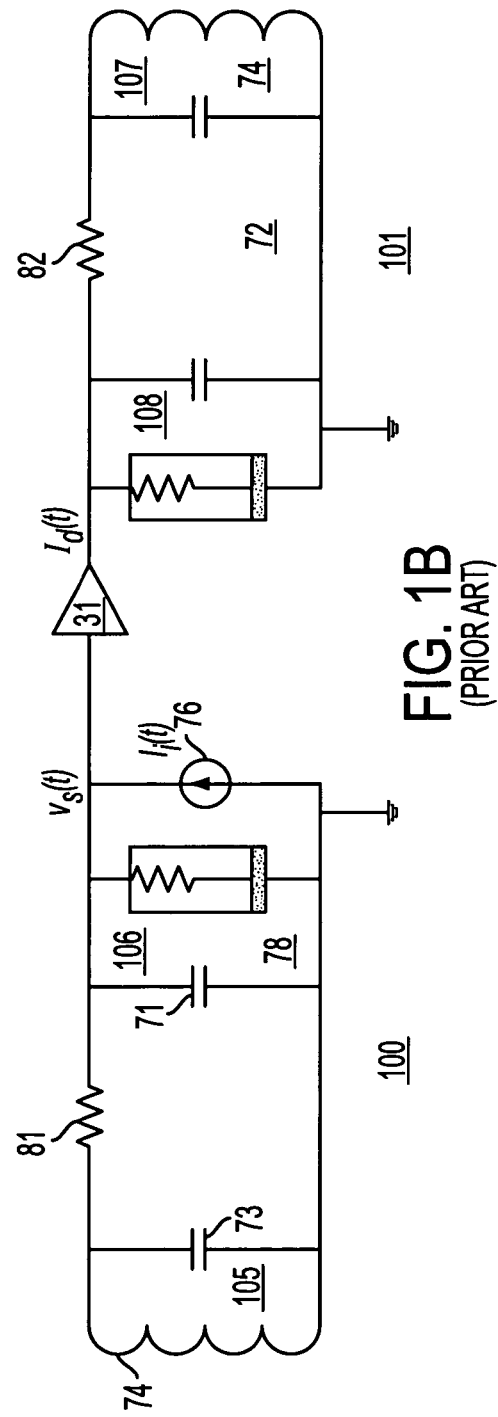
FIG. 1B is a communications system according to the prior art.

Various modulation schemes have been proposed. For example, a simple signal summing system adds the information signal to the chaotic scalar. A more complex correlation system uses a signal divider and multiplier at the transmitter and receiver, respectively. In FIG. 1B, a prior art system uses a Chua circuit to transmit signals and receive signals. The system has a transmitting Chua circuit 100 and an identical (in terms of its chaotic oscillating properties) receiving Chua circuit 101. The transmitting Chua circuit 100 oscillates in a chaotic or semiperiodic regime.

Generally, the two chaotic circuits 100 and 101 can be synchronized by driving a portion of the receiving chaotic oscillator 101 with a driving function tapped from the transmitting chaotic oscillator 100. L-C tank circuit 105 of the transmitting Chua circuit 100 is linked through a resistor 81 to the capacitor/non-linear resistor portion 106. The latter portion causes the oscillations of the L-C tank circuit to become chaotic for certain values of the inductor 74, capacitors 71 and 73, and resistor 81 as discussed above with reference to FIG. 1D. The chaotic portion 108 of the identical receiving circuit 101, also a capacitor/non-linear resistor circuit, reproduces the driving signal. That is, the transmitting 100 and receiving 101 circuits follow precisely the same chaotic course of states (assuming no modulation is taking place in the transmitting circuit 100).

It is known that the transmitting 100 and receiving 101 circuits will remain synchronized even when a substantial amount of noise and/or information is injected into the driving signal. Thus, in the prior art embodiment of FIG. 1B, a signal current $I_i(t)$ is injected by a driver 76 that converts a signal voltage through an invertable coding function $c(v_s(t))$. The decoded signal at the receiver is then obtained from the received current signal $I_d(t)$ by applying the inverse coding operation to the received current signal $I_d(t)$ to obtain a voltage signal containing the information signal.

Note that the term, "synchronous," in this context, characterizes the convergence of two state variables toward identical or linearly related, but continuously changing, sets of values. That is, a change in one variable corresponds to a change in a synchronized variable that is linearly related to the change in the one variable. Thus, plotting one variable against the synchronized variable over time, the result, theoretically, is a straight line. Synchronization of non-linear systems, and the mathematical modeling of such systems, is described in some detail in U.S. Pat. Nos. 5,245,660; 5,473,694; 5,402,334; 5,379,346; 5,655,022; 5,432,697; and 5,291,555, the entirety of each of which is incorporated by reference herein.

Prior art systems have been discussed widely, but few practical working designs are known. The problems with practical synchronization systems are summarized in the introduction of U.S. Pat. No. 5,680,462. Synchronization systems are inherently noisy and error prone due, at least in part, to the time it takes for synchronization to occur in a noisy channel and because noise induces state transitions in the receiver since it causes a breakpoint to be crossed. For example, when a transmitting circuit is perturbed to encode a piece of information (a bit), it takes a finite amount of time for the receiving circuit to begin to follow the trajectory of the transmitted signal. Also, according to the prior art, modulation cannot span too great a range. Otherwise, a tightly locked synchronization, which is, according to the prior art, essential, cannot be maintained. In addition, the practical problems attending achievement of high data throughput, the providing of reliable locking performance, and various purely practical design considerations have not received a great deal of attention. These prior art problems are addressed by the present invention in both the first-generation and second-generation embodiments.

According to one aspect of a first-generation system, the invention provides a spread-spectrum-like communications system that transmits information in a chaotic signal. Other aspects of the invention include:

(a) a method for modulating a chaotic process to generate a signal to encode information in the signal;

(b) a method for modulating a circuit that generates a chaotic signal in a stable manner.

(c) transmitting and receiving chaotic circuits that are characterized by rapid synchronization;

(d) a mechanism for imprinting and extracting information from two chaotic devices synchronized by a chaotic signal in which the information is embedded such that the chaotic signal can serve as the information carrier signal over a communication channel;

(e) a communications system that permits the modulation of a chaotic process so as to encode multiple independent streams of data on a same chaotic carrier signal, in effect, implementing an N-word vocabulary, where N corresponds to a number of stable chaotic oscillation states that are induced in a transmitter by modification of a property of at least one of a resistance, a capacitance, and an inductance to tune an oscillating circuit of the transmitter.

Briefly, an embodiment of the invention employs a transmitting oscillating circuit capable of chaotic or quasiperiodic oscillation to generate a (chaotic or quasiperiodic) carrier, preferably a voltage tapped through a voltage follower. A property of the transmitting oscillating circuit, in an embodiment, an auxiliary capacitance, is switched on and off to vary the capacitance of an L-C tank portion of a Chua oscillator. The switching is controlled by an information signal to generate a modulated chaotic signal.

Switching is performed with an optical isolator that requires zero output biasing and introduces essentially no capacitance into the circuit. This prevents any effect on the chaotic or quasi-periodic operating regime of the circuit. An autonomous portion of a receiving oscillating circuit, substantially identical in terms of its oscillating properties, is driven by the modulated carrier. This establishes a synchronized chaotic or quasiperiodic oscillation in the receiving circuit. A comparator is used to output the difference between the driving modulated carrier and a synchronized signal tapped from the receiving oscillator at a point corresponding to the transmitting circuit tap used to generate the modulated carrier. This output provides the recovered information signal.

In one embodiment, various elements of the transmitting chaotic circuit are switchably varied to maintain a constant operating regime so that strange attractors, with frequencies covering a wide selectable range, are generated. This is used to form a vocabulary of strange attractors. The frequency can be determined by the receiver in a very simple way by counting pulses formed from a difference between the base signal in the receiving circuit and the received signal. The difference in the frequencies of the signal being transmitted and the base signal generated by the receiver indicates the "word" transmitted. In this way, if the vocabulary consists of N distinguishable oscillating frequencies, then $\log_2(N)$ bits can be transmitted with each modulating cycle.

According to one embodiment, the invention provides a communications device with a transmitting chaotic circuit. The transmitter has at least one circuit element, the value of which affects a chaotic electrical property of the chaotic circuit. That is, a change in the magnitude of the circuit element changes the oscillating behavior of the chaotic transmitting circuit. The circuit element has multiple component elements, at least one of which is isolated from the chaotic circuit by a switch. The configuration is such that when the switch is switched to a first state, the magnitude has a first value and when the switch is switched to a second state, the magnitude of the component has a second value. This causes the transmitter to oscillate over multiple oscillating regimes each corresponding to one of the values. The chaotic property can be applied to a communications channel to be picked up by a receiver.

Switching the circuit element allows, essentially, a chaotic signal to be modulated. That is, a chaotic signal is tapped from the transmitter (in FIG. 1B, for example, the voltage at the junction of resistor 81 and capacitor 71), applied to a communications channel, and picked up by a receiver. The switch is controllable responsively to an information signal, whereby the chaotic carrier signal is modulated by the information signal. This information signal can be detected by applying the chaotic signal from the channel to a receiving chaotic circuit that synchronizes with the chaotic signal corresponding to one of the chaotic oscillating regimes of the transmitter, but not with another and detecting the alternations between synchronization and desynchronization.

According to another embodiment, the invention provides a communications device with a transmitting chaotic circuit configurable responsively to an information signal. The configurations are such that the transmitting chaotic circuit produces at least three different chaotic signals, each characterized by a different trajectory-versus-time characteristic. The device includes a receiver with an oscillating subportion to which the different chaotic signals can be applied to drive the oscillating subportion. The receiver has a beat detector connected to the oscillating subportion to detect a difference between a fundamental frequency of the oscillating subportion and a current chaotic signal. This allows the information signal to be detected by the detection of beats.

According to still another embodiment, the invention provides a communications receiver with a chaotic oscillator that includes an oscillator portion and a chaotic portion. The chaotic portion has a non-linear resistance element that forms a chaotic oscillator with the oscillator portion when the chaotic portion and the oscillator portions are coupled to pass a current signal therebetween. The oscillator portion is signally coupled to a communications medium carrying a modulated chaotic signal. The chaotic portion is also signally coupled directly to the communications medium such that a voltage of the communications medium is directly applied to the chaotic portion through a circuit path parallel to a coupling allowing the current signal to pass between the oscillator portion and the chaotic portion. Thus, both the chaotic and oscillating portions of the receiver are driven by the incoming chaotic signal from the communications channel.

According to still another embodiment, the invention provides a communications device with a chaotic oscillator connectable to a communications channel. The chaotic oscillator has a tank circuit with at least two capacitors and an inductor. The first of the capacitors is connected to an inductor and a second is selectively connectable to the inductor to combine respective capacitances of the capacitors through a switch. In other words, the capacitors combine their capacities responsively to the switch. The switch has an input for accepting an information signal. The information signal controls the switch so that the chaotic oscillator is selectively alternated between at least two oscillating regimes. The result is that a chaotic transmitter is modulated in accordance with the information signal to generate a chaotic signal which, at each instant, oscillates according to a selected one of the oscillating regimes. A receiver signally coupled to the communications channel has a receiving chaotic oscillator portion for each of the oscillating regimes, each portion being configured to synchronize with a respective one of the at least two chaotic signals. By detecting which portion is in synchrony with the incoming signal, the information signal can be detected.

According to still another embodiment, the invention provides a communications system with transmitting and receiving Chua circuits. At least one component of the transmitting Chua circuit includes at least two subcomponents, at least one of which is selectively isolated from the transmitting Chua circuit by a switch. This is done such that a current oscillating regime of the transmitting Chua circuit is selectively alternated between at least two respective oscillating regimes. The switch is switchable responsively to an information signal. The values of the subcomponents together with a configuration of the switch are such that one of the oscillating regimes is substantially the same as an oscillating regime of the receiving Chua circuit. The result of the latter is that the receiving Chua circuit is synchronizable with the transmitting Chua circuit when the current oscillating regime is the same oscillating regime as the receiver's. A detector is connected to detect when the receiving Chua circuit is in synchrony with a chaotic signal generated by the transmitting Chua circuit. This allows the information signal to be recovered from the chaotic signal (see, e.g., FIG. 4C).

According to still another embodiment, the invention provides a communications receiver with a chaotic oscillator that has an oscillator portion and a chaotic portion. The chaotic portion has a non-linear resistance element that forms a chaotic oscillator with the oscillator portion when the chaotic portion and the oscillator portions are coupled to pass a current signal therebetween. The oscillator portion is signally coupled to a communications medium carrying a modulated chaotic signal. The chaotic portion is also signally coupled directly to the communications medium such that a voltage of the communications medium is directly applied to the chaotic portion through a circuit path parallel to a coupling allowing the current signal to pass between the oscillator portion and the chaotic portion. Thus, both the chaotic and oscillating portions of the receiver are driven by the incoming chaotic signal from the communications channel. In this embodiment, the coupling resistance is a series of three resistors that provide the coupling from the voltage of the communications medium to the chaotic portion of the circuit and provide a voltage divider network for a comparator detector to detect voltage differences between the voltage of the communications medium and the chaotic voltage generated by the receiver chaotic portion of the system (see, e.g., FIG. 4D).

According to still another embodiment, the invention provides a communications receiver system as described in the previous paragraph except the receiver is divided into an oscillator portion and a chaotic portion which are separately driven through emitter followers from the voltage of the communications medium. This allows the voltage of the communications medium to drive the oscillator portion and the chaotic portion of the receiver without direct feedback between the two through the synchronizing resistor. This prevents spontaneous chaotic oscillation in the receiver due to a feedback path from the chaotic portion of the Chua circuit to the oscillator portion of the Chua circuit. The circuit still synchronizes since the voltage of the communications medium is coupled to both the oscillator portion of the receiver and the chaotic portion of the Chua circuit. As a result, the receiver responds only when there is a voltage on the communications medium to stimulate the system (see, e.g., FIG. 4E).

According to still another embodiment, the invention provides a communications receiver system divided into an oscillator portion and a chaotic portion. The oscillator portion is driven by the voltage of the communications medium. The voltage of the chaotic portion is fed back to the oscillator portion through an emitter follower and the synchronizing resistor in a phase locking type arrangement. This allows the voltage of the communications medium to drive the oscillator portion and the voltage of the chaotic portion of the receiver to directly feed back through the synchronizing resistor to quickly synchronize the communications system in the presence of a voltage on the communications channel. This arrangement rapidly synchronizes the communications system. The circuit still synchronizes since the voltage of the communications medium is coupled to the oscillator portion of the receiver and the chaotic portion of the Chua circuit feeds back a portion of the receiver voltage. As a result, the receiver responds only when there is a voltage on the communications medium to stimulate the system (see, e.g., FIG. 4F).

According to still another embodiment, the invention provides a communications receiver system divided into an oscillator portion and a chaotic portion except the nonlinear diode portion has only a Gb component. This allows the oscillator portion of the circuit (e.g., FIG. 4l elements 5340 and 5350) to be driven directly in accordance with the previous embodiments discussed above. By removing the discontinuity caused by diodes 652 and 655 (FIG. 6B), noise in the channel cannot cause the receiver to change scrolls. The circuit still synchronizes since the voltage of the communications medium is coupled to both the oscillator portion of the receiver and the chaotic portion of the Chua circuit. As a result, the receiver responds only when there is a voltage on the communications medium to stimulate the system (see, e.g., FIG. 4l). The noise performance has been shown to be approximately an 8–10 dB improvement over a receiver with the diodes in the circuit.

DETAILED DESCRIPTION
(FIRST-GENERATION EMBODIMENTS)

Referring again to FIG. 1D, discussed above, the various chaotic oscillating regimes of the Chua circuit are mapped onto an $\alpha/\beta$ parameter plane. Circuits falling in a double scroll region 60 are characterized by oscillation about two strange attractor equilibrium points ("double scroll"). Circuits falling in a spiral set of oscillating regimes 61 exhibit oscillation about only one strange attractor equilibrium point ("single scroll").

Figure 22B:
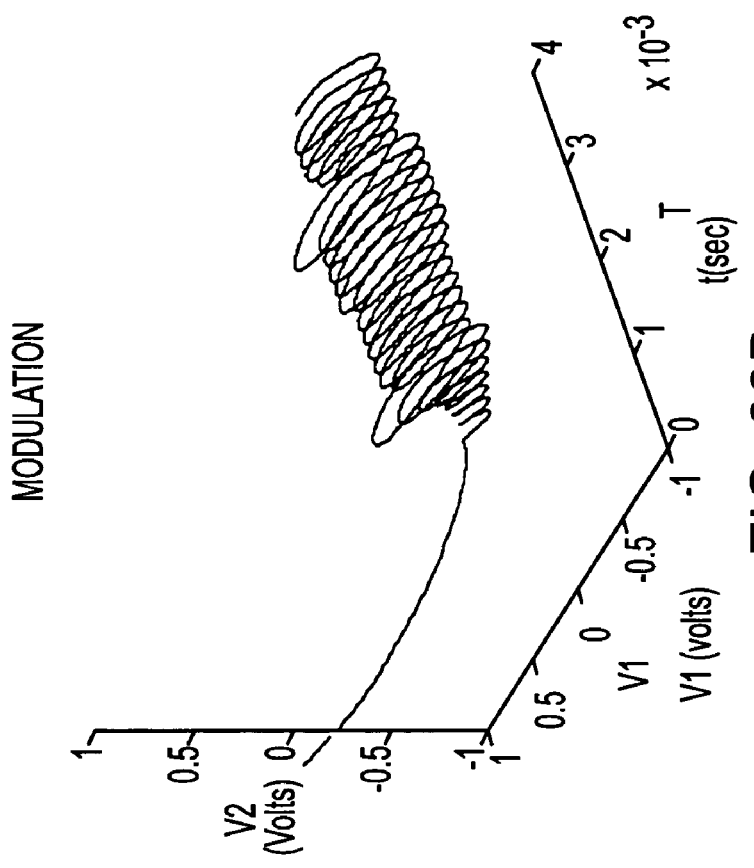
FIG. 22B shows the plot of FIG. 22A when modulated with an information signal.
Figure 22A:
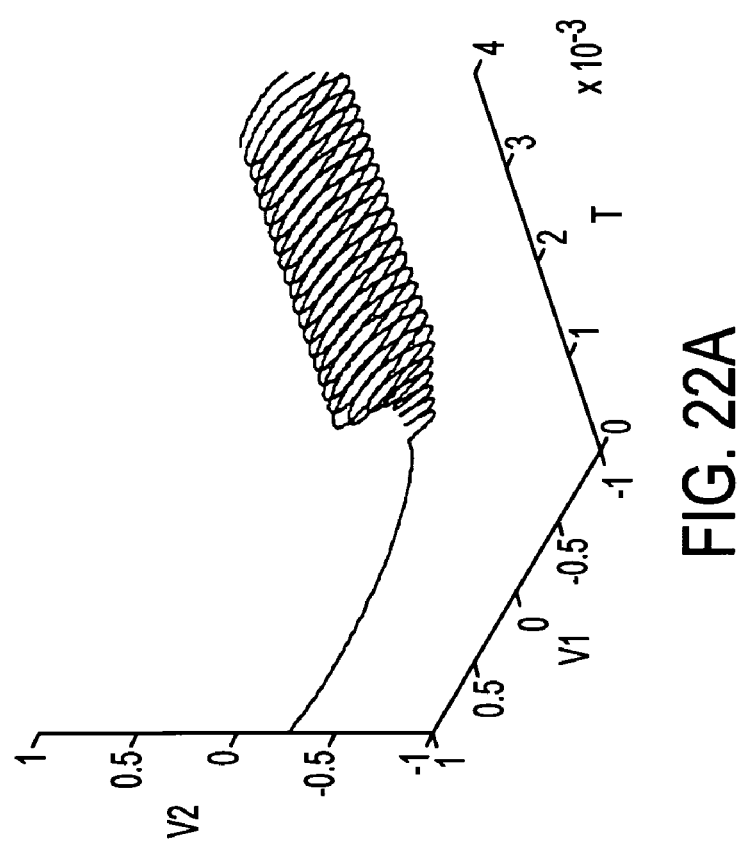
FIG. 22A shows a voltage (V1) versus voltage (V2) versus time (T) plot of a chaotic signal (single scroll strange attractor) without modulation.

The oscillations of a circuit operating in a single-scroll attractor mode can be seen graphically in FIG. 22A, which plots two voltages V1 and V2 as a function of time for a transmitter without modulation. The two voltages are measured at points 242 and 282, respectively, as shown in one embodiment of FIG. 2A. (In this example, V2 is measured at the L-C tank circuit and V1 is measured at the nonlinear resistance element). While the circuit operates in a non-modulated state, the values of V1 and V2 vary chaotically but generally swirl about an equilibrium point.

Figure 20B:
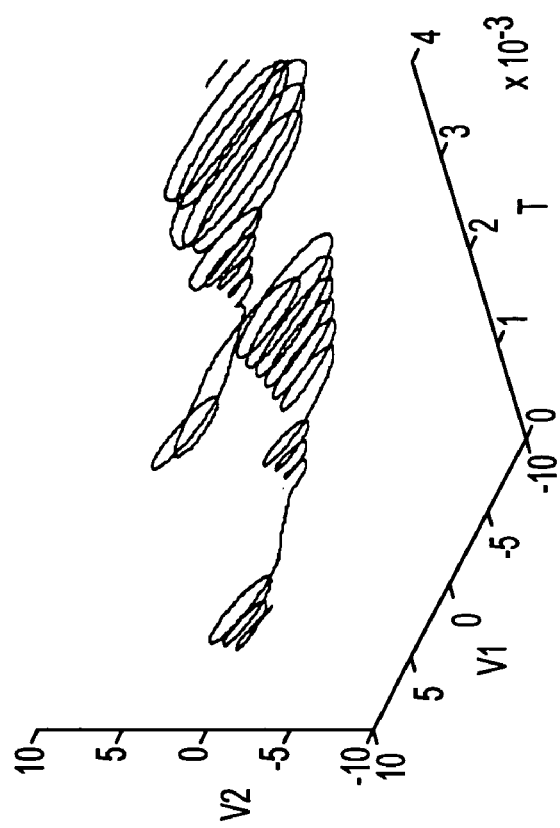
FIG. 20B shows the plot of FIG. 20A when modulated with an information signal.
Figure 20A:
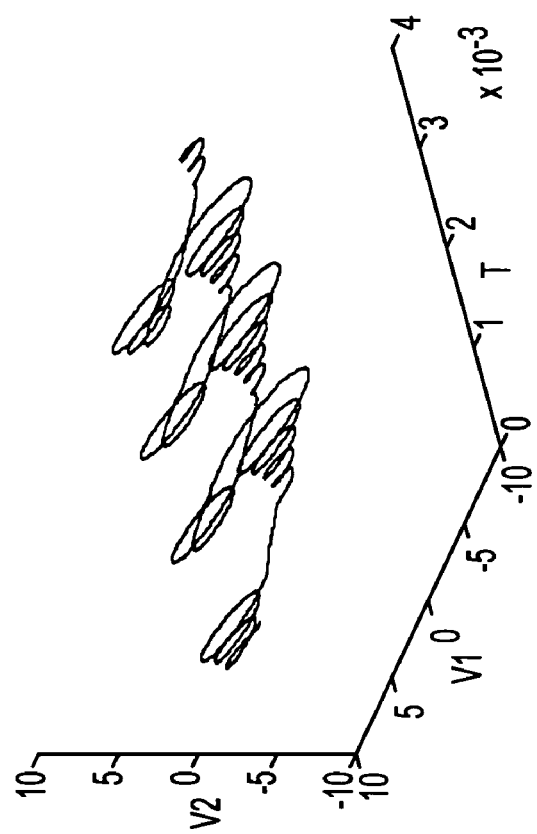
FIG. 20A shows a voltage (V1) versus voltage (V2) versus time (T) plot of a chaotic signal (double scroll strange attractor) without modulation.

The oscillations of a circuit operating in a double-scroll attractor mode can be seen graphically in FIG. 20A, which plots the same two voltages V1 and V2 as a function of time for a circuit that is not modulated. While the circuit operates in a non-modulated state, the values of V1 and V2 vary chaotically but generally swirl about two distinct equilibrium points.

Varying $C_1$ causes the $\alpha/\beta$ combination to shift as indicated by arrow 130 in FIG. 1D. Varying $C_2$ causes the $\alpha/\beta$ combination to shift as indicated by arrow 140. Varying $R_2$ or L causes the $\alpha/\beta$ combination to shift as indicated by arrow 150. As can be seen from the diagram (FIG. 1D), the capacitance $C_2$ of capacitor 20 can be varied over a wide range while still maintaining operation of the circuit in the double scroll oscillating regime 110. A much smaller range of values of capacitance of capacitor 15 ($C_1$) coincides with operation in the double scroll regime 60. The wide range of capacitances for $C_2$ (capacitor 20) that coincide with operation in the double scroll region 60 is exploited in a first embodiment of the invention discussed immediately below.

Figure 2A:
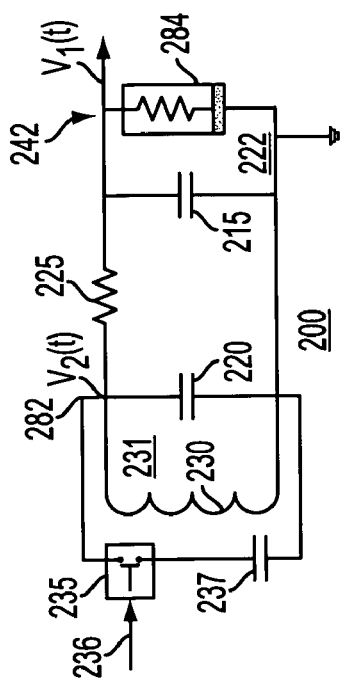
FIG. 2A is a schematic of a transmitter of a first-generation system wherein a capacitor 237 is switched to modulate a chaotic signal.

Referring now also to FIG. 2A, in a first-generation embodiment of the invention, a transmitter 200 includes a modified-Chua circuit. The transmitter 200 generates a modulated chaotic signal responsively to an information signal 236. The transmitter 200 has a primary 220 and auxiliary 237 capacitor. The auxiliary capacitor 237 is selectively switched into the circuit to add selectively to the $C_2$ capacitance of the embedded Chua circuit. By switching the auxiliary capacitor 237 off and on, the transmitter oscillates according to a base oscillating regime and an alternate oscillating regime, respectively. By controlling optoisolator 235 responsively to an information signal 236, an alternating pattern of chaotic oscillations is generated which can be characterized as a modulation of the base chaotic oscillation. This modulated chaotic pattern can be transmitted to a receiver by transmitting a voltage $V_1$ tapped from point 242.

Figure 2B:
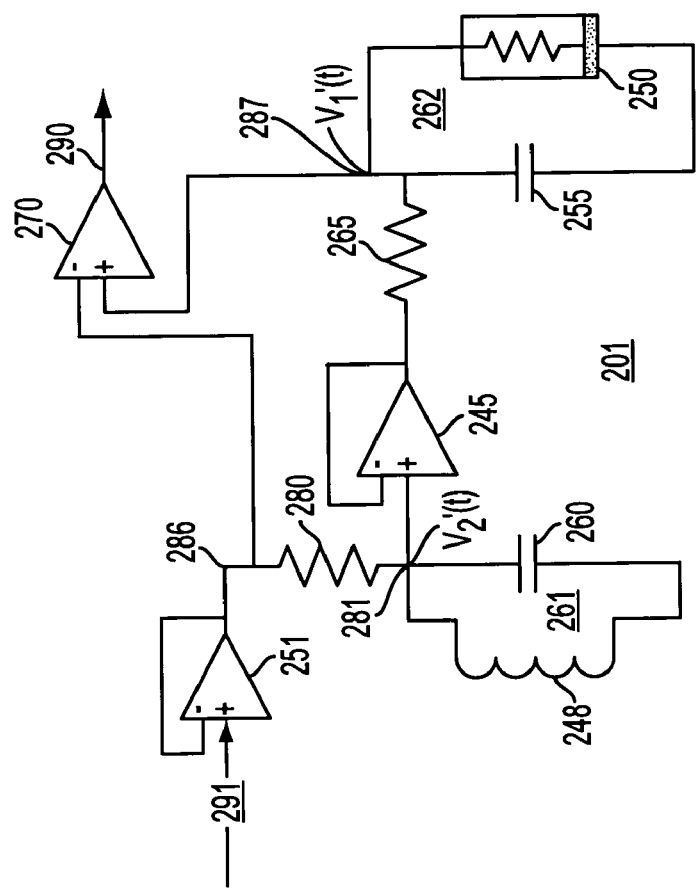
FIG. 2B shows a conventional receiver that can be used with the transmitter of FIG. 2A.

Referring now also to FIG. 2B, the modulated chaotic signal is detected by a receiver 201 containing a modified-Chua circuit whose component properties are chosen to insure that the receiving circuit 201 will exhibit the same oscillating behavior as the base configuration (auxiliary capacitor 237 switched off) of the Chua circuit of the transmitter 200. The need to match oscillating behaviors is to allow the receiving circuit 201 to synchronize with the received signal 291. One way to match the oscillating behaviors of the transmitting and receiving circuits 200 and 201 is to match the values of the components that determine the oscillating behavior. The resulting transmitted voltage $V_1$, output from the transmitter 200, is applied as input signal 291 to the receiver 201. Note that the component values need not be matched perfectly. It has been found that the receiver's $\alpha$ and $\beta$ can differ by as much as approximately 5 percent from the transmitter's without substantially affecting the ability of the circuits to synchronize.

The use of an optoelectronic switch 235 avoids any need for output biasing. Also, an optoelectronic switch 235 also adds no significant capacitance to the circuit. A low output biasing and low capacitance of the switching element make it easier to match the component values of the receiving and transmitting circuits 201 and 200 to insure synchronization.

Alternatively, a reed switch or a field effect transistor (FET) can be used to isolate the auxiliary capacitor 237 from the main circuit. To provide a lower output biasing requirement, multiple FETs can be employed as a single switch. In the embodiment of FIGS. 2A and 2B, the modulated chaotic signal is produced by varying the capacitance $C_2$ of the tank circuit 231 as described above. That is, in the transmitter 200, the auxiliary capacitor 237 is isolated from the main circuit by an optoelectronic switch 235, which effectively changes the capacitance of capacitor 220 in FIG. 2A.

To modulate the transmitter 200, the capacitance $C_2$ of the tank circuit 231 is modulated by intermittently combining the capacitance of auxiliary capacitor 237 with that of capacitor 220. This capacitance corresponds to the capacitance of capacitor 20 in the unmodified Chua circuit 101; that is, to $C_2$. By intermittently altering this capacitance responsively to the input signal 236, the Chua circuit of the transmitter 200 alternates between two different oscillating patterns.

The voltage signal $V_1(t)$ can be transmitted by any means desired. For example, the output chaotic signal $V_1(t)$ can be used to modulate an optical carrier, laser carrier, radio carrier, applied directly to a metallic (wire) interface, applied to a speaker and transmitted as sound waves, or transmitted using any other mechanism. The received signal can also be applied through an automatic gain control circuit (not shown in this embodiment) for signal conditioning.

In the embodiment of FIG. 2B, the received signal can be applied through a voltage follower 251, if desired for high input impedance, through a resistor 280, and finally to a bridge point 281 of L-C tank circuit 261. Tank circuit 261 has an inductor 248 and a capacitor 260 and can include a resistor in addition to its inherent resistance. The L-C tank circuit is connected to the chaotic portion of the embedded Chua oscillator of the receiver circuit 201 by a voltage follower 245. Current from the L-C tank circuit 261 is applied through the voltage follower 245 and a resistor 265 whose resistance matches that of the transmitting circuit resistor 225. In other words, the resistance R of the Chua circuits match.

By matching the resistance of 280 to that of resistor 225, tank circuit 261 is driven or pumped by the incoming signal exactly as tank circuit 231 is pumped by chaotic portion 222. When the $C_2$ values of the transmitter tank circuit 231 and the receiving tank circuit 261 are identical (that is, when auxiliary capacitor 237 is isolated from the tank circuit by opto-isolator 235), a time-varying voltage at 281 synchronizes and subsequently tracks that of the incoming signal 291. This synchronization occurs because the incoming signal matches that at corresponding point 282 of the transmitting circuit, so the environments of tank circuit 261 and tank circuit 231 are the same.

Also, the voltage at point 281 is applied through a resistor 265 that is also matched to resistor 225 so the environment of the chaotic part 262 of the receiving circuit 201 is also the same as the environment of the chaotic part 222 of the transmitting circuit 200. Thus, when the transmitter is oscillating about the base strange attractor equilibrium points (base referring to the situation when the auxiliary capacitor 237 is isolated from the transmitter 200 so all the circuit elements of the transmitting 200 and receiving 201 circuits match), tank circuit 261 quickly goes into an oscillating pattern that is in synchrony with that of the transmitter's tank circuit 231. When the auxiliary capacitor 237 is switched on by closing the optoisolator 235, the transmitter circuit 200 oscillates in a pattern that is no longer matched to that of the receiver and the receiver 201 can no longer track the signal perfectly. That is, the transmitting circuit 200 and the receiving circuit 201 no longer synchronize. Note, the value of the combined capacitance $C_2$ can be varied over the range 1 µF to 0.015 µF, a dynamic range of 66:1.

As discussed above, in one embodiment, receiving circuit 201 and the base configuration of the transmitting circuit 200 can be precisely matched, in terms of their oscillating behavior, to insure that receiver 201 will alternately synchronize and go out of synchronization responsively to the transmitter 200. That is, according to this embodiment, the transmitter's and the receiver's behaviors must be substantially matched for the transmitting and receiving circuits 200 and 201 to form an effective communications device. Since β (See FIG. 1D) varies as the square of resistance, precise resistors should be used in the transmitter 200 and the receiver 201. A combination of a 1580 ohm fixed resistor 280 and a 200 ohm, 25-turn pot 265 can be used for resistors 280 and 265 in receiver 201. This allows tuning of the receiver resistors to obtain a precise match to those in the transmitter. Note, if component values of the receiving circuit are chosen to match the values of α and β of the transmitting circuit but depart more substantially from those of the receiving circuit, the receiving circuit can still be driven into synchronization, but the response will not be as strong.

Note that the receiver circuit with the synchronizing resistor added can be configured with components that permit the receiver to produce a detectable pattern at the detector output of a chaotic signal produced by a Chua receiver whose component values do not match the transmitting circuit's precisely. A fully functional communication system can be made since the receiver can produce consistent output beat frequencies from the detector while the receiver circuit tries to follow the input signal. The receiver therefore detects signals that are not synchronized with the receiver chaotic parameters through a received process that shifts the amplitude and phase of the incoming strange attractor. This mode of operation produces a response over a wide range of α/β values as well as frequency ranges for a single specified α/β combination. One can build a vocabulary using this technique even when the chaotic signal attractor frequency is varied and α/β are different. The synchronizing resistor produces this beat frequency effect at the output of the detector.

A comparator 270 detects the alternating pattern of synchronizations and desynchronizations of the receiving circuit 201. The received signal at 286 is compared by comparator 270 with the voltage generated at 287. These two voltages are at corresponding locations 242 and 287 in the transmitting 200 and receiving 201 circuits. When the transmitting 200 and receiving 201 circuits are in synchrony, that is when the voltages follow the same time-dependent trajectory pattern, the comparator output 290 is zero. When the transmitting 200 and receiving 201 circuits are not in synchrony, that is when these voltages do not follow the same time-dependent trajectory pattern, the comparator output 290 is non-zero. A waveform is generated characterized by pulses representing the points where the two waveforms diverge by some voltage difference determined by the sensitivity of comparator 270. The sensitivity (voltage difference trigger) can be set by replacing the fixed comparator 270 with a comparator having hysteresis. Of course there can be a DC component, but that is ignored or filtered out of the comparator output 290.

The following is what occurs in the transmitter as the transmitting circuit 200 is modulated. When the auxiliary capacitor 237 is switched out of the circuit during a first time interval, the transmitting circuit oscillates around the base (strange) attractor at a particular attractor frequency. The circuit, of course, oscillates not at a specific frequency, but about a set of attractors. That is, the modulated signal is chaotically "smeared" over a range of frequencies around the current strange attractor equilibrium point or points.

In the embodiment of FIGS. 2A and 2B, the equilibrium point(s) correspond to the base value of $C_2$, which corresponds to the capacitance of capacitor 220 alone. Note that for some of the operating regimes illustrated in FIG. 1D, the equilibrium point(s) can be dependent on the initial state also. When auxiliary capacitor 237 is switched on by the opto-isolator 235, the transmitting circuit 200 begins oscillating in a different pattern corresponding to a then-current initial state and the new value of $C_2$ equal to the capacitance of capacitor 220 and auxiliary capacitor 237.

When a modulation pattern of successive actuations/deactuations is applied through opto-isolator 235, the transmitting circuit 200 switches between the first (base) signal and the second signal in accordance with the modulation pattern. In the receiver 201, the transmitted $V_1(t)$ signal is applied at 281 and through resistor 280. The receiver's L-C tank circuit 261 sees the received $V_1(t)$ applied through resistor 280 so that when the base-signal is transmitted, the $V_1(t)$ signal applied at 286 causes the voltage at 281, $V_2'(t)$, to follow the same time-dependent trajectory as $V_2(t)$ of the transmitting circuit 200. Given that $V_2'(t)$ in the receiving circuit is substantially identical to $V_2(t)$, the $V_1'(t)$ in the receiving circuit follows the same time-dependent trajectory as $V_1(t)$ of the transmitting circuit 200. Thus, the two circuits are synchronized when the transmitting circuit is oscillating about the base strange attractor(s). When $V_1(t)$ received corresponds to the base signal, $V_1(t)$ and $V_1'(t)$ are substantially identical and an output 290 of comparator 270, to whose inputs $V_1(t)$ and $V_1'(t)$ are respectively applied, has a nominally zero amplitude. In a practical system, the output of the comparator can have some hysteresis so that the difference must exceed some nominal level to generate a nonzero output.

When optoisolator 235 switches in the auxiliary capacitor 237, transmitting circuit 200 oscillates about the second strange attractor(s). When that happens, the receiving circuit 201 can no longer synchronize in response to the $V_1(t)$ applied at 281. This is because $C_2'$ (the capacitance of capacitor 260) no longer matches $C_2$ (the combined capacitance of capacitor 230 and auxiliary capacitor 237). As a result, the pattern of oscillation of $V_1'(t)$ is no longer synchronized with $V_1(t)$ transmitted and the output 290 of comparator 270 is no longer zero. The changes in output 290 between the nominal zero and nominal oscillating states can be registered through some convenient system, such as a power meter or frequency counter on the output 290, to generate a signal carrying the data in the information signal 236.

The receiving circuit 201 is very sensitive to the chaotic signal of $V_1(t)$. That is, the incoming signal can be a very low peak power signal (power within a narrow frequency band about a peak) while still cause the receiving circuit to synchronize with the transmitting circuit. Thus, receiving circuit 201 is able to follow the distinct chaotic time-dependent pattern of the received signal (when the base signal is being transmitted) and only by virtue of its inherent tendency to follow (be driven by) it, is the receiver 201 able to pick up the signal out of the noise. It is very much a resonance phenomenon, even though it is not periodic in the sense of strict linear oscillatory phenomena. This kind of resonance effect allows the power to be so spread over a range of frequencies that the transmitted signal appears to be "buried" in the noise of the channel. The signal can be detected by means of a receiving circuit whose parameters are closely matched with the transmitting circuit or by applying a large FFT engine (1024 point or larger) to the sampled data. The values of the components of the transmitting circuit must be known in order to pick up the data signal masked in the chaotic signal applied to the channel. The sensitivity of the various embodiments described below is so great that an effective communications signal can be characterized by a zero dB signal-to-noise ratio.

Note that a higher signal-to-noise ratio will allow synchronization to be achieved with less precise component matching. To achieve reliable transmission with the lowest signal-to-noise ratio, the precision of component-value-matching should be as high as practical. To achieve precise resistance matching, as mentioned, fixed resistors can be used with 25-turn fine-tuning resistors, either in parallel or series for each resistor 280 and 265.

As discussed above, a large number of different operating regimes are available by modifying $C_2$. However, the receiver 201 may not be capable of distinguishing among these because of the inability of the receiving Chua circuit to track a received signal 291 other than the one generated by the base configuration of the transmitting circuit.

Figure 3A:
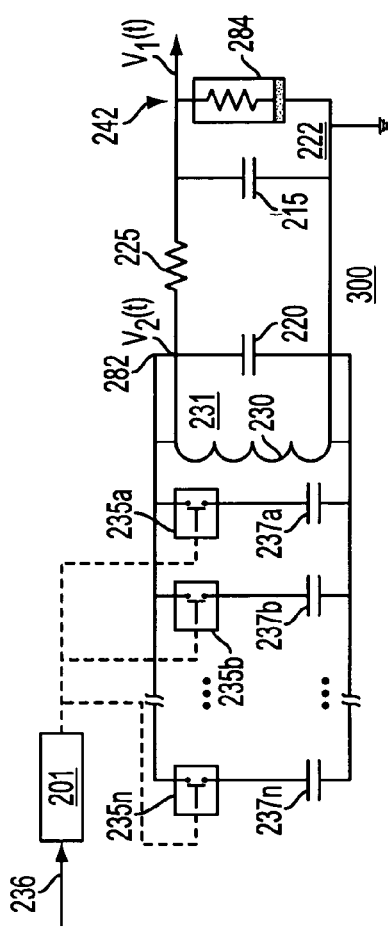
FIG. 3A shows another embodiment of a first-generation transmitter that produces a vocabulary of chaotic signals.
Figure 3B:
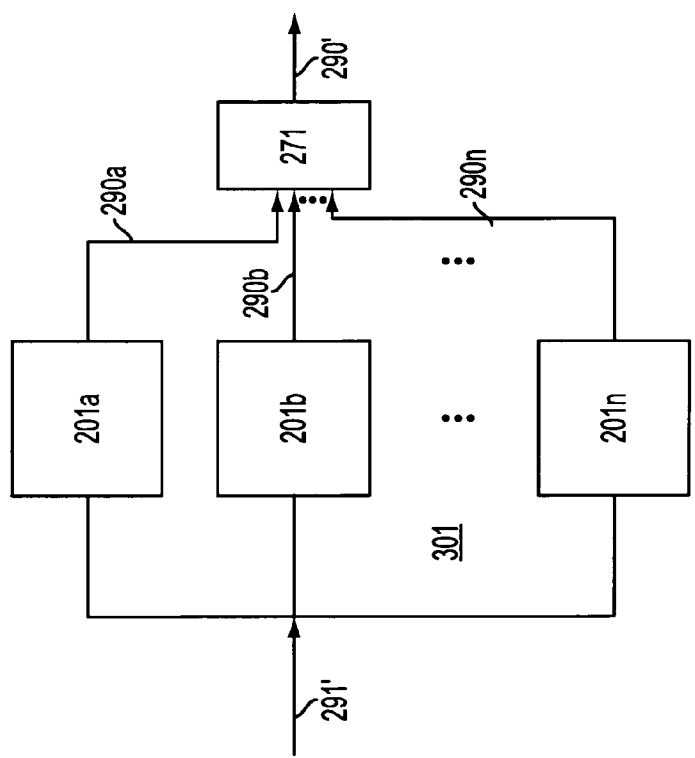
FIG. 3B shows a receiver for use with the embodiments of FIG. 3A and FIG. 4A.

Referring now to FIGS. 3A and 3B, a transmitter 300 has a bank of auxiliary capacitors 237a–237n that can be selectively switched into the tank circuit portion of the transmitter 200' by respective opto-isolators 235a–235n. Opto-isolators 235a–235n are controlled by a controller 201 responsively to the input signal 236. In all other respects, transmitter 200' is identical to transmitter 200 of FIG. 2A.

To produce a modulated signal, controller 201 is programmed to receive a data word at 236 and control opto-isolators 235a–235n to switch one or more of them into the circuit to produce a particular chaotic pattern. For example, if opto-isolators 235a and 235b are actuated to switch in auxiliary capacitors 237a and 237b, the capacitances of capacitors 220, 237a, and 237b are combined to produce a corresponding chaotic signal. This unique pattern forms one word or symbol of a vocabulary of possible ones that can be generated by actuating opto-isolators according to the various possible combinations.

Receiver 301 includes a bank of receivers 201a–201n, each the same as shown in FIG. 3B but with different component values chosen to allow each to resonate with a corresponding configuration of the transmitter 200'. That is, the component values for each receiver 201a–201n, are chosen such that each will synchronize with one word of the vocabulary of chaotic signals generated by the transmitter 200'. The outputs of each receiver 201a–201n each correspond to the output 290 of the comparator of FIG. 2B. These are individually applied to a detector 271 that determines which of the outputs 290a–290n is in synchrony with the transmitter 200' at a given point in time. Detector 271 determines this by indicating which output 290a–290n is nominally equal to zero.

Output 290' can be a stream of digital words each corresponding to the word transmitted. Thus, at any given instant, signal 290' can indicate the current, or most recently received, word being applied in the received signal to input 291'. The number of bits that can be transmitted with each cycle of the opto-isolators 235a–235n is equal to the $\log_2$ (log base-2) of the number of different capacitor values $C_2$ forming the vocabulary. In this embodiment, the number of receivers 201a–201n matches the size of the vocabulary, that is, the number of symbols or words generated by the transmitter 200'.

Figure 4A:
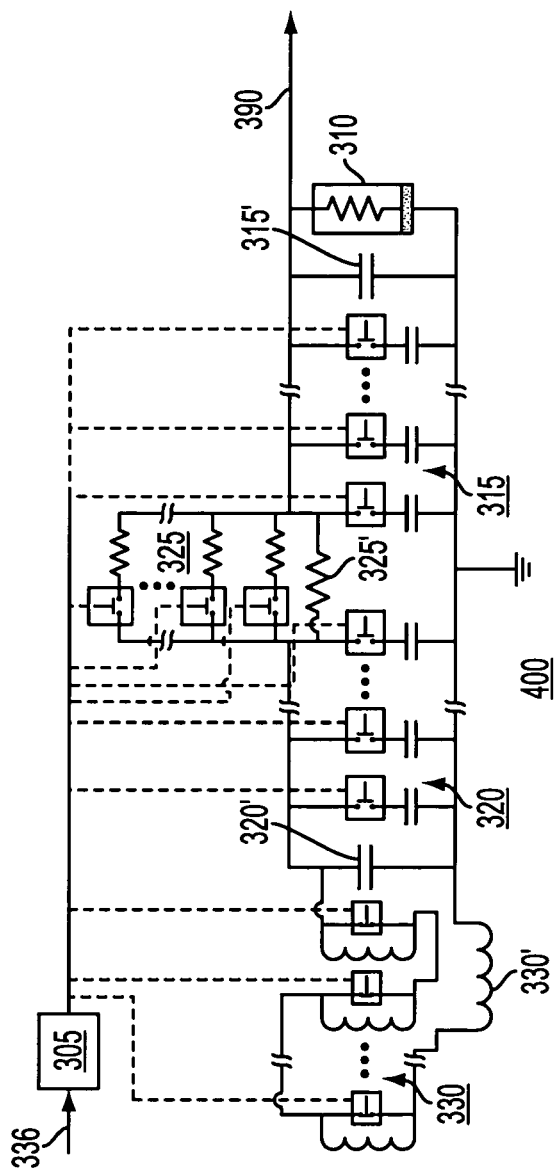
FIG. 4A shows another embodiment of a first-generation transmitter that produces a vocabulary of chaotic signals in which all such signals can be mapped to the same combinations of the lump parameter plane of FIG. 1D.
Figure 4B:
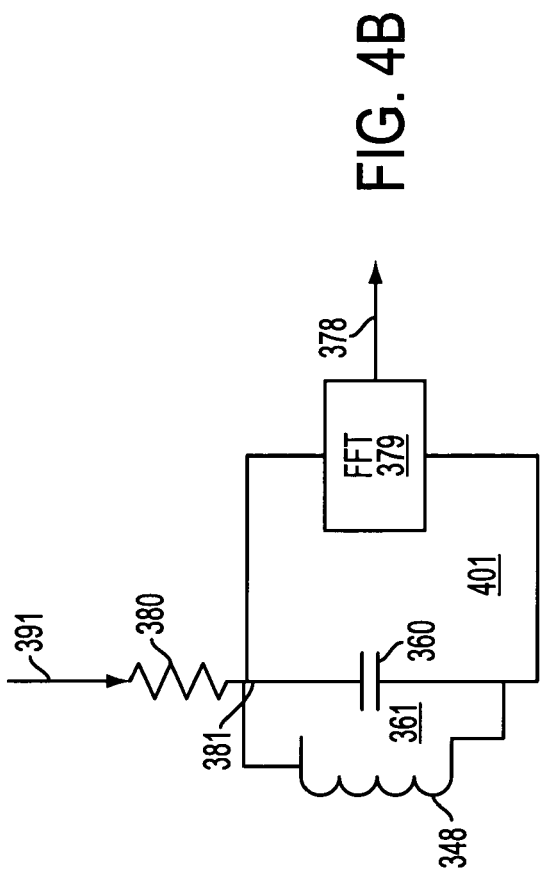
FIG. 4B shows another embodiment of a first-generation receiver for use with the embodiments of FIG. 3A and FIG. 4A, this receiver being usable with a simple counter circuit for determining a beat frequency.

Referring to FIGS. 4A and 4B, an alternative embodiment of the invention also produces a vocabulary of signal-words. In this embodiment, the values of the various components are chosen so that all "words" of the vocabulary are produced by configurations that maintain the same α–β combinations. That is, the values of $C_1$, $C_2$, R, and L of the transmitting circuit 400 are varied to produce a variety of selectable chaotic oscillation patterns, each of which coincides with the same α/β combinations. A bank of parallel inductors 330 can be provided that can be switched in by respective opto-isolators to add to the inductance of the fixed inductor 330'. To this end, a bank of parallel capacitors 320 can be provided that can be switched in by respective opto-isolators to add to the capacitance of the fixed capacitor 320'. A bank of parallel capacitors 315 can be provided that can be switched in by respective opto-isolators to add to the capacitance of the fixed capacitor 315'. Finally, a bank of parallel resistors 325 can be provided that can be switched in by respective opto-isolators to change the resistance of fixed resistor 325'.

In the embodiment of FIGS. 4A and 4B, instead of modulating the behavior of the transmitting circuit by varying only one component, the values of combinations of components determining $C_1$, $C_2$, R, and L are varied in such a way as to maintain $\alpha = C_2/C_1$ and $\beta = R^2 C_2/L$ constant under the control of a controller 305. That is, values of the auxiliary capacitors, resistors, and inductors in banks 315, 320, 325, and 330 are chosen so that when predefined combinations of the corresponding opto-isolators are actuated, the oscillating frequency changes (See equation (1), below), but α and β remain the same.

In a first embodiment, the inductance L and the capacitances $C_1$ and $C_2$, only, are varied, maintaining R constant. That is, only the opto-isolators in banks 315, 320, and 330 are switched to modulate the circuit. The fundamental frequency of the tank circuit, given by $$F = 1/[2\pi(LC_2)^{1/2}] \quad (1)$$

varies even though the oscillating regime remains constant. In this embodiment, there is no need to vary R to maintain a constant α and β. Also, the non-linear resistor 310 components do not have to be varied. In one embodiment of the transmitter 400, one combination of values of $C_1$, $C_2$, and L (corresponding to one state of the opto-isolator switches) can be identical to the combination of values corresponding to a receiving circuit 301. This combination of values causes the transmitting circuit to oscillate at a base frequency corresponding to the frequency of the receiver. In a first alternative embodiment, the values of $C_1$, $C_2$, and L are varied, keeping R constant.

The receiver 401, shown in FIG. 4B, consists of a tank circuit 361 and a fast Fourier transform FFT computer 379. The component values of tank circuit 361 are chosen to match the α/β combinations of the transmitter 400. The value of resistor 380, in the first embodiment, can be chosen to match that of the fixed R value of the transmitter. (As mentioned above, R is fixed in the first embodiment. The embodiment depicted in FIG. 4a is capable of variable R values, but a single fixed value is used in the first embodiment. If a fixed R value is to be used, the bank of resistors 325 could be omitted leaving only a single resistor 325'.)

The output 390 of the transmitter 400 is applied (through some transmission medium) to an input 391 of the receiver.

The FFT block 379 determines the word transmitted by the transmitter by detecting the difference between the fundamental frequency, given by equation (1), of the instant configuration of the transmitter 400, and the fixed configuration of the tank circuit 361. Fast Fourier transform (FFT) block 379 "sees" this frequency difference because tank circuit 361 attempts to follow the trajectory of the incoming signal applied through resistance 380. Since, however, the incoming signal is at a different frequency, tank circuit 361 is not able to maintain this trajectory and it "falls off the rails." The frequency with which the tank circuit alternately follows and uncouples from the incoming signal applied at 391 is equal to the difference between the fundamental attractor frequency of the transmitter 400 and that of the tank circuit 361. A peak at this difference frequency is indicated by the output 378 of the FFT block. Thus, output 378 indicates each word generated by the transmitter 400.

In an alternative embodiment, the value of R (the resistance determined by the configuration of resistor bank 325) of the transmitter 400 is varied also. In this case, the value of resistor 380 of the receiver 301 can be any of the values used for R in the transmitter 400 or another value.

In the receiving circuit 201 of FIGS. 2A and 2B, the Chua circuit oscillates in synchrony with that of the transmitter 200 when the base signal is received. The resulting output 290 from the comparator 270, as discussed, is a flat (nominally zero) output. However, when the transmitter 200 is placed in a configuration such that it a signal other than the base signal, the comparator output 290 of the receiver 201 becomes substantially non-zero and, also, chaotic due to the lack of synchronization. This would also be the case if the transmitter 400 were connected to the receiver 201 of the prior embodiment. Any signal other than ones that drive the receiver into synchronization will produce a non-zero chaotic signal at the output 290. In other words, if this output 290 were viewed on an oscilloscope, the trace would appear chaotic and it would be difficult if not impossible to tell which "word" of the vocabulary of strange attractors was generating the transmitted signal. This is because $V_1'$ can no longer synchronize with the $V_1$ transmitted.

In the combination of the transmitter 400 and the receiver 301 of the FIG. 4A/4B embodiment, however, the transmitter drives the tank circuit 361 for part of the tank circuit's fundamental cycle but subsequently skips ahead or lags behind (unless, of course, the fundamental frequency of the transmitter is the same as that of the receiver) the driving input voltage applied at 391. This happens at the frequency difference (a beat frequency; the difference between the fundamental frequency of the transmitter (e.g., (1)) and the fundamental frequency of the receiver) and thus forms a detector. The reason the receiver is able to follow the transmitter in this way is that the $\alpha$ and $\beta$ of the transmitter and receiver are matched and the natural frequency of the tank circuit is an integer multiple of the frequency of the transmitting circuit given by equation (1).

In addition to using a FFT calculator, alternative ways of detecting the beat frequency include an amplitude detector connected across the same terminals as the FFT calculator and which outputs to a counter. The counter can count the number of beats to determine the frequency of the transmitter. Various other alternatives would occur to a practitioner skilled in the art of signal conditioning.

Figure 4C:
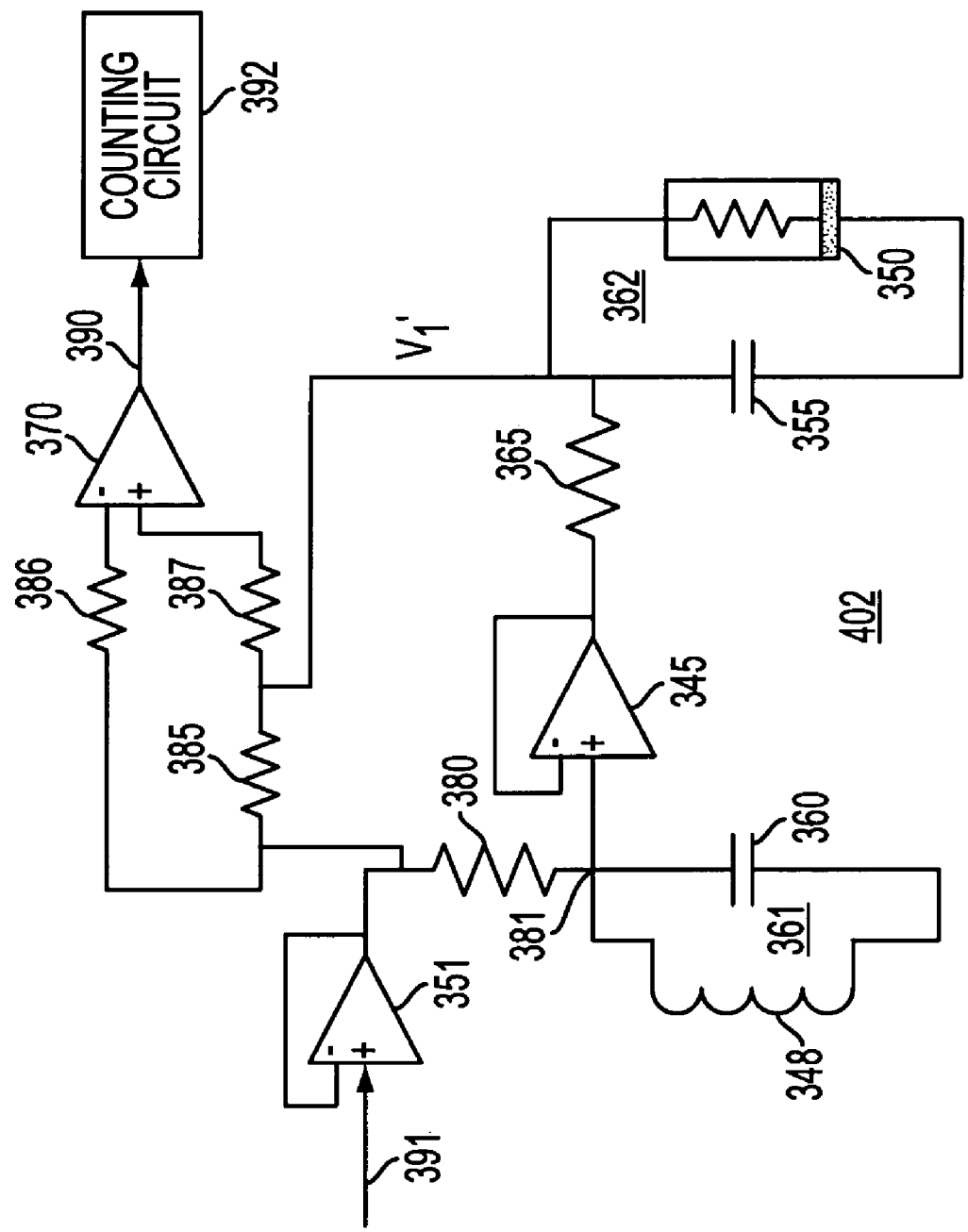
FIG. 4C shows another receiver for use with the embodiment of FIG. 3A and FIG. 4B using a synchronizing resistor 385.

Referring now to FIGS. 4A and 4C, an alternative receiver design employs a synchronizing resistor 385 and comparator input resistors 386 and 387. In this embodiment, the received signal, corresponding to a signal other than the base strange attractor, is applied to the chaotic portion 362 through the synchronizing resistor 385. In the embodiment of FIG. 4C, it has been found, through experiment, that the synchronizing resistor 385 can be adjusted to optimize the ability of the receiver circuit 402 to follow the trajectory of the transmitter signal at portions thereof so that the zero levels of the output 390 are clean and clear. The application of the received signal to the chaotic portion 362 of the receiver 402 through synchronizing resistor 385 forces the chaotic portion into an oscillation pattern that forms clear and distinct beats with the original transmitted signals that are output by the comparator 370. Because the beats (amplitude differences) are distinct and clear, a counting circuit 392 can be used to indicate the detected word. As in the embodiment of FIG. 4B, the beats indicate the frequency of the transmitting circuit 400 oscillations. It appears the reason the synchronizing resistor 385 allows clean beats to be formed is that the receiver is forced by the application of $V_1(t)$ to the chaotic portion to follow certain portions (i.e., zero crossings) of the chaotic signal from the transmitter 400. During these brief intervals, the comparator output 390 goes to nominal zero output.

Counting circuit 392 can be any of various circuits for determining the number of such zero-intervals per unit time. For example, the counting circuit can reset a timer at the start of a nominal zero (zero within a tolerance) and output a pulse to a counter if the zero is maintained for some threshold interval. The counter can be reset through the transmission of a base chaotic signal for which the comparator output remains zero for a second threshold interval. The counter can automatically reset at predetermined intervals maintained in synchrony by the transmission of the base chaotic signal.

Note that the use of a photo field-effect transistor (FET) optocoupler for the opto-isolator in the various transmitter embodiments is recommended because of the following properties. First, the example used for evaluating the circuits tested has a gallium-arsenide infrared emitting diode coupled to a symmetrical bilateral silicon photodetector. The detector is electrically isolated from the input signal and performs as an ideal FET. Distortion free control of low level alternating current (AC) and direct current (DC) signal is enabled. The primary feature that relates to modulating chaos is the low output impedance of the FET when active (i.e., $\leq 100$ ohms). Also, the device exhibits high impedance ($\geq 300$ Mega-ohms) when switched off.

The output FET is controlled via a channel voltage that does not require external biasing of the device so that it can operate as an ideal switch. This is compared to conventional FETs that require external biasing. In addition, the device is characterized by a shunt capacitance of $\leq 15$ picofarads. The circuits allow switching speeds of up to 2 Megahertz. For slower speeds, a solid state relay switch can be used. Finally, a normal FET has some capacitance between the drain and the gate. The small current differential permitted by this can prevent the circuit from operating chaotically or it can make it difficult to match the chaotic pattern of the base signal in the receiving and transmitting circuits.

Figure 4D:
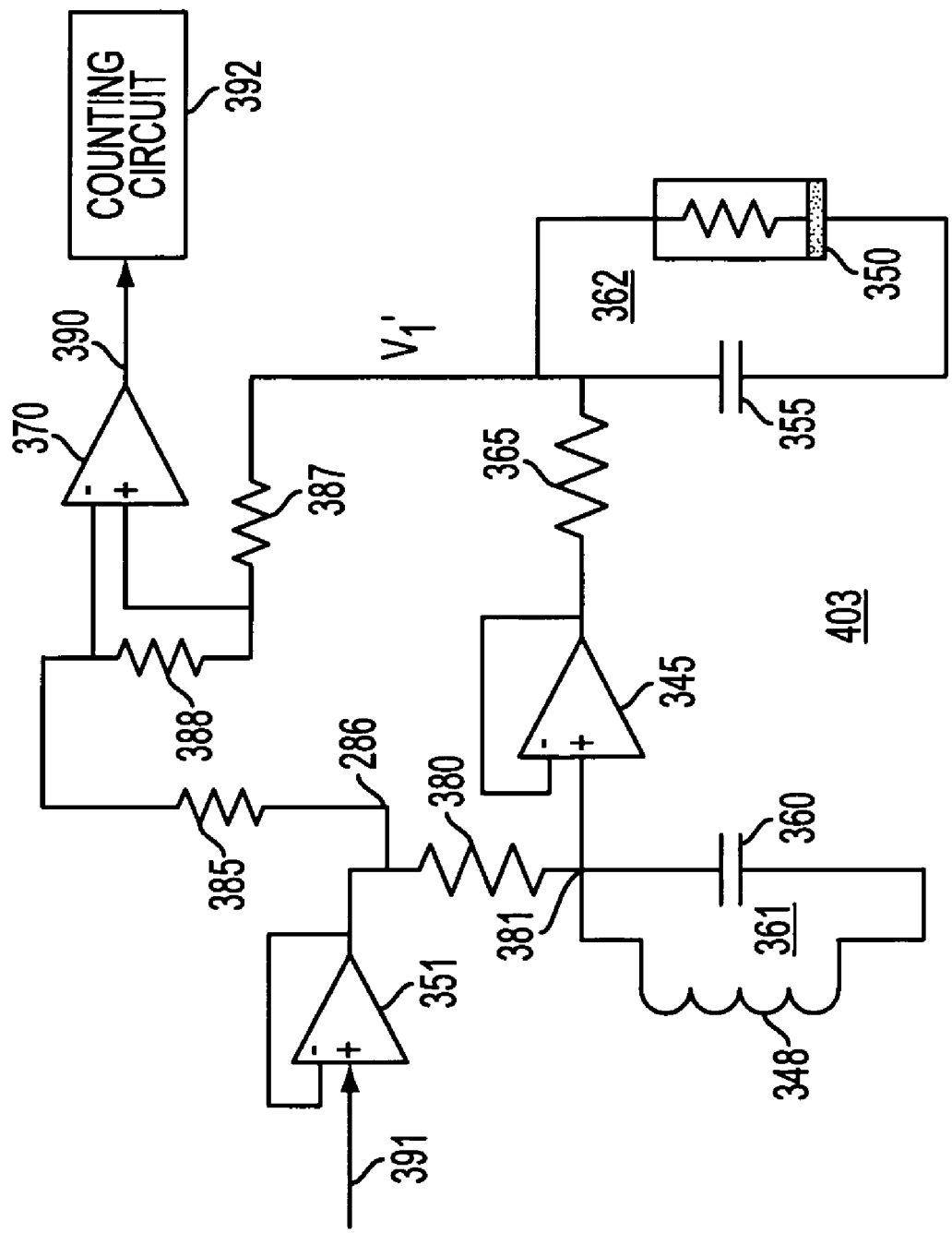
FIG. 4D shows another receiver usable with a simple counter circuit for determining a beat frequency using a synchronizing resistor formed from a combination of resistors.

The embodiment of FIG. 4D, receiver 403, has the characteristics of that of FIG. 4C except the synchronizing resistor is formed of the sum of resistors 385, 387, and 388. As in the embodiment of FIG. 4C, the embodiment of FIG. 4D also uses a simple counter circuit for determining a beat frequency. Also, the combination of resistors 385, 387, and 388 provide a synchronizing element to lock the chaotic portion of the receiver to the incoming signal, as in the embodiment of FIG. 4C. In this embodiment, however, a voltage follower 351 isolates the incoming communication signal from the receiver-generated chaotic signal.

It has been determined that a resonance voltage difference is achieved when the resistance of the synchronizing resistor is approximately 5 times the resistance of resistor 380. This configuration maximizes the voltage difference between points 286 and 287 of FIG. 4D and FIG. 2B, respectively.

Figure 4E:
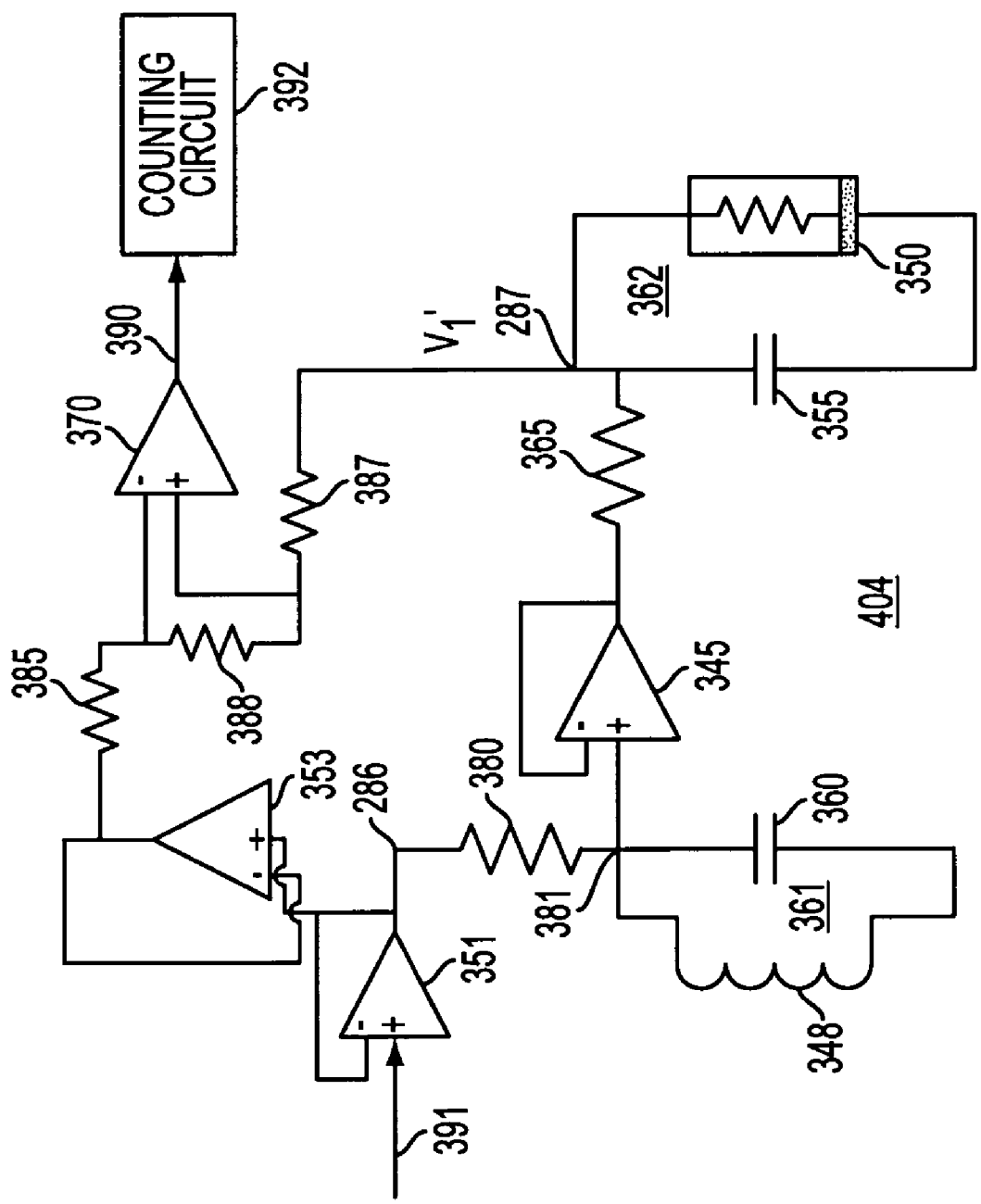
FIG. 4E shows another receiver similar to that of FIG. 4D, but which adds an emitter follower 353 to isolate the oscillator portion 361 from point 287.

The embodiment of FIG. 4E (receiver 404) adds an emitter follower 353 to isolate the oscillator portion 361 from point 287. In other words, a voltage follower blocks feedback from point 287 to the oscillator portion. It provides feed-forward coupling of the incoming signal 391. This causes synchronization to be forced through two parallel paths. One path is through the emitter follower 351 and synchronization resistors 385, 388, and 387 to the chaotic portion of the Chua circuit. The other path is through the oscillator portion 361 and the emitter follower 345 and resistor 365.

Figure 4F:
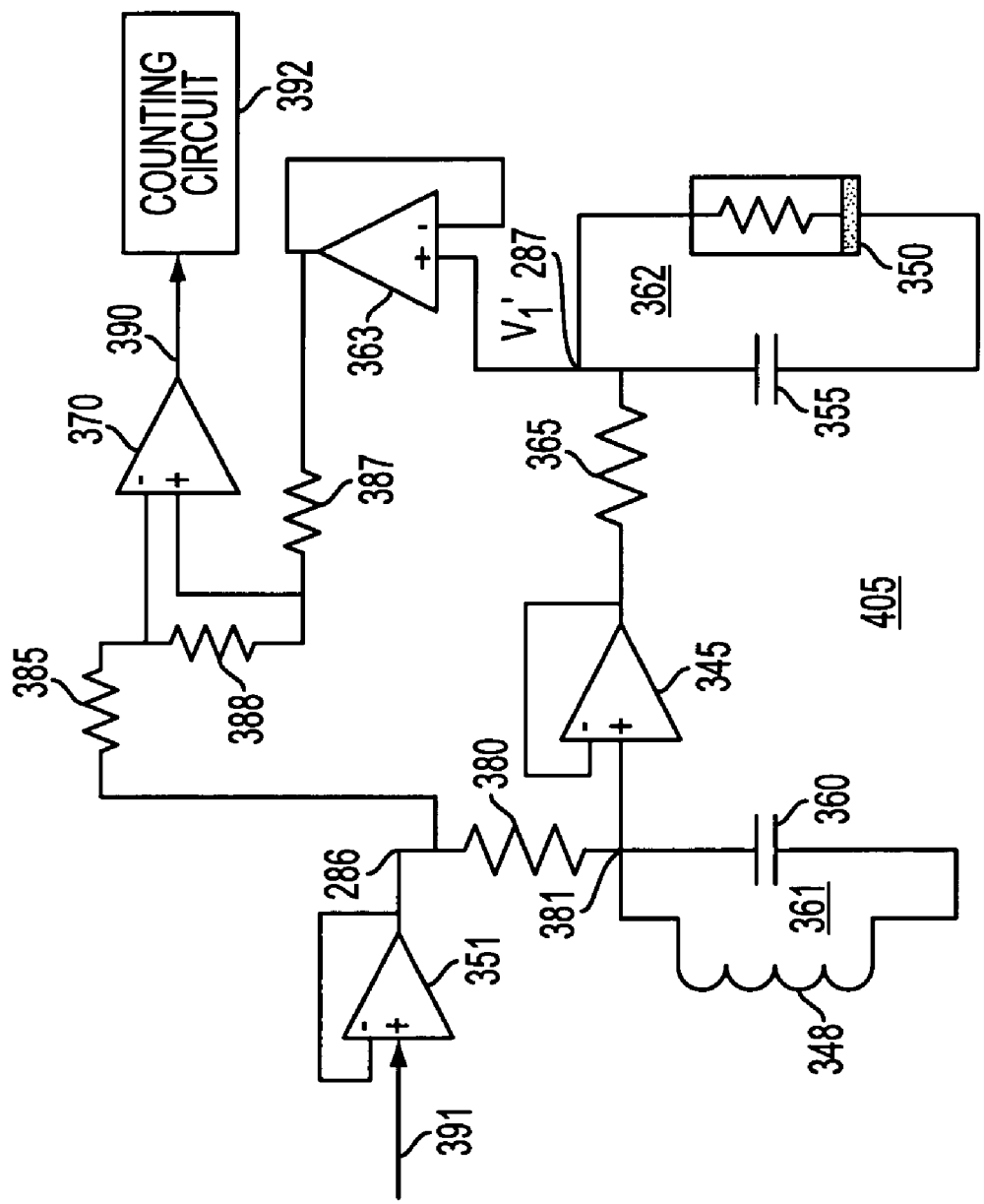
FIG. 4F shows a receiver including a simple counter circuit for determining a beat frequency, wherein resistors provide a synchronizing element to lock the incoming voltage of the communications channel and the receiver generated voltage. In this embodiment, voltage follower 363 isolates the receiver generated signal from the incoming signal and allows the receiver generated signal to feedback into the oscillator portion of the Chua circuit to cause faster synchronization.

In the FIG. 4F embodiment, receiver 405 reverses the feedback path using an emitter follower 363 to provide a phase lock loop type operation in which the voltage $V_1'$ is fed back into the oscillator portion of the Chua circuit to achieve synchronization. In this embodiment, voltage follower 363 isolates the receiver-generated signal from the incoming signal and allows the receiver generated signal to feed back into the oscillator portion of the Chua circuit to cause faster synchronization.

Figure 5:
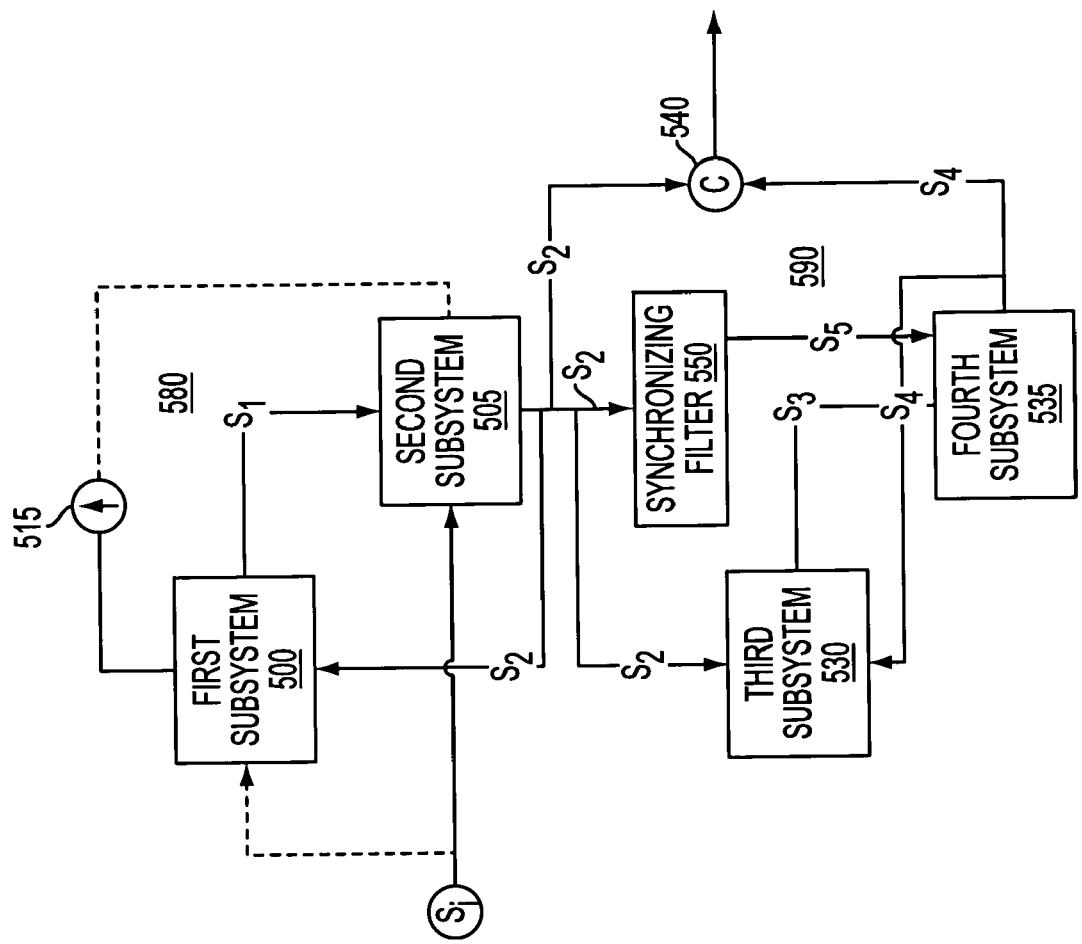
FIG. 5 shows a generalized communications system with a synchronizing filter 550 according to a first-generation embodiment of the invention.

Referring now to FIG. 5, a general chaotic communications system in which the synchronization concept identified above is applied includes a transmitter 580 and a receiver 590. Transmitter 580 includes a first subsystem 500 signally coupled to a second subsystem 505. Subsystems 500 and 505 can include common elements, but are not coextensive. First subsystem 500 applies a signal $S_1$ to second subsystem 505 and second subsystem 505 applies a signal $S_2$ to first subsystem 500. First subsystem 500 drives second subsystem 505 with signal $S_1$ and second subsystem 505 drives first subsystem 500 with signal S2.

Either first subsystem 500 or second subsystem 505 can be driven by a driving signal or by some current source 515 or simply by establishing an initial state if both systems are lossless as in a purely numerical system generated by a computer. Current source 515 could form a portion of either subsystem 500 and 505 as in a Chua diode described in detail in various prior art publications, for example, *Chua's Circuit: A Paradigm for Chaos*, Ed. Rabinder N Madan, (see pp. 13–24), World Scientific Publishing, NJ, USA, 1993; the entirety of which book is incorporated herein by reference. Alternatively, in a physical system such as an electrical circuit, current source 515 could be derived from a driving circuit such as described in U.S. Pat. No. 5,473,694 (element 115 in FIGS. 1 and 7) the entirety of which patent is incorporated herein by reference. Again in a numerical model, current source 515 would be absent since the transmitter 580 could be considered lossless.

The transmitter is perturbed by some means to modulate the signal $S_2$ to convey information. This can be done by injecting current into either signal S1 or S2 or some portion of either or both of the first and second subsystems 500 and 505 or by modifying parameters of either or both of the first and second subsystems. This information signal injection process is represented by the application of information signal $S_1$ to either of the first and second subsystems 500 and 505. Note, however, that the information signal can be coextensive with a driving current source 515 such as described in U.S. Pat. No. 5,473,694 and that it can be applied as a current addition to either or both of signals $S_1$ or $S_2$ or by application to either of subsystems 500 or 505.

In accordance with one aspect of the invention, signal $S_2$ is applied to the receiver 590. In the prior art arrangements, the signal $S_2$ would be applied only to a third subsystem 530 whose configuration closely matches first subsystem 500. Transmitted signal $S_2$ is also applied through a synchronizing filter 550 to the fourth subsystem 535 whose characteristics closely match those of second subsystem 505. To extract the received signal, the incoming signal $S_2$ is processed together with the signal $S_4$ generated in the response, for example by subtracting them in a comparator with hysteresis 540. Alternative methods of processing the received signal and the signal S4 generated by the receiver can be employed, for example, the phase comparison technique described in U.S. Pat. No. 5,473,694.

Note that in all of the above embodiments, it may be desirable periodically to send a registration signal, for example, a contiguous series of base chaotic signals, to insure that any clocks on the receiving and transmitting ends are aligned. Such registration might be needed, for example, to demarcate the time blocks applied to the FFT calculator so that the correct time series is sampled. This might not be necessary, depending on the size of the FFT block relative to the symbol duration.

Note that the invention can be implemented using a computer rather than discrete components since the Chua circuit is readily susceptible to digital simulation. In this case, all the above-described processes could be implemented digitally, with appropriate use of A/D and D/A conversion at either end of the communications channel. The communications systems described also form the basis of computer algorithms that can be implemented in a processing architecture to implement a chaotic communications system. References to discrete components and time-varying parameters should be interpreted to encompass their analogues in the digital signal processing domain. Similarly, references herein to "circuits" should be understood to include both analog and digital implementations of the circuits.

II. SECOND-GENERATION EMBODIMENTS AND TECHNIQUES

As described above, various first-generation systems use modulated chaotic circuits to transmit information in a low-power, high-noise environment with simple circuit elements. Modulated chaotic communication systems such as those described above provide benefits similar to spread-spectrum technology (e.g., covert communication applications and noise immunity) using a simpler, cheaper circuit design and improved signal-to-noise ratios.

The present inventors have discovered that the modulation techniques used in first-generation systems may be subject to certain bandwidth limitations. In particular, it has been determined that the modulation bandwidth using the aforementioned techniques may be generally limited to 10 to 15% of the tank circuit frequency in the transmitting circuit. This limitation is believed to be due to the fact that changing lump parameters (reactive components) in the transmitter requires a certain amount of settling time in the transmitter before the receiver can synchronize with the changed transmitter parameters, although this theory is not critical to understanding or practicing the present invention. The reactive components' impedance change is believed to cause signal spikes that ring the receiver at the discontinuity points that cause receiver noise spikes.

Modulation bandwidth is an important consideration in applying the principles of the invention commercially. In cellular telephone systems and cable television transmission systems, for example, the ability to transmit larger quantities of information over a channel of a given bandwidth translates into lower costs. Consequently, it is desirable to increase the bandwidth when modulating chaotically oscillating transmitters.

In order to overcome the aforementioned limitations, the present inventors have discovered that by modulating certain characteristics (including nonreactive components) of the transmitting circuit, the modulation bandwidth can be increased by approximately 200%. In some embodiments, this effect occurs as a result of changing one or more non-reactive resistive values in the transmitter circuit, which allows the transmitter to smoothly transition between strange attractors, which causes the receiver to go into and out of synchronization almost instantly without generating noise. Various transmitter circuits according to the second-generation embodiments can be used with first-generation receivers described above. Other features, improvements and advantages of the second-generation system will become apparent through the following description and accompanying figures.

A. General Principles

Figure 19A:
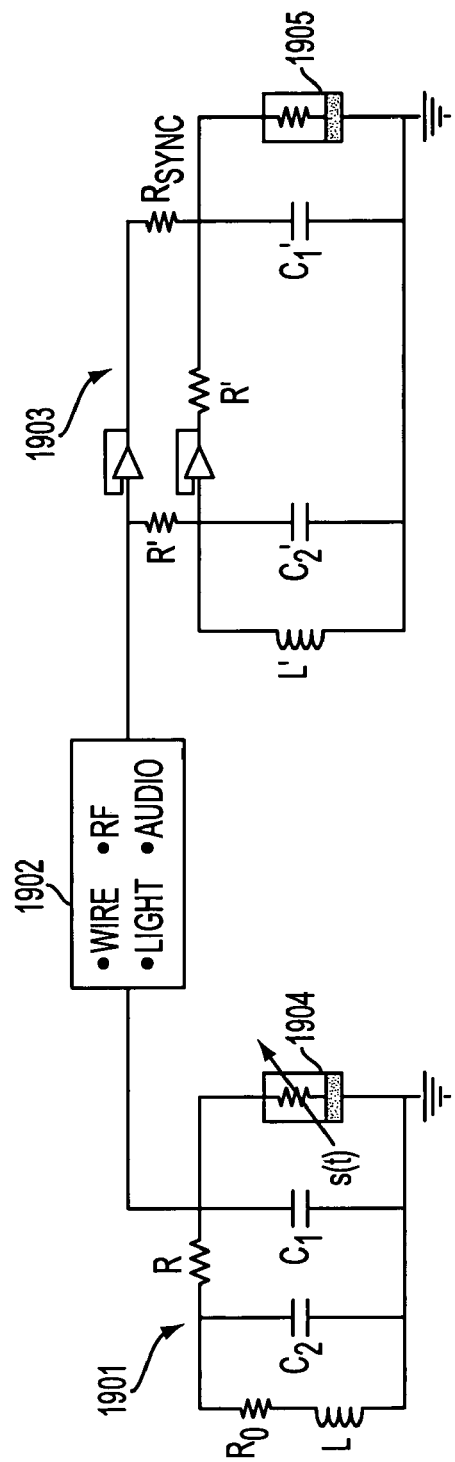
FIG. 19A shows a second-generation system employing various principles of the present invention, including a transmitter with a nonlinear element 1904 modulated with an information signal, and a receiver including a nonlinear element 1905 and a synchronizing resistor Rsync.

Turning first to FIG. 19A, a second-generation system employing various inventive principles is shown. The system includes a chaotic transmitter circuit 1901 coupled to a communications channel 1902 and a chaotic receiver circuit 1903. Like the chaotic transmitters described above with respect to the first-generation system, transmitter 1901 includes a tank circuit characterized by inductor L and capacitor C2, a resistor $R_0$, and a chaotic portion including a second capacitor C1 and a nonlinear element 1904.

Figure 19B:
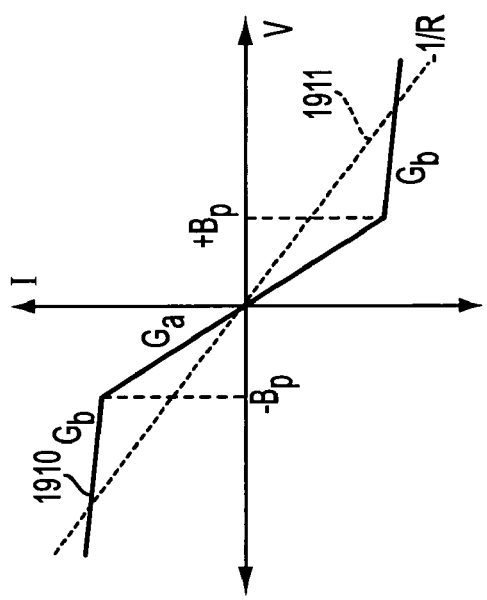
FIG. 19B shows a current/voltage curve 1910 for a nonlinear diode superimposed over a load line 1911.

As in many of the first-generation systems, nonlinear element 1904 includes a negative resistance element having a current-voltage response characteristic such as that illustrated by line 1910 in FIG. 19B. In contrast to the first-generation systems, however, the current-voltage characteristics of nonlinear element 1904 are modulated in accordance with an information signal s(t). This modulation behavior is denoted by an arrow through the nonlinear element as shown in FIG. 19A. In one embodiment, nonlinear element 1904 comprises a negative resistance diode.

As with the first-generation systems, communications channel 1902 can comprise any of various transmission media such as wire, light (including fiber optic), radio frequency (all bands), or sound, for example. Chaotic receiver circuit 1903 can comprise any of the various receivers described above with respect to the first-generation systems, or may include various enhancements described below.

FIG. 19B shows the current/voltage (I/V) characteristics of a nonlinear element such as those used in the first-generation system. A direct current load line 1911 is superimposed over a piecewise linear current-voltage characteristic line 1910, representing the quantity (−1/R), where R is a resistance coupling the tank circuit to the chaotic portion of the circuit as shown in FIG. 19A.

Figure 19D:
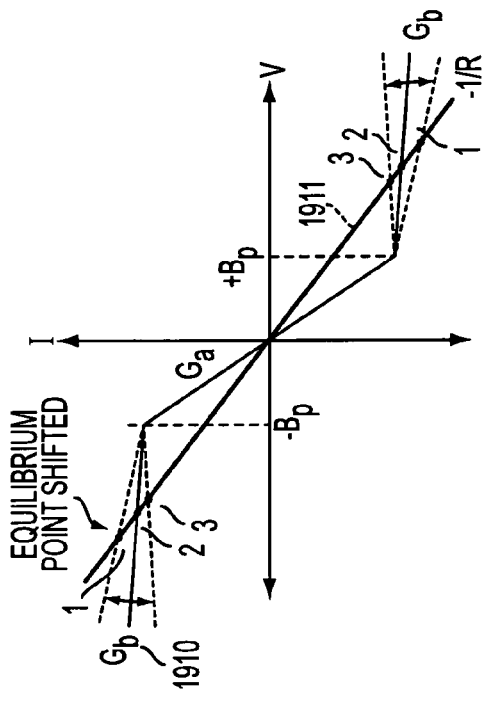
FIG. 19D shows how the current-voltage characteristic curve can be changed at the transmitter to move the equilibrium points between three different positions while slope Ga and the breakpoint positions are held constant.
Figure 19C:
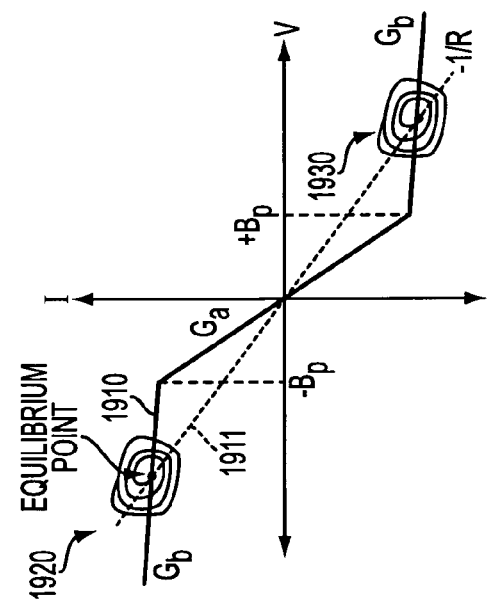
FIG. 19C shows two "single-scroll" attractors 1920 and 1930 orbiting around equilibrium points at the intersection of a nonlinear diode current-voltage characteristic curve and a load line, illustrating a DC analysis of a transmitter.

FIG. 19C shows two single scroll attractors 1920 and 1930 orbiting around equilibrium points where nonlinear element characteristic curve 1910 intersects load line 1911. When operating in a single-scroll attractor mode, the current-voltage point oscillates about either equilibrium ("attractor") point 1920 or 1930, depending on circuit parameters. When operating in a double-scroll attractor mode, the circuit transitions between upper attractor 1920 and lower attractor 1930 of the curve when the strange attractor voltage touches or crosses the breakpoint voltage −Bp or +Bp (i.e., a discontinuity point on the IV characteristic curve defined by the diode breakdown voltage +/− Bp and any biasing voltage applied to the diodes). These principles were described generally in connection with the first-generation systems above.

According to various second-generation embodiments, the equilibrium points are shifted in accordance with an information signal by changing one or more resistance values of nonlinear element 1904. As shown in FIG. 19D, modulating these resistance values has the effect of shifting the strange attractor points to different equilibrium positions along the load line. In other words, an information signal is used to shift the equilibrium points, changing the strange attractor frequency and amplitude. Because this shift can be accomplished by changing a nonreactive resistance value, the shift occurs quickly, instantly shifting the transmitter's operating regime between different strange attractors and allowing a receiver to synchronize very quickly (e.g., in less than a quarter cycle of the tank circuit's fundamental frequency).

Figure 19F:
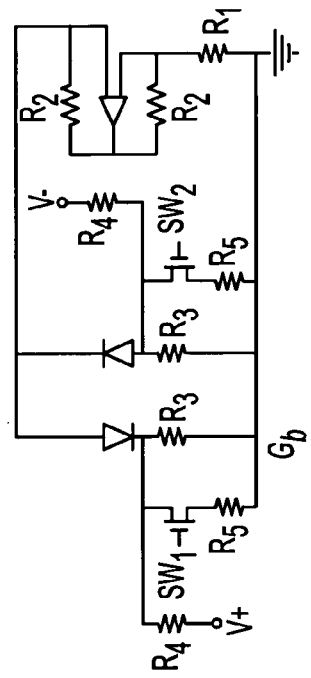
FIG. 19F shows one technique for changing a nonlinear diode current-voltage characteristic curve using an ideal switch SW1 and a resistor in series with the ideal switch that is also in parallel with one of the nonlinear diode resistors.
Figure 19E:
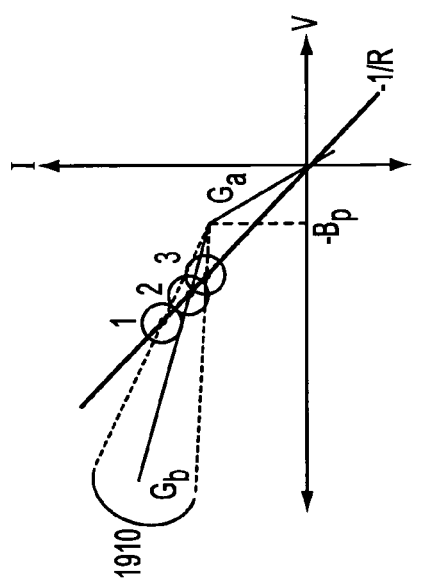
FIG. 19E shows a strange attractor moving with the equilibrium point as a nonlinear circuit element is modulated with an information signal, causing changes in the slope of part of the characteristic curve.

FIG. 19E shows the strange attractors moving with the equilibrium point, wherein the impedance of the load is changing and a time varying signal is traced out on the voltage across the nonlinear diode input. As shown in FIG. 19E, three or more different symbols can be generated, each corresponding to a single equilibrium point on the characteristic curve.

FIG. 19F shows one technique for changing the nonlinear diode current-voltage (IV) characteristic curve using an ideal switch (SW1 and SW2) and a resistor in series with the ideal switch (R5) placed in parallel with one of the nonlinear diode resistors. Further details of this circuit are provided below. In general, FIG. 19F shows a so-called "Caltech" diode that is modulated such that the slope Gb of the nonlinear characteristic curve 1910 in FIG. 9D is changed. This causes the strange attractor to change frequency and equilibrium points as shown in FIGS. 19D and 19E. Gb changes as follows:

$$Gb = R_3 - R_1/R_3 \times R_1$$

When R5 is placed in parallel with R3 the new Gb value is:

$$Gb = \frac{\frac{R_3 \times R_5}{R_3 + R_5} - R_1}{\frac{R_3 \times R_5}{R_3 + R_5} \times R_1}$$

This yields a new slope for Gb and this new slope crosses load line 1911 in FIG. 19D at points 2 or 3.

Figure 19G:
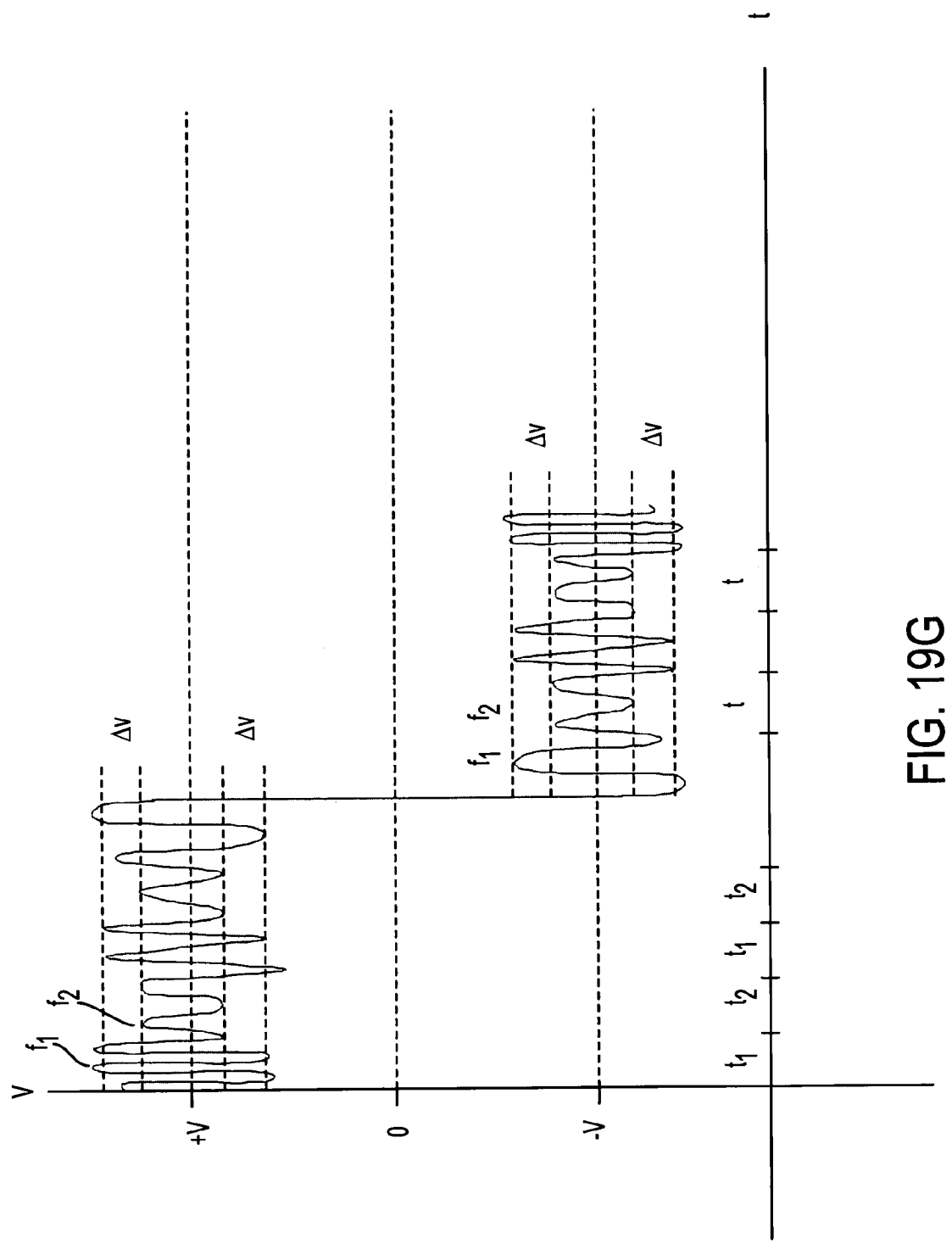
FIG. 19G shows the result of modulation on the voltage across the nonlinear diode.

FIG. 19G shows the result of modulating the voltage across the nonlinear element. Note that both the amplitude of V1 and the frequency are changed. At the receiver, the frequency and/or amplitude changes can be used to demodulate the signal as shown in various first-generation embodiments.

In general, chaotic receivers described above with reference to the first-generation systems can be used to detect and recover information transmitted with second-generation transmitters. As one example, the receiver shown in FIG. 4C can synchronize to a transmitter and, when the transmitter's strange attractor is changed in accordance with the principles described above, the receiver will fall out of synchronization. These changes can be detected by a counting circuit or any of various other methods described in the first-generation systems in order to recover information.

In general, changing the current-voltage characteristics of a circuit element in a chaotic transmitter by changing a nonreactive circuit value to transmit information will be referred to as "chaotic trajectory shift modulation" and the resulting signals will be referred to as "chaotic trajectory shifted" or "chaotic trajectory modulated" signals. In the specific case where a chaotic signal is transitioned between two or more discrete signal profiles by such techniques, the modulation will be referred to as "chaotic trajectory shift keying modulation" and the resulting signals will be referred to as "chaotic trajectory shift keyed" signals.

B. Modulating a Nonlinear Element of the Transmitter

Techniques for modulating characteristics of a nonlinear element in a chaotic transmitter will now be described according to various second-generation embodiments of the invention.

Figure 6A:
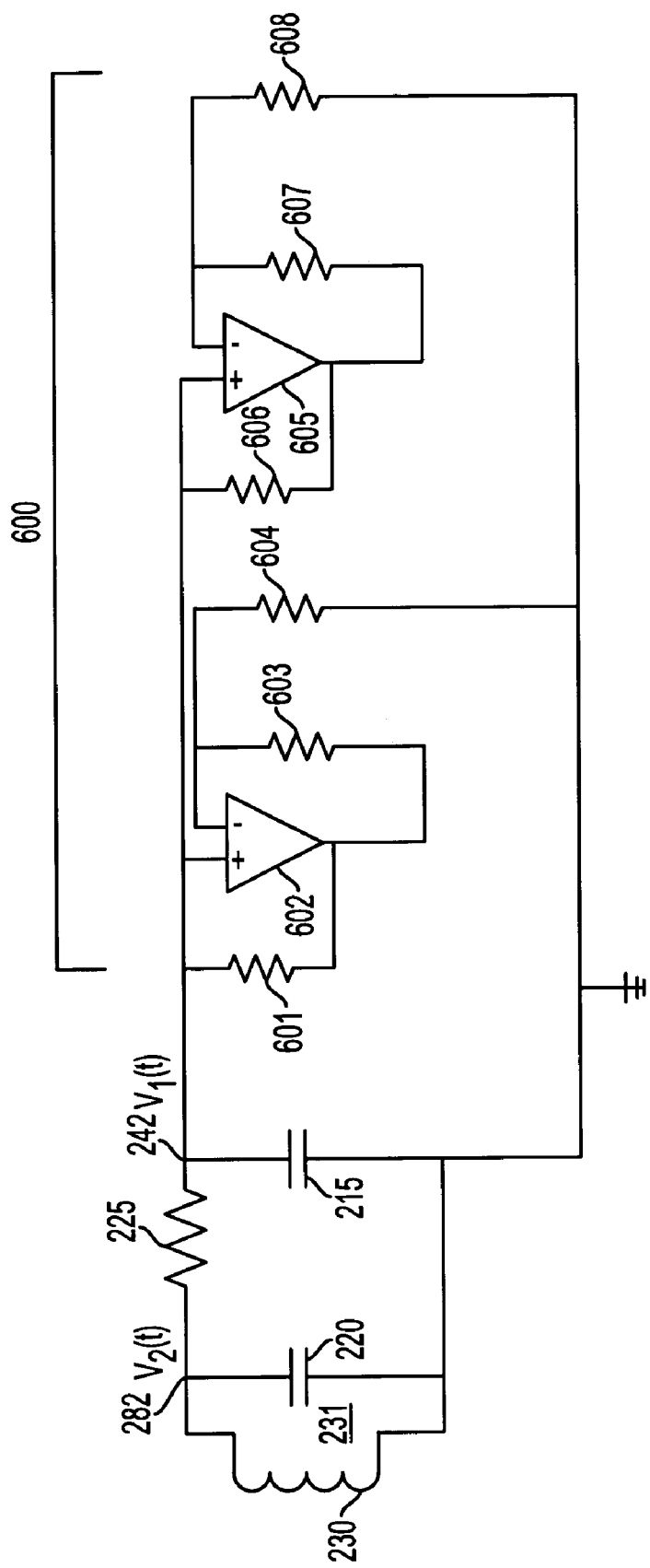
FIG. 6A shows a conventional transmitter with a Kennedy non-linear diode that can be modulated according to the principles of a second-generation system.

FIG. 6A shows a chaotic oscillator including a tank circuit 231, capacitor 215, resistor 225, and a so-called "Kennedy" diode 600 that can be used as the nonlinear element of a Chua transmitter shown in FIG. 2A. This diode, which is known in the prior art (see, e.g., *Chua's Circuit: A Paradigm for Chaos*, Rabinder N. Madan, pp. 86–87 (1993)), includes op amp 602 coupled to resistors 601, 603, and 604, and op amp 605 coupled to resistors 606, 607, and 608. References herein to "Kennedy diode" should be understood to refer to subcircuit 600 of FIG. 6A and its many obvious variations. Tank circuit 231, resistor 225, and capacitor 215 are the same as or similar to those shown in the transmitter circuit of FIG. 2A.

Figure 8:
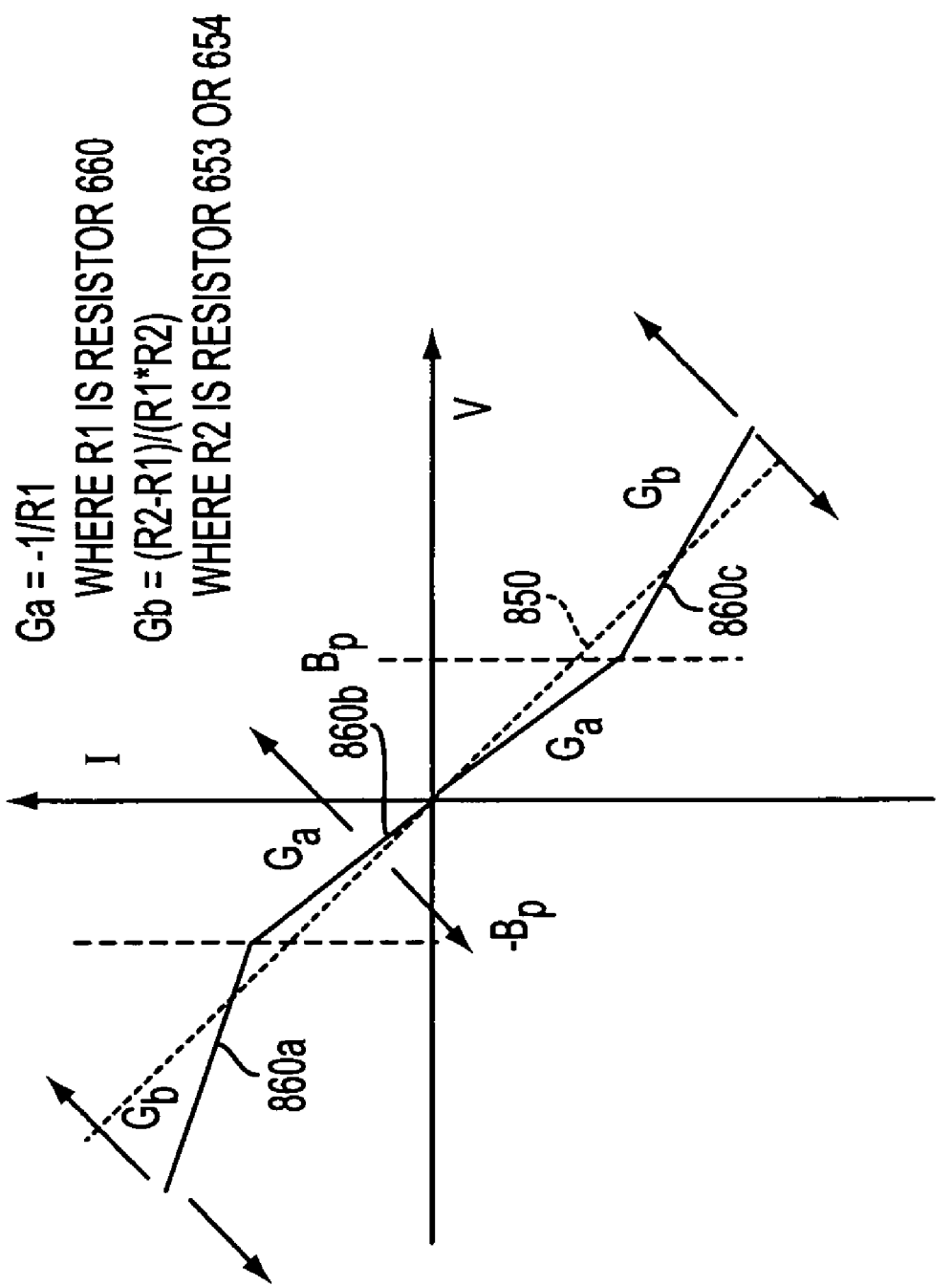
FIG. 8 shows how the slope of the current-voltage characteristic curve for a nonlinear element can be changed in order to change the rotation of a strange attractor phase plane according to a second-generation embodiment.

In general, Kennedy diode 600 of FIG. 6A is characterized by a piecewise linear current/voltage function across its terminals as illustrated in FIG. 8 by segments 860a, 860b, and 860c (the entire line will be referred to as element 860). The slope of segments 860a and 860c, referred to as Gb, is defined by various resistive values within the nonlinear element as described below. Similarly, the slope of segment 860b, referred to as Ga, is defined by resistive values within the nonlinear element. The negative breakpoint –Bp and the positive breakpoint Bp, which define where the slopes changes occur, are also determined by resistive values in nonlinear element 600. It will be appreciated that the piecewise linear characteristics illustrated in FIG. 8 represent only one of several different possible nonlinear circuits.

Load line 850 represents a current-voltage characteristic of a resistive element coupling the oscillator to the chaotic portion of the circuit (e.g., resistor 225 in FIG. 2A), and is superimposed on the graph in FIG. 8 to illustrate the location of the strange attractor equilibrium points. As explained previously, the intersection of load line 850 with the current-voltage characteristic curve determines the location of the strange attractor equilibrium points. Depending on the orientations of these curves, the transmitting circuit can be made to operate in a single-scroll or double-scroll attractor mode. See, e.g., FIG. 1D. Other multiple-scroll modes, such as triple-scroll and the like are also possible. Single-scroll attractors orbit about the points where load line 850 intersects Gb lines 860a or 860c. Double-scroll attractors transition through the Ga line 860b and move to or from Gb lines 860a and 860c. A triple-scroll attractor can orbit around the IV characteristic curve origin at the center of the Ga 860b line.

Various second-generation embodiments of the invention modulate a nonlinear circuit element by shifting the equilibrium point of the strange attractor (for single-scroll circuits) or attractors (for multi-scroll circuits). This can be done by changing slopes Ga, Gb, or both, of characteristic curve 860, which can be accomplished by changing various resistances within the nonlinear circuit element. Consequently, one or more slopes are changed in accordance with an information signal in order to modulate the position of the strange attractor (see generally FIG. 19D). In various first-generation embodiments, load line 850 can be modulated. This load line can be used to shift the equilibrium point and change the operating point as shown in FIG. 1D (element 150). Control of the load line, however, affects the tank circuit reactive load, which impacts modulation performance.

For a single-scroll attractor, the circuit will oscillate in only one quadrant of the characteristic curve (see FIG. 19C), and thus only one piece (e.g., either 860a or 860c, depending on which quadrant the circuit is oscillating) must be shifted to accomplish this modulation. For circuits operating in a double-scroll attractor mode, both pieces 860a and 860c must be simultaneously shifted to cause both attractors to shift along the curve, since at any particular point in time it cannot be predicted which quadrant the circuit will be operating in. In second-generation systems, one can control the transition of a double-scroll or single-scroll attractor by modulating either Gb 860a or Gb 860c to cause the attractor to change from the upper scroll region to the lower scroll region or vice versa. In this case, only one Gb line needs to be changed. This can cause a single scroll attractor to change quadrants and remain in the other quadrant until its Gb line is modulated to cause a transaction.

Figure 6B:
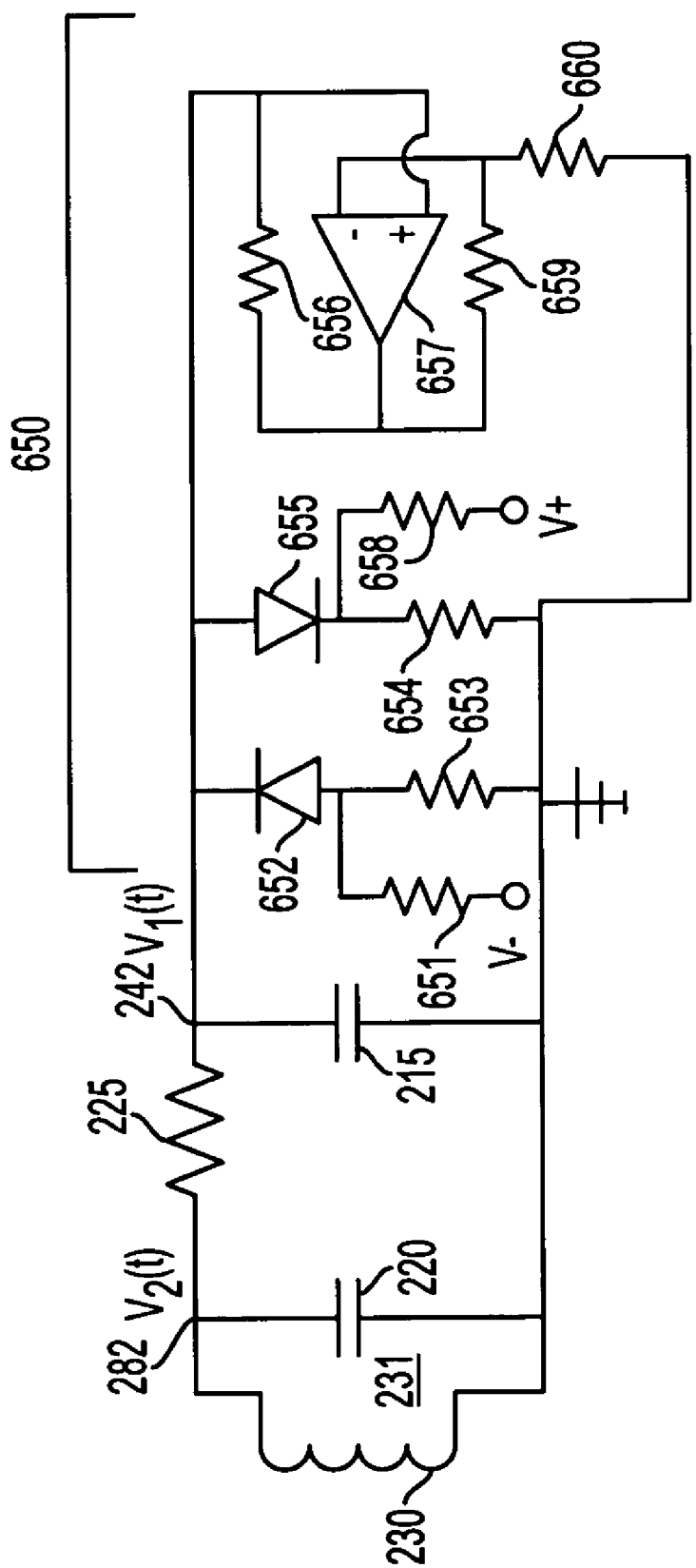
FIG. 6B shows a conventional transmitter with a Caltech non-linear diode that can be modulated according to the principles of a second-generation system.

FIG. 6B shows a so-called "Caltech" diode, which produces a characteristic curve similar to that of the Kennedy diode. Caltech diode 650 includes two diodes 652 and 655 connected to a four-resistor network comprising resistors 651, 653, 654, and 658, each of which is coupled to either a ground, the negative voltage supply, or the positive voltage supply. Additionally, an op amp 657 and two resistors 656 and 659 are coupled in the circuit. As explained below with reference to FIG. 7A, resistor 660, which is coupled between op amp 657 and ground, provides one possible mechanism for modulation in accordance with various principles of the second-generation system. References herein to "Caltech diode" should be understood to refer to subcircuit 650 of FIG. 6B and its many obvious variations.

Figure 6C:
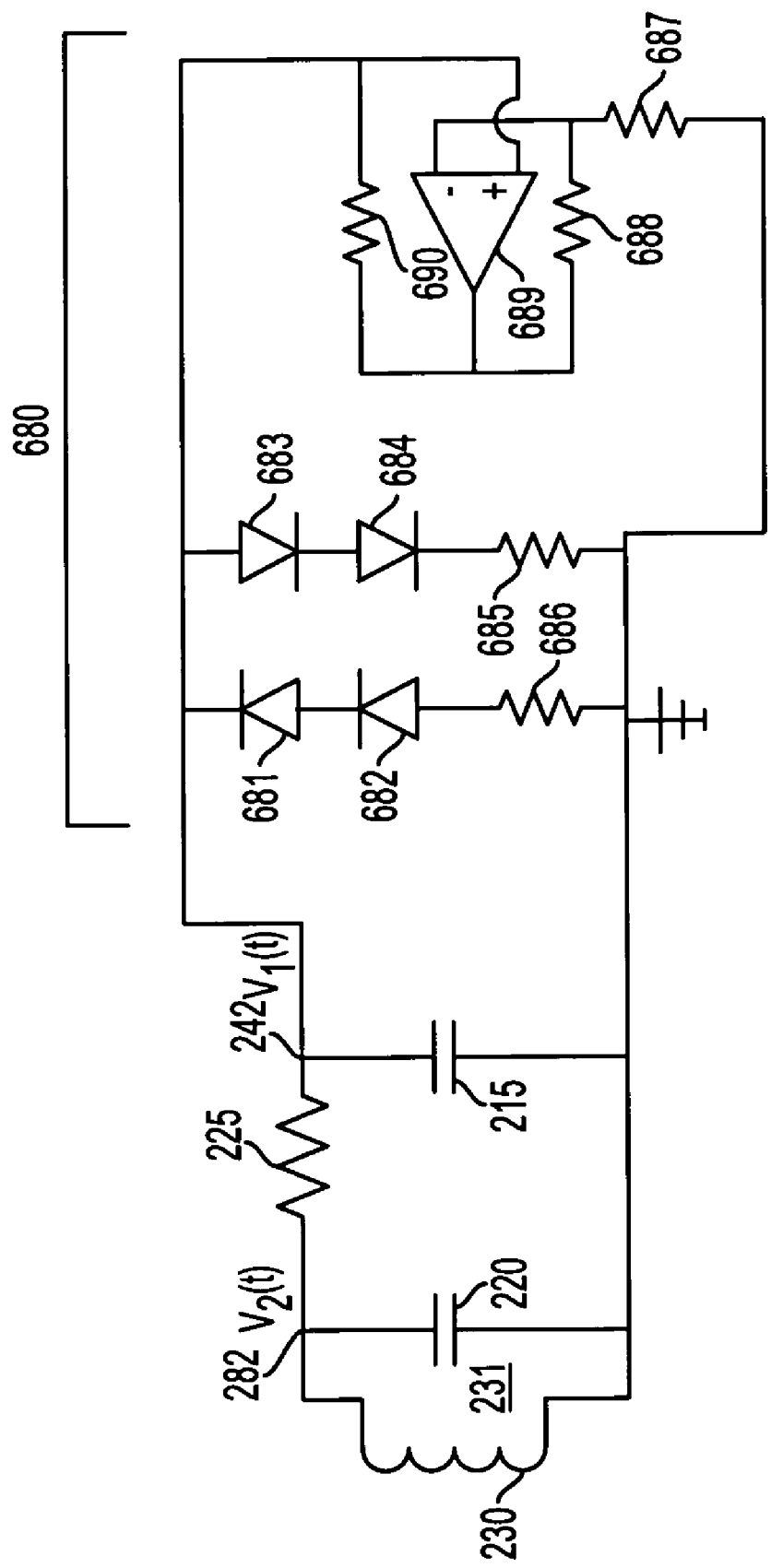
FIG. 6C shows a transmitter with a novel non-linear diode that can be modulated in accordance with the principles of a second-generation system.

FIG. 6C shows yet another negative resistance diode circuit 680 that can be used in a modulated transmitter according to various principles of the present invention. The novel circuit shown in FIG. 6C includes four diodes 681 through 684 arranged in pairs with opposing polarity across the terminals of capacitor 215 through resistors 685 and 686, respectively. Op amp 689 and associated resistors 688 and 690, along with resistor 687, perform functions similar to those of the Caltech diode shown in FIG. 6B. References herein to "SAIC diode" should be understood to refer to circuit 680 of FIG. 6C and its many obvious variations.

Figure 7A:
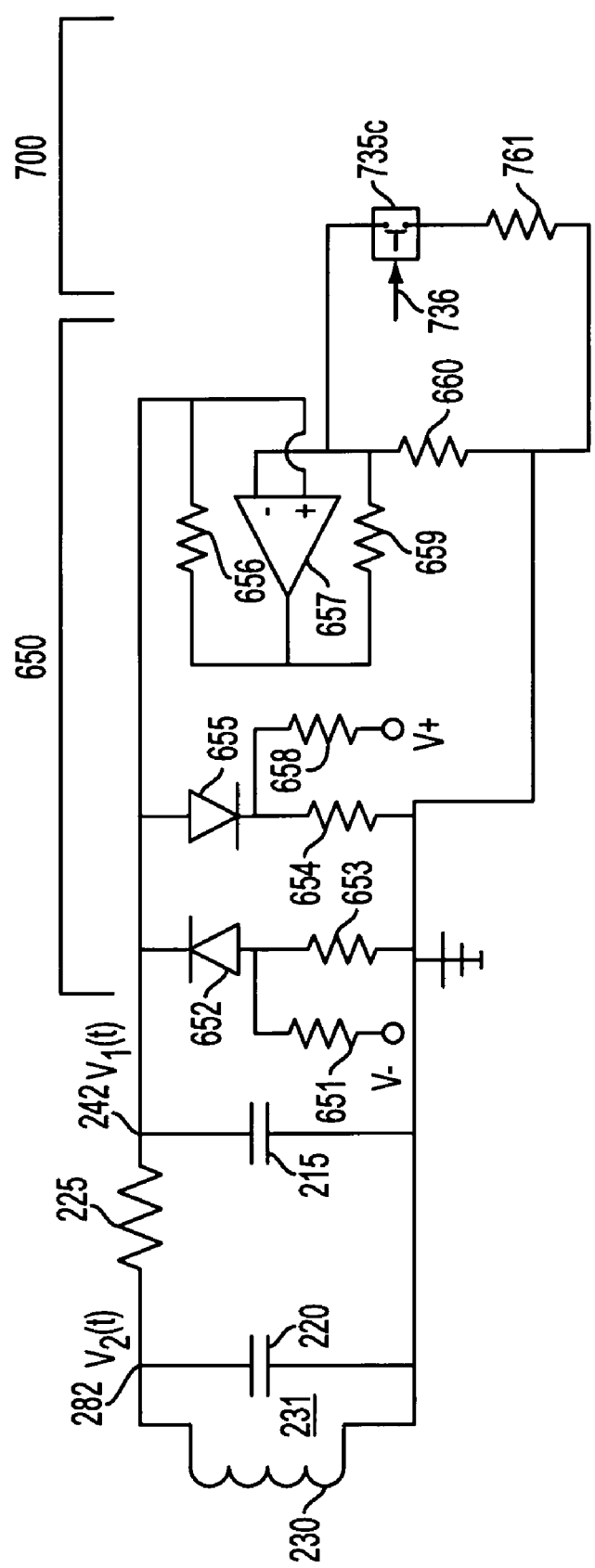
FIG. 7A shows how a switch 735c can be used to modulate voltage-current characteristics of a nonlinear diode in accordance with a second-generation embodiment.

Turning now to FIG. 7A, one technique for modulating a nonlinear element will be described in detail, using the Caltech nonlinear diode embodiment as the basis for discussion. (In FIG. 7A, elements with numerals matching those in FIG. 6B are the same as those in FIG. 6B). As shown in FIG. 7A, Caltech diode 650 is modified by adding a modulation circuit 700 including switch 735c and resistor 761 in parallel with resistor 660. An information signal 736 modulates switch 735c and causes resistor 761 to be switched into and out of the circuit. When switch 735c is open, a chaotic transmitter circuit incorporating diode 650 oscillates chaotically around a single scroll or double scroll attractor. (The size of the modulating resistor controls the type of scroll obtained). When switch 735c is closed, resistor 761 changes the resistance of the nonlinear element in the transmitter, thus changing the slopes Ga and Gb (see FIG. 8) and moving the position of the strange attractor to a new equilibrium position (see FIGS. 19D and 19E). This new equilibrium position causes a receiver synchronized to the previous equilibrium position to fall out of synchronization, thus transmitting a bit of information.

In accordance with various second-generation embodiments, an information signal modulates a chaotic transmitter by changing a resistive part of the nonlinear element in the circuit, thus causing a near instantaneous shift (less than a quarter cycle of the tank circuit's fundamental period) in strange attractor characteristics in the circuit. Other implementations that use transistors, field effect transistors, or other active devices can effect the modulation scheme described in this paragraph assuming they implement the general current-voltage characteristic curve shown in FIG. 8. The nonlinear element can be modulated using different resistive components as described with respect to the first-generation embodiments (e.g., optoisolator, analog switch, field effect transistor, relay, etc.) using a resistor in series with an ideal switch and placing this combination in parallel with the nonlinear diode resistors. Other variations of modulating the resistive value are of course possible.

In FIG. 6A, for example, an additional resistor can be switched in parallel with resistor 608 to change the strange attractor trajectory in a Kennedy diode implementation. In FIG. 6C, for example, an additional resistor can be switched in parallel with resistor 687 to change the strange attractor trajectory. Other combinations of resistors can also be changed in the circuits to change the trajectory in any desired manner. In general, changing these resistances in the nonlinear element of the chaotic transmitter circuit increases modulation bandwidth from approximately 10–15% of the tank circuit fundamental frequency to 200% of the tank circuit frequency when compared to modulating the reactive components.

Many different resistive components of the circuits described above (e.g., resistors 651, 653, 654, 658, 659, 660, etc.) can be modulated using an ideal switching element to modify the trajectory in phase space of the chaotic strange attractor. Good results were obtained by controlling resistor 660 of FIG. 6B to simultaneously change the slope of Ga and Gb as shown in FIG. 8. As shown in FIG. 7A, by switching resistor 761 into and out of the circuit, the rotation of the strange attractor phase plane changes as the slope of the current-voltage characteristic curve shown in FIG. 8 changes. This implementation changes the slope of both Ga and Gb simultaneously and increases the modulation and demodulation rate (i.e., synchronization rate) at the various receivers described with reference to the first-generation systems.

With reference to FIGS. 7A and 8, slope Ga is related to resistor 660 (R1) by the equation:

$$Ga=-1/R1$$

and slope Gb is related to resistor 653 or 654 (R2) and the resistance of the switch 735c by the equation:

$$Gb=-(R2-R1)/R1R2.$$

Referring again to FIG. 8, modulating resistor R1 shifts the characteristic curve of the transmitter by moving the slopes Ga and Gb. At the receiver, this characteristic curve is seen as a voltage difference between the received signal and the signal generated by the receiver (see, e.g., FIG. 4C). This voltage difference at the receiver is independent of the type of strange attractor (i.e., single or multiple scroll) and results in an improvement over transmitters that use only single-scroll attractors. This modulation technique also increases the available set of strange attractors, thus increasing the number of simultaneous transmitters that can operate in a given environment and increasing noise immunity.

Returning again to FIG. 7A, frequency changes caused by modulating the inductor 230, capacitors 215 and 220, or resistor 225 cause zero crossing voltages (when changing from an upper to a lower scroll or vice versa) that generally cannot be detected by the aforementioned receivers. This inability to detect zero crossing (Ga region changes) voltage differences results in lost bits and therefore bit errors at the receivers when using a double or multiple scroll attractor. Modulating the nonlinear diode current-voltage characteristic curve provides an improvement in detection within a Ga region that allows the use of any type of attractor as the carrier for the modulating digital bit stream, rather than only a single scroll attractor. This modulation technique allows modulation to be applied at two times the tank circuit frequency compared to 10–15% of the tank circuit that can generally be achieved by modulating the other components of the transmitter.

Figure 7B:
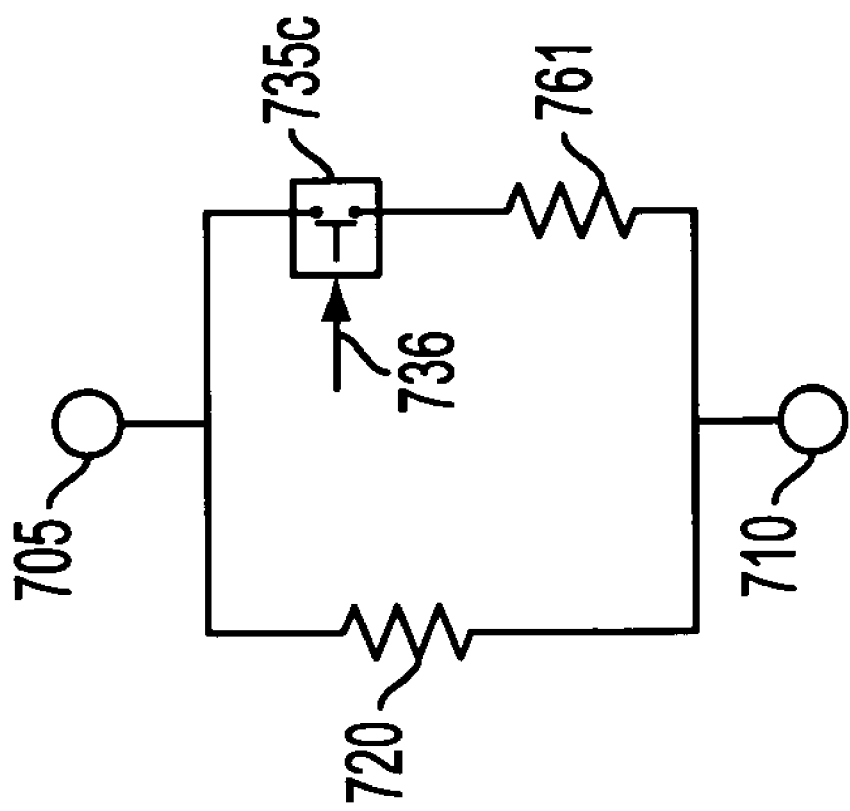
FIG. 7B shows generally how an information signal 736 can be used to make and break a switch 735c (or other switch-like device) to modulate a negative resistance in accordance with a second-generation embodiment.

In FIG. 7B, switching element 735c in series with resistor 761 (which together are in parallel across the nonlinear diode resistors) can be used to modulate components 660, 653, and 654 of FIG. 7A. The resistors 653, 654, 660 can be individually modulated or modulated at the same time to achieve different characteristic curve shapes. Elements 653, 654, and 660 can be modulated singly to change slope Gb in the upper left quadrant of FIG. 8 or Gb in the lower right quadrant of FIG. 8. They can be modulated as a pair to change both Gb slopes. Resistor 660 can be modulated singly to cause Gb and Ga slopes on the characteristic curve to change, or it can be modulated in conjunction with resistors 653 and 654 to cause larger variations in the Gb slope. The Gb slope is related to the Ga slope in the Caltech diode of FIG. 7A as follows:

$$Gb=Ga-1/R_2 \text{ where } R_2 \text{ is element 653 or 654.}$$

FIG. 7C summarizes the effect of resistor changes in nonlinear diode on slopes Gb and Ga. In FIG. 7C, slope element Gb (elements 860a and 860c in FIG. 8) and Ga (element 860b of FIG. 8) are changed by varying the resistors for the Caltech and Kennedy diodes. The Ga and Gb slopes are shown down the left hand side of the page and the resistor values are shown across the top of the table. The slopes that are affected by varying the resistors singly or in pairs is shown by an "x" in the box. It should be noted that several resistors affect all slopes and several effect only one or two slopes. Other variations beyond those specifically shown in FIG. 7C are possible. Changing the values of resistors 651 and 658 (see FIG. 7A) changes the characteristic curve break points (see FIG. 8) by changing the breakdown/biasing points of diodes 652 and 655. The same technique can be used with any other nonlinear diode characteristic curve where the components that determine the nonlinear diode current-voltage characteristic curve can be modulated in a like manner to produce the characteristic curve modulation.

The parallel resistors can be modulated over a wide range. To maintain chaotic behavior, characteristic curve 860 should intersect load line 850 at three or more points, as shown in FIG. 8. The load line can be right on top of Ga

860*b* and intersect the entire Ga line as well as the two breakpoints that lie on both the Gb and Ga. The closer the parallel combination of switch 735*c*, modulation resistor 761 and original resistor 660 are to the original resistance 660 value, the less the characteristic curve is changed and the more difficult it is to detect the modulation. The larger the combined resistive difference between modulation resistor 761 and original resistor 660, the larger the voltage difference generated at the receiver (i.e., the greater the characteristic curve is changed). Similar results can be obtained using the Kennedy nonlinear diode of FIG. 6A by modulating the various resistors in the diode (e.g., resistors 604, 608, 607, and 601).

FIG. 7B shows generally how an information signal 736 can be used to make and break a switch 735*c* (or other switch-like device) to modulate a resistance 720 in a nonlinear circuit element according to various second-generation embodiments. The resistance modulation scheme of FIG. 7B can be applied to any type of negative resistance nonlinear element, including the nonlinear diode circuits of FIGS. 6A, 6B, and 6C, and others. In general, a resistive value 720 in the nonlinear element is modulated across its terminals 705 and 710 by applying a second resistive element 761 in accordance with an information signal, which may comprise for example an on-off keying type signal. It will be appreciated that multiple values and switches can be used to create a multi-key and multiple modulation techniques. For example, multiple resistors and switches can of course be used to create a "vocabulary" of resistive values, each corresponding to a different equilibrium point on the current-voltage characteristic curve, with corresponding modulation and demodulation.

In FIG. 7B, the modulation scheme can be used to individually modulate one resistor at a time or used to modulate multiple resistors simultaneously to get a different strange attractor. This can be done in pairs or all resistors in FIGS. 7A, 6A, 6B, and 6C in any combination. This creates flexibility in strange attractor designs. It is also possible to modulate resistor 720 directly using a photoresistor or FET devices' internal resistance, rather than switching a resistance. Moreover, other types of nonlinear circuit elements could be used in place of a diode. Examples include gas breakdown tubes or operational amplifiers.

Figure 9A:
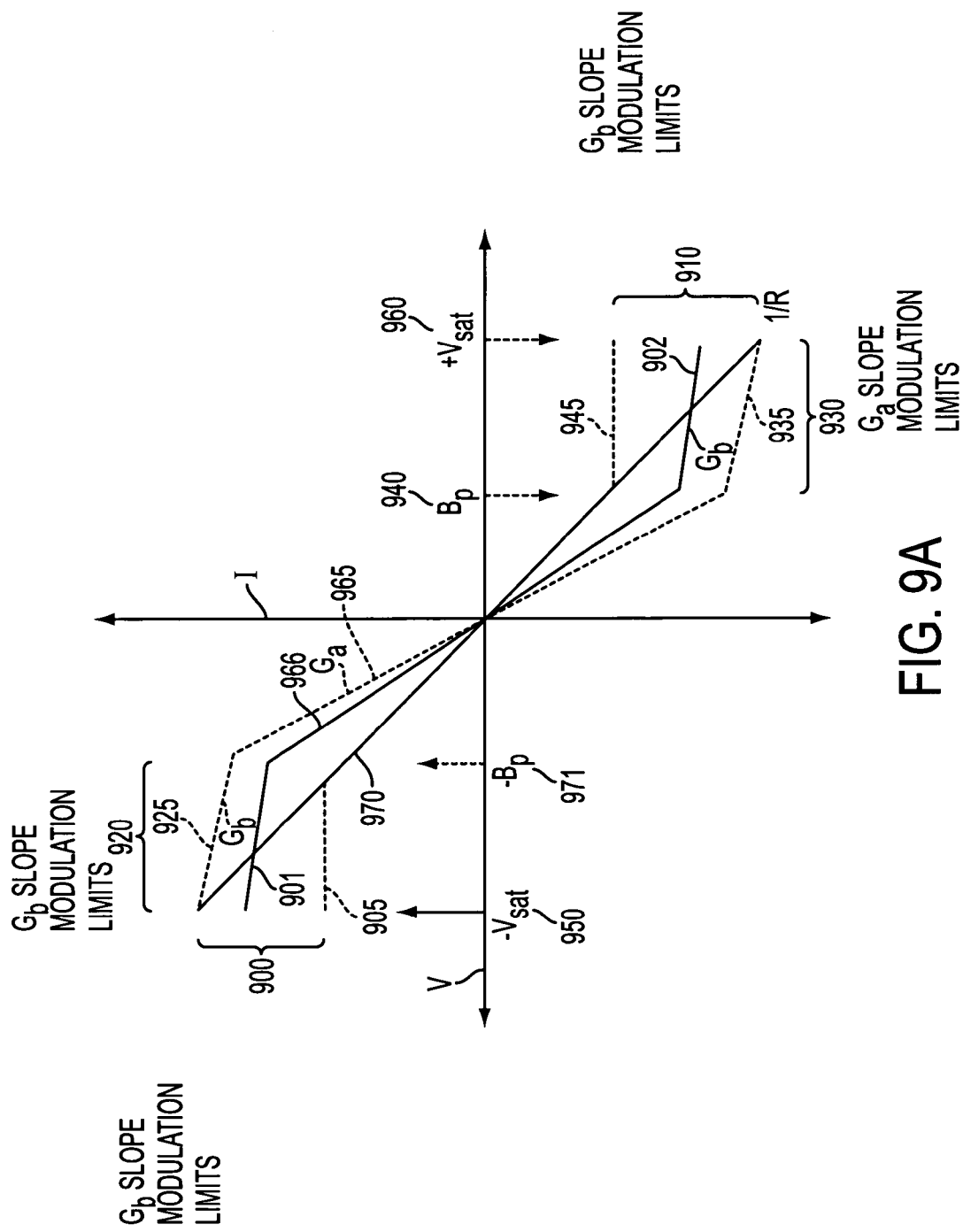
FIG. 9A shows modulation limits for Ga and Gb according to a second-generation transmitter.

FIG. 9A shows various modulation limits of the nonlinear diode characteristic curve used in a Chua's circuit. Starting with the load line 970 defined by −1/R, it can be seen that the load line varies from −Vsat 950 to +Vsat 960. These two points are the extremes of the nonlinear diode operational amplifier's voltage swing and are related to the power supply voltage (Vcc) by approximately (Vcc-0.712 volts) in actual practice.

Figure 9B:
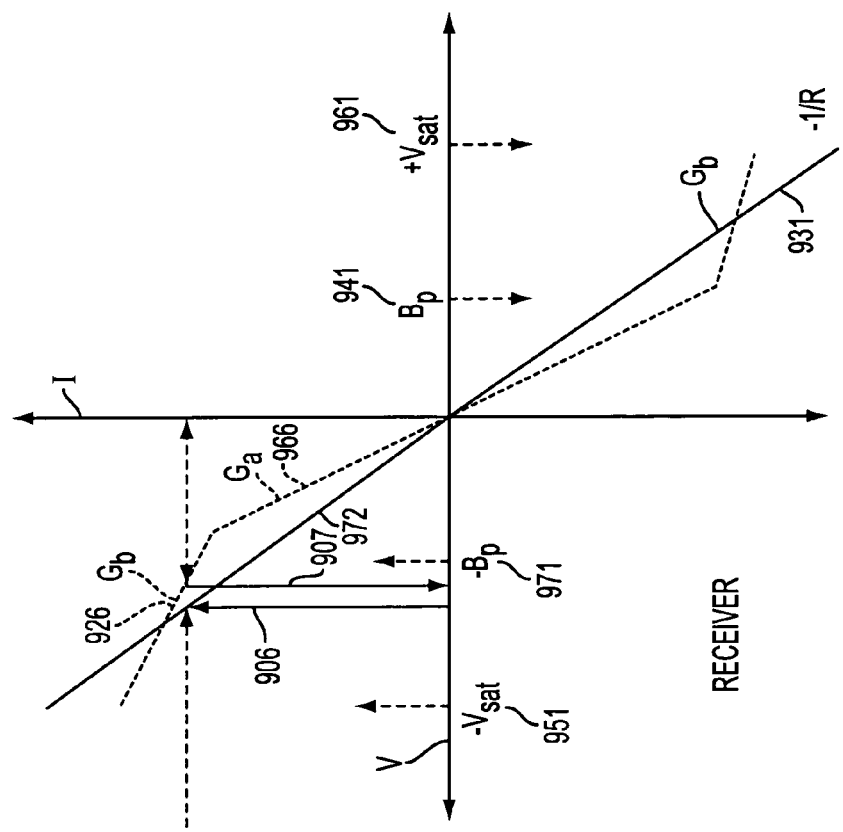
FIG. 9B maps current-voltage characteristic curves between a modulated transmitter and a receiver.

Referring to both FIGS. 9A and 9B, the nonlinear diode curve regions (901, 966, and 902) are also limited by this maximum voltage point. The current is limited by the maximum current drive of the operational amplifier and this limit can be exceeded depending on the slope of 901, 902, or 966. In addition, to operate in a chaotic state, load line 970 should intersect the characteristic curve in at least three points (901, 966, and 902). If these conditions are met, the transmitter will oscillate chaotically because break points 971 and 940 will be crossed by the voltage in the tank circuit and unpredictable behavior will take place in the form of an unpredictable transition in the strange attractor orbits. As explained in more detail herein, chaotic operation can also occur through the use of linear circuit elements, and the invention is not limited to the use of nonlinear circuits to effect chaotic operation.

Under the above conditions, the modulation limits for chaotic operation are defined by the line segments 905, 970, and 945, and line segments 965, 966, and 945. The lower curve is bounded by the −1/R load line (970) and the points where the slope of the line defined the points 905 and 945 go to zero (i.e., no longer have a negative slope). If the transmitter slope (905 or 945) becomes positive then a receiver would have difficulty resolving where it was operating on the receivers' characteristic curve since two points could have the same current (i.e., one on line 905 and one on line 970).

The second characteristic curve boundary is defined by regions 925, 965, and 935 and occurs where the current produced by a given slope Ga or Gb exceeds the nonlinear diode's current capability, or where Gb (925) no longer touches the load line curve (970), within the operational amplifiers' saturation voltage regions 950 or 960, or where the slope Gb (925 or 935) is zero or positive.

FIG. 9B shows graphically how modulation in the transmitter and receiver operates. Transmitter voltage V1 (903) in the nonlinear diode produces a voltage V2 (904) in the tank circuit across resistor R associated with load line 935. V1 is transmitted through a channel to a receiver.

The receiver is a decoupled version of the Chua's circuit (see, e.g., FIG. 19A). The receiver's tank circuit is coupled to the channel through a resistor R that is equal to R at the transmitter with a load line 931. Therefore, current flows in accordance with V1 impressed on the load line 931, which generates a current I and voltage V2 (906). V2 (906) is coupled through a unity gain operational amplifier to the nonlinear portion of the receiver, which generates a current I equal to the current across the resistor R from the channel to the tank circuit. This current then produces a voltage V1 (907) on the receivers' nonlinear diode characteristic curve. This voltage V1 (907) can be compared with the input voltage (904), which generates a voltage difference across a synchronizing resistor Rsync, (e.g., resistor 385 in FIG. 4C), thus generating a bit of information. When the transmitter is then switched back to the fundamental characteristic curve equal to the receiver's characteristic curve, the receiver and transmitter are in synchronization and a zero voltage difference across Rsync 385 is produced. The incoming voltage then equals the voltage generated in the receiver. The voltage difference across Rsync is therefore zero.

Figure 9C:
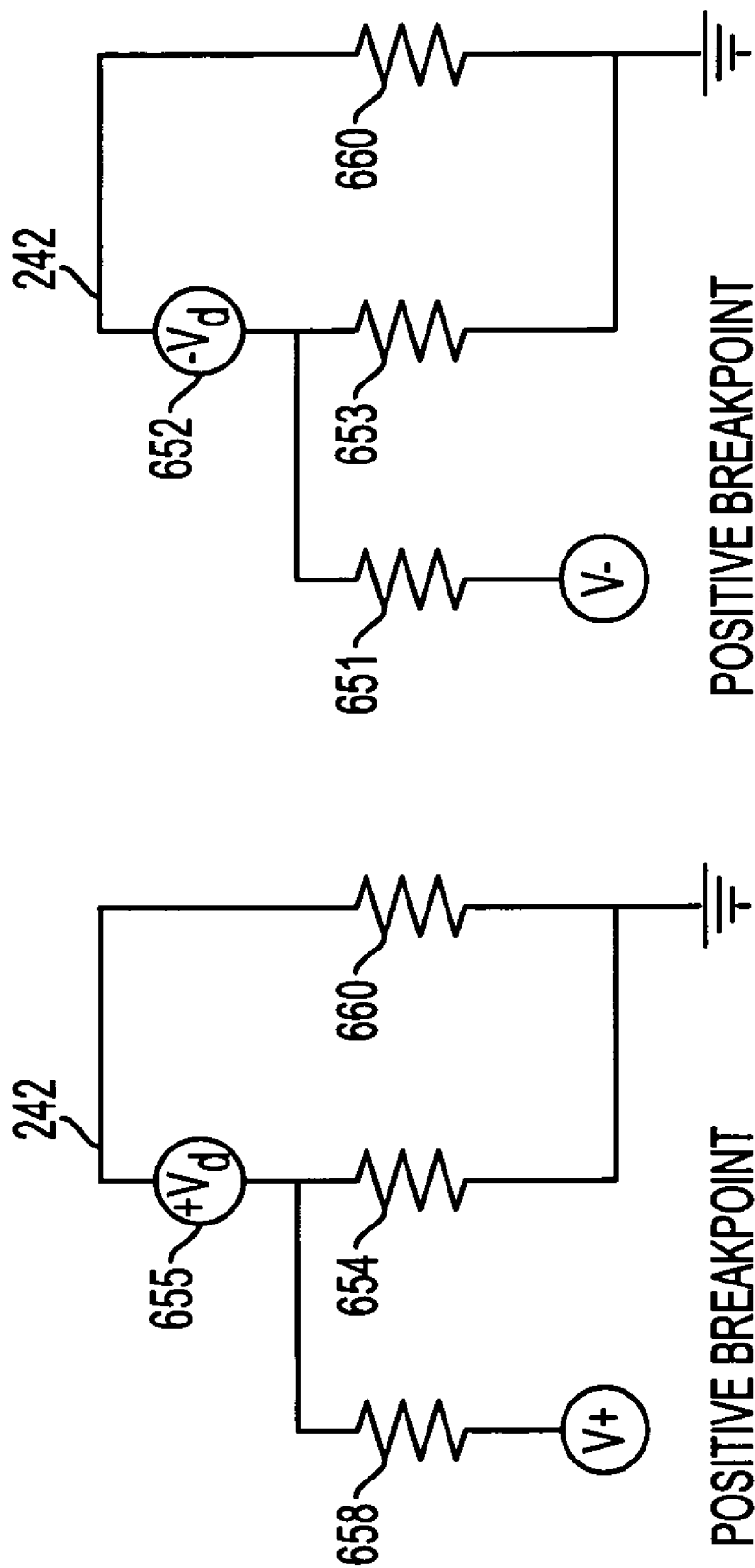
FIG. 9C shows how positive breakpoints can be established for a nonlinear diode according to various second-generation embodiments.

FIG. 9C provides an analysis of the positive-going breakpoint of the nonlinear diode, representing the voltage points in FIG. 6B. The negative-going breakpoint can be set in a similar fashion. The negative resistance 660 is generated by the operational amplifier 657 in the Caltech diode shown in FIG. 6B. The voltage at point 242 must overcome the breakdown voltage of diode 655 and the voltage bias set up by voltage V+ set by the voltage division network made up of resistors 658 and 654. This ratio is defined as (V+)*{[654]/([658]+[654])}. The sum of the voltage of resistor 655 and (V+)*{[654]/([658]+[654])} sets the breakpoint for the nonlinear diode.

There is another way to shape the characteristic curve and set the chaotic operation. These same resistors 658, 654, and 660 can also set the breakpoint. The diode voltage breakpoint 655 can also be raised by adding diodes in series as shown in FIG. 6C. Changing 660, 653, and/or 654 change the slope of the nonlinear load line. This same technique can be applied with any nonlinear diode. These diodes will have a different set of resistor values that have to be manipulated in a like fashion to the Kennedy diode of FIG. 6A. Other types of circuit elements could be used to modulate the nonlinear elements, such as photoresistors, FETs or other types of transistors could be substituted for the resistors to vary the resistance of these elements.

The zero crossings of the transmitted and received signal are maintained irrespective of the curve being used at the transmitter. However, there is a difference voltage at all other points on the receiver curve when the transmitter is using the modulating curve.

The equivalent resistance of the modulating resistor and the resistor being modulated is given as follows:

Parallel resistance equivalent={(resistance of switch [735c]+[761])*([660])}/(resistance of switch [735c]+[660]+[761])  (Equation 2).

This equation can be used to set any desired modulation resistor size to achieve the voltage difference to meet a particular communications systems noise performance requirements.

Figure 10:
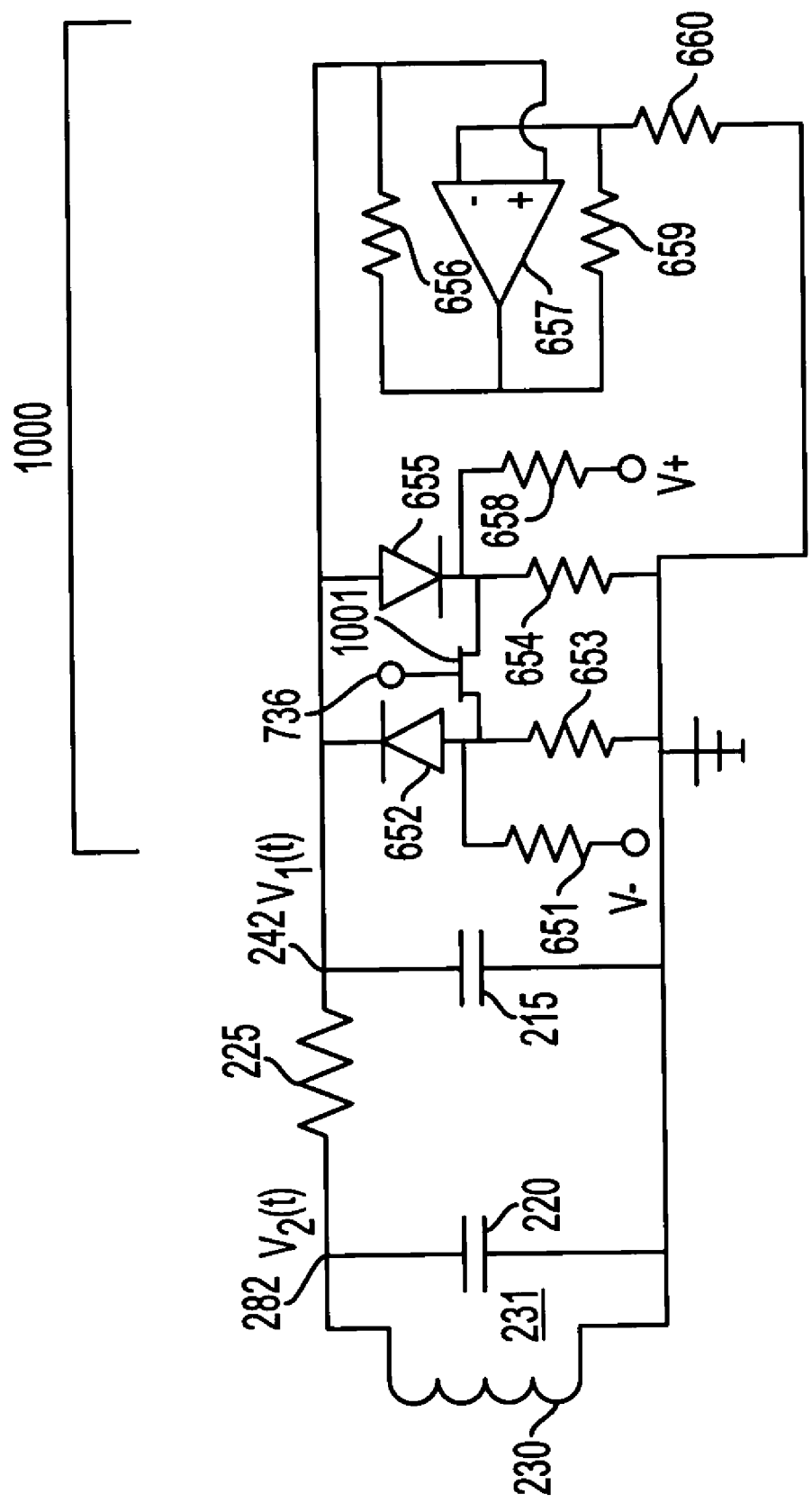
FIG. 10 shows a field effect transistor 1001 placed across diodes 652 and 655 to implement on-off keying according to a second-generation embodiment.

FIG. 10 shows a field effect transistor 1001 placed across diodes 652 and 655 to implement on-off keying according to a second-generation embodiment. In this embodiment, FET 1001 implements on-off keying, which allows rapid switching but results in a detectable modulation frequency in the voltage output of the Chua's circuit across C1 (255) or C2 (260) in FIG. 2B. However, it is an improvement over current practice, which results in a better detection at the receiver output across a comparator detector.

Reference will now be made to FIGS. 20A through 23I, which show various data plots and displays depicting voltages, currents, and frequencies in systems employing the principles of the invention.

Double-Scroll Attractors

Figure 20D:
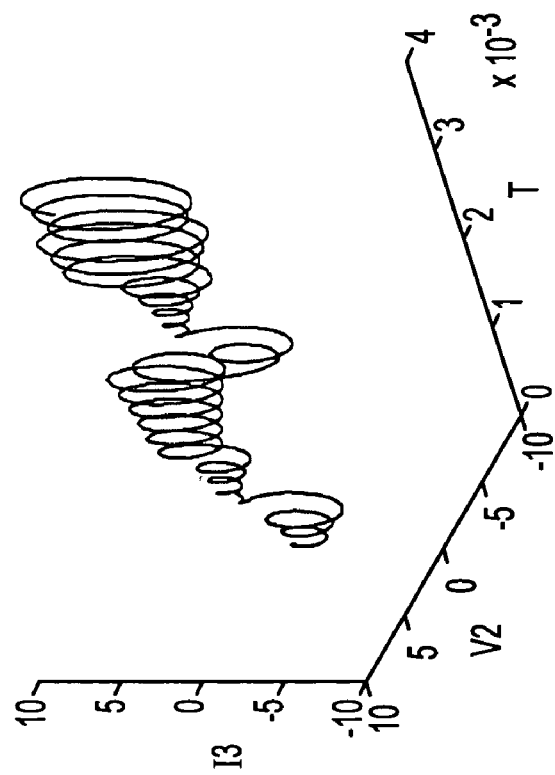
FIG. 20D shows the plot of FIG. 20C when modulated with an information signal.
Figure 20C:
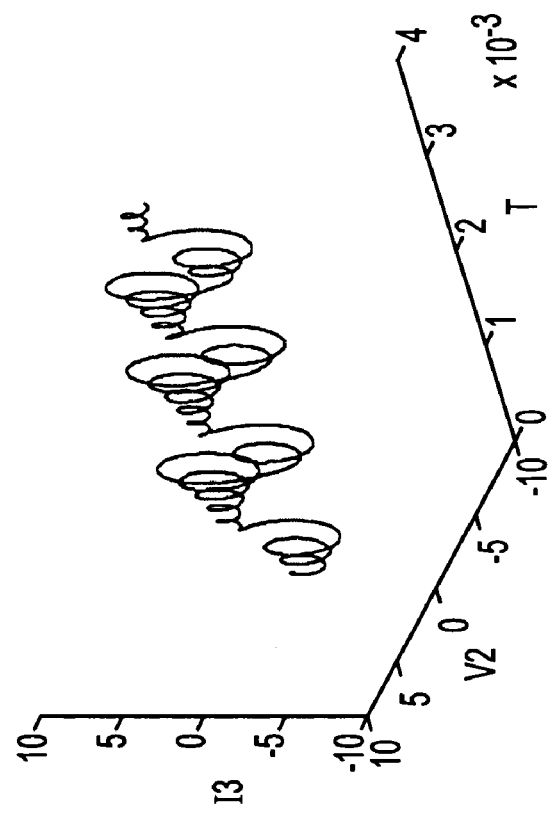
FIG. 20C shows a voltage (V2) versus current (I3) versus time (T) plot of a chaotic signal (double scroll strange attractor) without modulation.
Figure 20F:
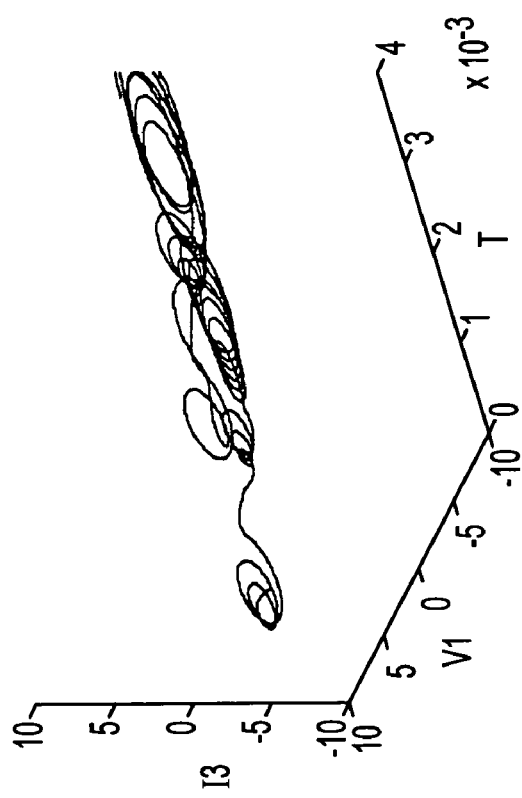
FIG. 20F shows the plot of FIG. 20E when modulated with an information signal (single scroll modulation).
Figure 20E:
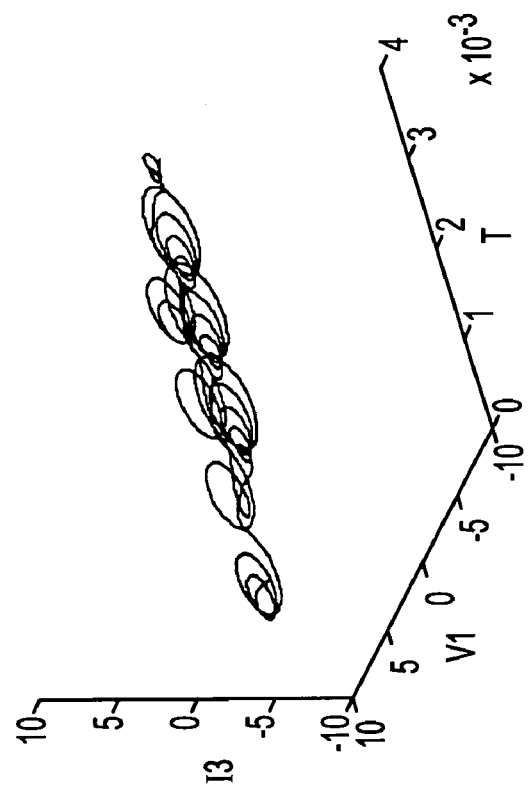
FIG. 20E shows a voltage (V1) versus current (I3) versus time (T) plot of a chaotic signal (single scroll attractor) without modulation.

FIG. 20A shows a voltage (V1) versus voltage (V2) versus time (T) plot of a chaotic signal (double scroll strange attractor) without modulation. FIG. 20B shows the plot of FIG. 20A when modulated with an information signal according to various second-generation embodiments. Voltage V1 is taken at point 242 in a chaotic transmitter (voltage across capacitor 215, see FIG. 7A), while voltage V2 is taken at point 282 in the same transmitter (voltage across capacitor 220). FIG. 20C shows a plot of voltage (V2) versus current (I3) in inductor 230 as a function of time without modulation, while FIG. 20D shows the same quantities when modulated with an information signal. FIG. 20E shows a plot of voltage (V1) versus current (I3) without modulation, and FIG. 20F shows the same quantities when modulated.

In FIGS. 20A, 20C, and 20E, a 5.6 KHz strange attractor without modulation oscillates about two equilibrium points. FIGS. 20B, 20D, and 20F show modulation at 1000 bps applied to the transmitter nonlinear diode slopes Ga and Gb. This illustrates how the strange attractor parameters change with time and how modulating the non-linear diode affects the behavior of the system as the Gb line crosses the load line at various points caused by the Gb slope changing.

The modulated signals were modulated at 1000 bps with a bit stream of "1010". The modulated signal transmits the same strange attractor for a binary "1" and different strange attractor for a binary "0". The transmission of a binary "0" shows a different time varying signal when compared with the modulated strange attractor signal. Notice the un-modulated strange attractor signal and the modulated strange attractor signal in FIGS. 20A and 20B are the same from time t=0 to 1 millisecond due to transmission of a binary "1", (i.e. synchronized case) while from time t=2 to 3 milliseconds in FIGS. 20A and 20B the strange attractors differ due to the transmission of binary "0", (i.e. non-synchronized case). (The same holds true for FIGS. 20C and 20D, and for FIGS. 20E and 20F.)

The strange attractor signals are correlated whenever a binary "1" is transmitted and uncorralated whenever a binary "0" is transmitted given the receiver is tuned to receive a binary "1". At the receiver, the synchronized strange attractor produces a voltage across the synchronizing resistor equal to zero. This establishes the synchronized state and produces a series of pulses corresponding to the out-of-synchronization state that corresponds to the spirals of the strange attractor projected onto the V1 axis.

Figure 21A:
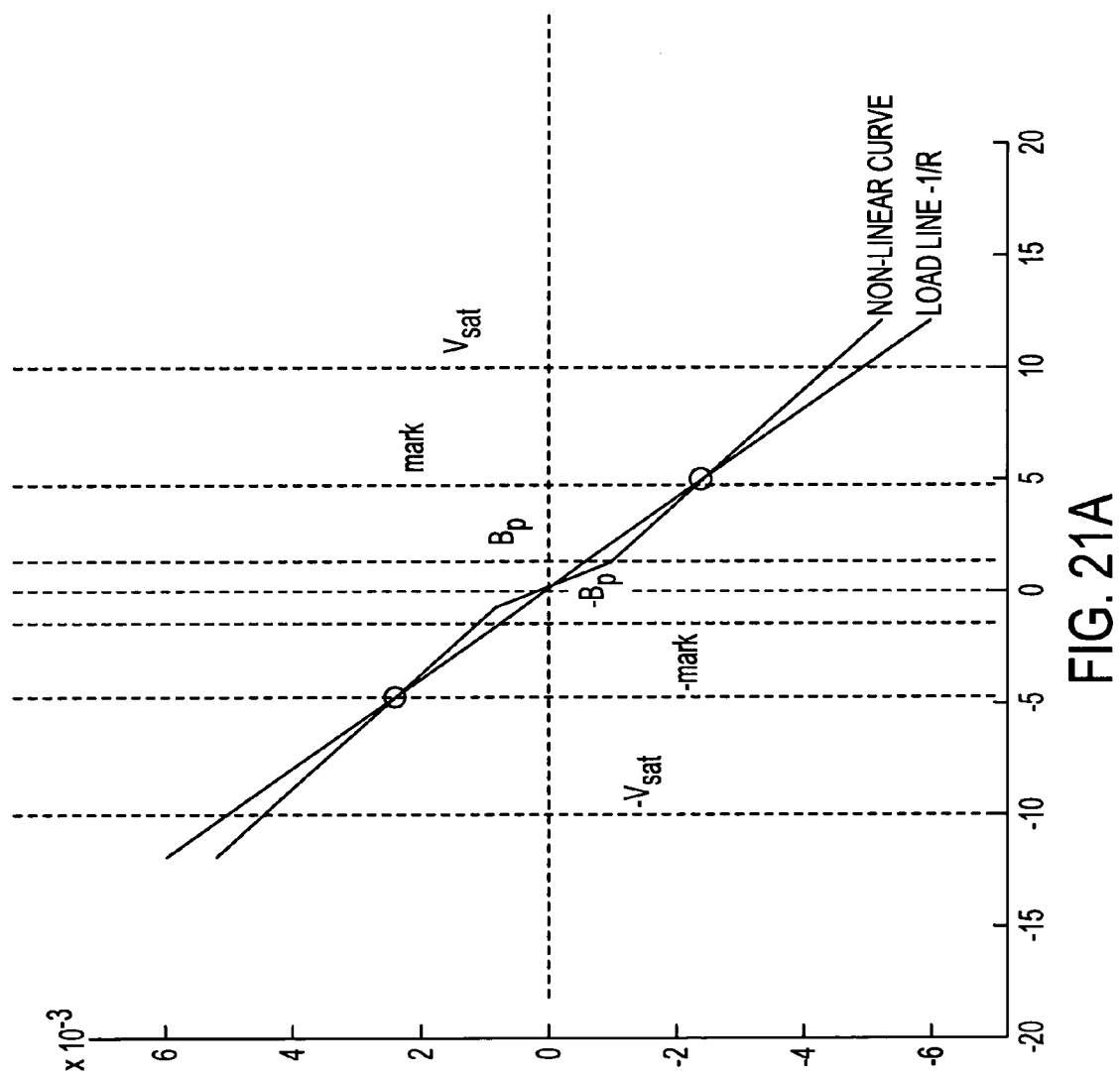
FIG. 21A shows a nonlinear diode current-voltage characteristic curve where resistor R1 is set to 1200 ohms (double scroll attractor).
Figure 21B:
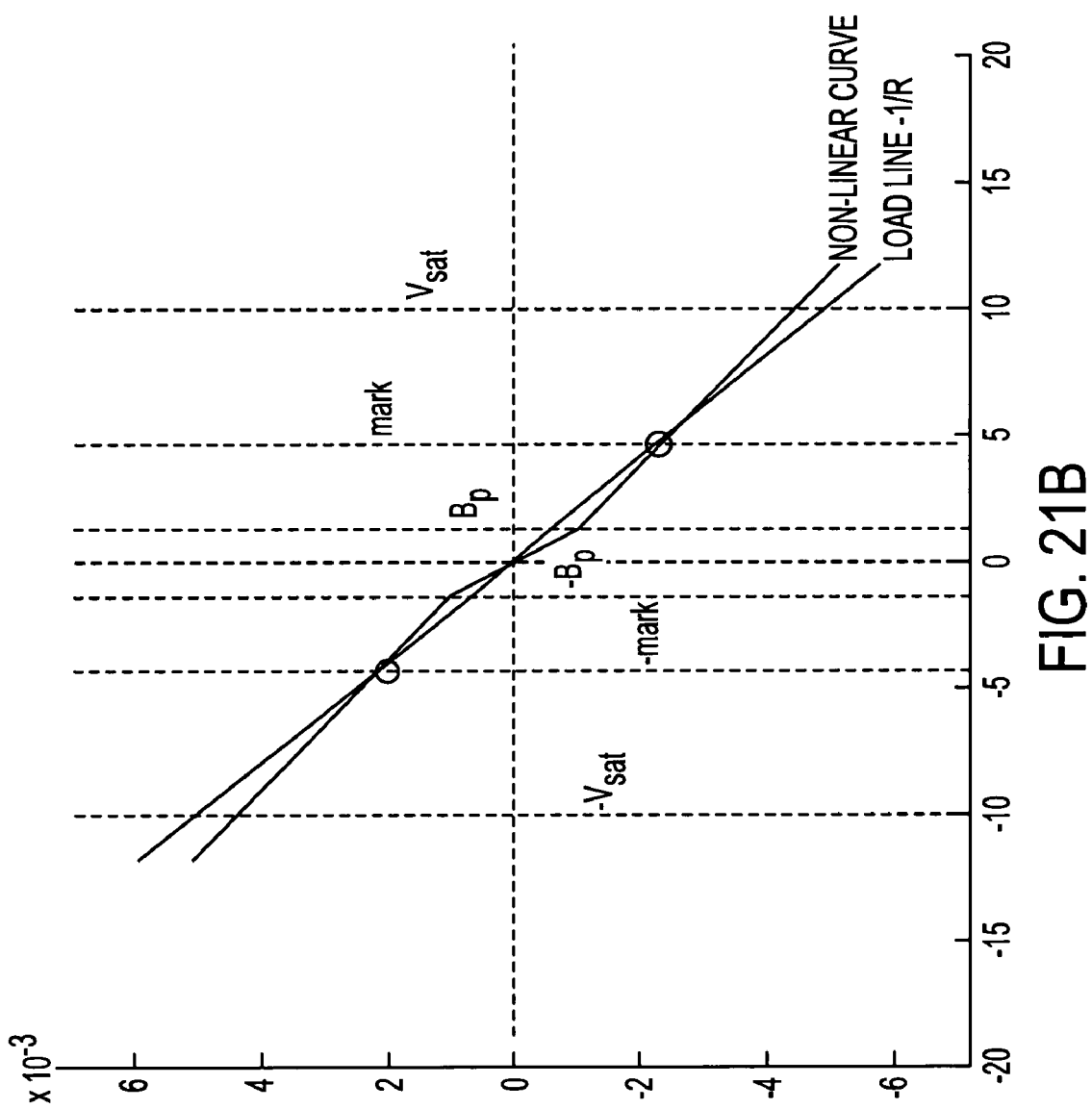
FIG. 21B shows a nonlinear diode current-voltage characteristic curve where resistor R1 is set to 1210 ohms (double scroll attractor).
Figure 21C:
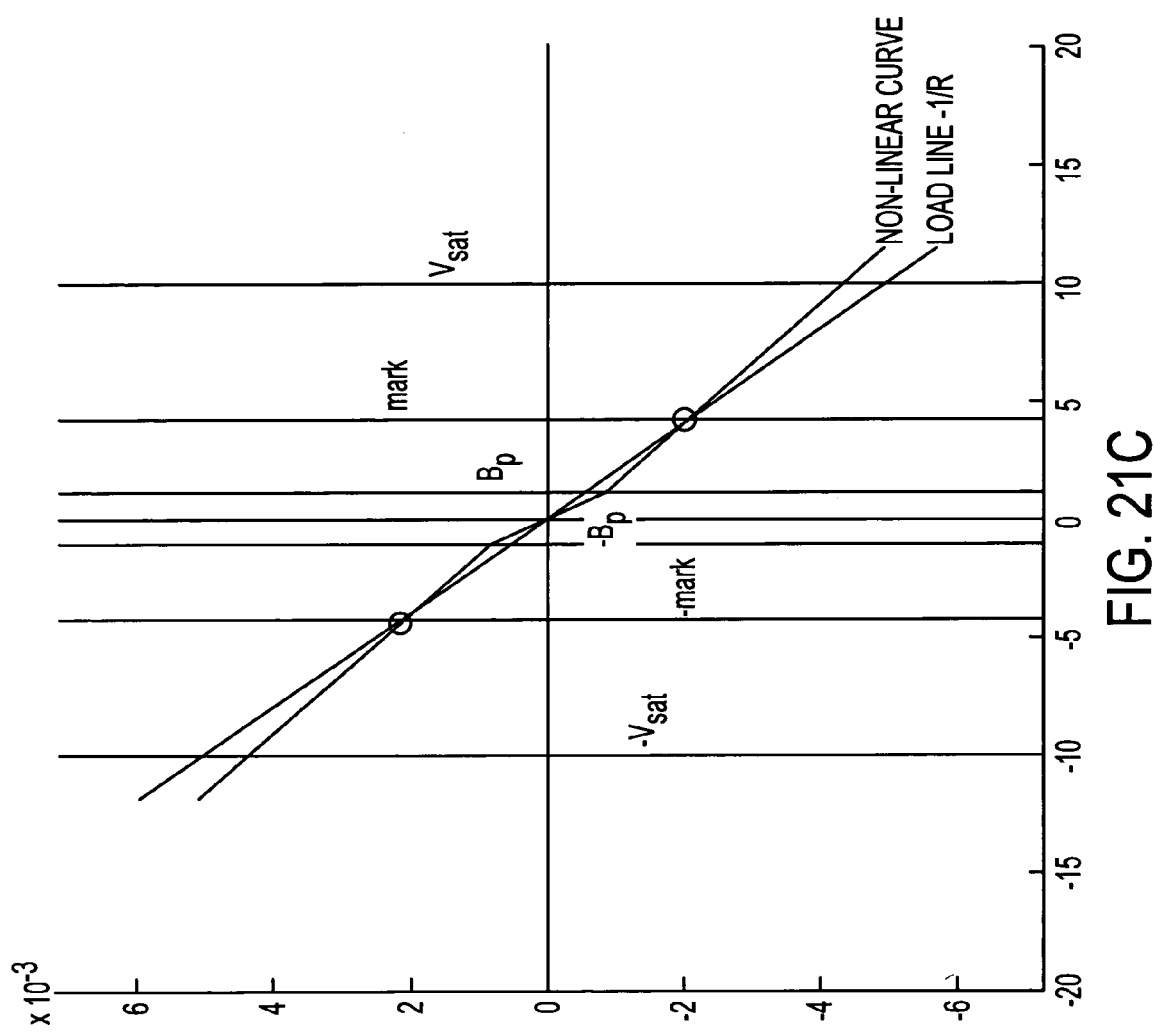
FIG. 21C shows a nonlinear diode current-voltage characteristic curve where resistor R1 is set to 1220 ohms (double scroll attractor).
Figure 21D:
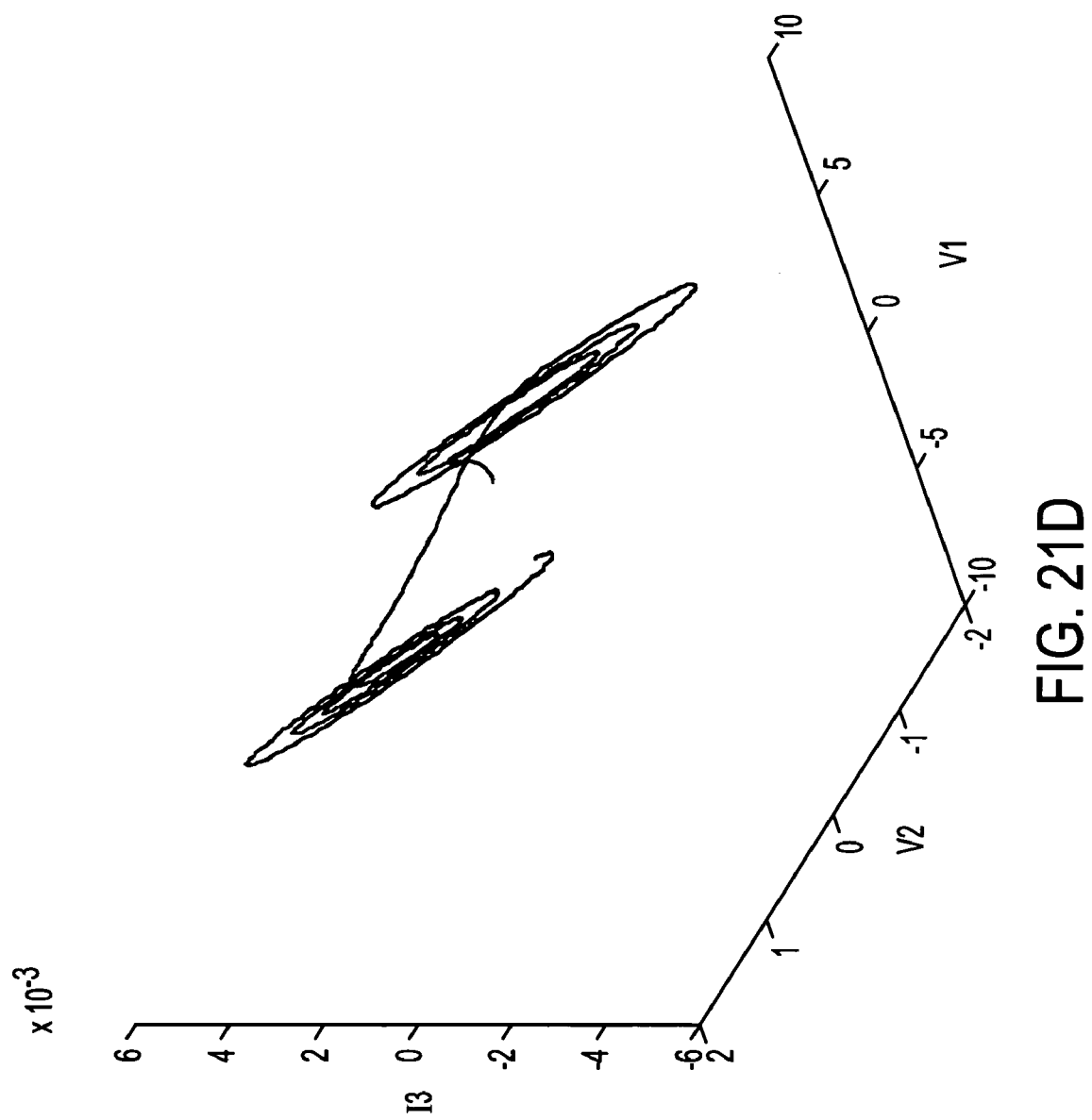
FIG. 21D shows a voltage-current phase space map (V1 vs. V2 vs. I3) corresponding to the nonlinear diode curve of FIG. 21A.
Figure 21E:
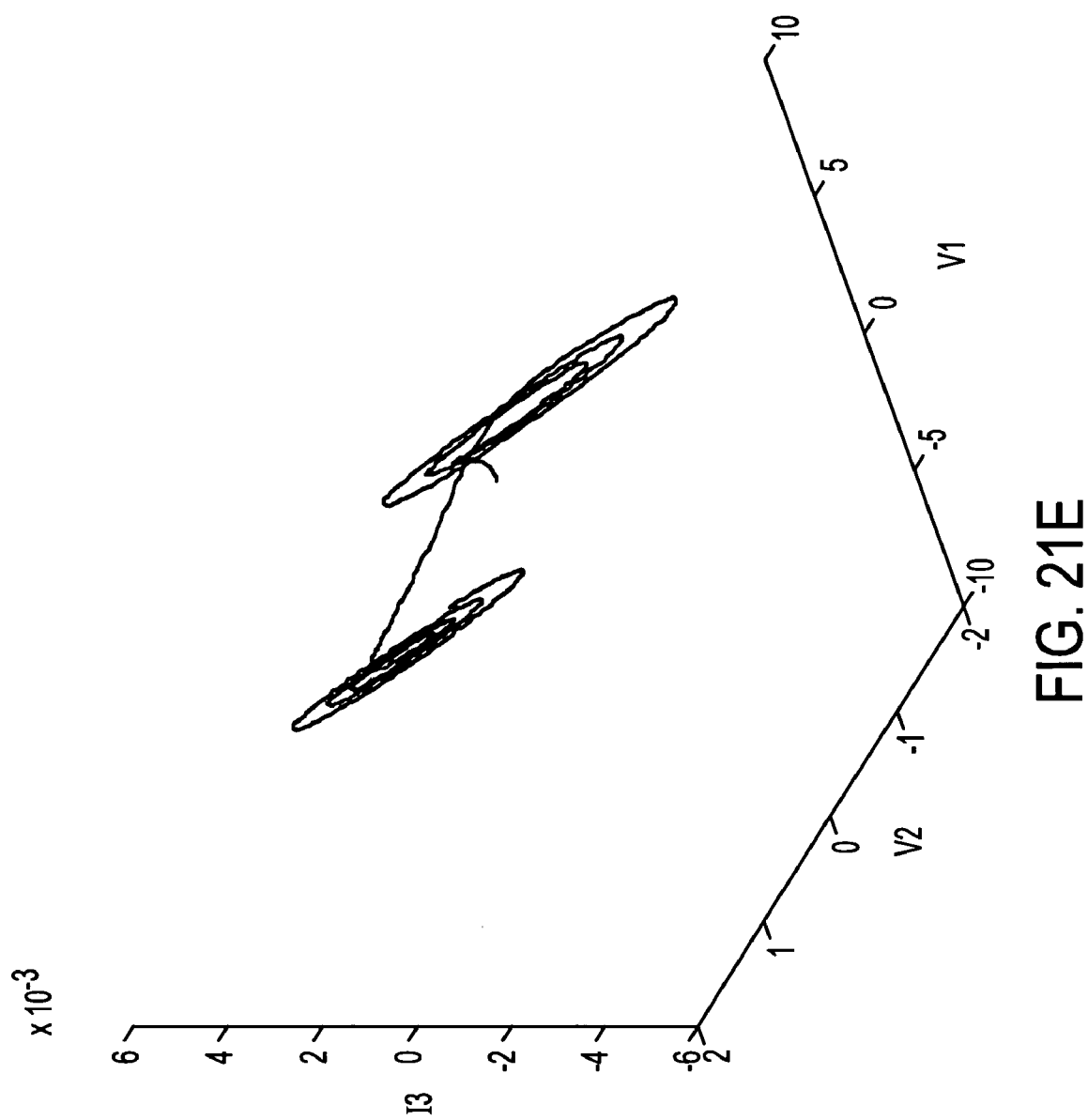
FIG. 21E shows a voltage-current phase space map (V1 vs. V2 vs. I3) corresponding to the nonlinear diode curve of FIG. 21B. As compared to FIG. 21D, the strange attractor on the left side is "squashed."
Figure 21F:
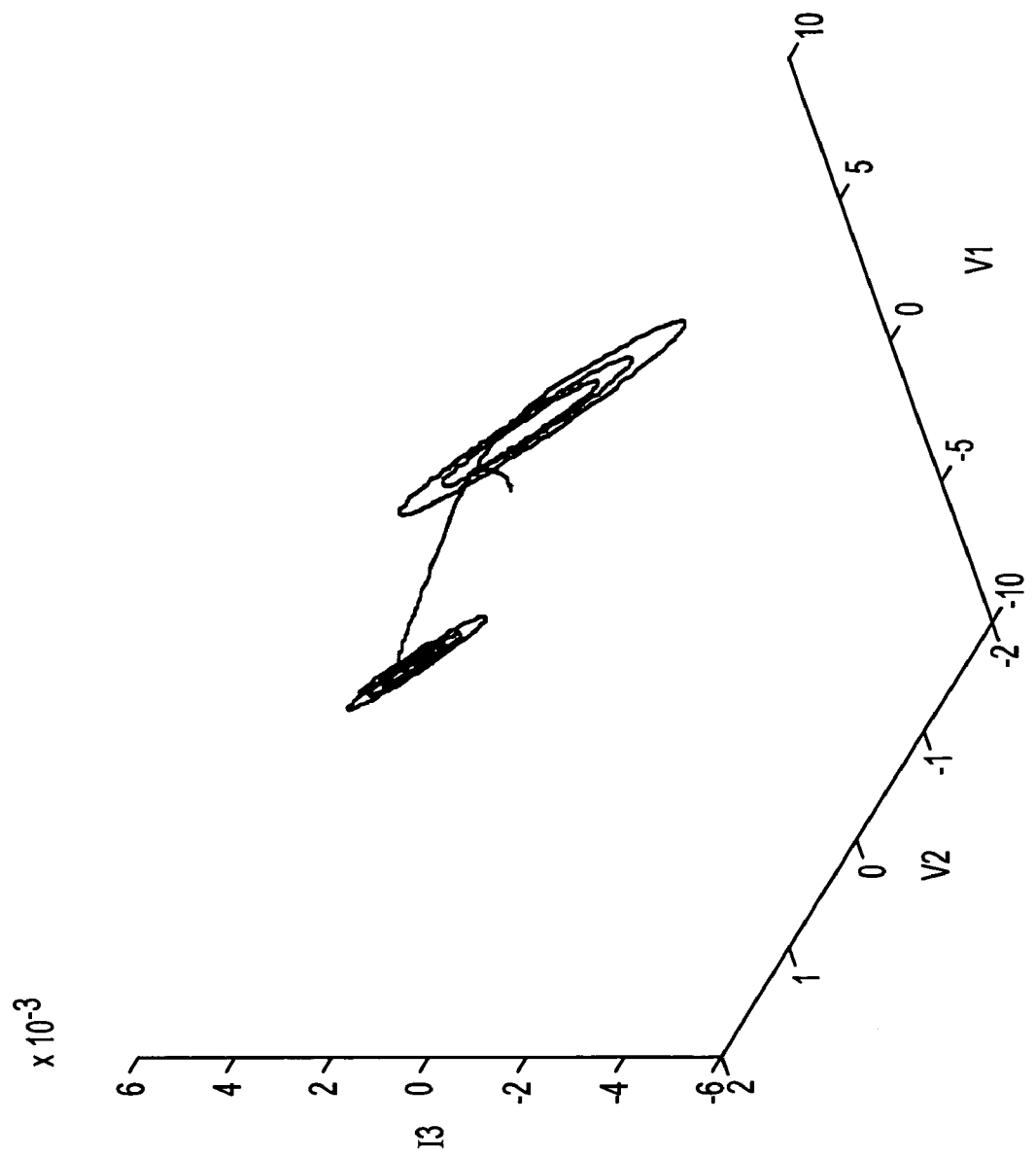
FIG. 21F shows a voltage-current phase space map (V1 vs. V2 vs. I3) corresponding to the nonlinear diode curve of FIG. 21C. As compared to FIG. 21E, the strange attractor on the left side is even more "squashed."

FIGS. 21A through 21C show modulation of the characteristic current-voltage curve for a nonlinear diode, and FIGS. 21D through 21F show corresponding voltage-current plots for the modulated transmitter corresponding to FIGS. 21A through 21C.

In FIG. 21A, resistor R1 has a value of 1200 ohms, resulting in intersections between the load line and diode curve at approximately −5 and +5 volts. In FIG. 21B, resistor R1 has a value of 1210 ohms, resulting in a slightly smaller voltage point for the intersections (i.e., about −4.75 and +4.75 volts). In FIG. 21C, resistor R1 has a value of 1220 ohms, resulting in yet a smaller voltage point for the intersections (i.e., about −4.5 and +4.5 volts, respectively). Resistor R1 affects the nonlinear diode slopes Ga and Gb as shown in these figures. As R1 increases, the slope of Ga and Gb decreases. As Ga and Gb change, the break point moves, causing the voltage swing to increase or decrease.

Voltage-current plots corresponding to the above modulations are depicted in FIGS. 21D through 21F. FIG. 21D shows voltage V2 versus current in the inductor I3 plotted against voltage V1 for the case where R1=1200 ohms. FIG. 21E shows the same quantities for the case where R1=1210 ohms. FIG. 21F shows the same quantities for the case where R1=1220 ohms. As can be seen in FIGS. 21D through 21F, as the resistance is increased, the strange attractor trajectories become "squashed." As R1 increases, the amplitude of the attractor decreases in V1, V2, and I3 due to a voltage decrease. This is due to the shift in the equilibrium points around the load line defined by the resistor R between the tank circuit and the nonlinear diode circuit. As R1 increases, the plots rotate in a clockwise direction.

Figure 21G:
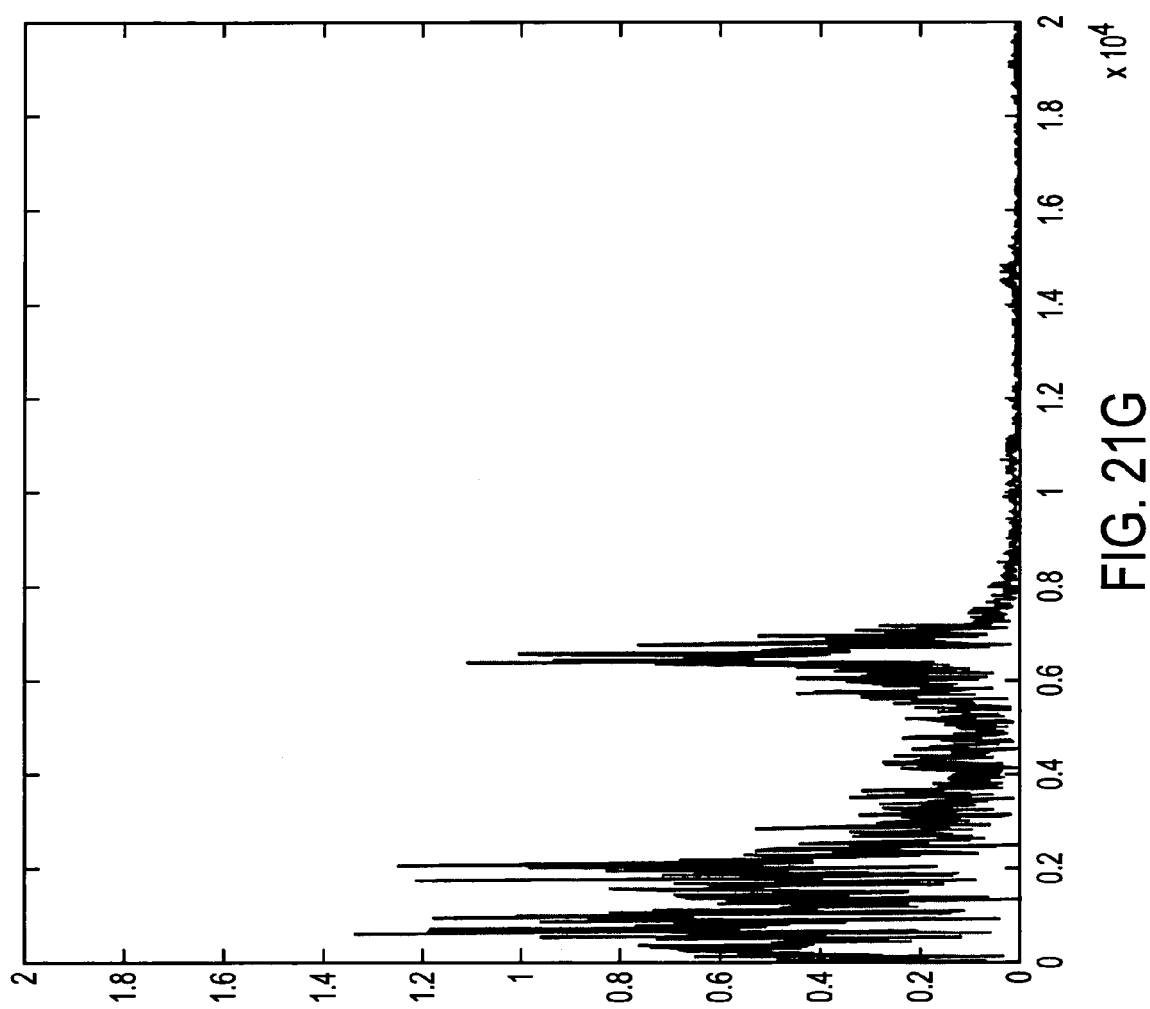
FIG. 21G shows a frequency plot corresponding to the nonlinear diode curve of FIG. 21A.
Figure 21H:
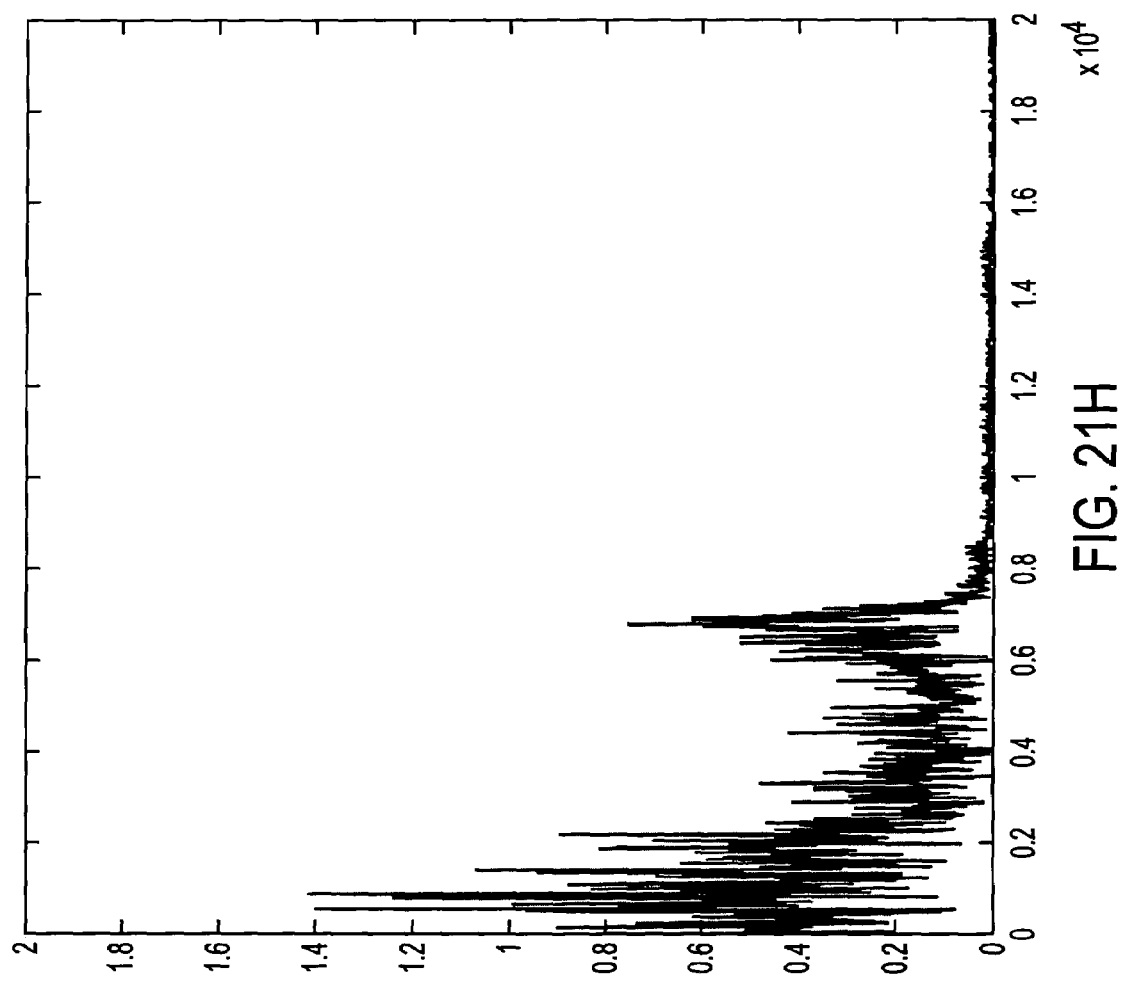
FIG. 21H shows a frequency plot corresponding to the nonlinear diode curve of FIG. 21B.
Figure 21I:
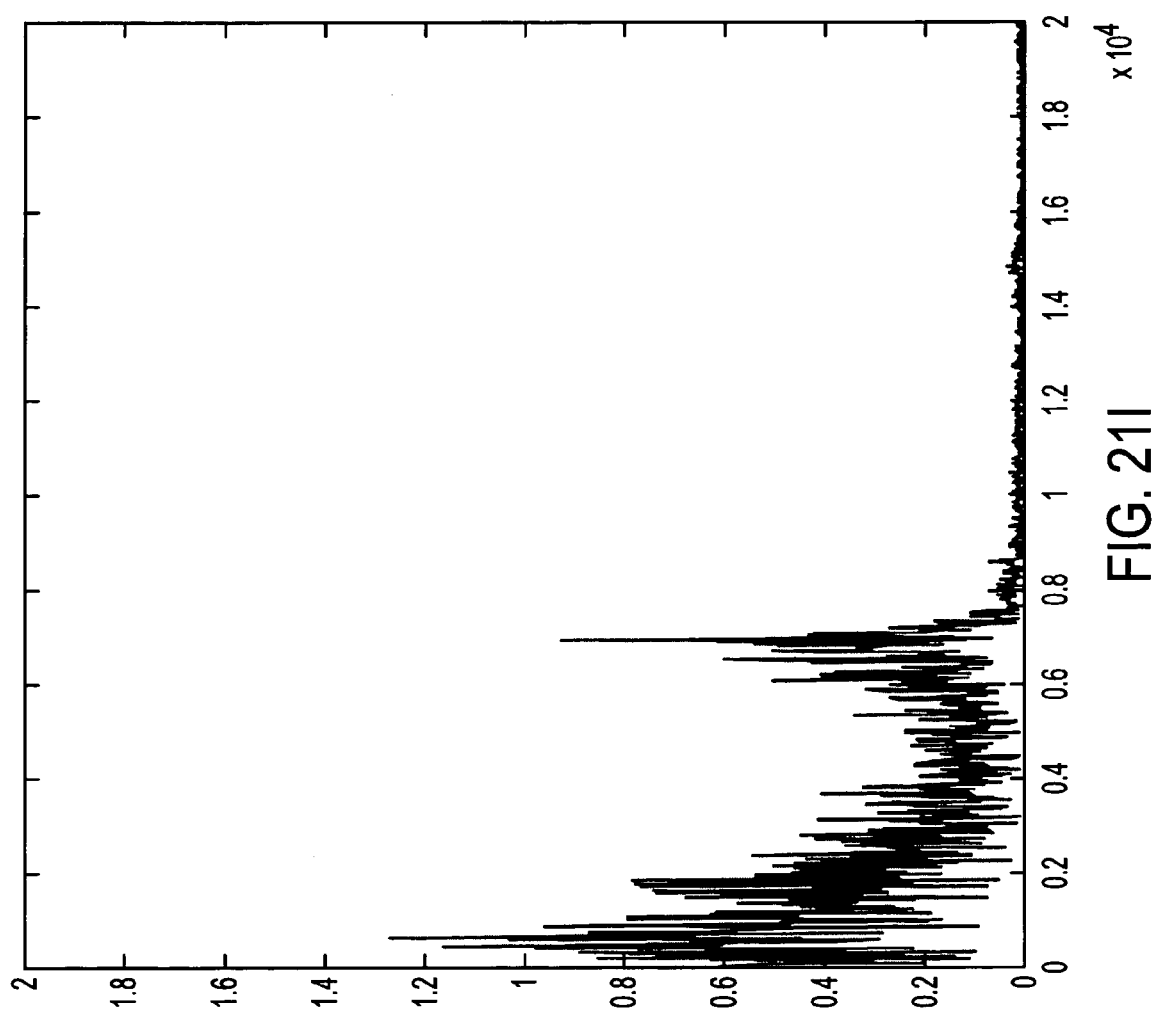
FIG. 21I shows a frequency plot corresponding to the nonlinear diode curve of FIG. 21C.

FIGS. 21G through 21I show frequency versus amplitude plots corresponding to the modulated parameters of FIGS. 21A through 21C. In other words, FIG. 21G shows the spectrum when R1=1200 ohms; FIG. 21H shows the spectrum when R1=1210 ohms; and FIG. 21I shows the spectrum when R1=1220 ohms. As can be seen, the frequency response shifts with an increase in R1. This frequency shift can be used to determine which value of R1 is switched in the circuit. In addition, the magnitude of the right most frequency spike changes with a change in R1, and this amplitude can be detected using a filter and frequency detector. When R1 is set to 1200 ohms, 1210 ohms, and 1220 ohms, respectively, the FFT spike is at 6.6 kHz, 6.85 kHz, and 6.95 kHz as shown in these figures.

Single-Scroll Attractors

FIG. 22A shows a voltage (V1) versus voltage (V2) versus time (T) plot of a chaotic signal (single scroll strange attractor) without modulation. FIG. 22B shows the plot of FIG. 22A when modulated with an information signal according to various second-generation embodiments. These voltages are taken at the same points as in FIGS. 21A through 21C.

Figure 22D:
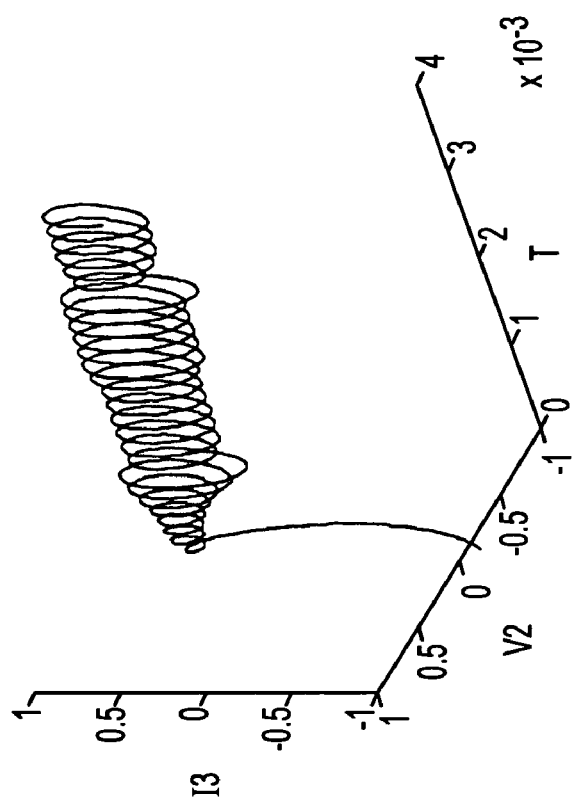
FIG. 22D shows the plot of FIG. 22C when modulated with an information signal.
Figure 22C:
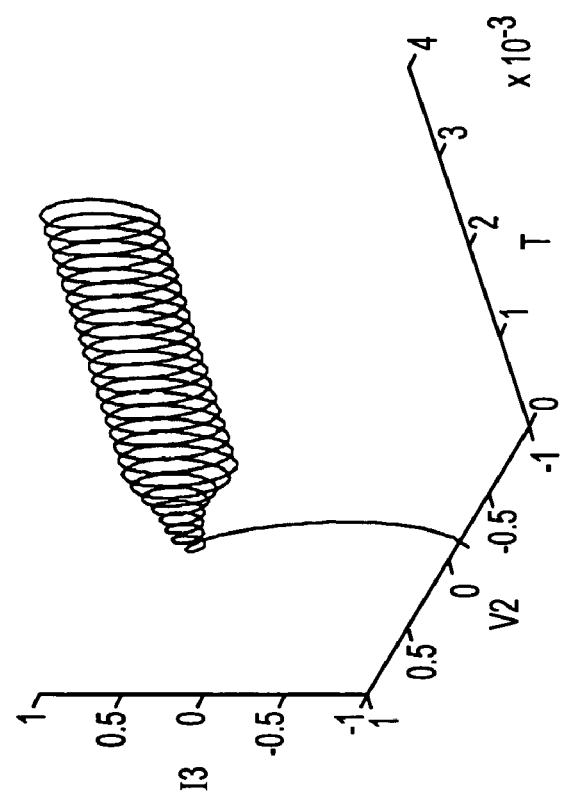
FIG. 22C shows a voltage (V2) versus current (I3) versus time (T) plot of a chaotic signal (single scroll strange attractor) without modulation.
Figure 22F:
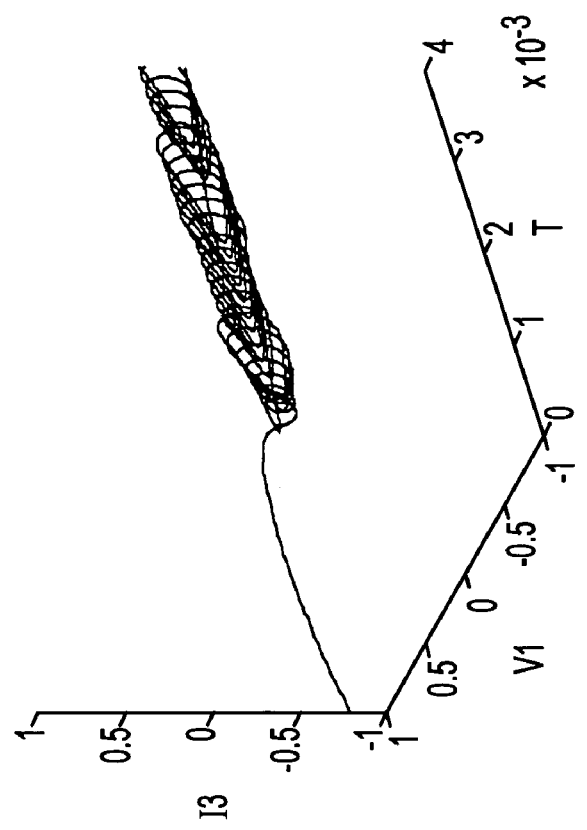
FIG. 22F shows the plot of FIG. 22E when modulated with an information signal.
Figure 22E:
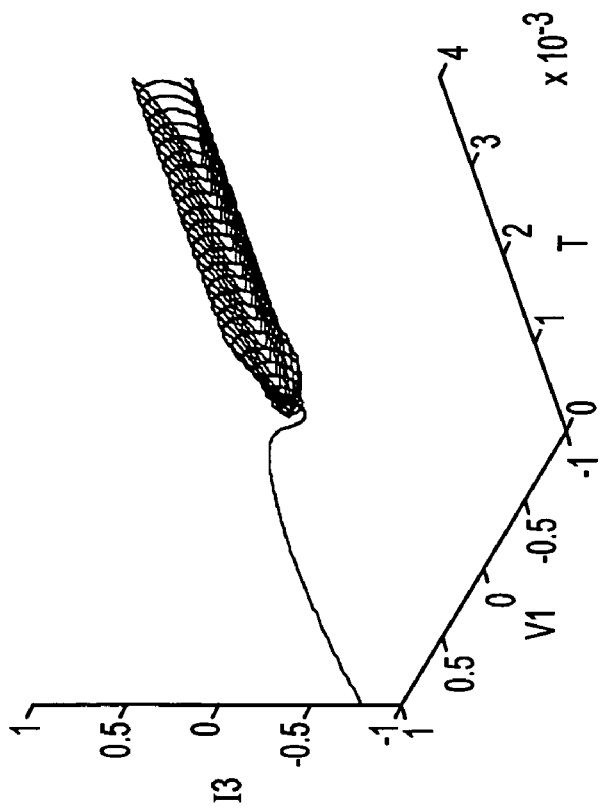
FIG. 22E shows a voltage (V1) versus current (I3) versus time (T) plot of a chaotic signal (single scroll strange attractor) without modulation.

FIG. 22C shows a plot of voltage (V2) versus current (I3) in inductor 230 (FIG. 7A) as a function of time without modulation, while FIG. 22D shows the same quantities when modulated with an information signal. FIG. 22E shows a plot of voltage (V1) versus current (I3) without modulation, and FIG. 22F shows the same quantities when modulated.

These figures also show the effect of starting the system with a set of initial conditions that are out of phase with the strange attractor. The system spirals into the single scroll strange attractor and then builds to its chaotic state conditions. As in FIGS. 20B, 20D and 20F, the signals in FIGS. 21B, 21D and 21Fwere modulated at 1000 bps with a bit stream of "1010". As with the double scroll strange attractor, the strange attractor signals are correlated whenever a binary "1" is transmitted and uncorrelated whenever a binary "0" is transmitted given the receiver is tuned to receive a binary "1".

At the receiver, the synchronized strange attractor produces a voltage across the synchronizing resistor equal to zero. This establishes the synchronized state and produces a series of pulses equating to the out-of-synchronization state that correspond to the spirals of the strange attractor projected onto the V1 axis. The single scroll attractor detection is simplified since there is no zero crossing that can cause a detection error as the modulating frequency is increased.

Figure 23A:
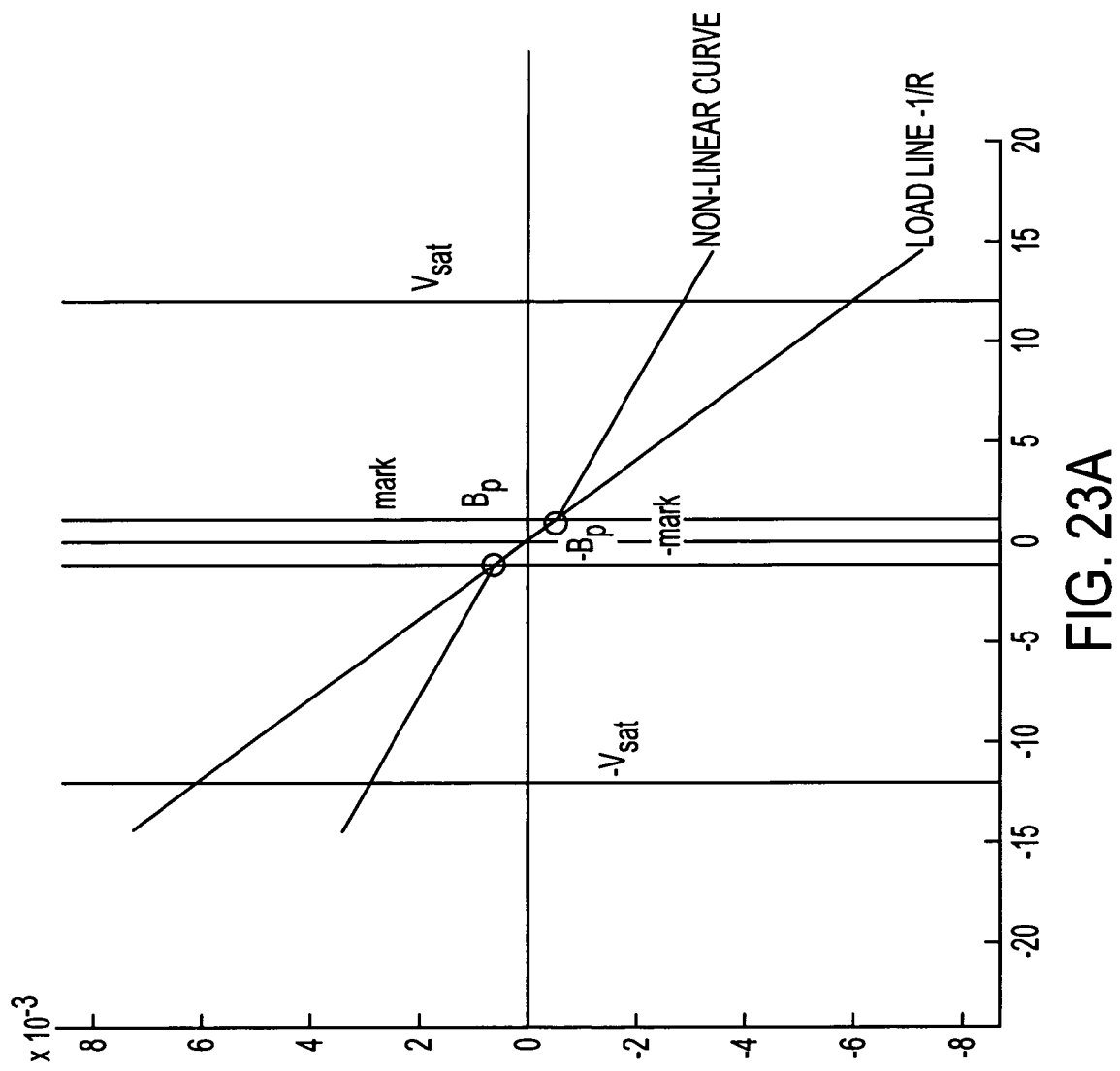
FIG. 23A shows a nonlinear diode current-voltage characteristic curve where resistor R1 is set to 1930 ohms (single scroll attractor).
Figure 23B:
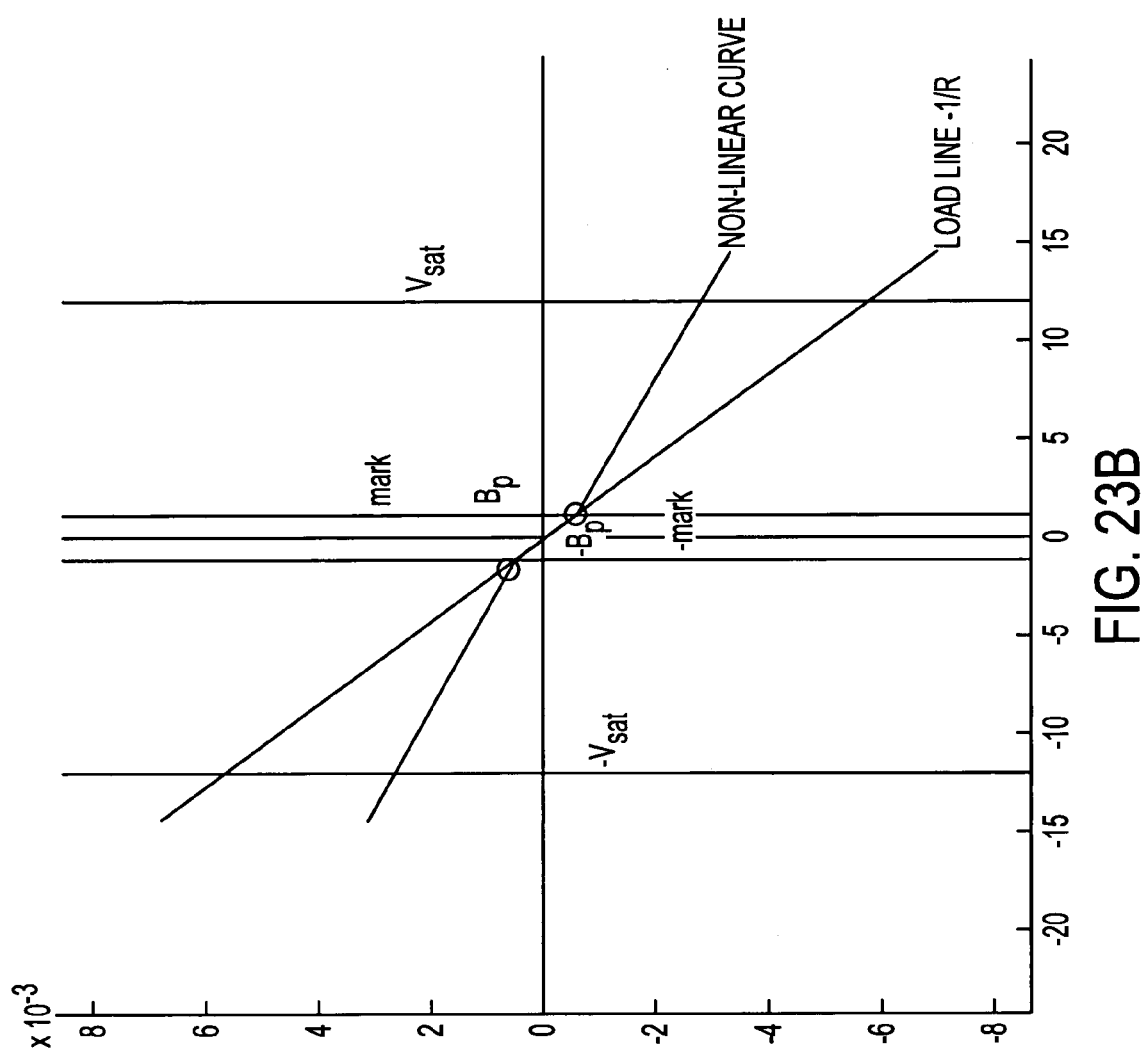
FIG. 23B shows a nonlinear diode current-voltage characteristic curve where resistor R1 is set to 1940 ohms (single scroll attractor).
Figure 23C:
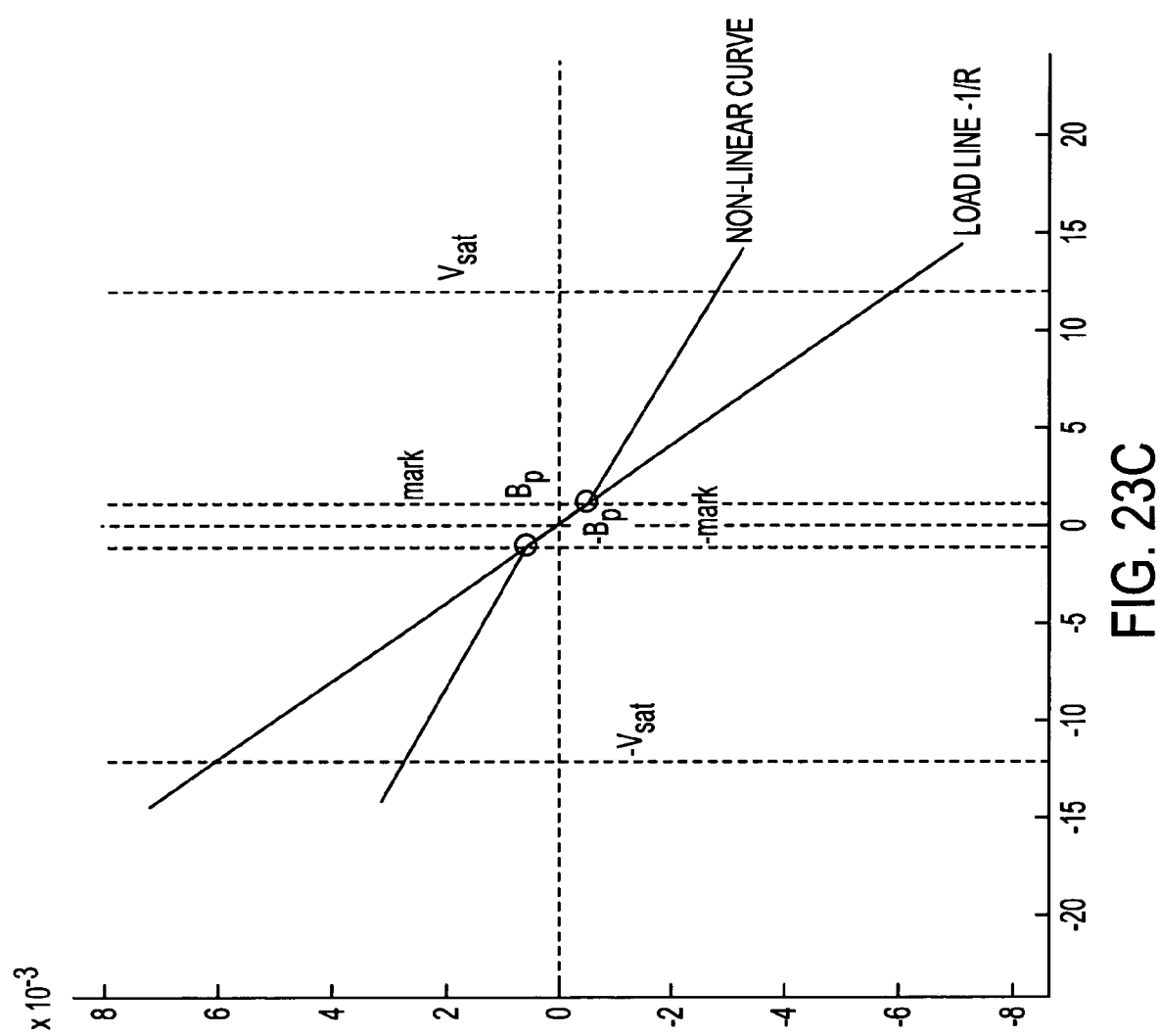
FIG. 23C shows a nonlinear diode current-voltage characteristic curve where resistor R1 is set to 1950 ohms (single scroll attractor).

FIGS. 23A through 23C show nonlinear diode plots similar to those in FIGS. 21A through 21C, but for a single-scroll attractor, wherein resistor R1 is 1930 ohms, 1940 ohms, and 1950 ohms, respectively. Resistor R1 affects the nonlinear diode slopes Ga and Gb as shown. As R1 increases, the slope of Ga and Gb decreases. As Ga and Gb change, the break point moves, causing the voltage swing to increase or decrease.

Figure 23D:
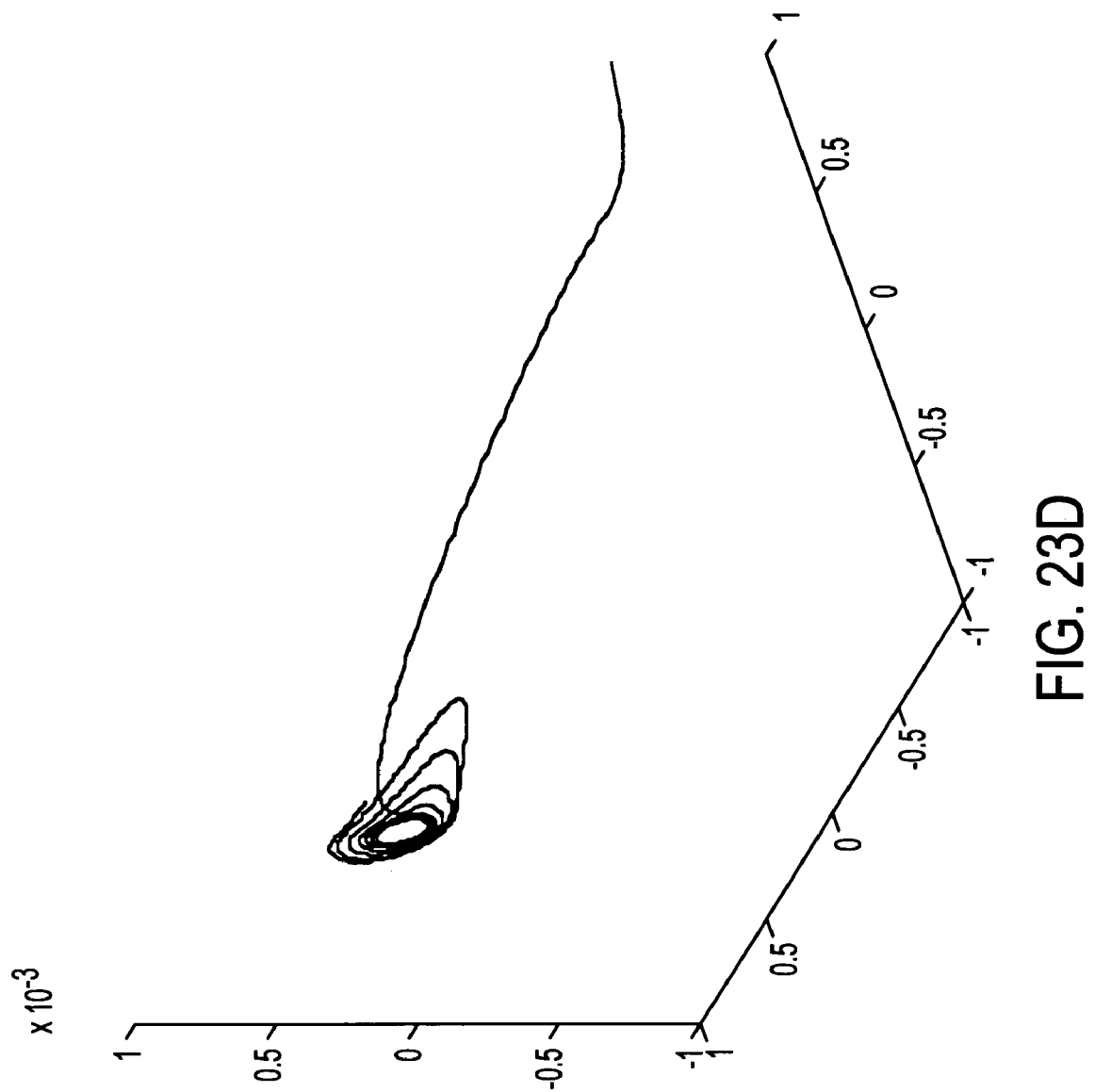
FIG. 23D shows a voltage-current phase space map (V1 vs. V2 vs. I3) corresponding to the nonlinear diode curve of FIG. 23A.
Figure 23E:
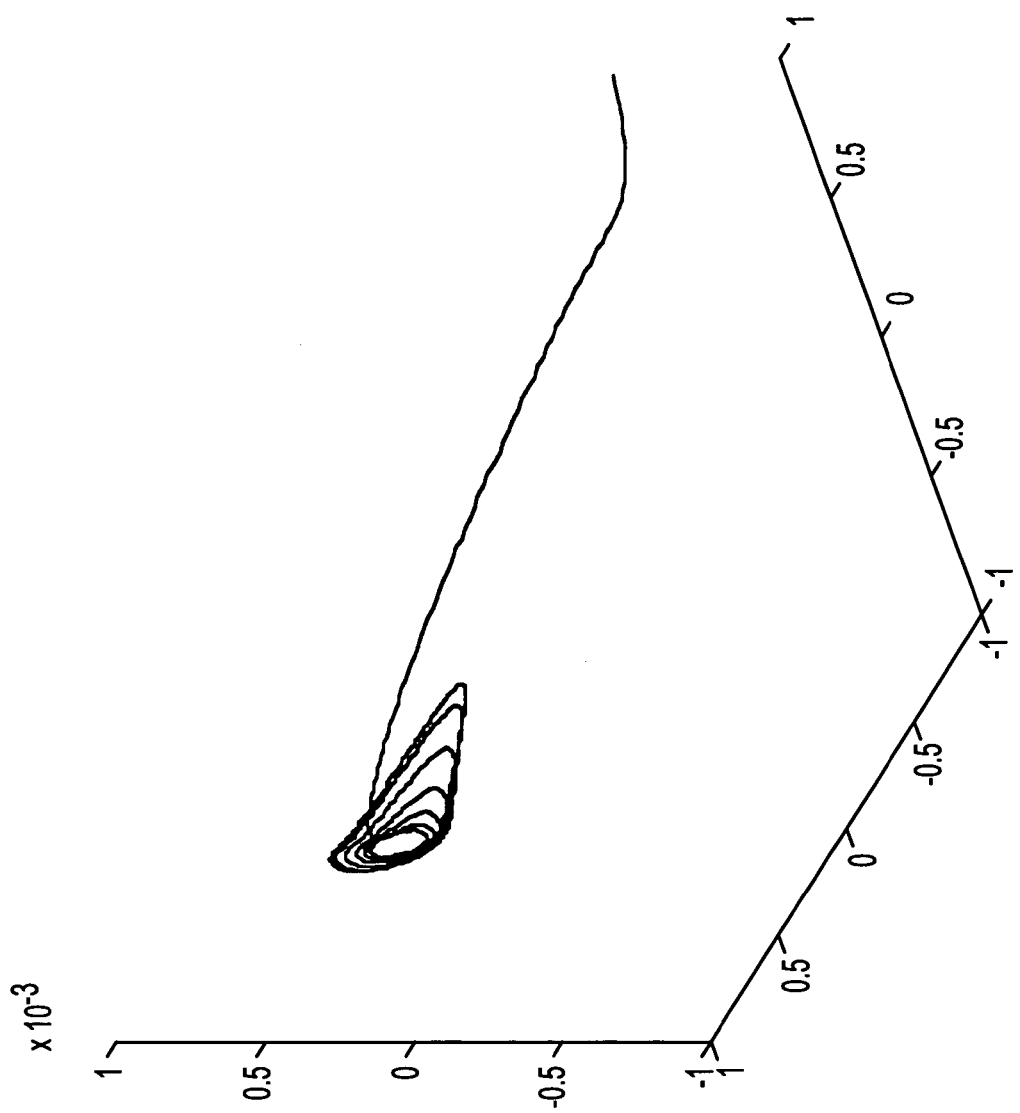
FIG. 23E shows a voltage-current phase space map (V1 vs. V2 vs. I3) corresponding to the nonlinear diode curve of FIG. 23B. As compared to FIG. 23D, the strange attractor is elongated.
Figure 23F:
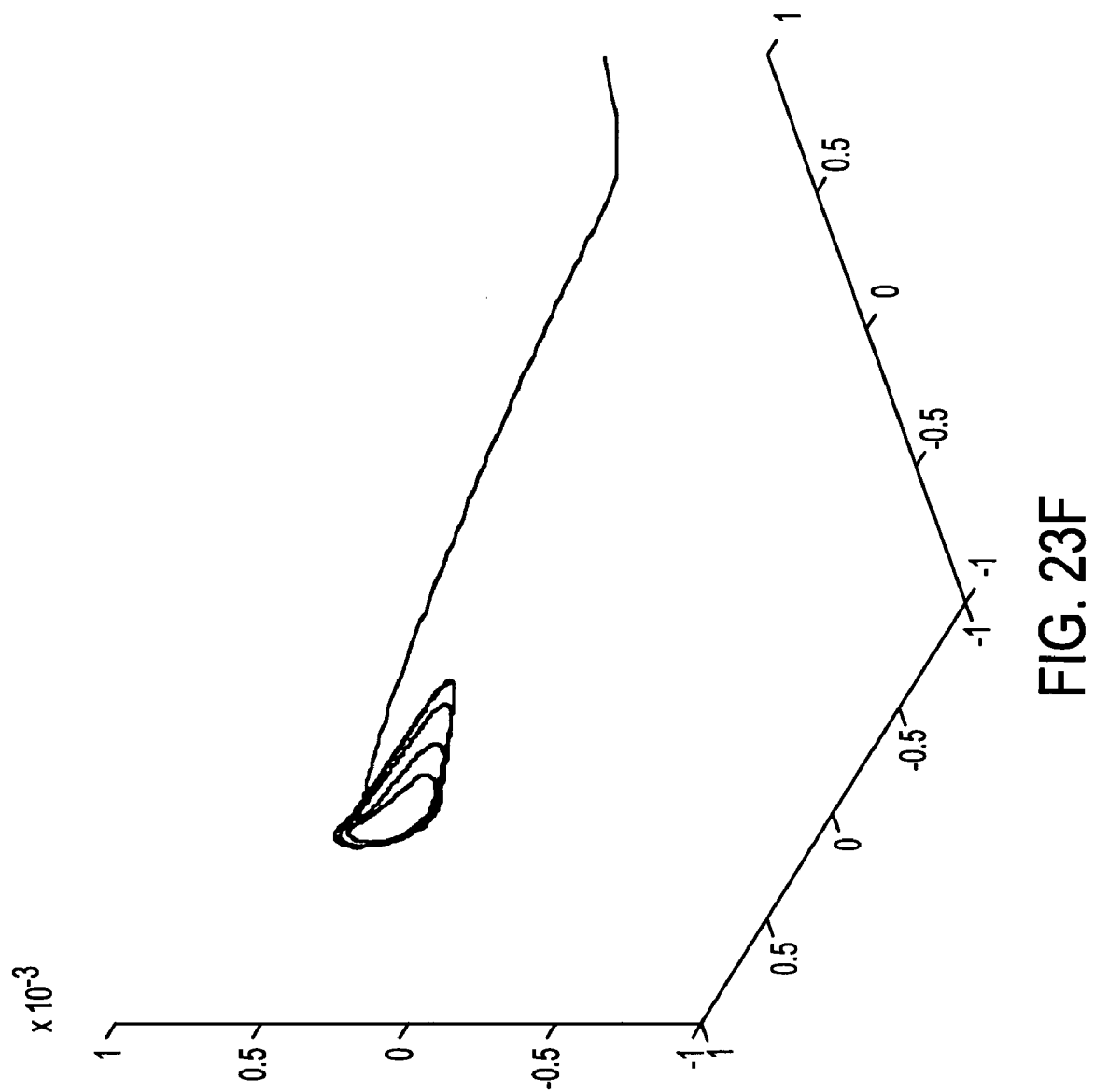
FIG. 23F shows a voltage-current phase space map (V1 vs. V2 vs. I3) corresponding to the nonlinear diode curve of FIG. 23C. As compared to FIG. 23E, the strange attractor is even more elongated.

FIGS. 23D through 23F show corresponding phase plots for the different resistive values in FIGS. 23A through 23C. These phase plots show that as R1 increases, the amplitude of the attractor decreases in V1, V2, and I3 due to a voltage decrease. This is due to the shift in the equilibrium points around the load line defined by the resistor R between the tank circuit and the nonlinear diode circuit. The phase plots also show that as R1 increases, the plots rotate in a clockwise direction.

Figure 23G:
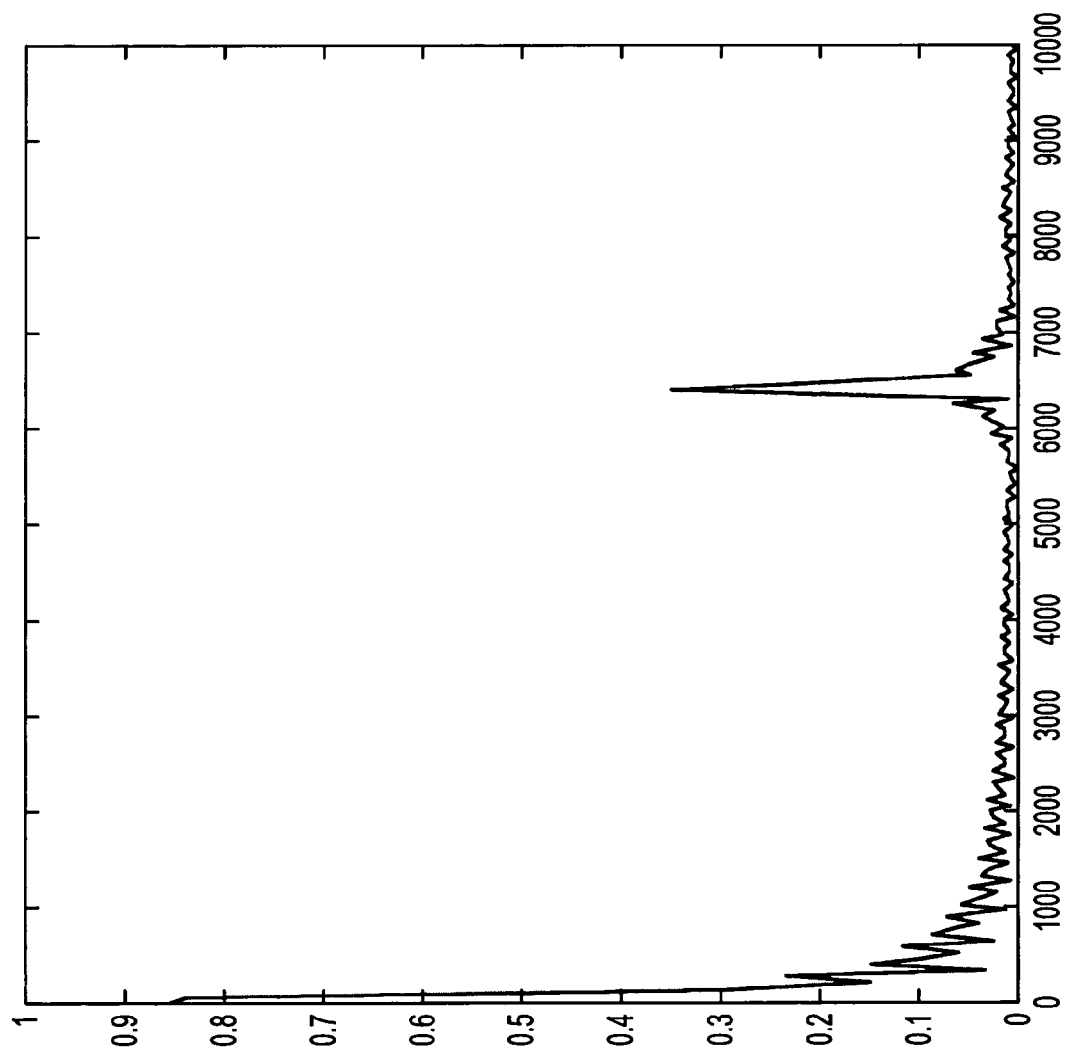
FIG. 23G shows a frequency plot corresponding to the nonlinear diode curve of FIG. 23A.
Figure 23H:
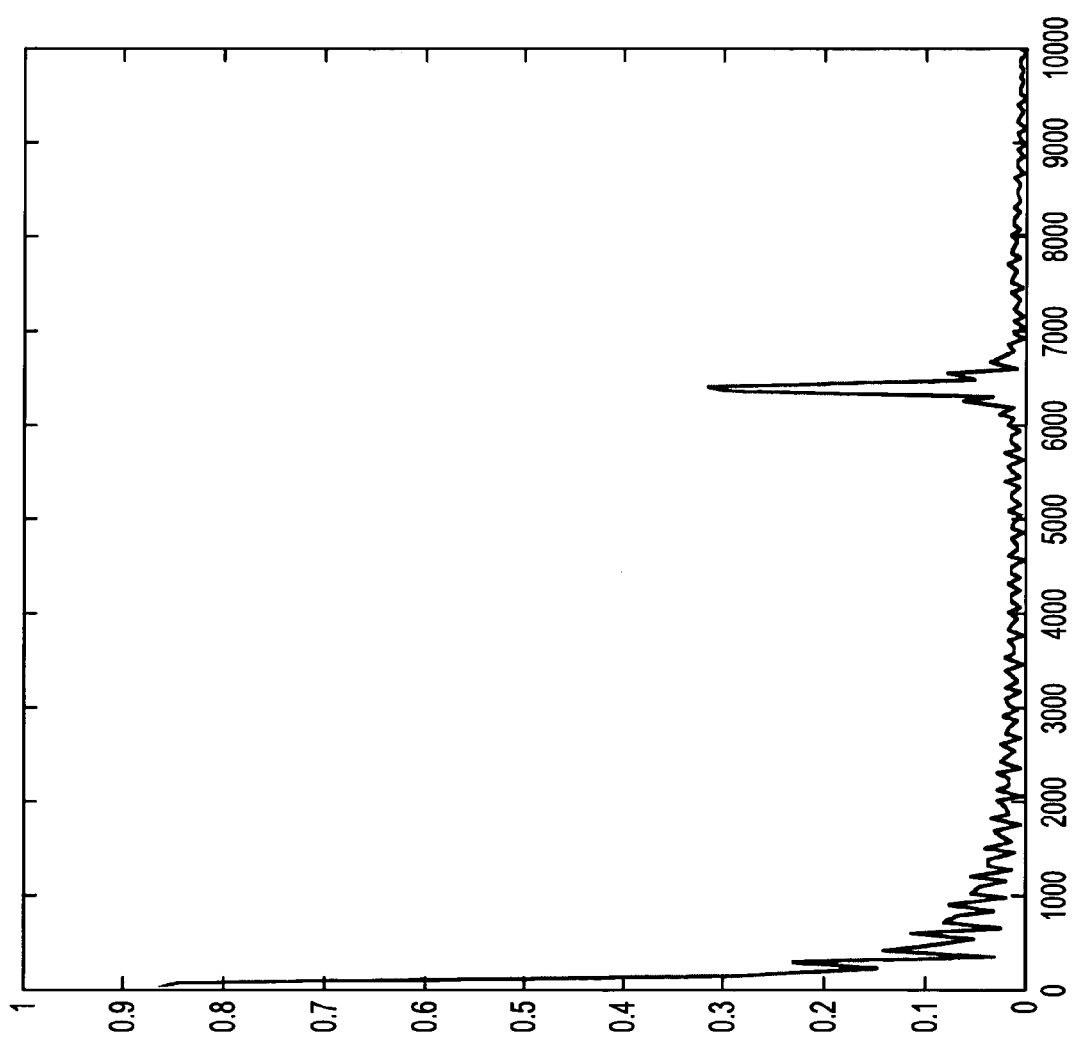
FIG. 23H shows a frequency plot corresponding to the nonlinear diode curve of FIG. 23B.
Figure 23I:
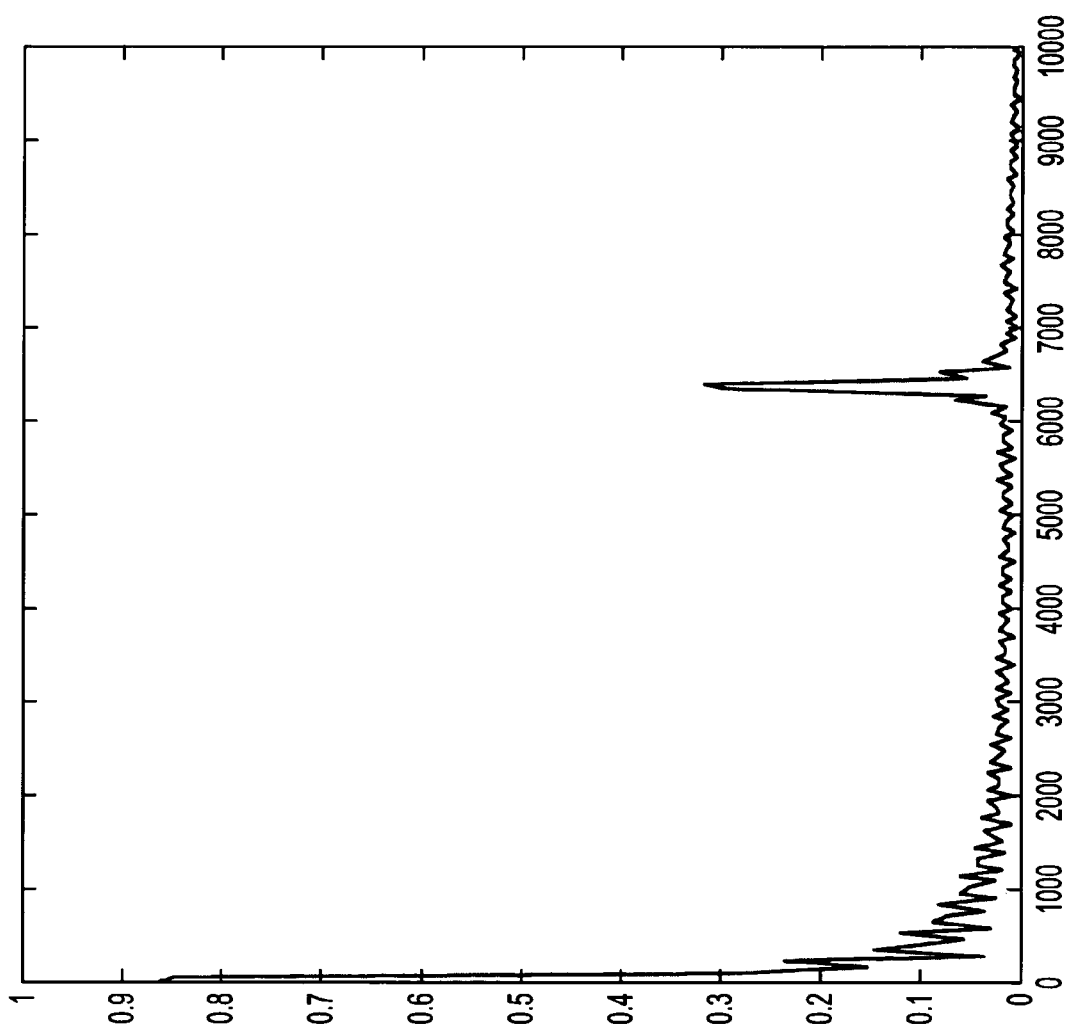
FIG. 23I shows a frequency plot corresponding to the nonlinear diode curve of FIG. 23C

FIGS. 23G through 23I show frequency versus amplitude plots corresponding to the different resistive values in FIGS. 23A through 23C. The plots show how the frequency response increases with an increase in R1. One can use this shift in frequency to determine which value of R1 is switched into the nonlinear diode circuit. In addition, the magnitude of the right most frequency spike changes with a change in R1 in the nonlinear diode circuit, and this amplitude change can be detected using, for example, an amplitude detection circuit. At R1 values of 1930, 1940, and 1950 ohms respectively, the FFT spike is at 6.425 kHz, 6.375 kHz, and 6.350 kHz, respectively as shown.

To summarize, a receiver that receives a signal generated in accordance with the above modulation techniques would see a variation of the current-voltage characteristic curve of the incoming signal and therefore a difference between the incoming signal and the signal generated by a matched chaotic circuit at the receiver. Second-generation modulation techniques change the trajectory of a component that varies the trajectory about the strange attractor. This shows up in the signal as an equivalent (or apparent) amplitude variation defined by the voltage across component 215, 220 and the current through the inductor 230 in FIG. 2A. This is different from conventional phase shift keying where the signal phase is shifted. In this case, the trajectory of the strange attractor determines a current through inductor 230, and the two voltages across capacitors 220 and 215 are changed within phase space when modulation is applied to one of the resistors in the diodes shown in FIG. 6A or 6B using an ideal switch (analog, FET, or relay) to switch a resistor in parallel with any nonlinear diode resistor components (e.g., any of resistors 601, 603, 604, 606, 607, 608 in FIG. 6A, or any of resistors 651, 653, 654, 658, 659, or 660 in FIG. 6B), or any combinations thereof.

Shifting the chaotic oscillator strange attractor trajectory by changing the 16 current-voltage characteristic of the transmitter's nonlinear diode results in an ability to modulate the strange attractor trajectory at modulation rates as high as approximately two times the tank circuit fundamental frequency ($f_{LC}$) (the Nyquist rate 1/(2f) given by the tank circuit components) and still recover the signal using any of the receivers described in the first-generation embodiments. This is an increase of the modulating data rate by approximately 200% over using first-generation transmitter modulation techniques that change a frequency by modulating other reactive circuit components (e.g., elements 230, 215, or 220 in FIG. 2A) or resistor 225.

Modulating Ga and Gb causes the receiver to synchronize at the Nyquist rate of 1/(2f). The output pulses exhibits this rise time at the receive output of a comparator or subtractor circuit. This technique can also be applied to a tunnel diode nonlinear current voltage characteristic curve for radio frequency operation or to a laser amplifier configured as a nonlinear diode.

The Fast Fourier Transform (FFT) of the voltage across C1 (element 215) and C2 (element 220) showed a 30 dB higher attenuation of the modulation frequency component which was lost in the chaotic signal noise floor when modulating the nonlinear diode using R1 (element 660 in FIG. 7A) by less than one ohm. The modulating frequency was therefore not detectable as a distinct frequency component since it was below the chaotic frequency spectrum noise floor.

Modulating the current-voltage characteristic curve results in a random polarity reversal of the attractors, and at the receiver demodulated output where the detected data is recovered. This random reversal adds a significant improvement in the detectors' ability to recover an information signal in secure communication environments since it helps mask the information signal in what appears to be additional noise on the channel.

A similar effect can be achieved by modulation components 653 and 654 since only Gb is modified. It will be appreciated that modulation can be effected by changing the breakpoints in order to shift equilibrium positions on the characteristic curve.

C. Receiver Synchronization

The following description explains how the chaotic receiver synchronizes with signals generated using the techniques and systems described above, and how the value of the synchronizing resistor Rsync can be selected for optimal performance in a chaotic transmitter implementation.

Referring back to the receiver embodiment of FIG. 4C, an analysis of synchronizing resistor Rsync (element 385) when the nonlinear diode is modulated determines the maximum voltage difference with and without modulation applied across that resistor. As Rsync increases in value, the voltage difference across it increases with modulation as $\tau(Tau) = 1/(\text{resistor } 385 \times \text{capacitor } 355) = 1/(\text{Rsync} \times C_1)$. This is an exponential time decaying voltage function. It has been determined that the decay rate of the time function $\tau$ optimizes the synchronizing signal difference as Rsync approaches zero ohms but the voltage difference across resistor 385 approaches zero. The upper synchronization voltage difference between a synchronizing signal and a modulating signal occurs at Rsync=∞(infinity).

In practice, Rsync can be optimized. It was determined empirically that the maximum frequency that could be demodulated in a receiver was two times the tank circuit (element 361) resonant frequency $f_{LC}$, since a modulation rate greater than 2 $f_{LC}$ at capacitor 360 in the tank circuit charges the capacitor and does not allow sufficient time for the capacitor to discharge. Capacitors 360 and 355 then charge to one of the equilibrium points of the strange attractor. On the characteristic curve, voltage V1 goes to a value equal to the crossing of the direct current load line (1/R) where it crosses Gb in the upper or lower quadrant as shown in FIG. 9B (line 904). Since this is a limiting modulation rate, then this point can be used to set the time constant for the 1/(Rsync×$C_1$) time constant. This permits a modulation rate of $2f_{LC}$ and allows the largest voltage difference across the Rsync resistor while still obtaining a synchronization time that supports optimum detection of the amplitude and frequency difference of the incoming signal (i.e., optimizes the voltage difference across Rsync versus synchronization time). One can reduce Rsync even further but the voltage difference is then exponentially decreased across Rsync for both the synchronized and modulated signal. Optimum synchronization (in a noiseless channel) for circuit design can therefore be obtained when Rsync is selected as follows:

$$\text{Rsync} \leq (1/(2f_{LC} \times C_1)) \text{ where } C_1 \text{ is capacitor } 355.$$

This is an optimum design point for Rsync in a chaotic receiver. The frequency $f_{LC}$ can be determined by taking the fast Fourier transform of the transmitter or by applying the following formula for an RLC tank circuit:

$$\text{Frequency} = k(1/(3.41(L \times C_2)^5)) = k(1/(3.41(L \times [\text{element } 360])^{0.5}))$$

where k is a constant ranging from 1 to approximately 2.5 depending on the internal resistance of the inductor (element 348) and the resistor R (element 380).

This establishes the upper limit for Rsync. It has been determined experimentally that in the presence of noise, Rsync in the range of less than about 1 ohm to about 1000 ohms improves the signal-to-noise ratio of the receiver circuits in the first and second generation receivers by several (e.g. two or more) orders of magnitude. This Rsync coupling resistor value forces the nonlinear diode portion of the circuit to synchronize faster. The synchronization time in a noisy channel dominates the system's noisy performance. Thus, Rsync can be adjusted to optimize the energy per bit to the noise per Hertz of bandwidth. This can be achieved at resistance values for Rsync from about 1 ohm or less to Rsync=(1/(2 $f_{LC} \times C_1$), see FIG. 4C, depending on the noise characteristics of the channel.

D. Gain Control Amplifier

Figure 11:
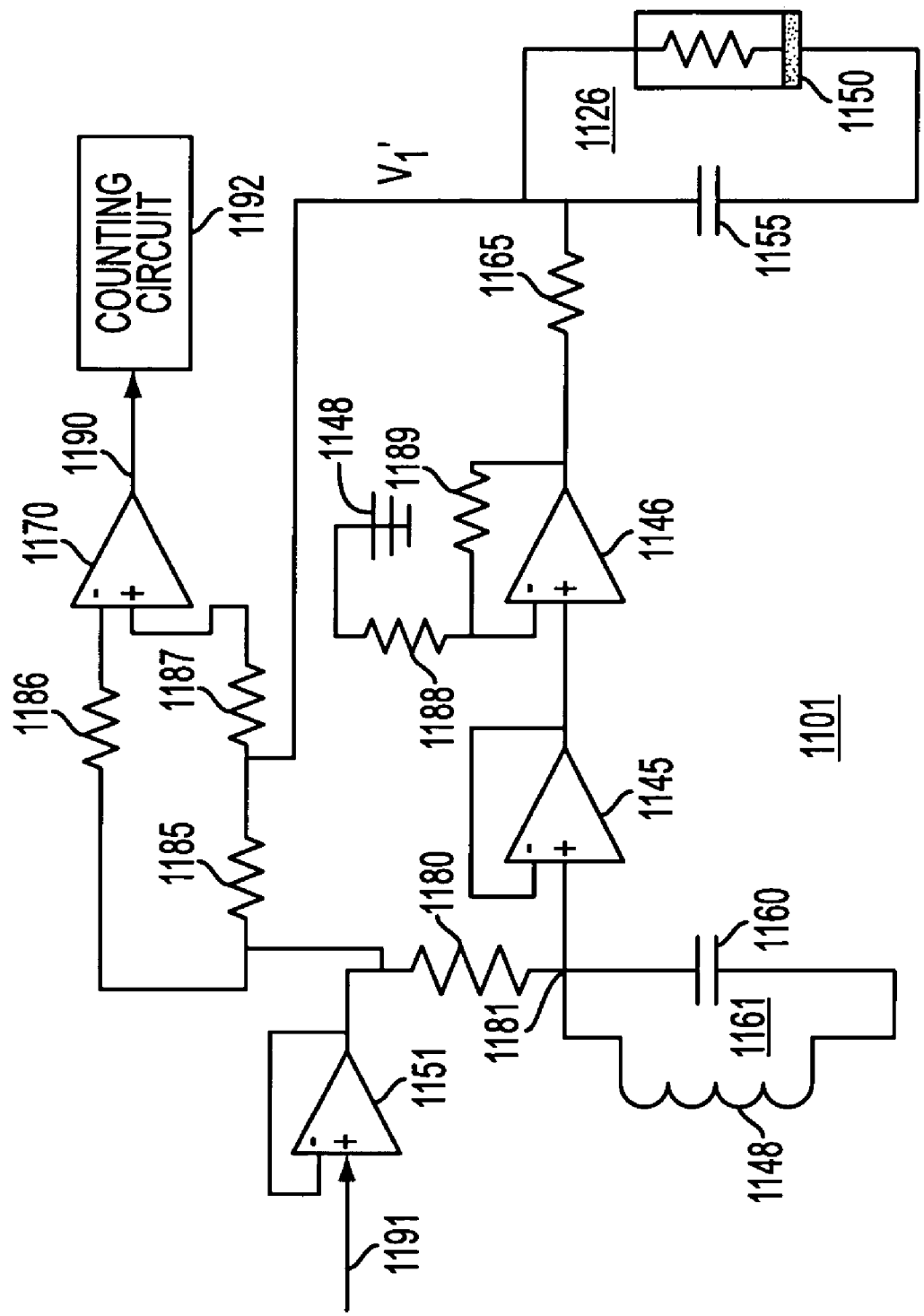
FIG. 11 shows a gain control amplifier 1146 inserted into a receiving circuit that reduces or eliminates the need for an automatic gain control (AGC) amplifier on the input at point 1191.

The chaotic receivers exemplified in FIGS. 4C, 4D, 4E, and 4F can be optimized by adding an amplifier in the circuit. FIG. 11 shows a gain control amplifier 1146 inserted into a receiving circuit that reduces or eliminates the need for an automatic gain control (AGC) amplifier on the input at point 1191. As shown, gain control amplifier 1146 is inserted into the circuit between elements 1145 and 1165. Resistors 1188 and 1189 set the amplification. In one embodiment, the optimum gain is 2.4 dB to 3 dB.

The amplifier will also operate with gains above 3 dB. However, the size of the gain should be adjusted to ensure that the signal is not clipped. This amplifier reduces the need for an automatic gain control (AGC) amplifier on the input of the chaotic receivers at point 1191. With amplifier 1146 in the circuit, the incoming signal can be attenuated by more than 10 dB and chaotic synchronization will still occur in subsystem 1126 to generate voltage V1 across capacitor 1155. This amplifier also seems to provide some noise immunity because of its band pass filter characteristics and its ability to move the signal away from the breakpoint of the nonlinear diode element 1126.

Figure 12:
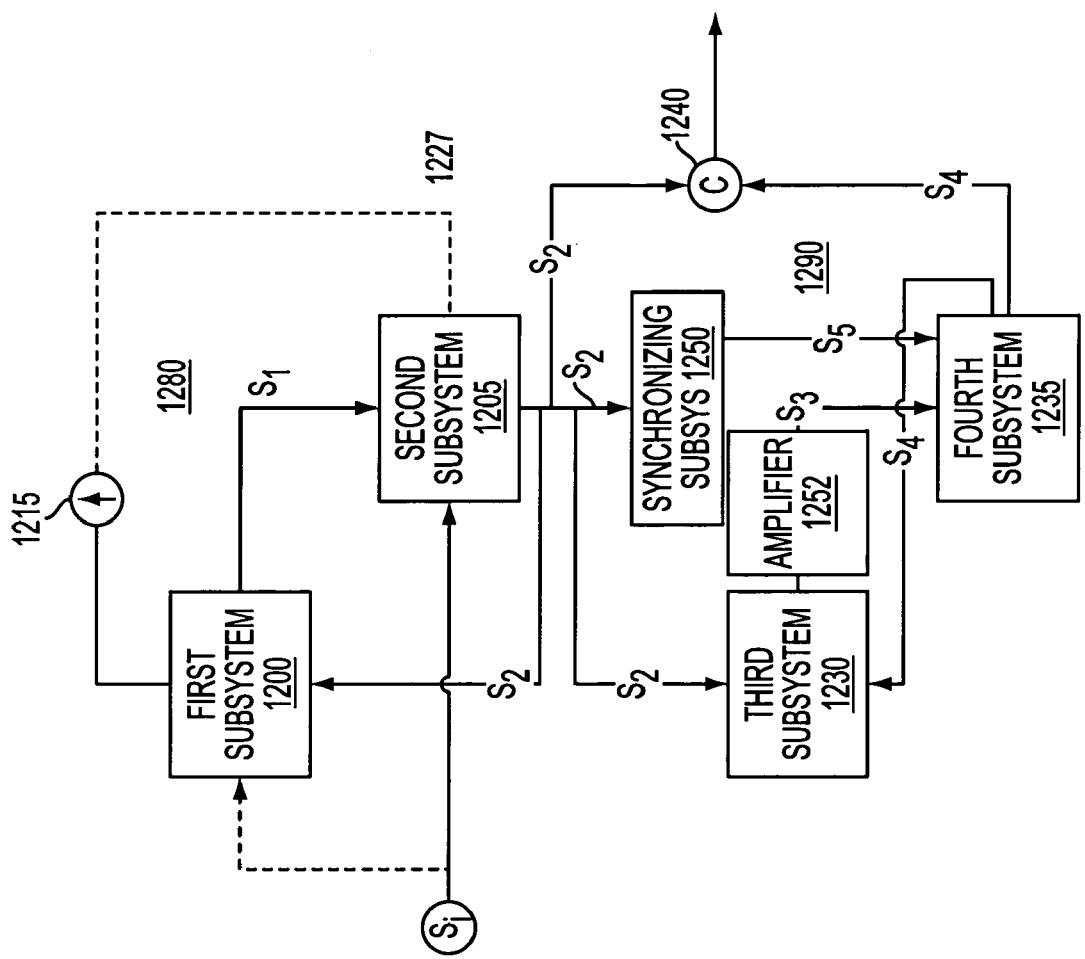
FIG. 12 shows a general case of a gain control amplifier 1202 embedded in a receiving circuit.

The most general case for this amplifier is shown in FIG. 12, which represents an improvement over the system shown in FIG. 5. In FIG. 12, amplifier 1201 is inserted between subsystems 1230 and 1235 to overcome signal attenuation in the incoming channel. An extension of this is to add an amplifier between every subsystem that performs the function of a receiver element, such as subsystem 1230 and subsystem 1235. The elements in FIG. 12 can be roughly mapped to previously described embodiments as follows: first subsystem 1200 corresponds to the tank circuit in the transmitter; second subsystem 1205 corresponds to the nonlinear element in the transmitter; third subsystem 1230 corresponds to the tank circuit in the receiver; fourth subsystem 1235 corresponds to the nonlinear element in the receiver; and synchronizing subsystem 1250 corresponds to the synchronizing resistor and associated components. The voltage across tank circuit capacitor 1160 in the receiver's tank circuit is amplified prior to being applied to resistor 1165.

The IV characteristic curve in FIG. 9B illustrates how this amplifier works. The received signal is compared to the signal produced by the receiver. If the received signal was produced on Gb slope 901 or 902 in the transmitter and it is attenuated below the breakpoint of the receiver 971, then it is being reproduced based on the slope of Ga 966. The voltage in the tank circuit must be amplified enough to raise it above breakpoint 971. This is based on slope Gb and load line 972. This then causes a voltage on the nonlinear diode Gb slope 925, or 931 instead of Ga 966. If the new voltage is compared to the incoming signal, there will be a constant difference between the two signals. This then brings the systems into synchronization, which can be detected as a one or zero voltage by various threshold detection circuits discussed herein.

In summary, the amplifier reduces the need for a precise automatic gain control in the receiver system of a chaotic communications system designed from Chua's circuit or any other nonlinear set of decoupled dynamical nonlinear equations used as a receiver. The amplifier allows the input channel signal to be attenuated up to 10 dB or more. This means that the automatic gain control does not have to precisely match the incoming signal. Moreover, the amplifier also acts as a noise canceling circuit based on its bandwidth filtering characteristics.

E. Chaotic Signal Filtering Transmitter

Certain second-generation embodiments of the present invention also include filtering in both the transmitter and receiver circuits. If a signal is produced by the transmitter and filtered, then the receiver can still follow this signal. At the receiver, the receiver follows the filtered signal and oscillates in such a manner that it actually adds the missing frequency components back into the receiver generated signal. The signal generated in the receiver must then be filtered using a like filter to match the received signal. If the signal is not filtered at the transmitter, then it can be filtered at the receiver to reduce noise effects. This can be done at the front end of the receiver or after the receiver has reconstructed the signal. The following paragraphs describe this process.

Figure 13:
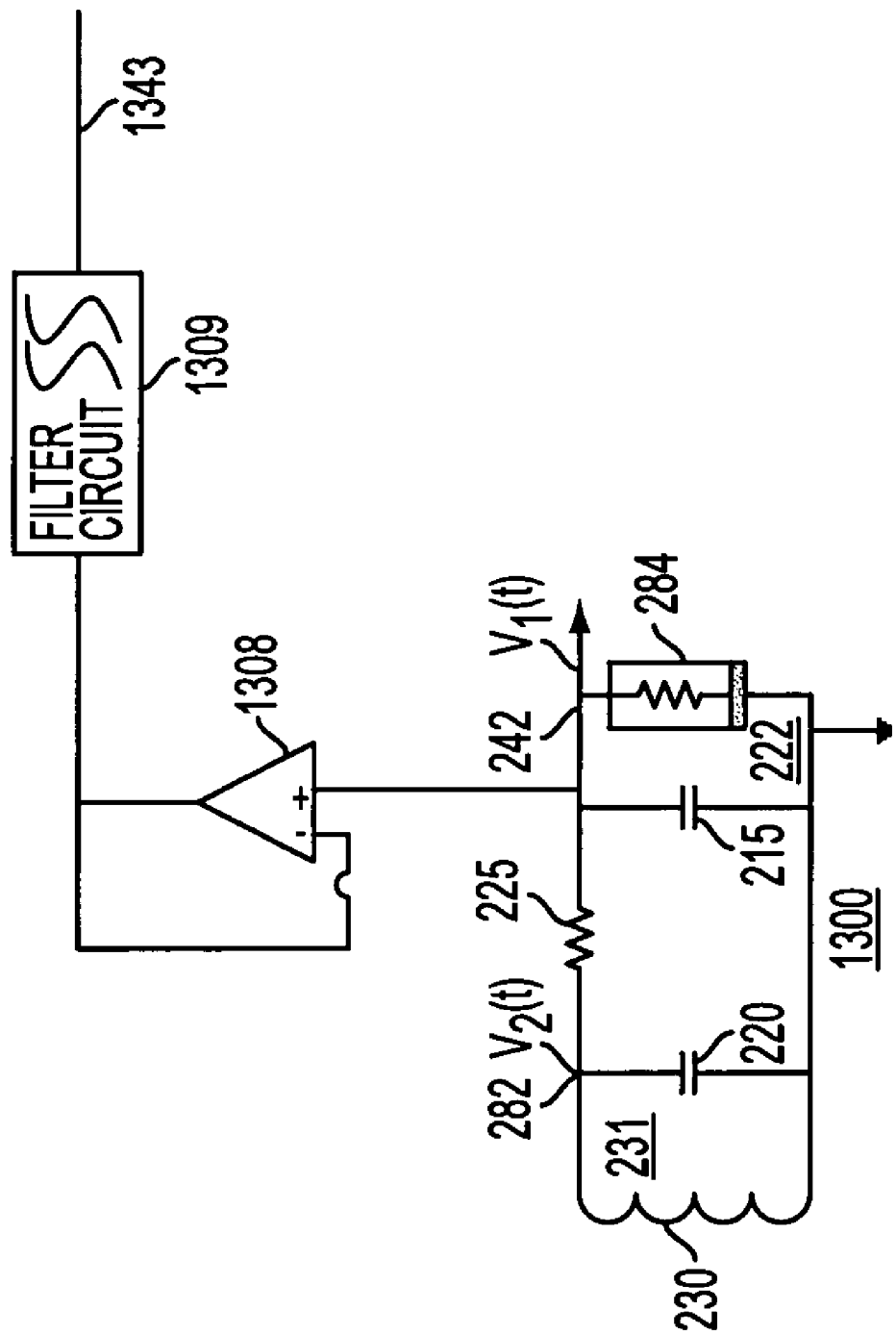
FIG. 13 shows a transmitter including an operational amplifier 1308 that isolates a filter 1309 from the chaotic subsystem 222 according to a second-generation embodiment of the invention.

Turning to FIG. 13, transmitting circuit 1300 is similar to the transmitter of FIG. 2A, but includes an amplifier 1308 that isolates filter 1309 from the chaotic subsystem 222. This prevents the filter's input impedance from interfering with the chaotic operation of the chaotic circuit's nonlinear resistor 284 or capacitor 215 (see FIG. 2A). Filter 1309 can be a low pass filter to eliminate the direct current component, or a bandpass filter to allow only the higher order chaotic signal components to pass over a real channel such as a radio baseband where direct current components are blocked. In practice, the three receiver designs described above with respect to the first-generation systems can be synchronized with output signal 1343 from filter 1309. This is an improvement because it can be used to match a chaotic transmitter circuit to the bandwidth of an audio, video, radio frequency, or light (e.g., laser) channel, where frequencies below some cutoff frequency cannot be passed in a real system.

Considering a bandpass filter, filter 1309 bandwidth in practice can be centered around the tank circuit frequency (e.g., ±20% of the tank circuit frequency) or centered around the information rate and still synchronize at the receiver. All the modulation techniques of the first-generation and second-generation embodiments can be applied with the transmitter filtering principles of FIG. 13. Another way to judge the bandpass requirement is to look at the bandpass of the tank circuit and design a bandpass filter that is slightly wider than it by approximately 5%. Optimum selection should, of course, be made on an application-dependent design basis.

Figure 14B:
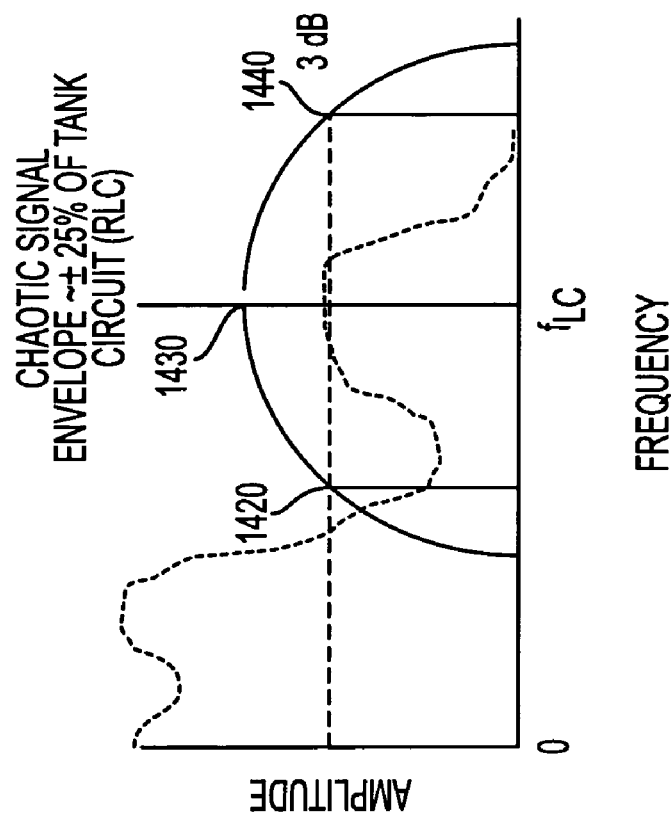
FIG. 14B shows bandpass filtering characteristics of a transmitter according to a second-generation embodiment of the invention.
Figure 14A:
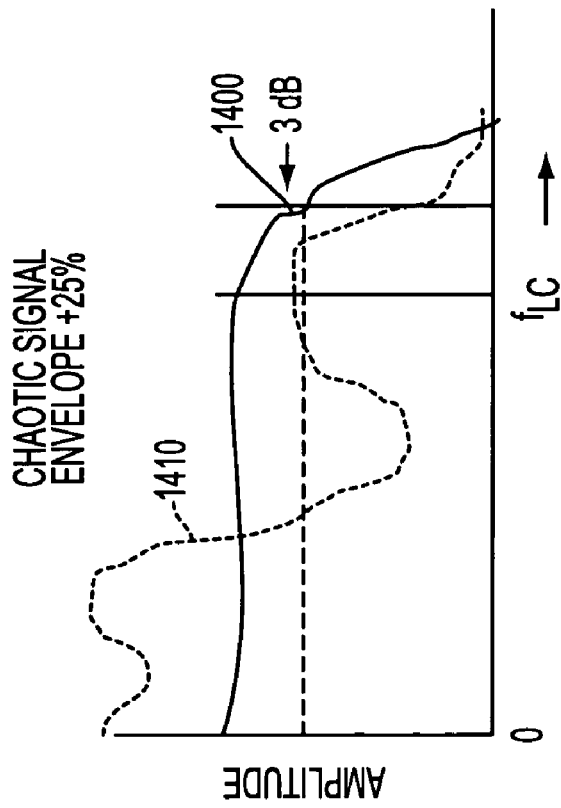
FIG. 14A shows low-pass filtering characteristics of a transmitter according to a second-generation embodiment of the invention.

FIGS. 14A and 14B show low pass and bandpass filter characteristics of one embodiment. Points 1400, 1420, 1440 are the 3 dB points of the filters. In actual practice, the bandwidth can be twice this width since modulation rates of two times the tank circuit frequency are possible. Point 1430 is the center frequency of the bandpass filter and corresponds to the fundamental frequency of the tank circuit 231 of FIG. 13.

In general, placing a bandpass or lowpass filter at the output of the chaotic transmitter matches the transmitter to audio, video, light, or radio frequency channel modulators/upconverters. It also reduces noise components outside these bandwidths.

F. Receiver Filtering

Figure 15:
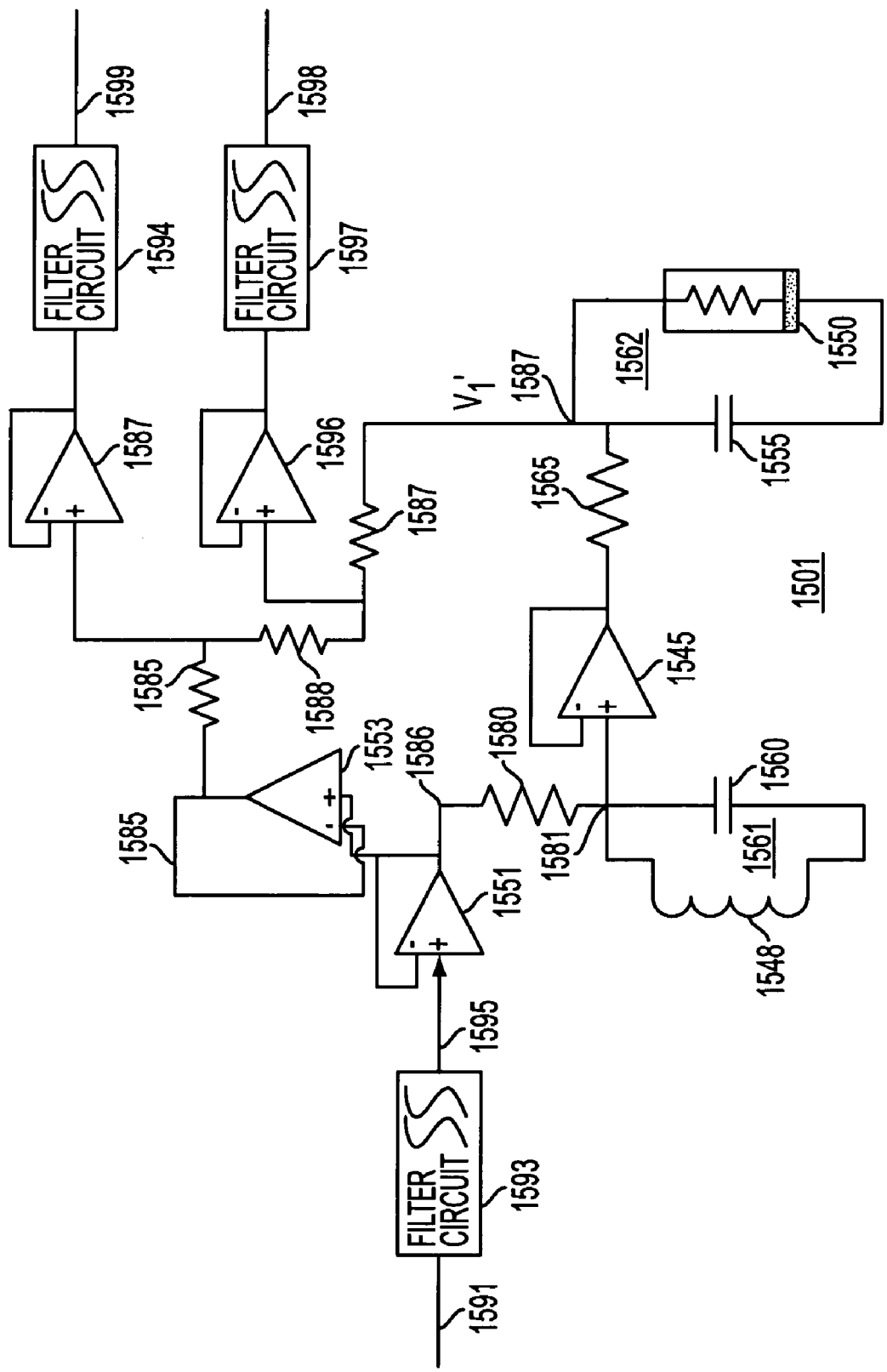
FIG. 15 shows a receiver including noise filters 1593, 1594 and 1597 to filter out noise components introduced by the transmission channel according to a second-generation embodiment of the invention.
Figure 16:
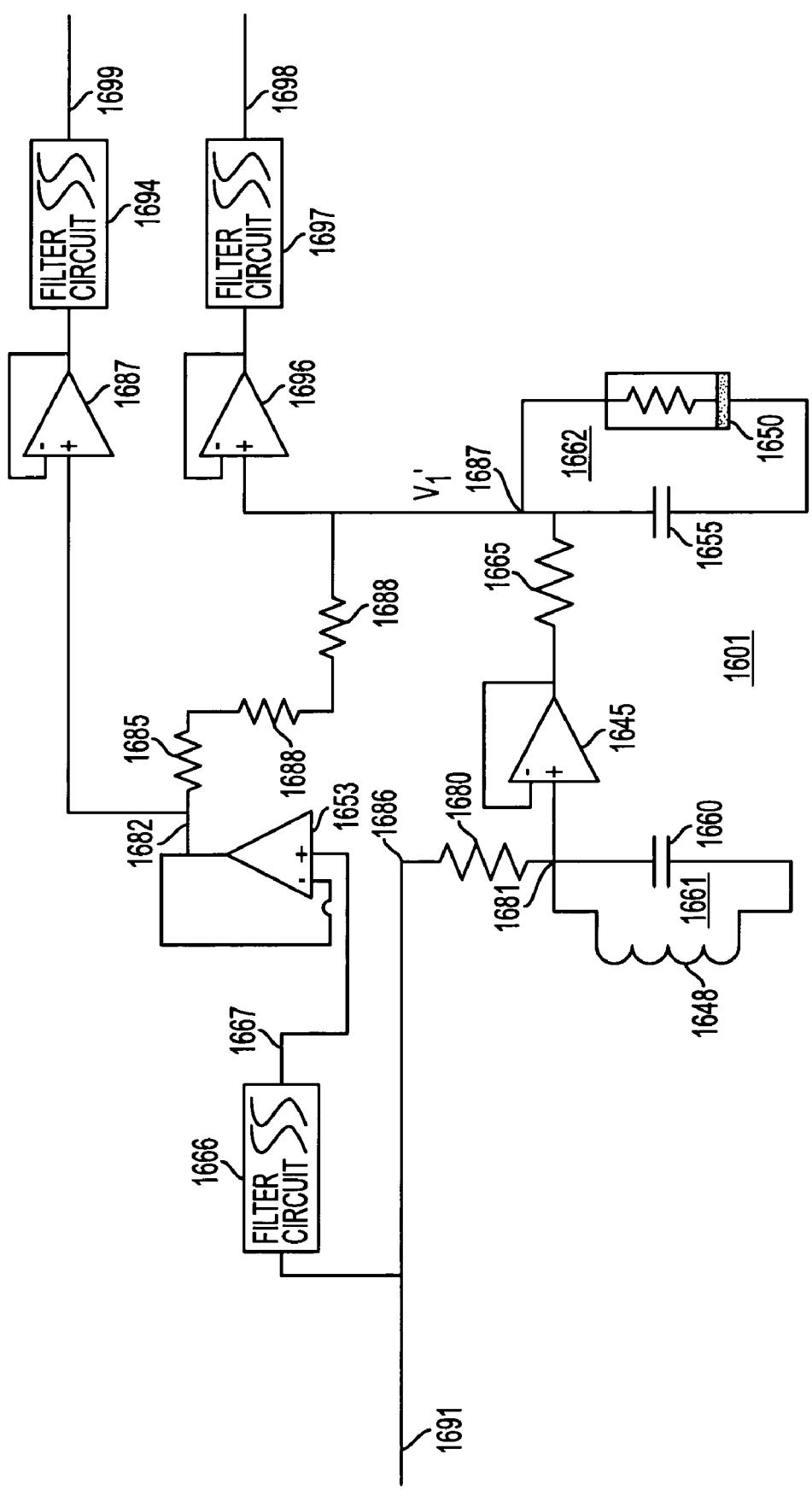
FIG. 16 shows a receiver including noise filters 1666, 1694 and 1697 to filter out noise components introduced by the transmission channel according to a second-generation embodiment of the invention.
Figure 17:
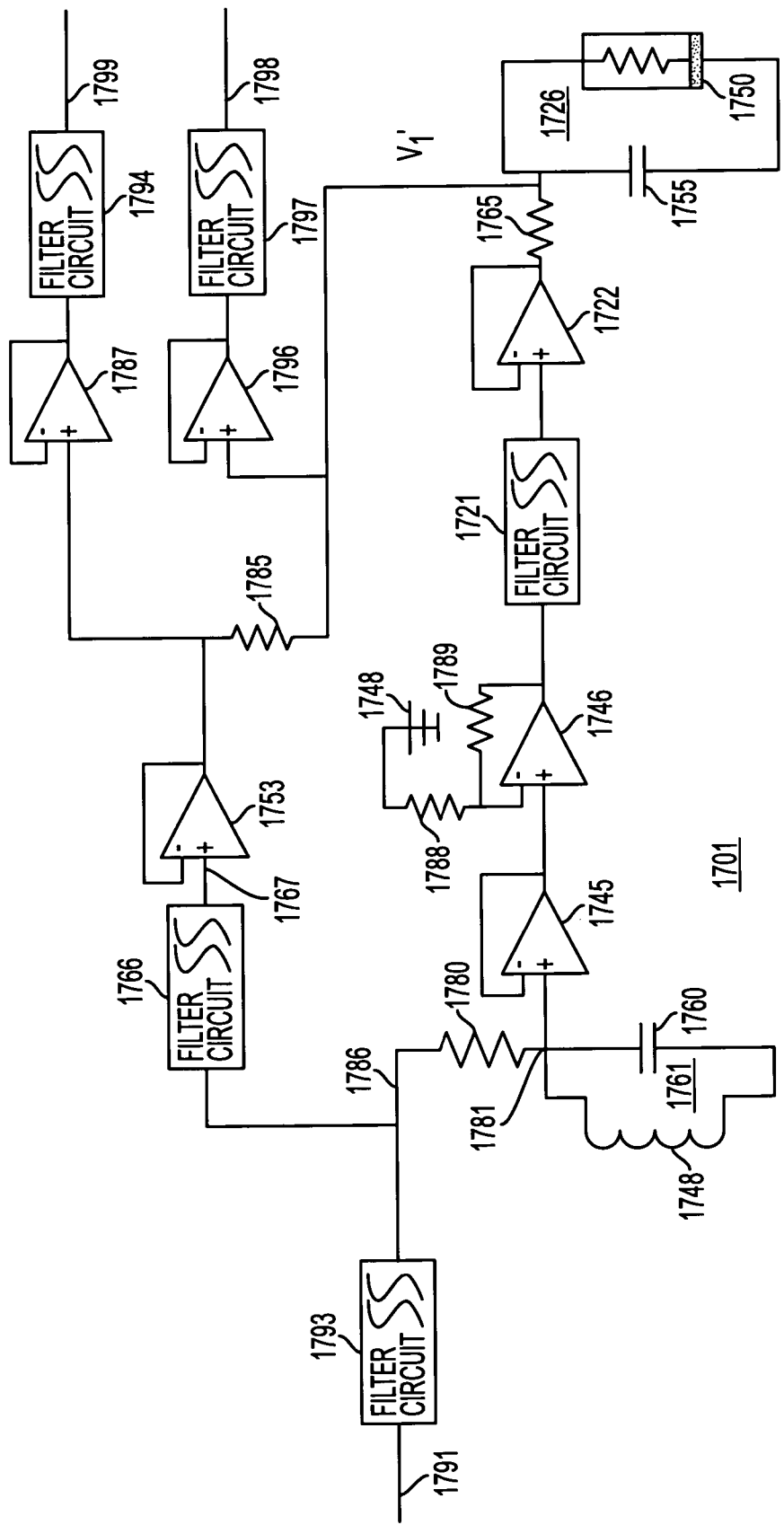
FIG. 17 shows a receiver including filters 1793, 1766, 1794, 1797 and 1721, wherein filter 1721 works with automatic gain control amplifier 1746 to further reduce noise generated in subsystem 1726.

As shown in FIGS. 15 through 17, chaotic receivers can also benefit from noise filters. FIG. 15 shows a receiver including noise filters 1593, 1594 and 1597 to filter out noise components introduced by the transmission channel according to a second-generation embodiment of the invention. FIG. 16 shows a receiver including noise filters 1666, 1694 and 1697 to filter out noise components introduced by the transmission channel according to a second-generation embodiment of the invention. FIG. 17 shows a receiver including filters 1793, 1766, 1794, 1797 and 1721, wherein filter 1721 works with automatic gain control amplifier 1746 to further reduce noise generated by subsystem 1726. The noise filters can be lowpass filters or bandpass filters that match the transmitter filter, or a combination of low pass and bandpass filters.

Referring first to FIG. 15, two bandpass filters 1593 and 1594 filter out noise components introduced by the channel. The detector is then placed across the buffered input signal after filter 1594 and receiver reconstructed signal after filter 1597. This reduces the noise components and improves detection in a noisy environment. The bandwidth of these filters can be set just like the description of FIG. 13 and FIGS. 14A and 14B.

FIG. 16 provides another implementation of noise filters. In this case, the incoming signal 1691 is applied to subsystem 1661 without filtering. The filtering is done in the synchronizing resistor chain made up of components 1666, 1653, 1687 and 1694. The noise is filtered from the input and also from the output through 1696 and 1697.

The foregoing techniques can be used in conjunction with the modulation scheme of FIGS. 7A and 7B to optimize the detection of the chaotic strange attractor trajectory shift keying to improve a communications receiver detection performance.

FIG. 17 shows a receiver including filters 1793, 1766, 1794, 1797, and 1721. Filter 1721 can be designed to work with the automatic gain control amplifier 1746 to further reduce noise generated in subsystem 1761. This receiver filtering technique will work with the receiver designs described above with reference to the first-generation systems. Unity gain operational amplifier 1722 acts as an impedance buffer.

G. Application to Cellular Phone Systems

The principles of both the first-generation and second-generation systems can be applied to cellular and non-cellular telephony in several different ways. First, they can be used in a baseband modem. Second, they can be applied directly to an intermediate frequency level modem. Third, they can be used at the radio frequency level. In a cellular telephone application, for example, a large number of matched strange attractor pairs could be created to transmit information, much like code division multiplex systems operate today. Thus, for example, each of a plurality of modulators (or transmitters) in a base station would have strange attractor parameters matched to a corresponding one of a plurality of portable telephone demodulators (or receivers); each corresponding demodulator/receiver in the base station would also be matched to a corresponding transmitter/modulator in one of the plurality of portable telephones. If implemented using digital signal processing techniques, the matching can be implemented with a software change rather than requiring specially matched hardware pairs.

In a baseband modem implementation, a modem takes advantage of the large embedded base of cellular telephony equipment and infrastructure. In this implementation, the cellular phone technology acts as the carrier system. The advantage of this method is that chaotic synchronization techniques could be used to produce digital modems for use in the current generation of cellular telephones. Cellular phones would take advantage of the chaotic synchronization to synchronize in low signal to noise ratio environments. This would allow digital data to be passed at two to three times the current data rate of current cellular systems.

Figure 18B:
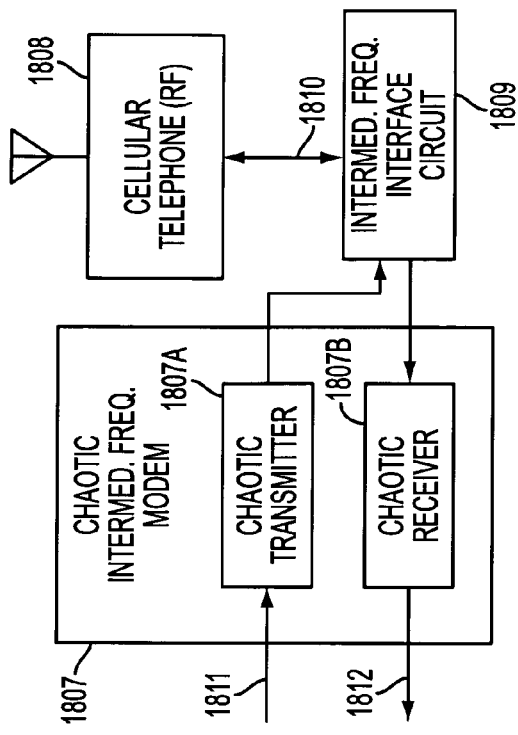
FIG. 18B shows a cell phone system using chaotic modulation principles at the intermediate frequency level according to a second-generation embodiment of the invention.
Figure 18C:
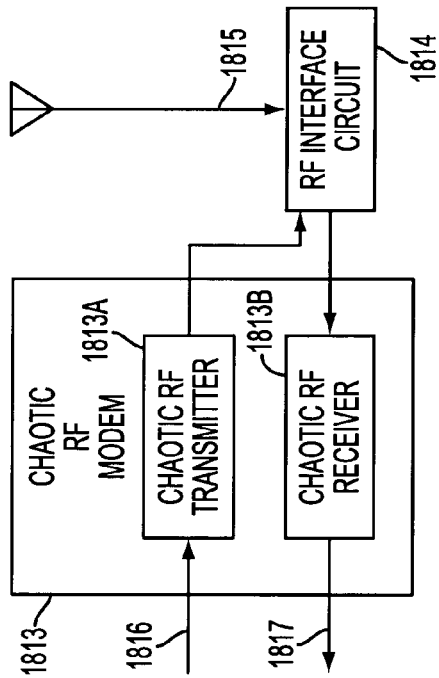
FIG. 18C shows a cell phone system using chaotic modulation principles at the radio frequency level according to a second-generation embodiment of the invention.
Figure 18A:
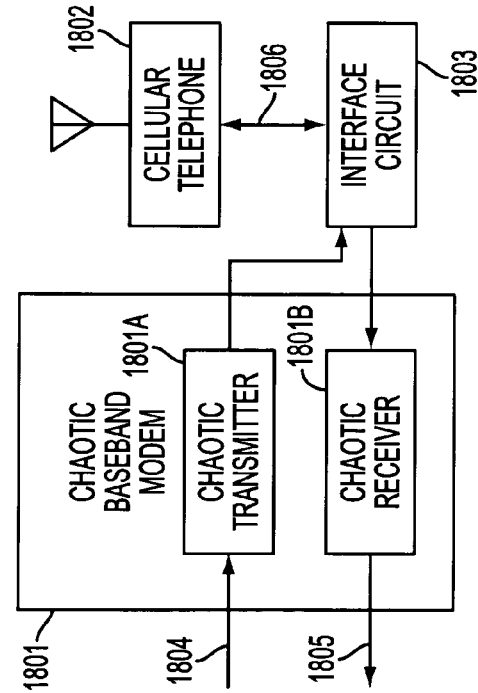
FIG. 18A shows a cell phone system incorporating a baseband modem using chaotic modulation principles according to a second-generation embodiment of the invention.

Turning first to FIG. 18A, various first and second-generation embodiments discussed in this patent application will be applied as described. A chaotic baseband modem 1801 includes a chaotic transmitter 1801A and a chaotic receiver 1801B. These circuits are coupled to an interface circuit 1803, which in turn is coupled to a cellular telephone 1801 (which may comprise a conventional cellular telephone of various types commercially used as of the filing date of this application). In this embodiment, the output of the interface circuit 1803 would be in the audio frequency range; the chaotic modem would essentially be interfaced as though the cellular phone was a radio system that accepted an audio input. Cellular telephone 1802 communicates with a conventional telephone system through one or more radio frequency communication nodes or base stations in a conventional manner.

The chaotic transmitter modem frequencies would fall into the audio baseband of a cellular phone system (e.g., 300–3000 Hz). An improvement in data rate would result from applying the M-ary signaling techniques discussed in the M-ary section below. The signal-to-noise ratio improvement over current state-of-the-art modems (frequency shift keying) will allow cellular phones to operate over a longer range than current systems. In other respects, the current generation cellular phones would remain the same.

Turning to FIG. 18B, in an intermediate frequency implementation, a chaotic modem could have its frequency adjusted to operate, for example, on a 1 MHz to 10 MHz intermediate frequency (IF) band, but the invention is not limited to this exemplary IF range. In this family of embodiments, a chaotic intermediate frequency modem 1807 comprises a chaotic transmitter 1807A and a chaotic receiver 1807B, wherein the bandwidth of the intermediate frequency could be set to 1.2 MHz to 2 MHz to match the code division multiple access signals used in current technology. The radio frequency operation of the cellular telephone 1808 would remain the same as today's state-of-the-art systems. This embodiment would require some changes to the cellular telephone from its existing commercial implementation.

FIG. 18C shows a chaotic modem that operates at radio frequencies. The system includes a chaotic modem 1813 including a chaotic RF transmitter 1813A and a chaotic RF receiver 1813B, which is coupled to an RF interface circuit 1814 and antenna 1815. In this system, the frequency of the chaotic system is increased to the cellular telephone frequency band and the chaotic transmitter and receivers discussed herein are operated at radio frequencies. The components may change to radio frequency components such as tunnel diodes for the non-linear diode implementation and radio frequency amplifiers. In other respects, the chaotic transmitting and receiving circuits remain the same as in the embodiments described herein. The specification for frequency use can be set to the code division multiple access standard of 1.2–2 MHz. This means that the tank circuit bandpass filter would be set to this 3 dB bandpass and the radio frequency transmission will be filtered to reduce frequency components outside of the passband.

The embodiments described above can take advantage of the characteristics of chaotic synchronization signals to synchronize in low signal-to-noise ratio environments. Various tradeoffs trades include (a) reducing the transmitter while keeping the data rate constant; (b) reducing the number of cells for a given area; (c) increasing the number of users in a given cell size; and (d) providing new digital services in the same bandwidth as current cellular phone systems. The interface circuits can be constructed as needed to interface existing or future telephone systems using well-known techniques.

In the embodiments exemplified by FIG. 18C, the new chaotic radio frequency modulation scheme could take advantage of chaotic synchronization spread spectrum capability where many more chaotic synchronization signals could be mixed over the radio frequency spectrum and decoded much like code division multiple access is applied today. The number of users would be determined by the number of orthogonal spreading codes (chaotic synchronization signals) possible and the frequency division spacing characteristics of chaotic signals as discussed with respect to the first-generation embodiments. Chaotic synchronization offers the advantage of simpler transmitters and receivers as well as noise immunity unachievable in conventional state of the art systems.

H. Dual Transmitter/Receiver Combinations

Figure 24:
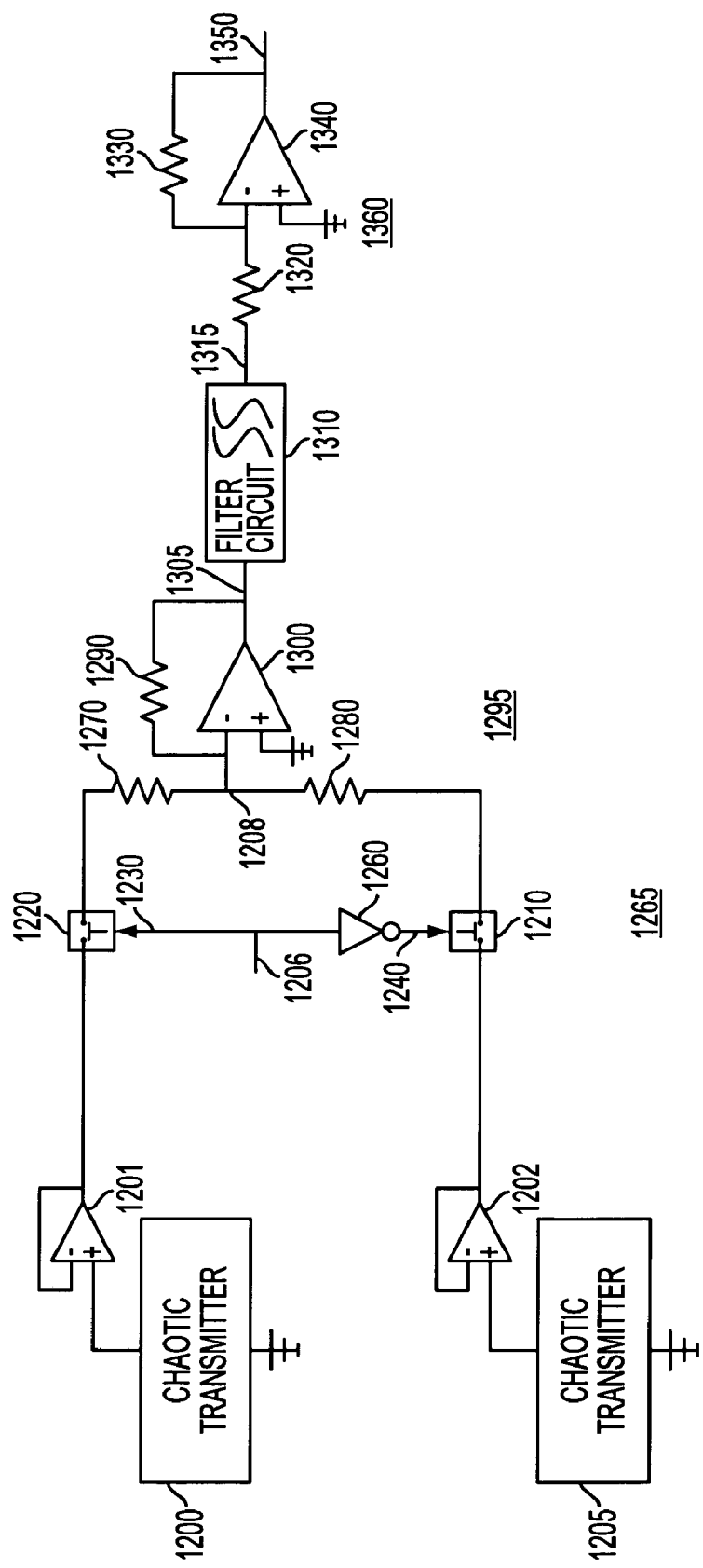
FIG. 24 shows a dual-transmitter configuration (1200, 1205) according to a second-generation embodiment of the invention.

FIG. 24 shows a dual-transmitter configuration (1200, 1205) according to a second-generation embodiment of the invention. In FIG. 24, two systems 1200 and 1205 are used to generate two strange attractor pairs (e.g., two single or two double scroll pairs). The strange attractors can be generated using any of the techniques described above with respect to the first-generation or second-generation systems. These strange attractors are buffered using two unity gain operational amplifier circuits 1201 and 1202 to prevent the switches 1220 and 1210 from loading the chaotic circuit systems 1200 and 1205. For the purposes of explaining the operation, the nonlinear diode subsections 251 and 1251 will form the basis for tuning the two chaotic systems. Each transmitter 1200 and 1205 can be implementing using an embodiment of FIG. 6A, FIG. 6B, FIG. 6C, or other embodiments described herein.

The slopes Ga and Gb of the nonlinear diodes can be set to two different values. Chaotic circuit 1205 can include components set to different resistance values than equivalent components of the nonlinear diodes in chaotic system 1200. This leaves the tank circuit subsystem elements 200 and capacitor 215 in both Chua's circuit systems with equal elements. In the non linear diodes the operational amplifier 223 and its biasing resistors 202 and 203 are also equal. The only difference between the two systems 1200 and 1205 is the slopes of the nonlinear diodes 251 and 1251.

An ideal switching system 1265 including single pole double throw switches (or similar devices)1210, 1220, inverter 1206, and information input source 1206 provide a means to switch the transmitter between the two strange attractors. A summing circuit 1295 sums the switched output at point 1208 to provide a transmitted signal based on the ratio of resistors 1270 and 1280 to resistor 1290 as in any summing circuit implementation. In this case, a 1:1 ratio is used. This signal has high frequency components due to the switching action of 1265.

To remove these unwanted switching pulses, low pass filter 1310 is used. Its lowpass cutoff frequency is set to the highest frequency of the channel roll off. An attenuator circuit 1360 is then added to adjust the output signal to match the signal to the channel. A system such as that shown in FIG. 24 (i.e., using two switched transmitters) provides more precise control of the strange attractors when compared to switching a single transmitter's nonlinear diode or other elements values. Using two or more switched transmitters allows one to choose the position of the strange attractors in phase space (double scroll, single scroll in upper quadrant or lower quadrant for digital signals). Using two or more switched transmitters provides faster switching time since the switching time is no longer dependent on the reactive components of the transmitter to stabilize. The switched transmitter in combination with a receiver pair allows the strange attractors to be optimized for the best detection results at the receiver.

I. Dual Receiver Design using Common Tank Circuit

Figure 25:
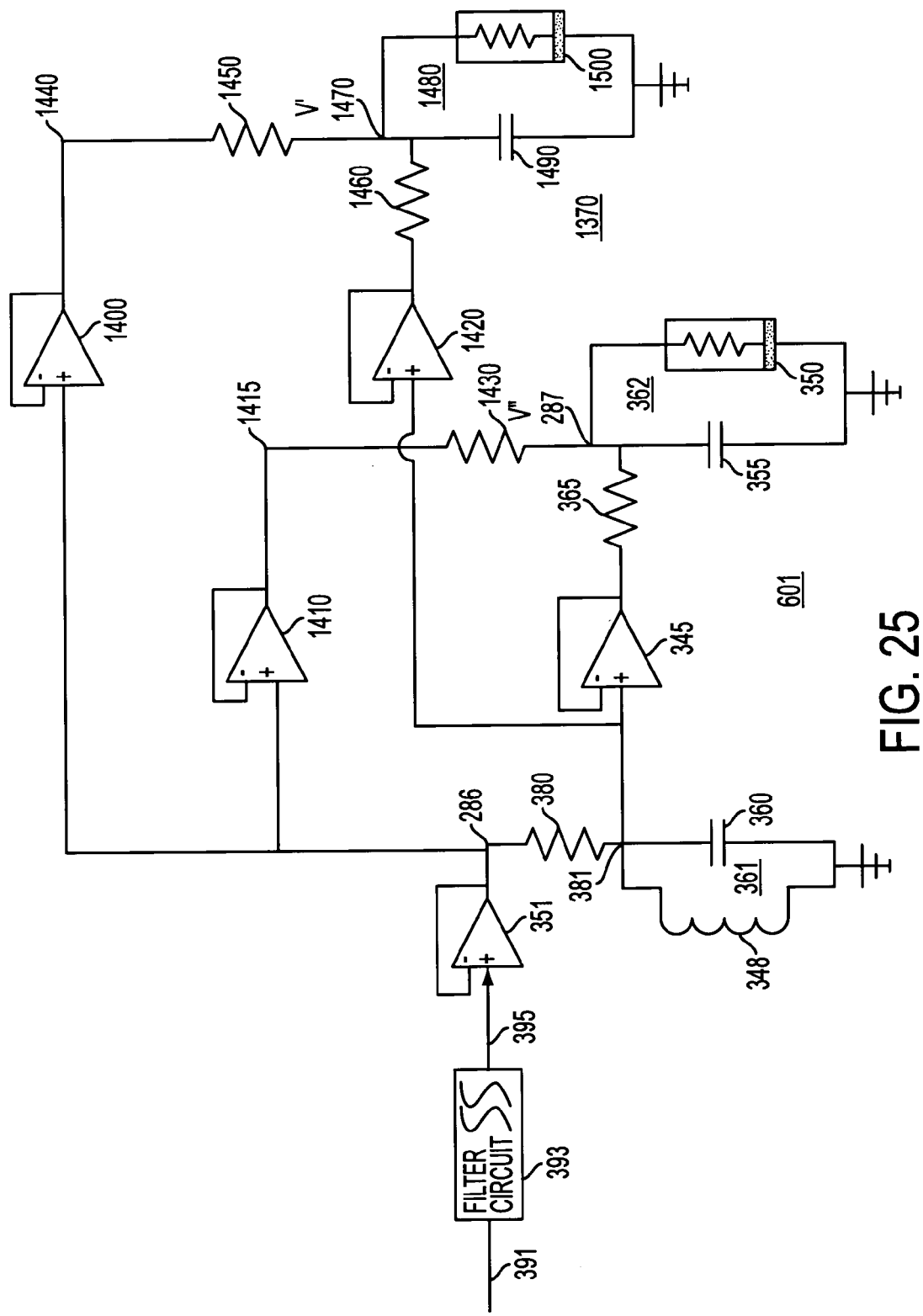
FIG. 25 shows a dual-receiver configuration (601, 1370) according to a second-generation embodiment of the invention.

FIG. 25 shows an embodiment including a dual receiver (1370 and 601) using a common tank circuit 361. This design is dependent on using a dual transmitter, or a single transmitter where the nonlinear diode and/or the capacitor 215 is varied and the tank circuit 200 remains the same. Lowpass filter 393 reduces the noise component and is set to the channel bandwidth. The unity gain operational amplifier 351 buffers the line and drives the multiple circuit elements. The common tank circuit element consists of elements 380, 348, and 360. The dual receiver elements consist of subsystem 601 and 1370. Receiver subsystems 601 and 1370 are tuned to the transmitters' two strange attractor nonlinear diodes 251 and 1251 (FIG. 24) plus the capacitors 215 as shown in FIG. 24. In FIG. 25, synchronizing resistors 1430 and 1450 provide a means to detect the difference between the incoming waveform and the strange attractor produced by the dual receiver elements. Since the strange attractors are different than those of the other of the subsystems 601 and 1370, the difference across the two resistors is either zero when matched or some voltage difference when they are not matched. Unity gain operational amplifiers 1400, 1410, 1420, and 345 isolate the synchronizing resistors and the non linear diode elements from the tank circuit and input signal 286 to prevent feedback from causing the system to detune. This dual receiver provides a precise method to detect two or more strange attractors. The nonlinear portions 1370 and 601 can be duplicated to detect additional chaotic strange attractors.

A dual receiver design such as the one depicted in FIG. 25 reduces the number of parts required in a receiver when capacitor 215 or the nonlinear diode are modulated or when one switches between two or more transmitter circuits with a common tank circuit in FIG. 24. The voltage difference across the synchronizing resistors 1450 and 1430 can be maximized for detection by amplitude detection circuits as discussed herein. This also provides a convenient way to detect frequency variations between the two circuits at points 1470 and 287. The voltage difference between points 1450 and 1430 can be maximized for amplitude modulated signal detection by maximizing the Ga and Gb differences. The dual receiver circuit design can be extended to N receivers where elements 345, 365, 355, and 350 are reproduced with the values of the transmitter systems.

J. Subtractor Circuit

Figure 26:
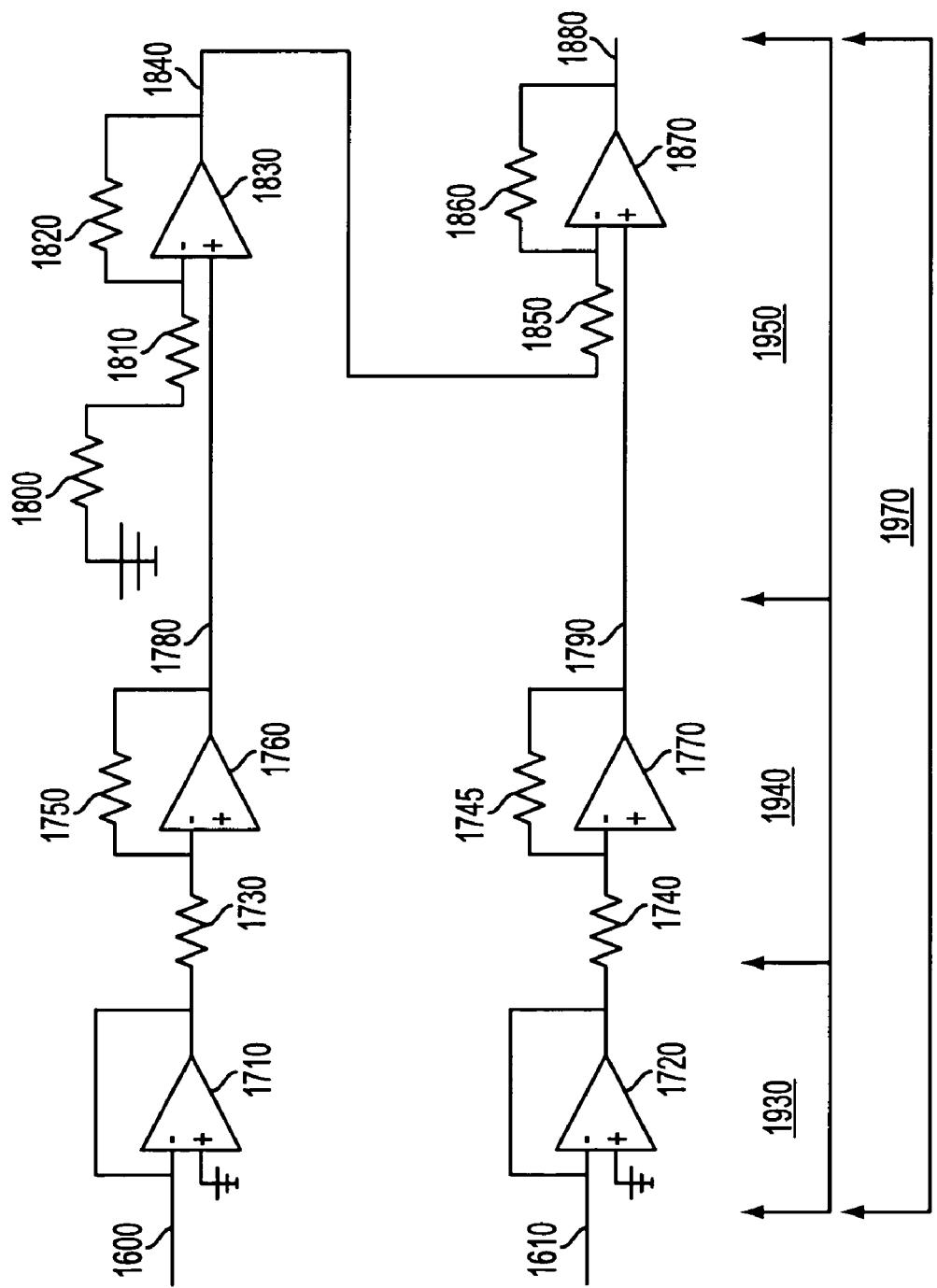
FIG. 26 shows a subtraction circuit for detecting a voltage difference across various points (e.g., point 1450) in FIG. 25.

FIG. 26 shows a subtraction circuit block for detecting the voltage difference across the synchronization resistors 1400 and 1450 in FIG. 25 and to detect the voltage difference between points 1470 and 287 of FIG. 25. It includes buffer unity gain operational amplifiers 1710 and 1720 in subsystem 1930 which isolates the subtractor circuit from the receiver circuits. This is followed by an attenuator circuit subsystem 1940 consisting of elements 1730, 1750, and 1760 as well as elements 1740, 1745, and 1770.

The attenuation circuit reduces the voltage across the synchronization resistors to a level the subtraction subsystems 1950 can process without clipping the input signals prior to the subtraction. The subtraction circuit makes mathematical detection possible in an analog system.

K. Absolute Value Circuit

Figure 27:
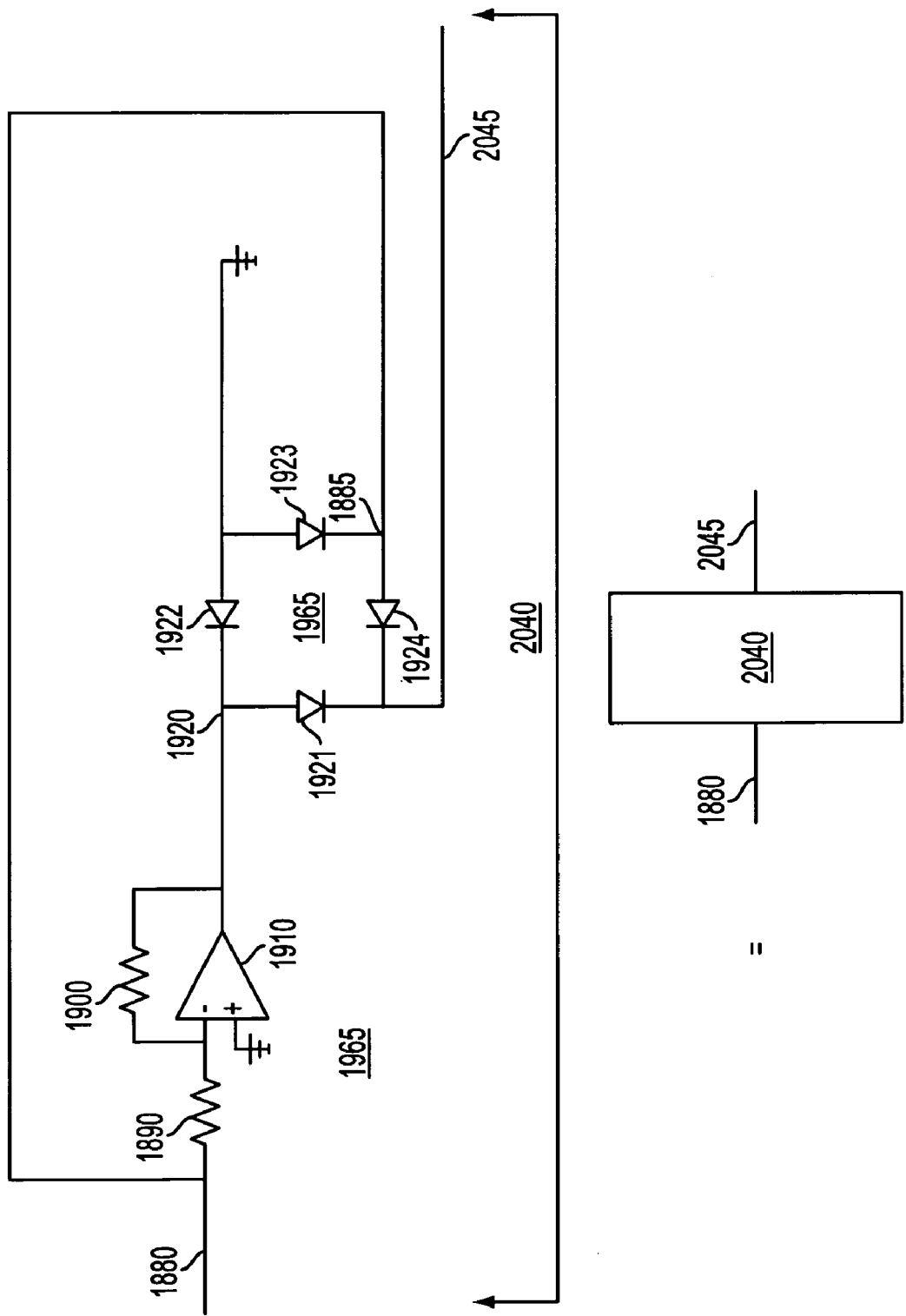
FIG. 27 shows an absolute value circuit that can be used in conjunction with a detector function.

FIG. 27 shows an absolute value circuit made from an operational amplifier circuit. The absolute value circuit can be used to take the absolute value of the input signal. This circuit can be used for a detector. This circuit executes the following equation:

Vout=abs(Vin)

Subsystem 1965 is an inverting operational amplifier that inverts the input 1880 and provides it as an output 1920 to one side of the full wave rectifier subsystem 1965. The input 1880 to the inverter subsystem 1960 is input 1885 of the full wave rectifier. The final output 2045 of the circuit is then further processed to recover the amplitude modulated information signal shown in FIG. 24 input data 1206 to complete the transmitter receiver pair. This absolute value circuit allows amplitude modulation on a chaotic signal to be processed into the information-bearing signal of FIG. 24 input point 1206. This circuit can be replaced by a squaring circuit that performs the absolute value function.

L. Dual Receiver Synchronization Detector Circuit

Figure 28:
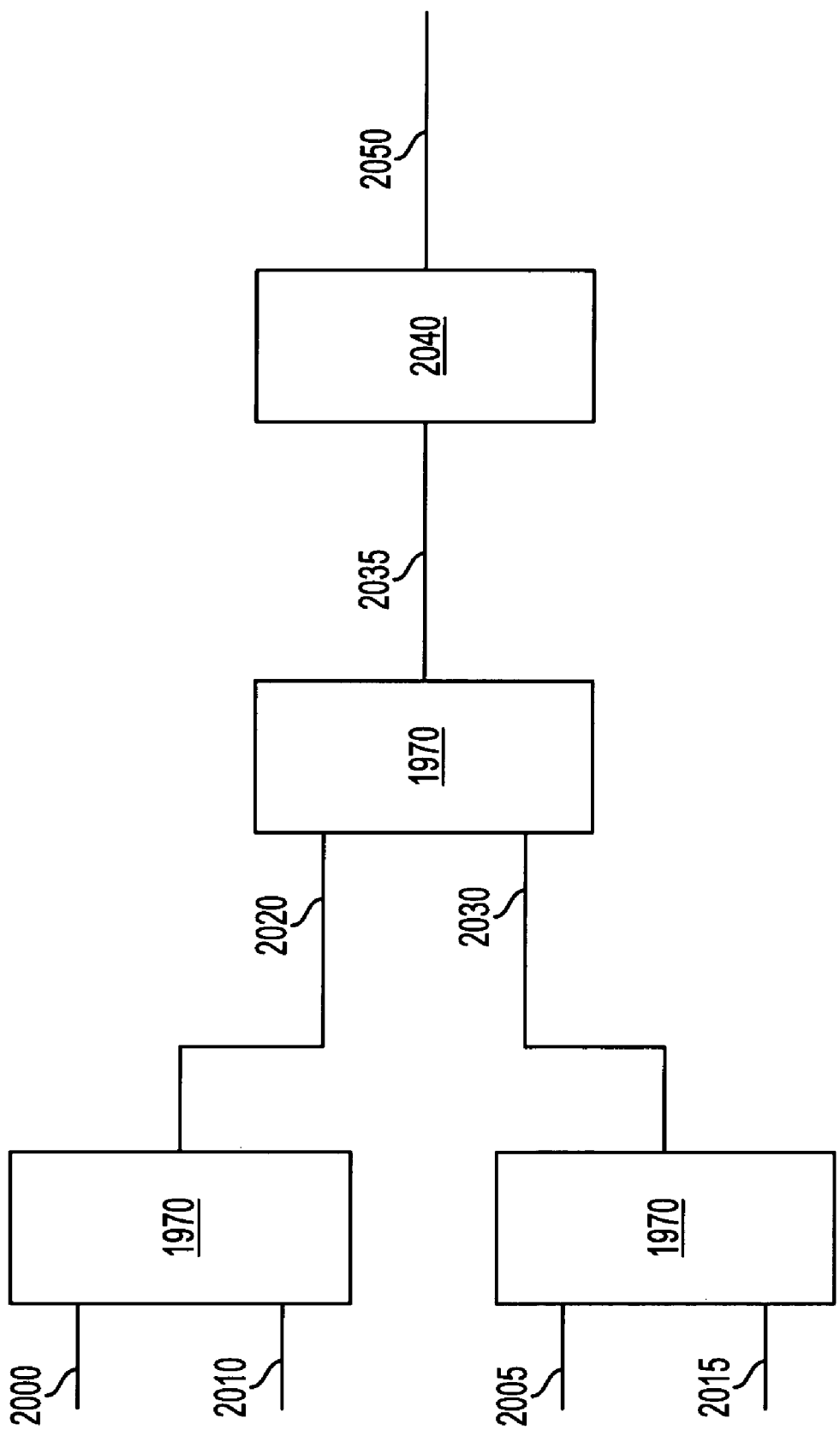
FIG. 28 shows a dual receiver synchronization detector circuit according to a second-generation embodiment of the invention.

FIG. 28 shows a dual receiver synchronization detector circuit. In this circuit the inputs to the circuit 2000, 2010 and 2005, 2015 are placed across the synchronization resistors 1450 and 1430 respectively in FIG. 25. Input 2000 is tied to point 1440 and 2010 is tied to point 1470. The detector input 2005 is tied to point 1415. The detector input 2015 is tied to point 287. The output of each subtraction circuit is then subtracted as follows: 2020-2030=2035. Then 2035 is passed through an absolute value subsystem 2040 (FIG. 27). The output 2050 is then processed through a moving average detector and the original modulating signal at point 1206 in FIG. 24 is recovered after squaring the signal.

This detector provides a significant improvement in detector output over a simple comparator. The detector subtracts noise off the input signal since the noise across the two synchronizing resistors of FIG. 25 are subtracted off.

M. Dual Receiver SYNC Detector using Absolute Values

Figure 29:
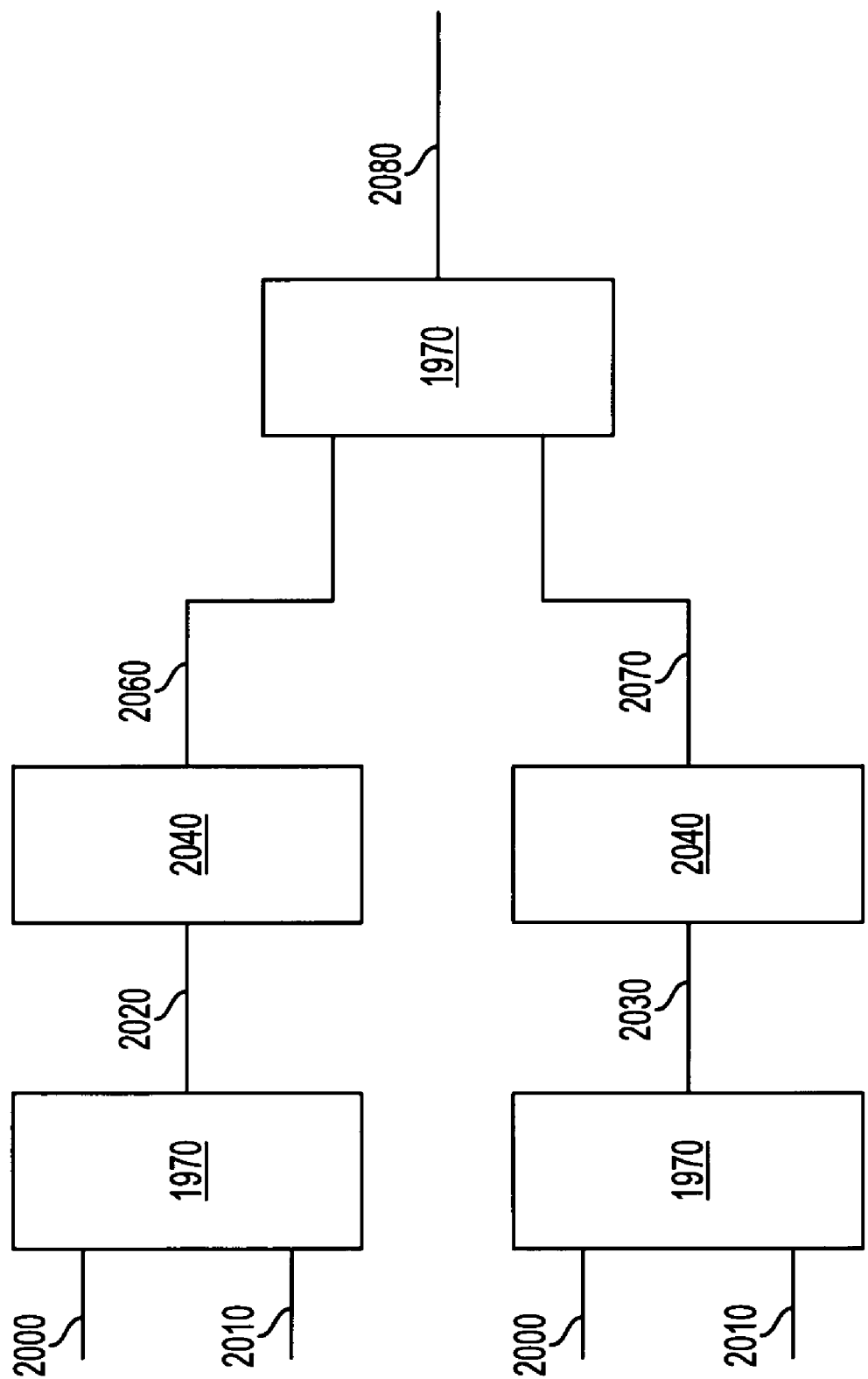
FIG. 29 shows a dual receiver synchronization detector circuit in which signals are subtracted, absolute valued and then subtracted.

FIG. 29 works like FIG. 28 except the output of the initial subtractions 2020 and 2030 are processed by an absolute value circuit to provide the absolute value at 2060 and 2070. These two numbers are then subtracted. The difference should have the maximum difference since the dual receiver circuit in FIG. 25 alternates between the two strange attractors and produce minimum and maximum values in step with the modulating signals. The output of the circuit 2080 is then processed using a moving average and square law detector and the original modulating signal 1208 in FIG. 24 is recovered by the detector. This detector provides a significant improvement in detector output over a simple comparator. The detector subtracts noise off the input signal since the noise across the two synchronizing resistors of FIG. 25 are subtracted off.

N. Single Detector Circuit

Figure 30:
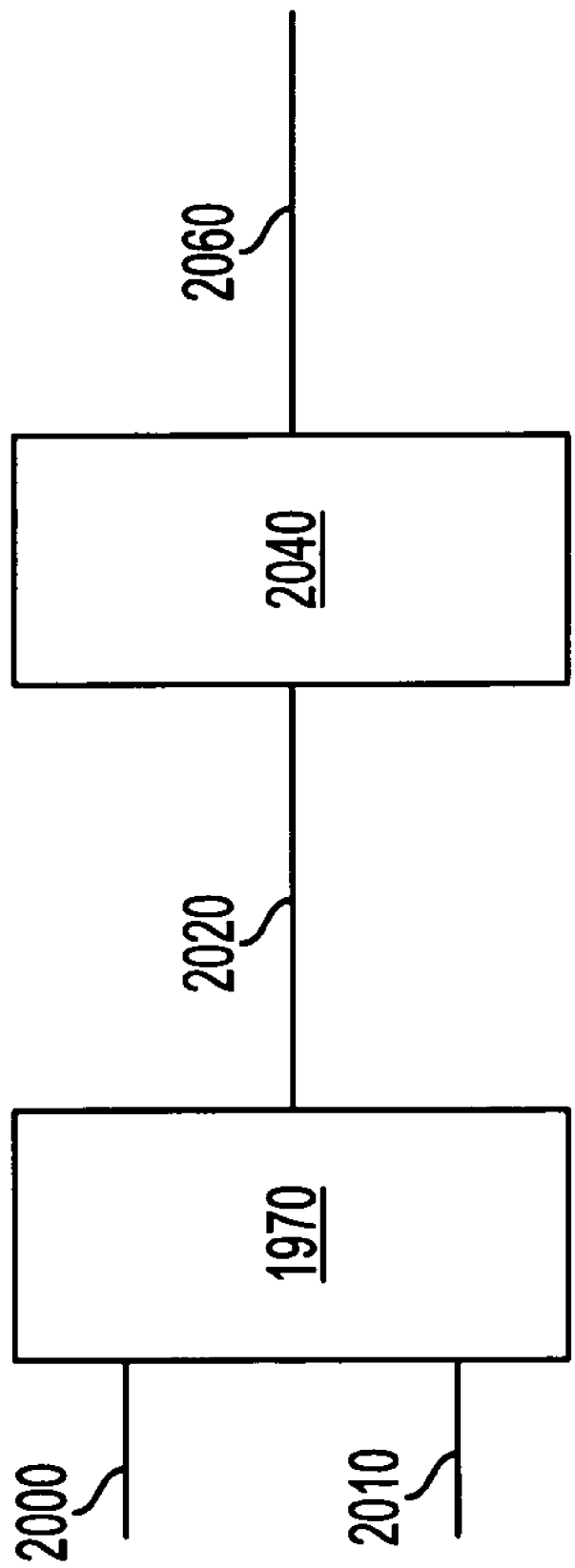
FIG. 30 shows a detector circuit for detecting voltage changes between points 287 and 1415 or points 1440 and 1470 in FIG. 25.

FIG. 30 shows a single circuit detection circuit element. This element can be used to process the voltage at points 287 and 1470 of FIG. 25. Good results were obtained when the strange attractors generated by the dual transmitter in FIG. 23 were single scroll attractors with one attractor produced on the upper quadrant Gb and the other single scroll attractor produced on the Gb in the negative quadrant. This maximizes the difference between the equilibrium points. The circuit is believed to work best when the transmitter is switched between two single scroll attractors in two different quadrants of the IV characteristic curve in FIG. 9A, although double scroll and single scrolls in the same quadrant would work, one produced on the +Gb slope and the other on the −Gb slope.

O. Interfacting to Communications Systems

Figure 31:
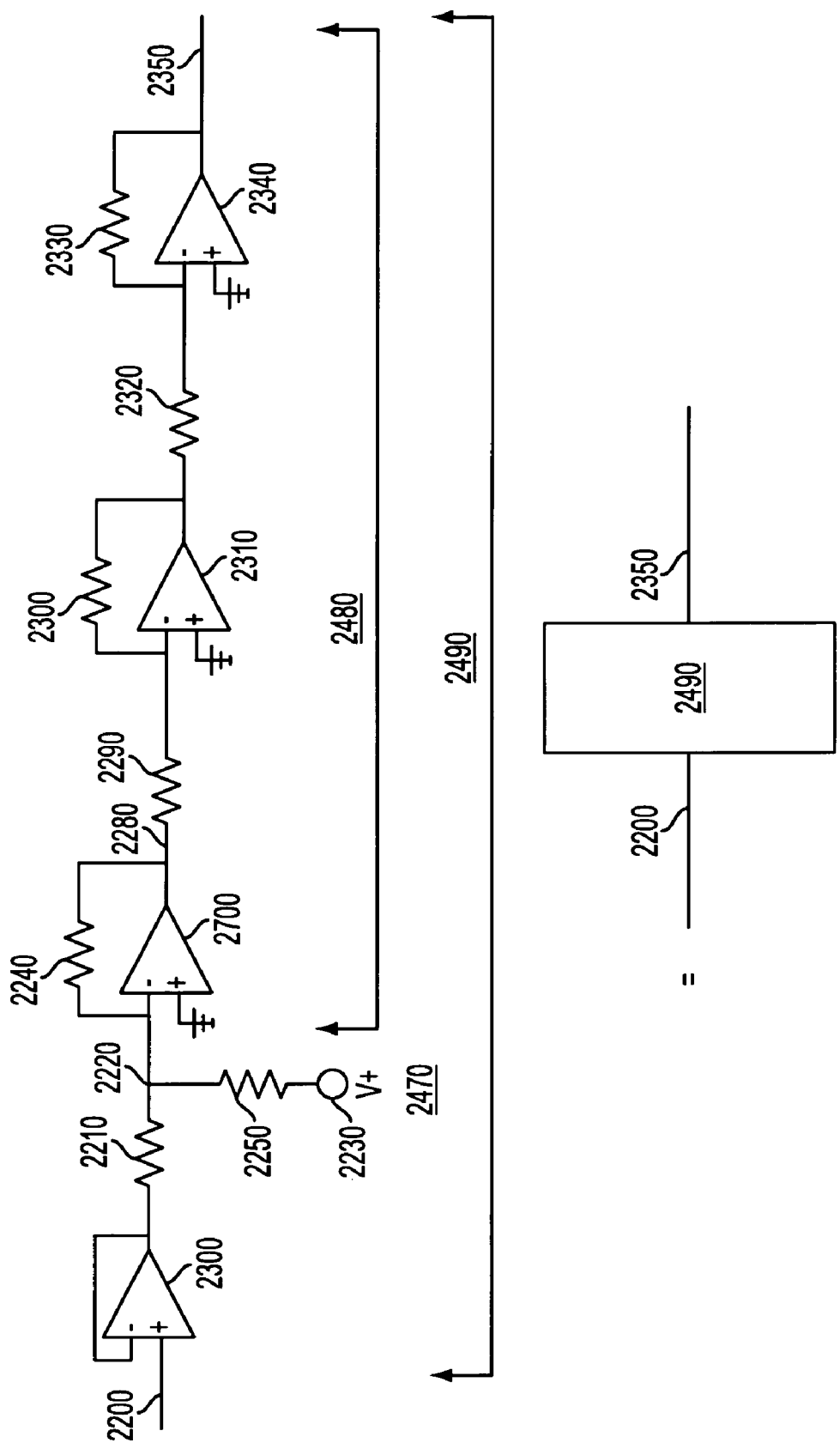
FIG. 31 shows a baseband transmitter interface circuit for interfacing a modulated chaotic transmitter to a communication system.

FIG. 31 shows a chaotic system interface in a chaotic circuit that allows one to tap off the chaotic signal without interfering with the chaotic circuit's operation. Unity gain operational amplifier 2300 provides the isolation. Since the chaotic signal voltage and direct current offset at the input 2200 are not at the level a communication system expects to see at the baseband input 2350 (e.g., microphone input, data port input, etc.) a direct current offset circuit made up of a direct current power supply 2230 and an attenuator subsection 2480 made up of one or more attenuator circuits are required.

The use of more than one attenuator is usually required since the input to most communication systems is in the range of hundreds of millivolts and the output of a chaotic circuit is in the range of volts. The dynamic range of one attenuator is usually not adequate and therefore several are required to match the input voltage level 2200 the required output voltage level 2350. In FIG. 31 there are three attenuators. The first attenuator consists of elements 2210, 2240, and 2700. The second attenuator consists of elements 2290, 2300, and 2310. The third attenuator consists of elements 2320, 2330, and 2340. These three attenuators make up the attenuator subsection 2480. In addition to attenuators this subsection can also act as an amplifier section by changing the ratio of the resistor elements 2210, and 2240 or 2290 and 2300 or 2320 and 2330. This makes subsection 2480 a universal amplifier/attenuation element. The level shifter subsection 2470 consists of a power supply 2230 and an interface resistor 2250. This allows one to add or subtract a direct current level from the input chaotic signal 2200 to match a single ended baseband communications system at the output 2350.

This may be important in modem applications since many existing radios and cellular phones have single ended baseband input/output requirements. This is an improvement over current practice since it eliminates the need for a direct current filter and preserves the direct current characteristics at the receiver since a known level can then be added or subtracted from the incoming signal. This technique can be applied to an amplitude modulated communication system (e.g., audio, radio frequency, or laser) and to a frequency modulated radio system.

The direct current offset subsystem 2470 is an improvement over current practice since it eliminates the need for a direct current high pass filter and preserves the direct current characteristics of the signal at the receiver where this known direct current voltage level can then be added or subtracted from the incoming signal. The attenuator/amplifier subsection 2480 is an improvement in practice in interfacing a chaotic signal voltage to the baseband of an existing communication system. The transmitter baseband interface circuit can be used in both radio and cable systems.

Figure 32:
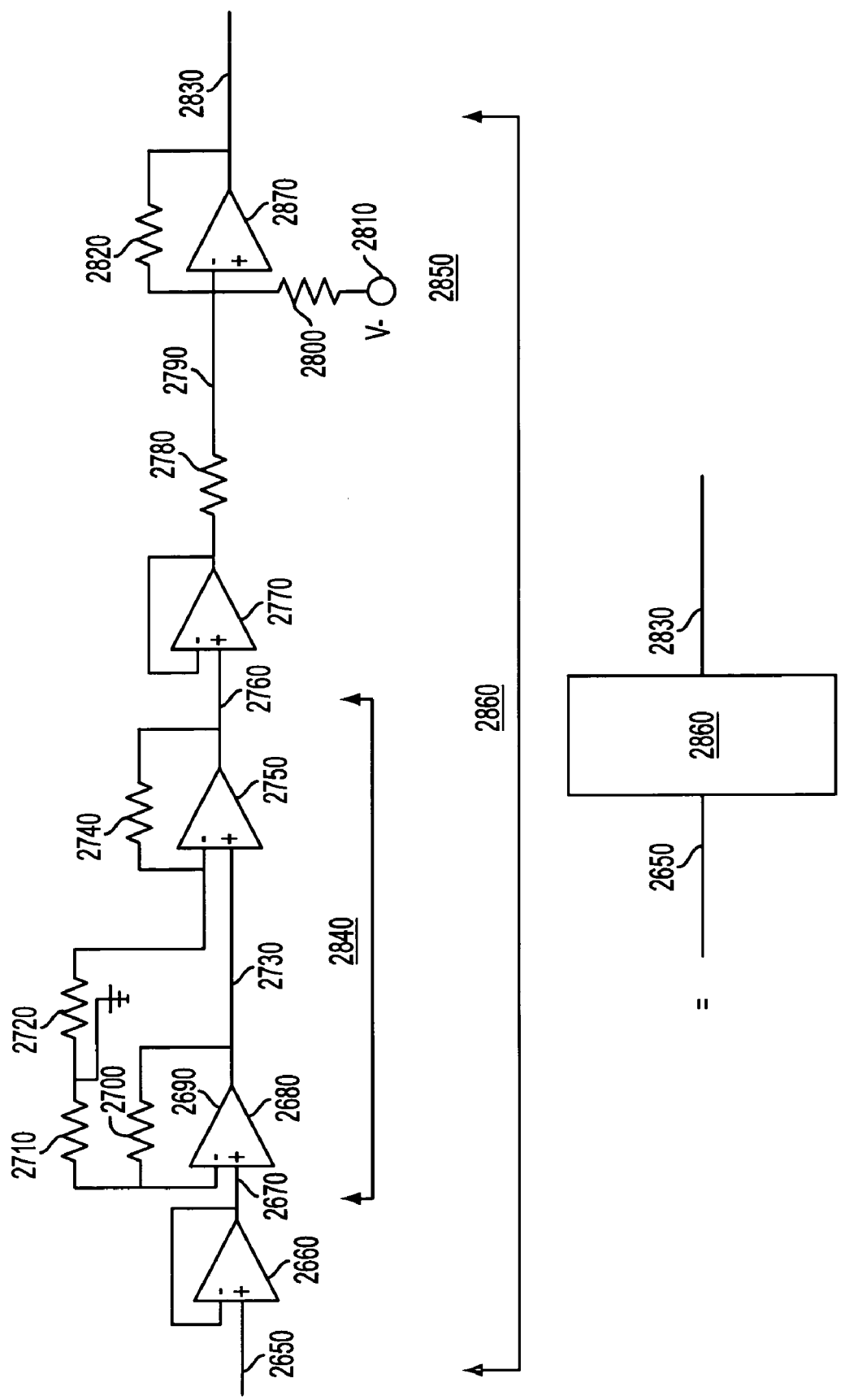
FIG. 32 shows a baseband receiver interface circuit for interfacing a receiver to a communication system.

FIG. 32 shows a chaotic receiver baseband interface circuit. The output of a communications receiver system baseband can be applied to the input of the interface circuit at point 2650. Normally this is a single ended output and the signal must be amplified from millivolt levels to the voltage levels expected by the chaotic receiver circuit at input point 2830. Following a unity gain operational amplifier 2660 the signal is amplified by a low noise high gain amplifier subsection 2840 which is followed by a unity gain operational amplifier 2770 for isolation from the final gain stage consisting of elements 2780, 2820 and 2870. Inserted into the final amplifier section is the direct current voltage offset subsystem 2850. The output of this circuit 2830 is the recovered chaotic voltage with the direct current voltage offset reinserted. The overall system element is designated subsystem 2860 and becomes an interface block for any chaotic receiver block.

The direct current offset subsystem 2850 is an improvement over current practice since it adds the direct current characteristics of the signal back into the receiver signal where this known direct current voltage level was subtracted at the transmitter and can be reinjected into the signal for processing by the chaotic receiver. The attenuator/amplifier subsection 2840 is an improvement in practice in interfacing a chaotic signal voltage to the baseband of an existing communications system. The receiver baseband interface circuit can be used in both radio and cable systems.

Figure 33:
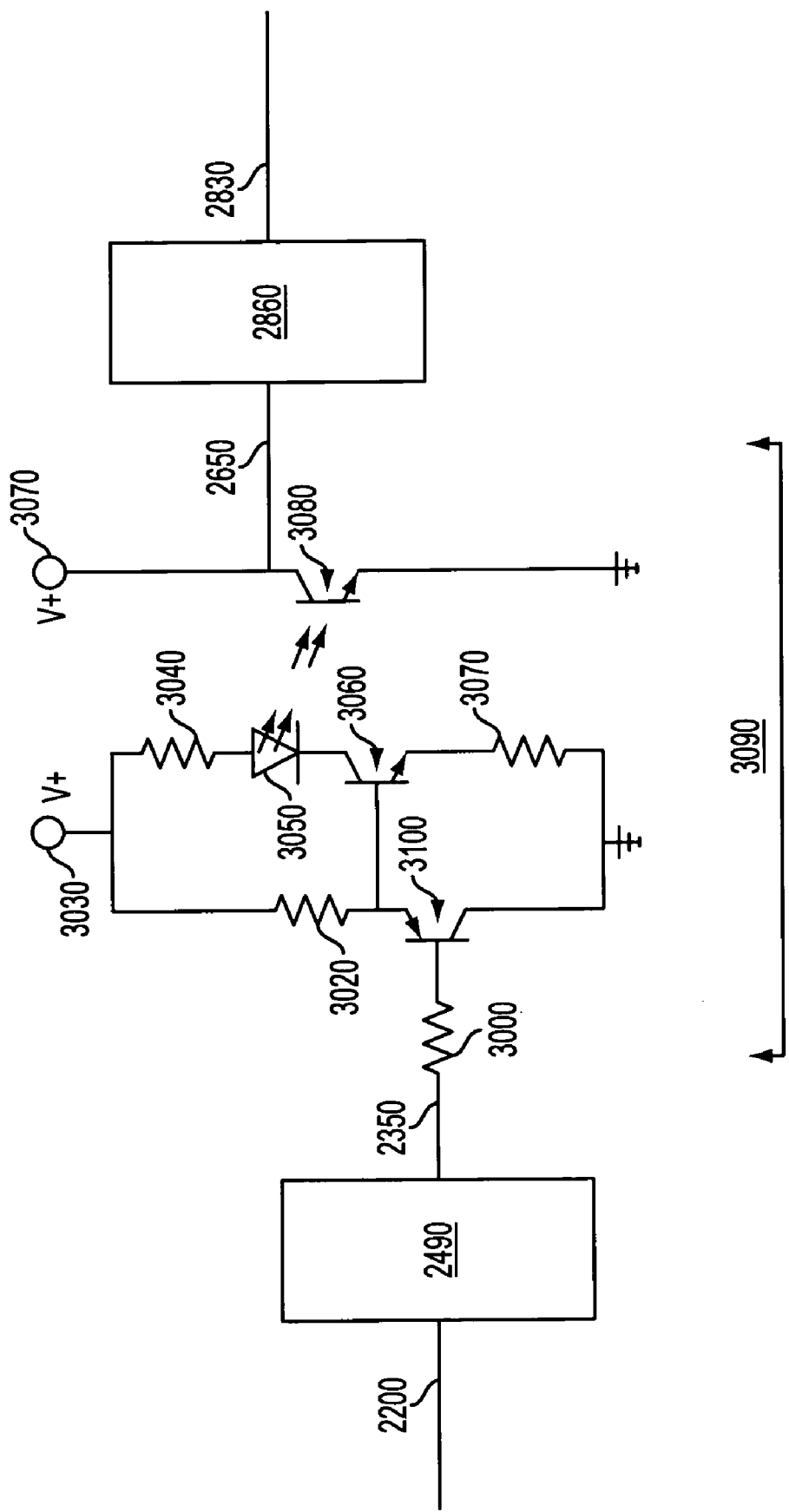
FIG. 33 shows a system in which a chaotic transmitter and receiver are interfaced to an infrared amplitude modulated subsystem 3090.

FIG. 33 shows a chaotic interface system 2490 and 2860 used to interface a chaotic transmitter and receiver to an infrared amplitude modulated subsystem 3090. The infrared transmitter consists of elements 3000, 3100, 3020, 3040, infrared diode 3050, transistor 3060, and 3070. The subsystem 2490 shifts the direct current voltage level of the input signal and attenuates it from volts of signal 2200 to millivolts 2350 of signal (FIG. 31). The infrared receiver is a self biased phototransistor pair 3080. The output 2650 is then applied to the chaotic interface circuit 2860 at interface point 2650. The infrared transmitter and receiver pair is a bandlimited system. This embodiment shows that a chaotic signal can be sent over a band limited amplitude modulated system and the original signal recovered adequately in the chaotic receiver to pass information bits at the channel baseband bandwidth. The chaotic interface circuit subsystem 2860 (FIG. 32) then changes the chaotic signal at interface point 2650 from millivolts to volts at interface point 2930 with the direct current voltage offset added back into the system. One infrared system embodiment had a bandwidth of 30 kilohertz and the chaotic signal was a 5.6 kilohertz strange attractor. Applications of this system include remote control units as well as communications systems. In addition to infrared systems, the inventive principles can be applied to other amplitude modulated systems including audio, radio frequency, and light (e.g., light emitting diodes and laser systems).

Band limited communications systems such as an infrared communications system can support a chaotic signal modem provided the interface circuits 2490 and 2860 are used to buffer the chaotic signal. The interface blocks provide a communications system capable of transmitting and receiving a band limited chaotic signal.

Figure 34:
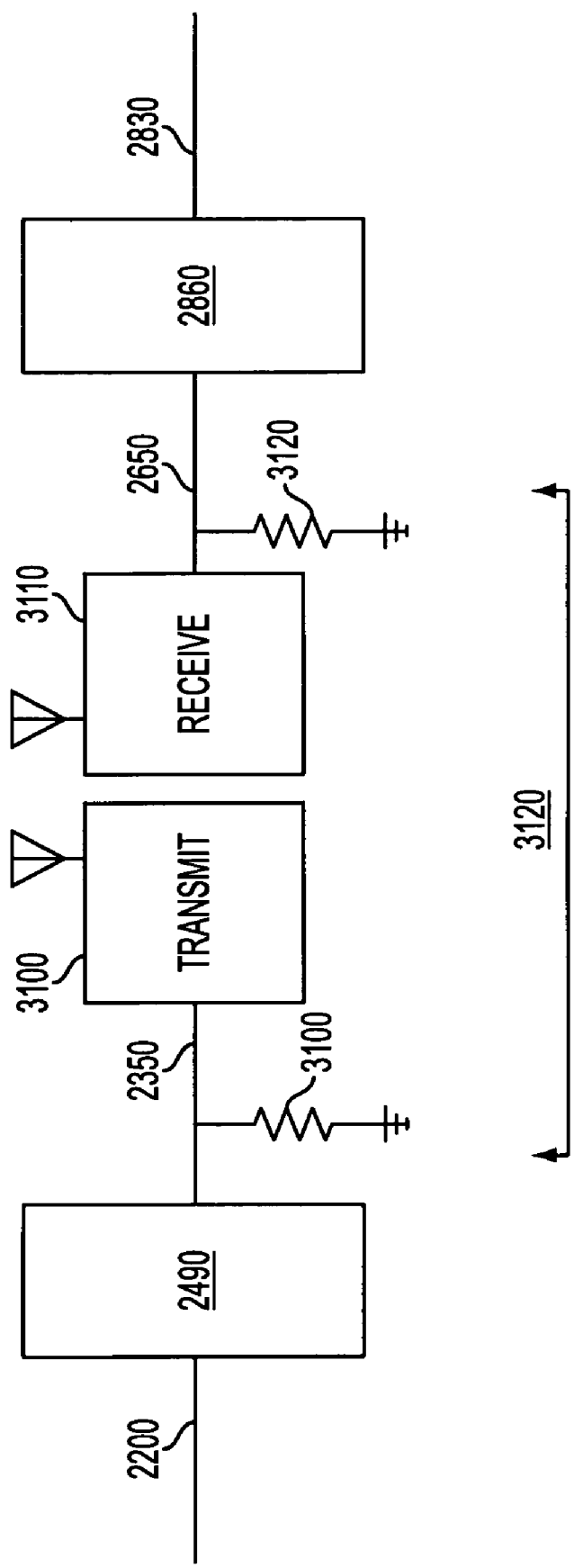
FIG. 34 shows how a chaotic transmission and reception system can be interfaced to a radio transmitter/receiver pair 3100 and 3110.

FIG. 34 is an embodiment of the chaotic signal interface circuit to a radio baseband system 3120. The resistor element 3100 provides an impedance match to the input of the transmitter baseband 2350. The radio frequency transmitter 3100 can be any radio transmitter at any frequency. The radio receiver 3110 is matched to the communications transmitter. The output of the receiver 3110 is applied across a resistor 3120. This produces a voltage at interface point 2650. The chaotic receiver interface circuit 2860 then matches the receiver signal to the chaotic receiver circuit. Chaotic signals can be passed over band limited frequency modulated systems using the interface subsections 2490 and 2860.

Figure 35:
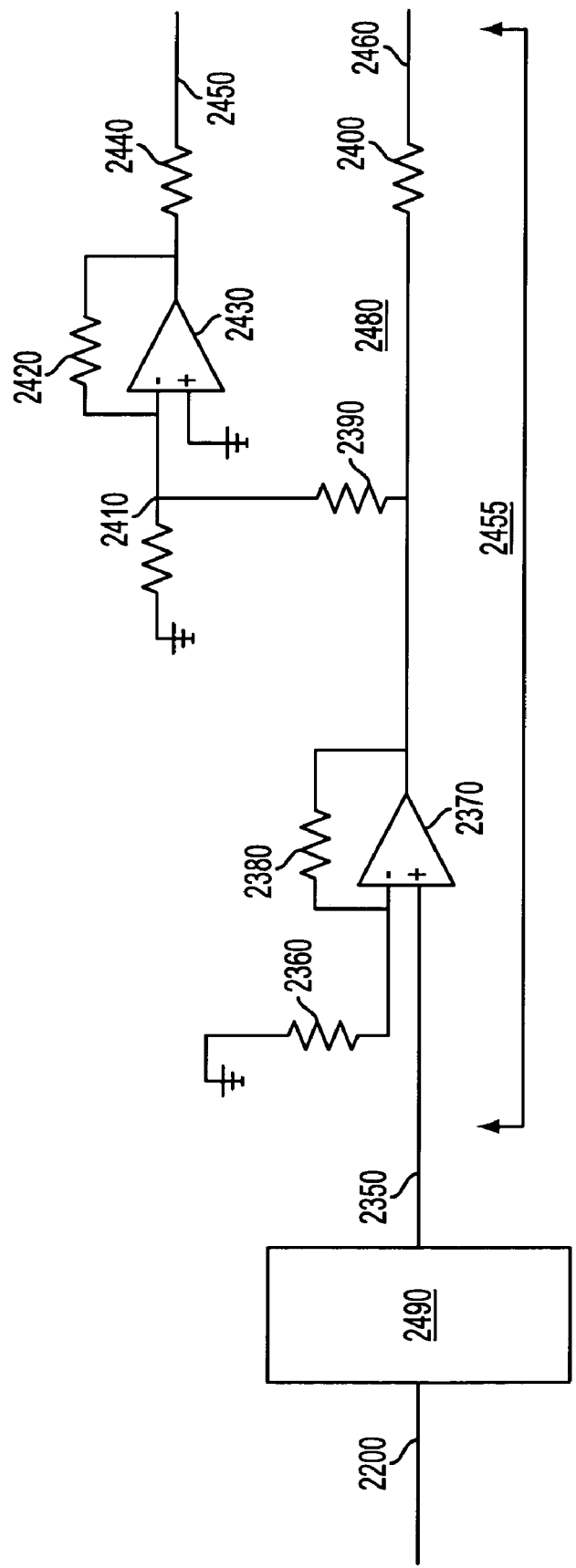
FIG. 35 shows a balanced cable driver circuit 2455 that can be used to pass a chaotic signal over a twisted pair or coaxial cable system.

FIG. 35 shows a cable driver system to pass a chaotic signal down a twisted pair or coaxial cable system. The chaotic interface circuit 2490 buffers the signal by providing attenuation and direct current voltage offset. The signal is then sent to a balanced line driver subsystem 2455. The balanced line driver prepares the chaotic signal to go over a twisted pair cable and matches the impedance of the cable to the driver circuit. One possible cable driver is derived from an operational amplifier book (SAMS "IC Op-Amp Cookbook", Third Edition, Walter G. Jung, 86-60253 (1997), page 387 titled differential line driver). This circuit allows chaotic signals to be sent over cable systems.

A chaotic interface subsystem 2490 provides an advancement in practice over current interface circuits and allows existing differential line drivers to be used for chaotic systems.

Figure 36:
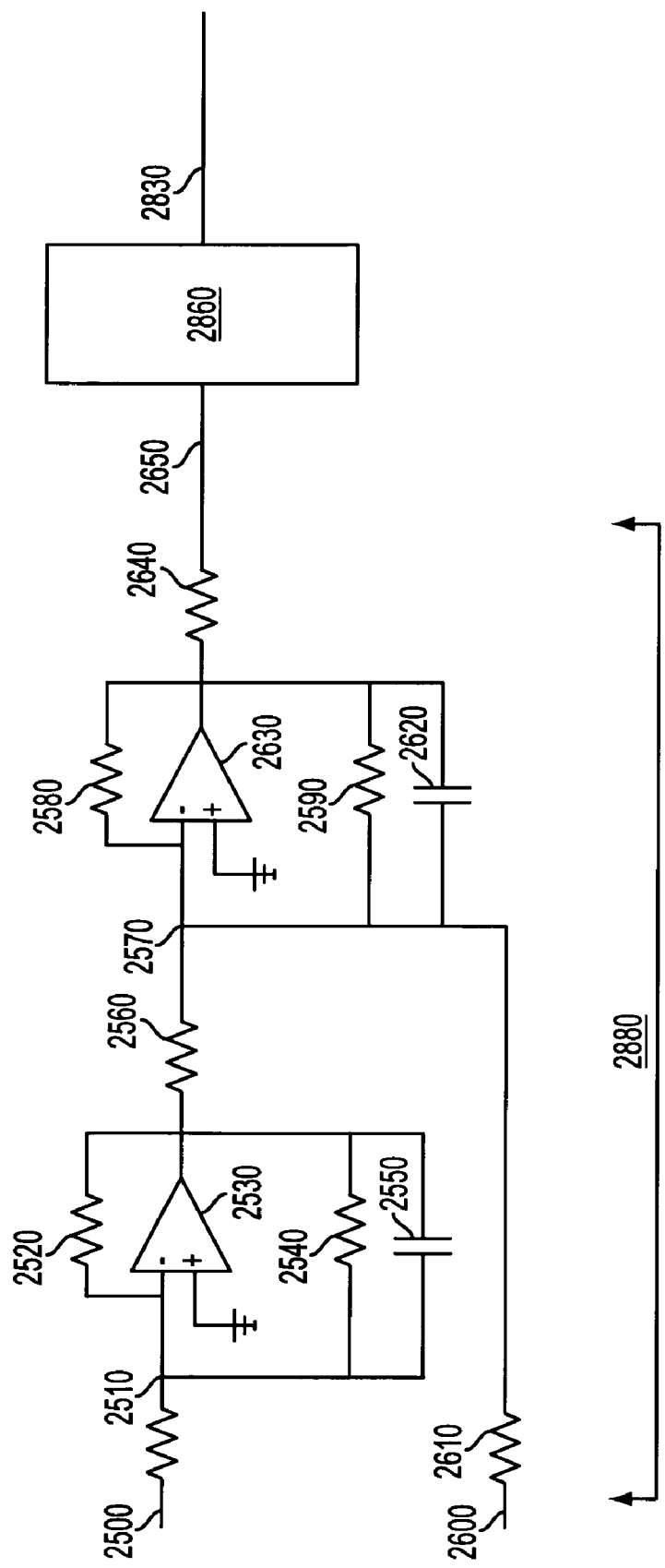
FIG. 36 shows a balanced cable receiver circuit 2880 that can be used to interface a chaotic receiver 2860 to a twisted pair or coaxial cable system.

FIG. 36 shows one embodiment of a cable line receiver circuit derived from the SAMS Operational Amplifier book (page 346) with a chaotic receiver interface circuit 2860.

The subsystem 2880 buffers the signal received from the differential input amplifier with high common mode rejection 2880. The circuit is a combination inverting attenuator and scaling adder which rejects common-mode input components while amplifying differential ones. This system allows chaotic signals to be matched to a transmission line such as standard twisted pair. The chaotic interface circuit allows chaotic signals to be passed over a transmission line.

Figure 37A:
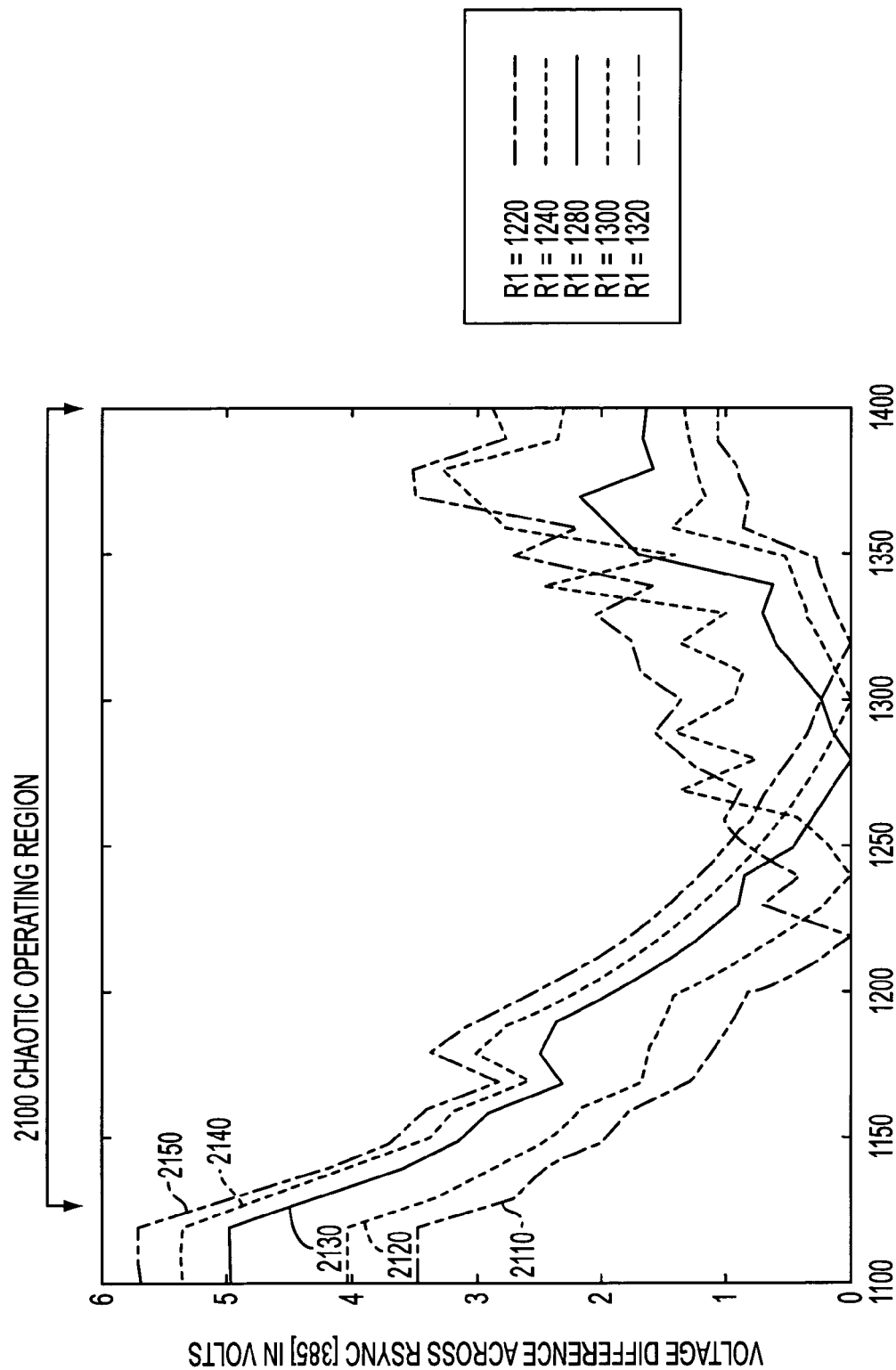
FIG. 37A shows curves representing chaotic operating regions for different values of a synchronizing resistor 660 for a Caltech diode implementation (FIG. 6B).

FIG. 37A shows an embodiment of modulating the transmitter using the resistor 660 from FIG. 6B and measuring the voltage difference across element 1185 of FIG. 11 at the chaotic receiver. This embodiment illustrates that the transmitter and receiver pair can act as a linear analog system in regions 2100. This means that amplitude modulation of the nonlinear diode is possible and the modulating signal can be recovered by examining the voltage difference across 1185 of FIG. 11. In addition, this figure shows that there are a number of values for element 660 in FIG. 6B 2110, 2120, 2130, 2140, and 2150 that are usable as signal vectors or code words in digital systems. Each of these resistor values generates a unique difference at the receiver when the receiver is set to a fixed resistor value R1. The signal vectors can be selected such that a maximum ratio is obtained. This curve can be drawn for different transmitter receiver pairs for different 660 values and different parameters of the Chua's circuit R, L, C1, and C2. The output of each of the receivers can be correlated to a specific code word. FIG. 37A can also be generated for resistor 653 and 654 in parallel with 660.

Figure 37B:
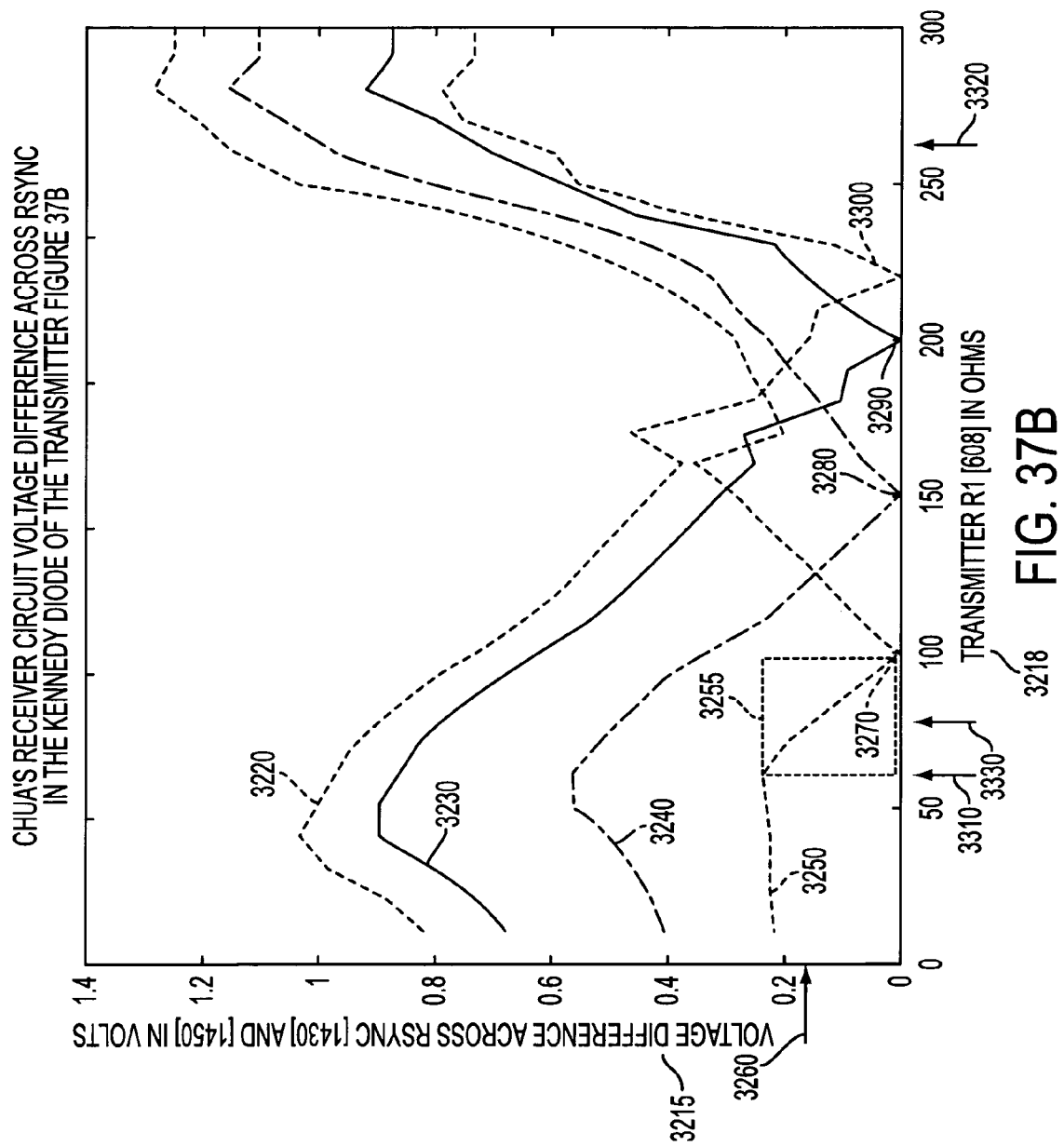
FIG. 37B shows curves representing chaotic operating regions for different values of a synchronizing resistor 608 for a Kennedy diode implementation (FIG. 6A).

A separate set of curves was also implemented for the Kennedy diode as shown in FIG. 6A when the transmitter element 608 was modulated and the receiver signal difference 3215 across elements 1450 and 1430 (i.e., Rsync) of FIG. 25 was measured and plotted as FIG. 37B. The curves 3220, 3230, 3240, and 3250 are examples of the voltage difference across Rsync 1450 and 1430 as resistor 228 of the transmitter is varied. The linear regions of the curves (e.g., 3255) can act as an analog signal demodulation curve by varying element 228 in the transmitter and obtaining a linear signal output at the receiver. Note the chaotic region goes from approximately point 3310 to 3320. Within this band of resistance, there are N possible signal vectors where N is determined by the minimum detectable voltage difference at the receiver for various resistor values 228 at the transmitter.

In FIG. 37B, the minimum voltage difference is where the transmitter and receiver have the same nonlinear diode characteristic curves 3270, 3280, 3290, and 3300 (i.e., element 608 in the transmit and receive nonlinear diodes are the same). Depending on the noise in the channel the number of usable vectors is reduced. For example, if point 3260 is the noise floor then the vectors would have to be adjusted to insure a detectable voltage difference based on the modulated value of resistor 608. One could also look at a fixed resistor value such as 75 ohms point 3330 at the receiver and look for the voltage difference at the receiver 3315 as resistor 608 in the transmitter changes between the vectors to determine a detection threshold. For digital signals, this means that one can space the vectors at one ohm increments and detect the voltage difference to all other signal vectors. In the presence of noise one may only be able to get some portion of this number based on the voltage difference trigger setting 3260 or 3315. This curve can be plotted for other circuit elements and expand the number of signal vectors.

FIG. 37C shows what happens when the transmitter capacitor 215 is varied in FIG. 6B and receiver capacitors 355 and 1490 in FIG. 25 are set to fixed values with the nonlinear diode characteristic curve set at a fixed value. The voltage difference across Rsync 1430 and 1450 of FIG. 25 is plotted against the transmitter capacitor 215 of FIG. 6B. This same curve can be plotted for every resistor value in FIG. 37B and a surface constructed showing where the optimum capacitor and resistor values are for signal vectors in a digital communications system. This increases the number of signal vectors possible with a given tank circuit and capacitor 215. In FIG. 37C, the curve generated by varying capacitor C1 is plotted as 3400. There are two linear regions of the curve defined as 3410 and 3420. These regions can be used as analog modulation regions in an analog communications system. The voltage differences in conjunction with FIG. 37B can be used to form sets of curves that can be used to build code words when each value of R1 (608) is used to generate a new set of C1 (215) curves.

In a transmitter receiver pair configured as a communications system, analog communication is possible by modulating R1 (608) or C1 (215) in the nonlinear diode of the chaotic transmitter circuit and observing the voltage difference across Rsync in the receiver circuit using the linear regions of the detection curves in FIG. 37A, 37B, and 37C. In the chaotic transmitter and receiver pair a large number of signal vectors can be constructed using the curves in FIGS. 37A, 37B, and 37C.

P. Using Multiple Transmitters and Receivers

Various systems and techniques described above use a technique of modulating current-voltage characteristics of a circuit element to achieve enhanced data rates in a basic digital communications channel. This technique can approach the Nyquist rate in its signal modulation. This is a fundamental improvement over the 15–20% performance of previous chaotic communications systems and is the basis for further improvement to increase the information-signaling rate well beyond the Nyquist rate. This is based on two fundamental factors that have been described herein. First, the chaotic trajectory phase shift keying technique has been shown to provide a robust method of signaling near the Nyquist rate using modulated chaotic attractors, which can be detected by matched receivers using a robust process based on the receiver improvements that are part of the technique.

Second, the transmitter and receiver circuits have been shown to be capable of generating a very large diversity of chaotic attractor modulated waveforms that can be discriminated from each other using the improved receiver techniques. This enables a coding scheme in which each transmitted bit (or Tbit) is coded to a digital word (a sequence of information bits—or Ibits) that is uniquely associated with one of several transmitter/receiver/attractor combinations implemented in a multiple transmitter/receiver system. Thus Tbits are transmitted as described above at a rate near the Nyquist rate, thus staying within the limits imposed by basic physics and information theory, while Ibits are transmitted at a higher rate, which is a multiple of the Tbit transmission rate and can apparently exceed the fundamental limits of information theory.

This technique is illustrated in FIG; 38 for the specific case in which two Ibits 4000 are coded into each Tbit 4065. This case requires 4 transmitters 4020, 4030, 4040, and 4050 and receivers 4090, 4100, 4110, and 4120 in matched combinations. Each receiver is capable of uniquely synchronizing with the waveform of its matched transmitter, and will not synchronize with the waveforms of the other transmitters. The transmitters and receivers could be designed with identical tank circuits and if values of the Ga and Gb parameters are varied as described in the chaotic trajectory phase shift keying technique (see FIGS. 24 and 25). Alternately, entirely different attractor types could be used for each transmitter/receiver pair so long as the synchronization advantages are retained. Unlike chaotic trajectory phase shift keying as described elsewhere herein, this technique is implemented using unmodulated chaotic circuits. Individual Tbit waveforms are formed by switching between the unmodulated outputs of the transmitters at the Tbit signaling rate. This has the same effect and the same characteristics as the previous modulation technique but is more efficient when several or a large number of transmitter/receiver pairs are to be implemented.

The received signal consists of a series of Tbits, each with the characteristic waveform transmitted by the transmitter that corresponds to its coded information content. The train of transmitted Tbits consists of a patched sequence of different waveforms, and is to be analyzed by the receiver circuit to recover the original sequence of Tbits in which the information signal is encoded. The signal is fed synchronously to all the receivers, which implement a demodulation and detection process similar to that described herein. The receiver that matches the transmitter of a given Tbit will synchronize using the rapid synchronization methods described herein, while the other receivers will not. In each Tbit period the matched receiver is identified and the coded word is extracted to recover the original information signal, or the Ibits in the coded word.

Figure 38:
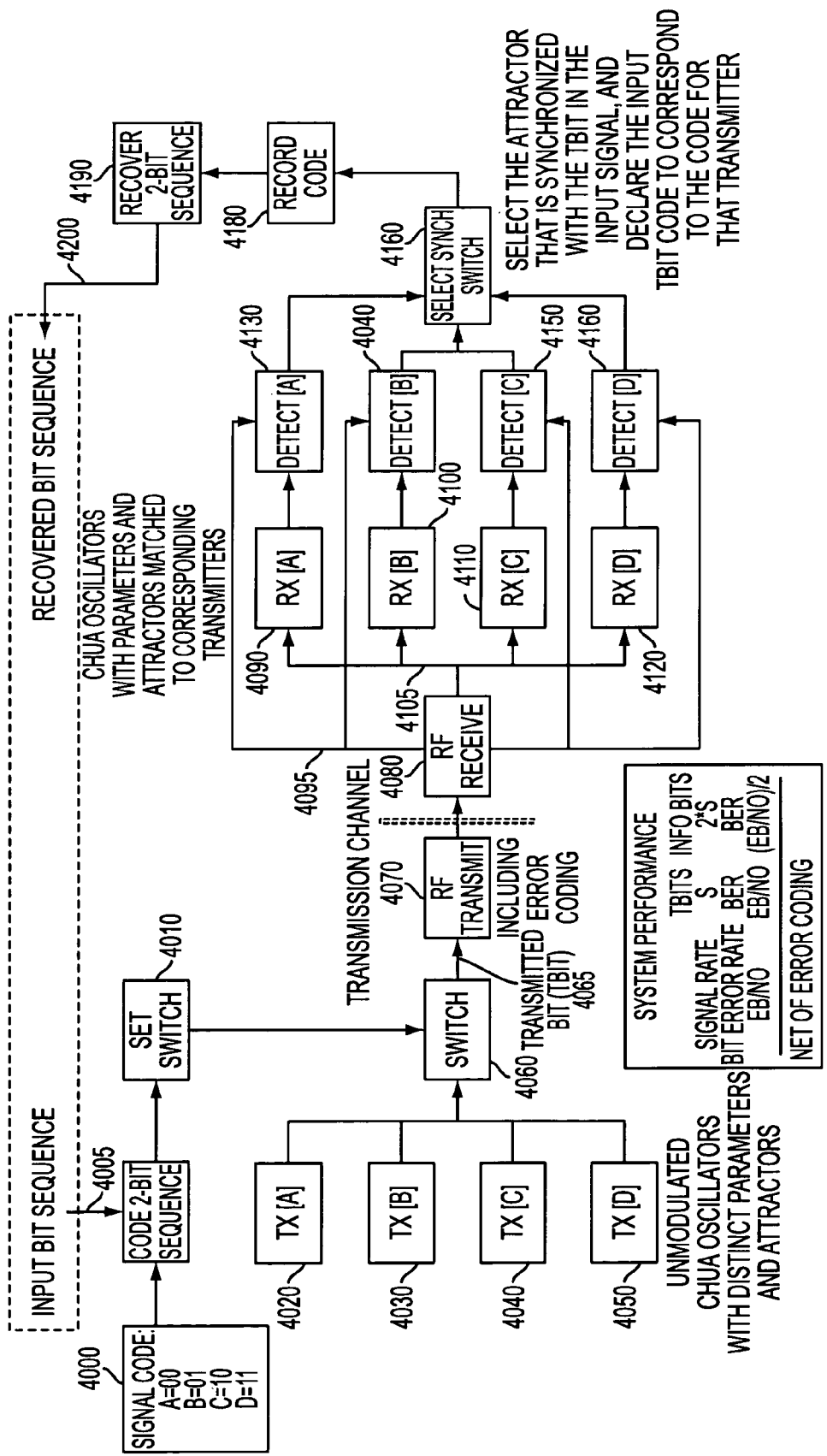
FIG. 38 shows a technique for doubling a signal rate using four unmodulated oscillator/transmitters and corresponding receivers.

FIG. 38 starts with element 4000 for example, the four signal coding vectors. The input information sequence 4005 controls the order in which the coded 2 bit sequence vectors are transmitted via a set switch 4010. This set switch then controls the order in which the transmitters are passed through the channel via switch 4060. The Tbit sequence 4065 is then injected into the RF transmitter 4070 using a chaotic interface circuit such as that of FIG. 31 (element 2490). The RF receiver 4080 then receives the signal and processes it to the baseband 4105 where it is applied to a chaotic receiver interface circuit such as that shown in FIG. 38 and processed to match the receiver input impedance the chaotic receivers 4090, 4100, 4110, and 4120. Each of the transmitters can be a chaotic circuit (such as a Chua's circuit) tuned to a specific strange attractor. After the chaotic receivers are detector circuits 4130, 4140, 4150, and 4160. Each of the receivers can be a matched Chua's circuit receiver as discussed herein. The detector outputs are sent to selector switch logic 4160 that declares the received vector 4170. The code is then recorded in a record code buffer and recovered in a 2-bit sequence buffer to be played out in a serial fashion as the recovered bit sequence 4200.

The example in FIG. 38 uses a coded word consisting of 2 Ibits. The 4 combinations of Ibit values result in a total of 4 digital words. With 4 transmitter/receiver pairs each word is assigned uniquely to one pair so that a complete coding (transform) of Ibits to Tbits is accomplished. Assuming that the basic communication process for Tbits (which follows the processes described previously) and that the process achieves a Tbit signaling rate of S bits/second with a bit error rate of BER at Tbit energy $E_b/N_0$, the word-coded process would achieve twice the true information transmission rate at half the equivalent (per Ibit) $E_b/N_0$ and the same BER. Thus the extension of the basic chaotic trajectory phase shift keying technique doubles the information rate without fundamentally changing the communications process.

This enhancement process is generalized by observing that $2^N$ transmitter/receiver pairs could be used to provide a complete code for digital words of N Ibits each. Thus a $2^N$ dimension system has the capacity to increase information rate by a factor of N without fundamentally changing the structure and physical communications parameters of the chaotic trajectory phase shift keying system described elsewhere herein. If N is large then information data rates (Ibit signaling rates) can be achieved far beyond Shannon's limit for communications systems. Although there are other methods that exceed Shannon's limit in transmission rate, this technique has the fundamental advantage that it does not require the deep transmitted signal modulation that can limit the compatibility of other techniques with various types of communications media with their requirements for sharing communications spectra.

Figure 39:
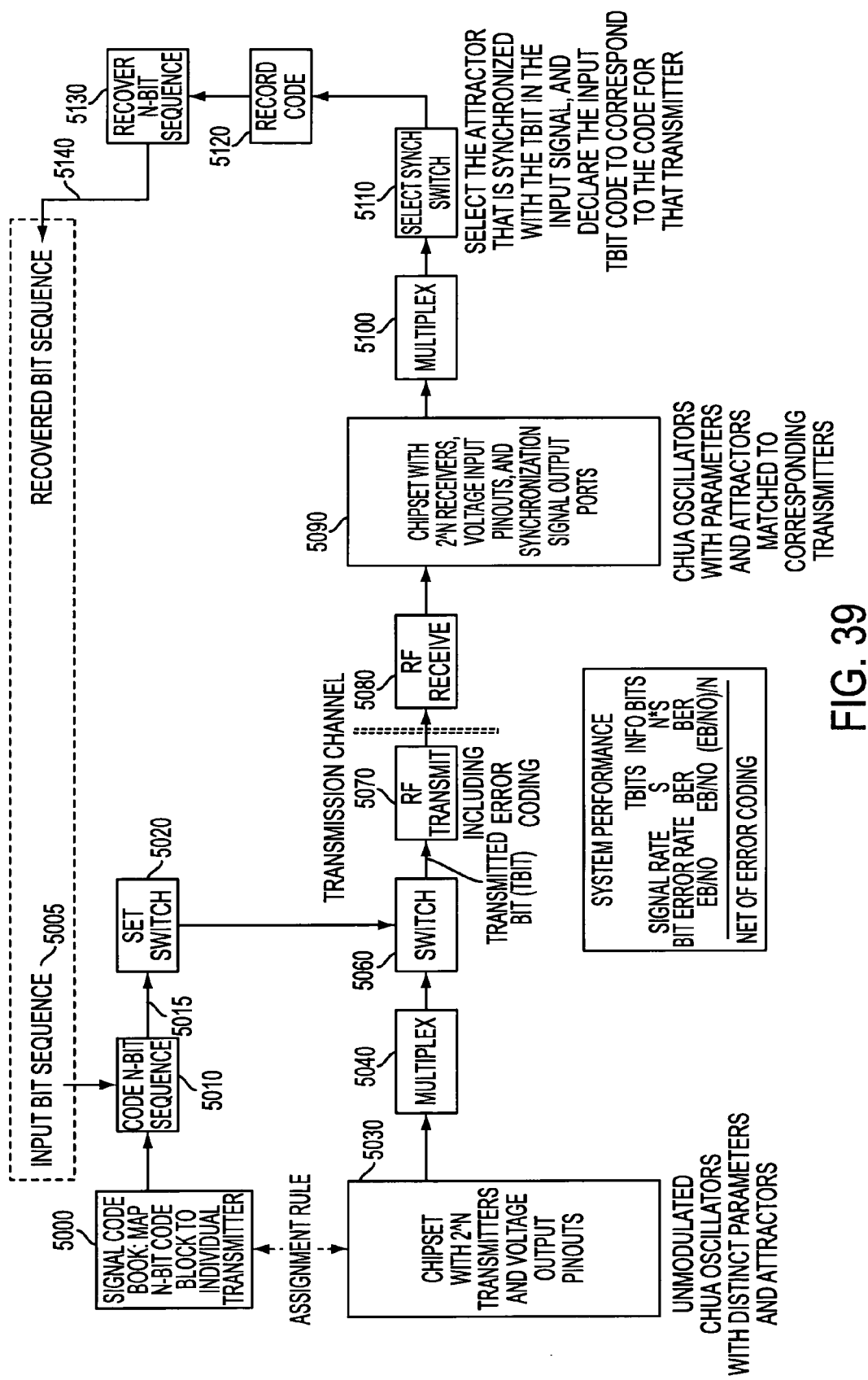
FIG. 39 shows a technique for increasing the digital signal transmission rate using multiple chaotic transmitters and matched receivers.

This technique may require the use of error correcting codes. Although increasing information rate by a factor of N does not increase the basic bit error rate, each Tbit error results in N correlated Ibit errors, analogous to a frame error in other digital communications systems. This is a disadvantage that must be addressed by error coding. However, the technique has the desirable property that the error correction codes will operate on Tbits, at their lower transmission rate, in a conventional way. No new error correction techniques will be required to achieve acceptable performance with this technique despite the very high equivalent Ibit transmission rate that can be achieved. Various techniques for interfacing the trajectory shift keying signals to real communications systems at audio, radio frequency and laser light frequencies are discussed herein. These techniques translate to baseband modems that can be used in cable transmission, radio and laser systems. This technique can be applied to a wide variety of systems using analog, hybrid digital-analog or pure digital components for implementing the chaotic circuits. The structure of such a system is shown in FIG. 39. Thus a system that uses a smaller number of transmitter/receiver pairs (up to approximately $2^8=256$ pairs) could use low cost ASIC chips with analog or analog and digital components for both transmitter and receiver systems. Much higher data rate systems (exceeding $2^{12}=4096$ pairs) could be implemented in custom CMOS or other integrated circuit chips to provide a system with very high performance.

FIG. 39 is the general case where a codebook is made up of "N-bit" code blocks 5000 with $2^N$ Transmitters 5030 and receivers 5090. The transmitters are multiplexed by element 5040 and switched in based on the input bit sequence 5105 by 5020 and 5060 giving "Tbits" 5065. The signal is then interfaced to the RF transmitter 5070. The RF receiver 5080 is interfaced to the $2^N$ chaotic receivers 5090. The output of the chaotic receivers are then multiplexed 5100 and decoded using 5110. The $2^N$ vectors are then recorded 5120 and recovered 5130. Finally the data is serialized into the recovered data stream 5140 to become the recovered bit stream 5140.

For purposes of reference, the following is an estimate of the enhanced performance that can be achieved with this technique. Shannon's limit implies a limit of 2 bits per second (BPS) per Hertz (Hz) of channel width. The basic chaotic trajectory phase shift keying technique could operate at a Tbit signaling efficiency of about 80% with error correction coding reducing Tbit efficiency by about 60% to a net efficiency of 32%. This would yield a Tbit signaling rate of 0.64 BPS/Hz of channel width. Without the enhancement this system could transmit 9600 BPS through a typical 15,000 Hz channel. A $2^8$ dimension system would increase this to 76,800 BPS through the channel, which is far beyond the capabilities of other existing systems. A $2^{12}$ dimension system could increase this to 115,200 BPS. Performance at these levels would allow a more redundant level of error coding (multiple techniques or coding plus redundant transmissions) while maintaining high performance. Using this technique information data rate is limited only by the physical ability to fabricate components with a high packing density of transmitter and receiver circuits, and by availability and design of switching components to implement the process at the chip level.

Combined with the basic techniques for modulating and demodulating chaotic signals described herein, the multiple transmitter/receiver enhancement applies to all communications applications envisioned for this technology. The technique comprises a breakthrough for applications that demand high information (Ibit) data rates but have fundamental limitations on physical or Tbit transmission rates. These include restrictions on use of the communications spectrum and limitations due to transmission effects in the communications medium itself. Thus very high speed modems will be possible using this technique, so long as the basic communication process supports the use of basic chaotic trajectory phase shift keying at conventional Tbit signaling rates as described elsewhere herein.

Although there are other methods that exceed Shannon's limit in transmission rate, this technique has the fundamental advantage that it does not require the deep transmitted signal modulation that can limit the compatibility of other techniques with various types of communications media with their requirements for sharing communications spectra. The technique comprises a breakthrough for applications that demand high information (Ibit) data rates but have fundamental limitations on physical or Tbit transmission rates. These include restrictions on use of the communications spectrum and limitations due to transmission effects in the communications medium itself.

Very high speed modems are possible using this technique, so long as the basic communication process supports the use of basic chaotic trajectory phase shift keying at conventional Tbit signaling rates as described elsewhere herein. The same technique can be applied to the Gb-only transmitter and receiver pair discussed below by modulating the equilibrium points (e.g., by shifting to M-ary equilibrium points).

Q. Digital Version with Cube-Law Nonlinear Component

Various chaotic trajectory phase shift keying techniques described herein use a chaotic oscillator circuit that has been modified in several respects to improve performance, but which retains the nonlinear diode component (for example, element 650 in FIG. 6B) in the nonlinear diode circuitry. When an all-digital implementation of the chaotic trajectory phase shift keying techniques is desired, however this component can be implemented more efficiently by other means. One digital implementation of chaotic trajectory phase shift keying can use a block diagram component using the following equation to model the current vs. voltage characteristic of the nonlinear diode:

$$I = -aV - bV^3$$

where I is the current through the nonlinear diode and V is the voltage across the diode. The constants a and b are calculated from the $G_a$, $G_b$, and $B_p$ characteristics of the nonlinear diode circuit. The constants are constrained by two conditions necessary for the component to produce the chaotic modulations necessary to implement the communications technique. These conditions are as follows:

Condition 1: the slope of the equation at I=0, V=0 must be less than $-G_a$ so that the curve passes through the load line and will produce chaotic modulations, producing the constraint that $a > G_a$.

Condition 2: the maximum usable value of V is defined by the point at which the slope of the I vs. V curve reverses sign and becomes unusable, producing the constraint that the maximum desired voltage $V_{max}$ is as follows:

$$|V_{max}| \leq (-a/3b)^{1/2}.$$

The third requirement that the curve passes through the origin at V=0 and I=0 is automatically satisfied by this form of the equation.

The constants a and b can be calculated by imposing further constraints on the shape of the curve. Good performance can be obtained by using the following procedure: (1) set $V_{max}$ at the actual maximum voltage consistent with the circuitry or other components used to fabricate the chaos producing circuit, and (2) constrain the curve to pass through a particular point (V*,I*). These produce enough information to solve for the constants. As an example, if the curve is constrained to pass through the breakpoint in the nonlinear diode ($B_p$,$-G_aB_p$) then the coefficients can be solved as follows:

Let: $r = (B_p/V_{max})$ and $r \leq 1$;

Then: $a = 3G_a/(3-r^2)$;

$$b = -(G_a/V_{max}^2)/(3-r^2).$$

Other solutions can be derived by changing the particular point (V*,I*) through which the curve is constrained to pass.

In a digital implementation of the equation it could be calculated as $I = -V^*(a + b^*V^*V)$, requiring the floating-point calculation of three multiplications, one addition, and one sign change.

This nonlinear diode simulation technique allows for a significantly smaller calculation workload than the nonlinear diode as modeled according to the Chua or Kennedy circuits. This leads to a more efficient digital algorithm for implementing the component in a system, particularly when a multiple transmitter/receiver system necessitates the calculation of the component characteristic for a very large number of different components.

R. GB-Only Receiver

Figure 40:
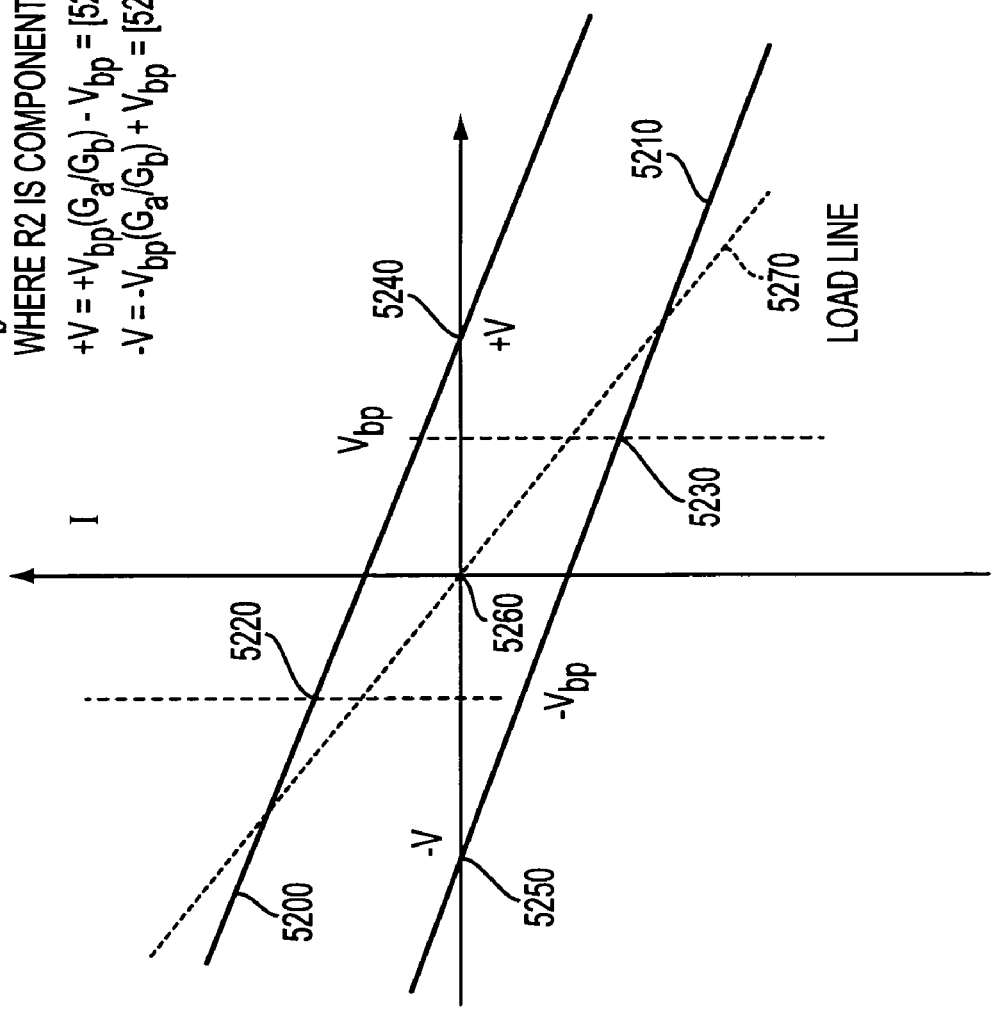
FIG. 40 shows how a nonlinear circuit can be replaced with two functions that represent only the Gb slopes, referred to as a "Gb-only" transmitter or receiver.
Figure 41:
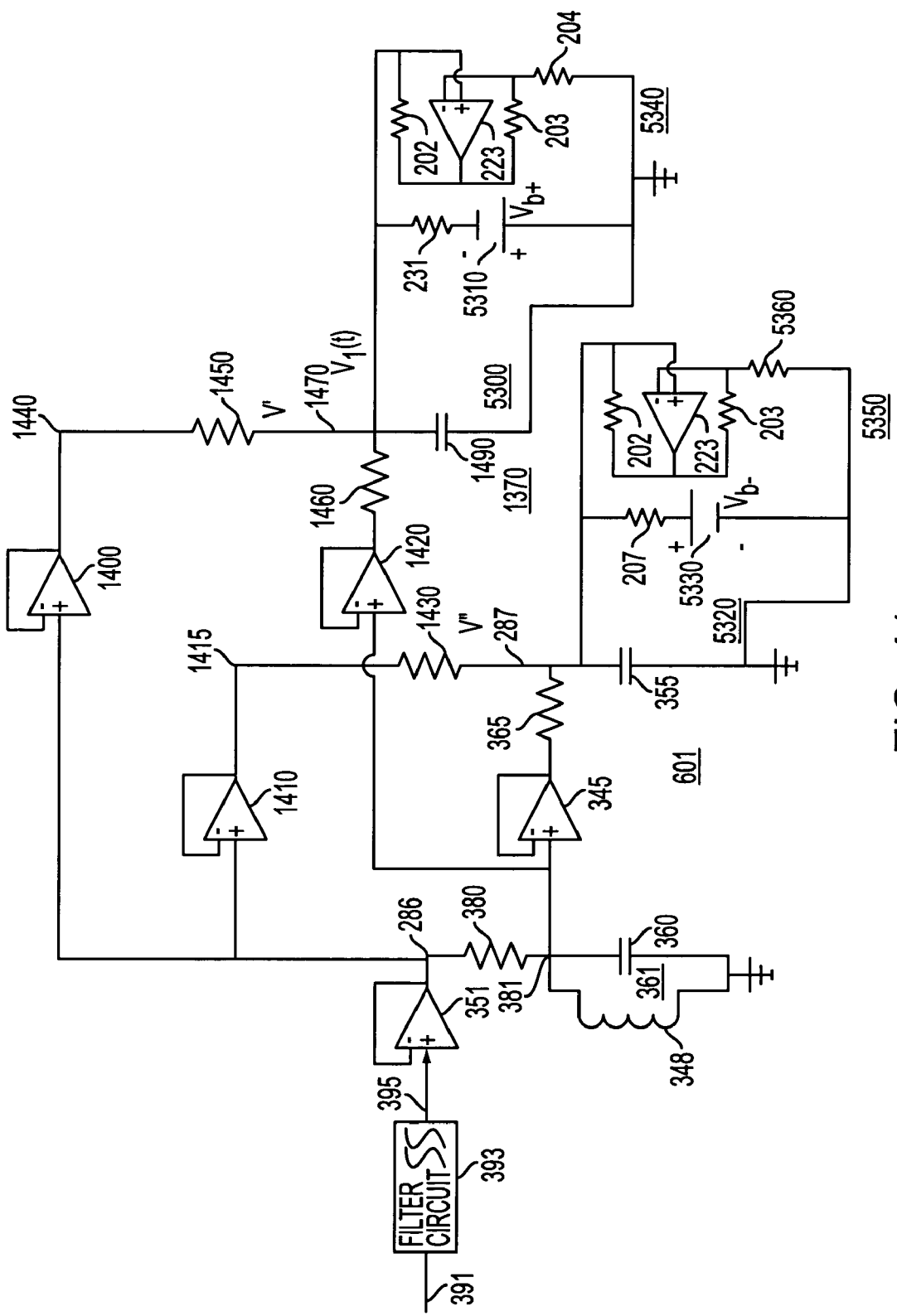
FIG. 41 shows a detector design in which a nonlinear diode is replaced with +/−Gb slope detectors (5350 and 5340).

According to certain embodiments, the inventive principles can be employed without using a strictly "non-linear" circuit element. For example, the receiver non-linear diode can be replaced with two functions that represent only the Gb slopes 5200 and 5210 as shown in FIG. 40. This receiver type will be denoted a Gb-only receiver. One possible implementation for such a receiver is shown in FIG. 41. The slopes are represented by two equations as follows:

Upper Scroll: $I = Gb^*V + Ga^*Vbp - Gb^*Vbp$

Lower Scroll: $I = Gb^*V - Ga^*Vbp + Gb^*Vbp$

Where the voltage at the zero current intercept is:

$V(\text{upper}) = +VBP(Ga/Gb) - VBP = 5240$ $V(\text{lower}) = -VBP(Ga/Gb) + VBP = 5250$ In the Gb-only receiver the Ga term is in the Gb slope equation as shown in the following equations:

$Gb = (R2-R1)/(R1^*R2) = Ga - (1/R2)$ (see FIG. 6B)

where R2 is elements 207 and/or 231 and R1 is elements 204 and 5360 of FIG. 41. Only the Ga slope created by the nonlinear element is taken out of the receiver element.

In the receiver, this embodiment eliminates the breakpoints 5220 and 5230 (see FIG. 40). This is important because noise when summed with the signal can cause the incoming signal voltage to hit the breakpoint and switch momentarily to the other scrolls. This can cause bit errors in the recovered signal due to voltage spikes generated in the now-removed Ga region (FIG. 40). Note the load line 5270 is maintained with respect to the transmitter implementation and the breakpoint voltage and current points 5220 and 5230 are also the same as the nonlinear diode of the transmitter.

This receiver embodiment allows operation in noisier channels where other receivers would give bit errors when points 5220 and/or 5230 were hit due to channel noise. This receiver implementation also eliminates the problem associated with the signal being attenuated in the channel. In a diode receiver implementation described previously, when the breakpoint voltage point is reached at either 5220 or 5230 a bit error can be induced in the receiver because of the slope change and the attractor transitioning to the other scroll region. With the slope Ga removed (compare FIG. 8), the strange attractor plus noise never causes a transition between scroll regions and the incoming signal is just attenuated towards the origin 5260 (i.e., the system never changes regions). If a lower scroll attractor was received then it is in the right half of the V plane and can be distinguished from the upper scroll attractor, which is in the −V plane.

In FIG. 41, a voltage difference is set up across the synchronizing resistors 1430 and 1450 in FIG. 41 equal to the current difference associated with the slope Gb. If a fixed length chaotic vector is sent and analog to digitally converted at the period of the information bits (data rate) of the transmitted signal, the system can distinguish between an upper and a lower scroll attractor. The upper scroll attractor will be in the negative portion of the V plane and the lower scroll attractor will be in the positive V plane. This technique of linearizing the receiver can be applied to any chaotic system that uses a nonlinear equation set (for example the Lorenz equation set). Controlling the transmitter in such a manner that it never hits a breakpoint ignores the problem of the receiver's being stimulated in the presence of noise to hit the breakpoint. For optimum operations, two or more single scroll attractor pairs in the same region (upper or lower) can be employed.

The technique discussed herein to transmit chaotic vectors (i.e., bursts of chaotic signal that do not cross the breakpoint voltage) when used in conjunction with a Gb-only receiver allows chaotic receivers of the type shown in, e.g., FIGS. 41, 42, 45A, and 45B to operate in noisy channels. These Gb receiver embodiments can also be used with a transmitter that uses feedback to stabilize the chaotic transmit signals to insure the chaotic signal never crosses the breakpoint voltage at the transmitter (i.e., stop a single scroll attractor). In a noisy system the Gb receiver has no breakpoint voltage 5220 and 5230 (FIG. 40). For an upper scroll attractor, the noise must drive the system into the opposite V-plane before bit errors are generated. This means that the system gains the breakpoint voltage difference in receiver performance. In addition, the signal can be attenuated to nearly zero volts and still be detected as a voltage difference across element 1430 and 1450 in FIG. 41, 45A, and 45B.

Figure 42:
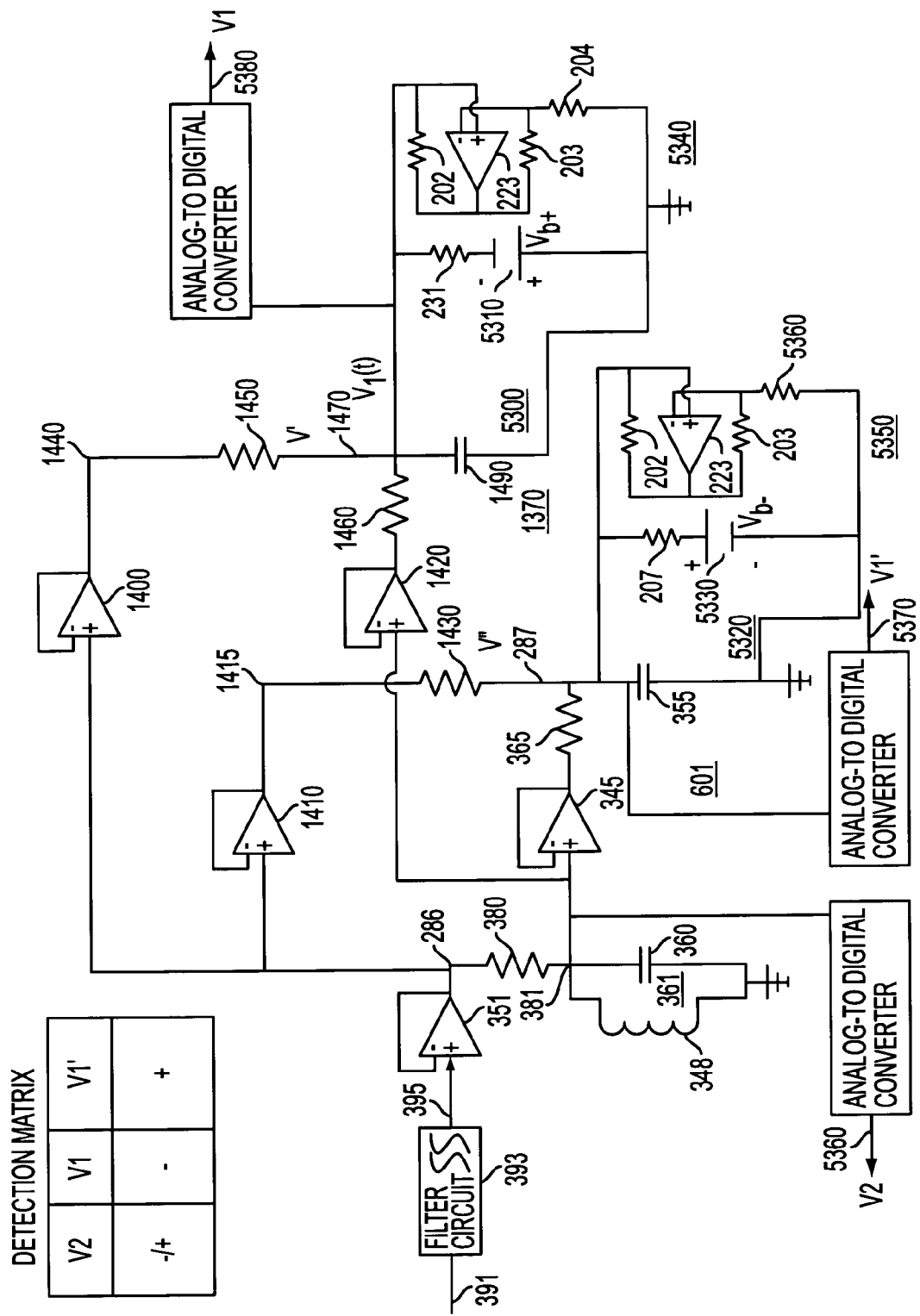
FIG. 42 shows a dual receiver design using sample-and-hold circuits with outputs 5380, 5360, and 5370.

One detector using an analog-to-digital (sample and hold circuit) converter embodiment is shown in FIG. 42. In FIG. 42, the receiver is essentially the same as the dual receiver implementation shown in FIG. 25. The change is that the nonlinear diode has been replaced by dual Gb receiver only implementing elements 5340 and 5350 (i.e., one Gb in the upper plane and one in the lower plane of the IV characteristic curve as shown in FIG. 40, where the Gb values can be different depending on the strange attractor pairs transmitted). The voltage sources 5310 and 5330 represent the voltage crossings where the current flow is equal to zero as shown in the equations above for the voltage crossings. The voltage sources are shown in FIG. 40 as points 5240 and 5250. The negative resistor implementation represented by elements 202, 203, 223 and 204 as well as 5360 remain the same. The resistor elements 207 and 231 represent the resistance of the Gb portion of the nonlinear diode. Each half of the circuit represents the upper and lower portions of the Gb negative slope respectively 5340 and 5350. To detect the change in attractors, the detectors previously described in this document can be used.

In addition, a sample and hold circuit can be used to sample the signal at a multiple of the data rate to obtain a plot of the voltage at 381 compared to points 1470 and 287. These plot the tank circuit voltage 361 against the Gb receiver voltages 1470 and 287. If one has an upper scroll, then the voltage is in the negative portion of the V-plane and if it is a lower scroll attractor then it is in the +V-plane. It requires several volts of noise along the V axis of FIG. 40 to cause the V1 287 or 1470 voltages to change signs. This is a very noise immune receiver implementation. This detector circuit will also detect two single scroll attractors, even if they are both in the same region (i.e., upper or lower scroll region).

FIG. 42 shows the sample and hold circuit detector (analog-to-digital converter) connected at points 1470, 287, and 281. A matrix of the voltages 5360, 5370, and 5380 can be generated as shown to distinguish between the two attractor pairs. Another detection technique is to sample at points 1470 and 287 and correlate to a stored signal to make a detection decision. Since chaotic attractors can produce uncorrelated samples, the same receiver circuit can be used to detect two or more uncorrelated signals. These signals can then be decoded using a correlation circuit attached to points 381, 287, and 1470. The tank circuit 361 tends to remove noise and provide an excellent detection technique. It gives a positive means to detect the strange attractor vector pairs in noisy channels. By using a Gb only receiver the voltage at point 381 and 287 and 1470 never hit a breakpoint even in the presence of high noise levels in the channel. This means the matrix in FIG. 42 can provide an accurate means of detection using single or multiple samples of the signals until the noise drives the signal into the opposite V-plane. This provides a noise improvement over other systems.

In the Gb receiver implementation, the Gb receiver allows a wider dynamic range in the received signal level. The Gb receiver embodiment allows operation in higher noise levels by a factor of the breakpoint voltage since the voltage never changes regions unless the zero voltage line 5260 is crossed. The Gb receiver embodiment also simplifies the receiver design since no diodes are required in the receiver. It also allows uncorrelated chaotic signal vectors to be received by the same detector circuit and then separated by a correlator circuit.

The Gb-only receiver technique can be applied to any chaotic nonlinear system that has a nonlinear element or elements. The Gb receiver can detect double scroll or two single scroll attractors, even if they are both in the same region (i.e., upper or lower scroll region), and can provide an accurate means of detecting chaotic signals using single or multiple sample and holds of the signal in noisy channels. This embodiment allows the signal to be attenuated in a channel by more than an order of magnitude and still be detected by the Gb only receiver in a noiseless channel. In a conventional Chua's receiver using a nonlinear diode implementation the signal can be attenuated by no more than approximately 1–2 percent before the breakpoint is crossed and bit errors result in a noiseless channel.

In a noisy channel the Gb only receiver allows the signal to be attenuated by 50 percent or more and still detect the signal. The attenuation of the signal does not affect noise performance. The energy per bit to the noise level is the only determinant when using a Gb receiver. In some receivers, the noise floor is set by the breakpoint voltage based on the signal attenuation in the channel. In the Gb only receiver, the transmitted chaotic signal can be attenuated to nearly zero volts and still be detected as a voltage difference across element 1430 1450 in FIG. 41, 45A, and 45B. All filtering techniques in this embodiment apply also to the Gb-only receiver.

Figure 45A:
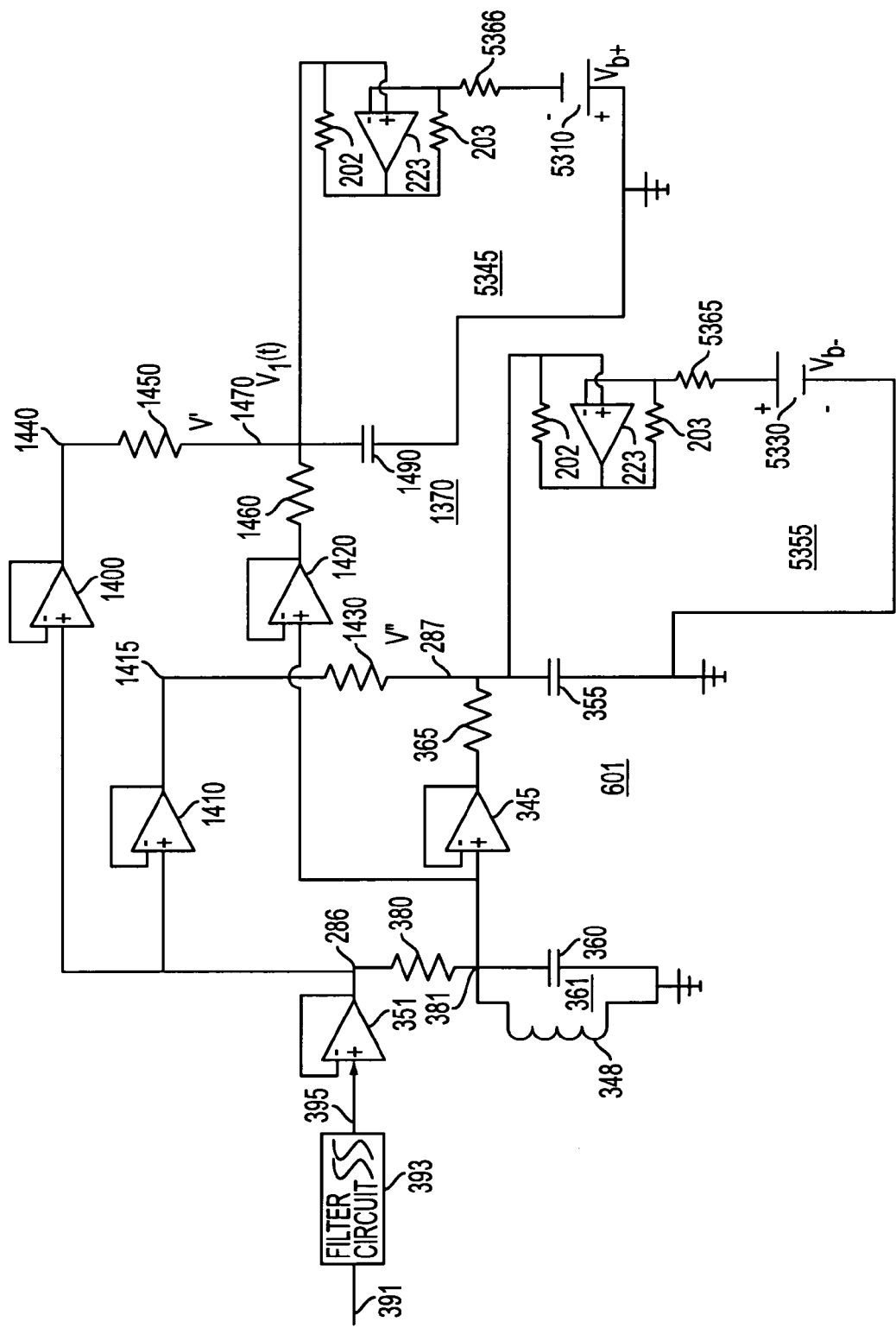
FIG. 45A shows a dual receiver design wherein a nonlinear diode is replaced with a +/− Gb detector and voltage Vb in a negative resistor circuit.

Turning to the dual Gb-only receiver embodiment shown in FIG. 45A, negative resistor elements 5340 and 5350 of FIG. 41 are replaced with negative resistors 5345 and 5355, and voltage sources 5310 and 5330 are placed in series with resistors 5366 and 5365 respectively. The other aspects of the circuit as similar to that shown in FIG. 41. Resistors 5366 and 5365 are in series with operational amplifier 223 that converts resistors 5366 and 5365 into negative resistors by changing the direction of current flow. Resistors 5366 and 5365 are the parallel combination of resistors 5366 and 204 and resistors 5365 and 5360 respectively of FIG. 41. The resistors 5366 and 5365 are determined in the same way as in the other embodiments described herein.

Figure 45B:
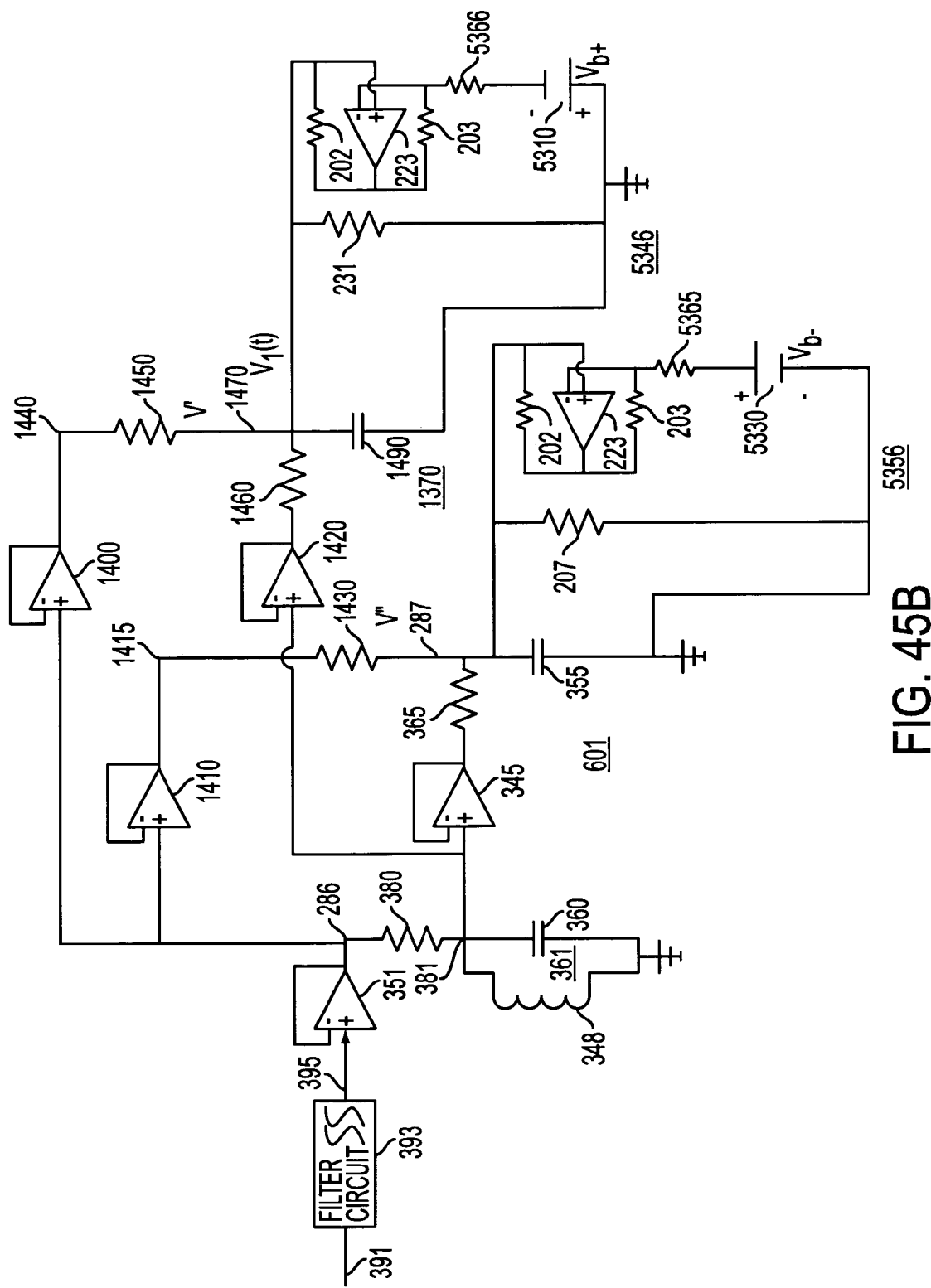
FIG. 45B shows a dual receiver design that is a variation on that of FIG. 45A.

FIG. 45B shows yet another embodiment in which resistors 231 and 207 are inserted in parallel with negative resistor elements 5366 and 5365 respectively. This makes up the resistive elements 5346 and 5356 respectively. In this case, the parallel combinations of the resistors are determined in the same way as FIG. 41. The difference between FIG. 41 and FIG. 45A in this embodiment is that voltage sources 5310 and 5330 are in series with the negative resistor chain made up of elements 223, 5366, 5310 and 223, 5365, 5366 respectively. In this embodiment, elements 5345 and 5355 in FIG. 45A are replaced by elements 5346 and 5356 in FIG. 45B. In FIGS. 41, 45A and FIG. 45B one starts by designing a standard Chau-based receiver as discussed above and translates the Gb slope into the negative Gb slope receiver to obtain noise immunity. These circuits provide 6–9 dB better performance than a standard nonlinear receiver with slope Ga present.

S. GB-Only Transmitter

Figure 43:
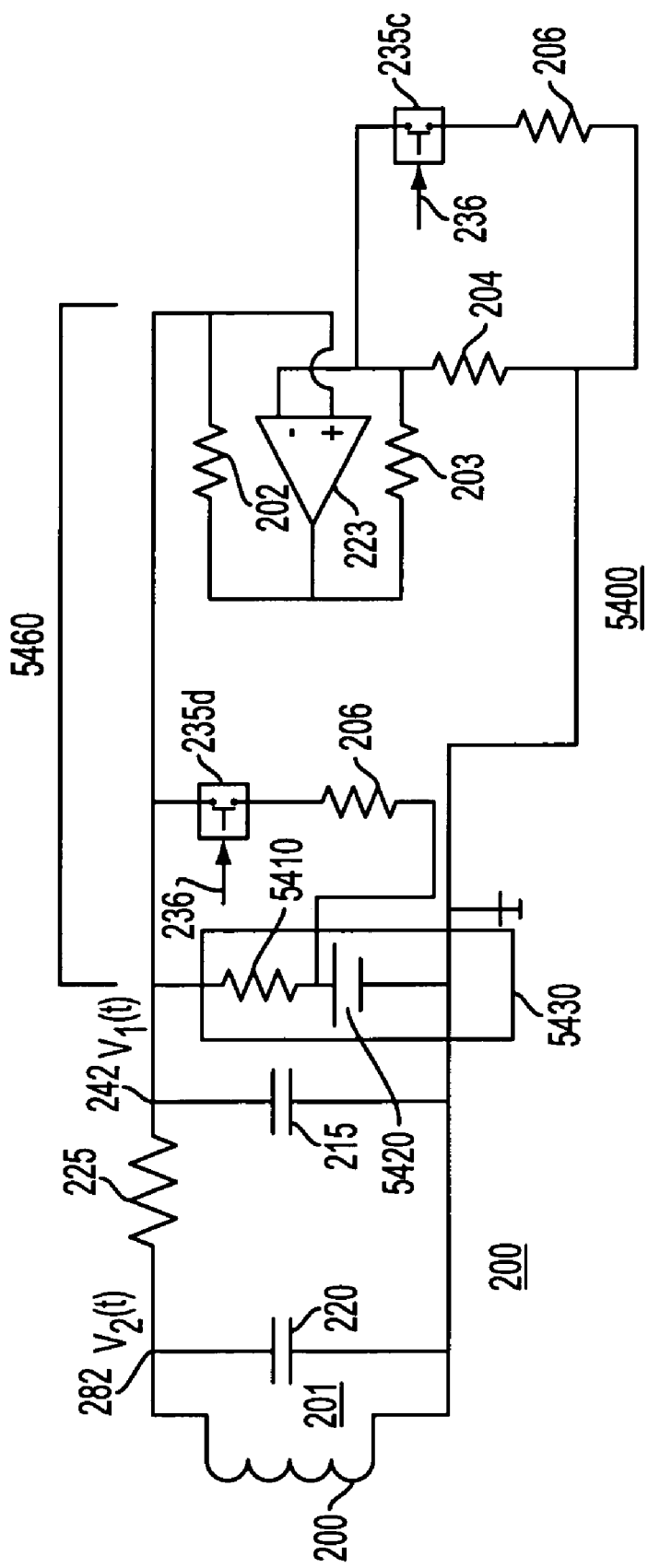
FIG. 43 shows a transmitter that modulates only the slope Gb.

According to certain embodiments of the invention, chaotic transmitting circuits exhibiting a linear (instead of nonlinear) current-voltage characteristic can be employed, wherein the slope of the curve is perturbed to transmit information. FIG. 43 shows a transmitter similar to FIG. 6C except the non-linear diode 680 has been replaced with the Gb slope element 5460. This transmitter produces single scroll attractors in either the lower quadrant of the characteristic curve of FIG. 40 (curve 5200) or the upper quadrant (curve 5200) depending on the value of the voltage source 5420. Voltage source 5420 represents point 5240 or 5250 in FIG. 40. The single scroll strange attractor orbits around the equilibrium point where load line 5270 crosses Gb line 5200 or 5210 in FIG. 40.

The resistive element 5410 has the same value as resistor 686 FIG. 6C. The resistor 204 is the same as resistor 204 in FIG. 6C. All other parts of the circuit are similar to those shown in FIG. 6C. The Gb slope can be modulated by placing a switching element 235c and a resistor 206 across resistor 5410 and/or 206 as shown in FIG. 43. The voltage source 5420 is varied as the slope is changed based on the same equations as the equations for the Gb receiver discussed with reference to FIG. 41. The resistor 206 will be a different value depending on whether it modulates resistor 5410 or 206. The input can be modulated by a digital data stream at point 236 (see FIG. 43).

Figure 44:
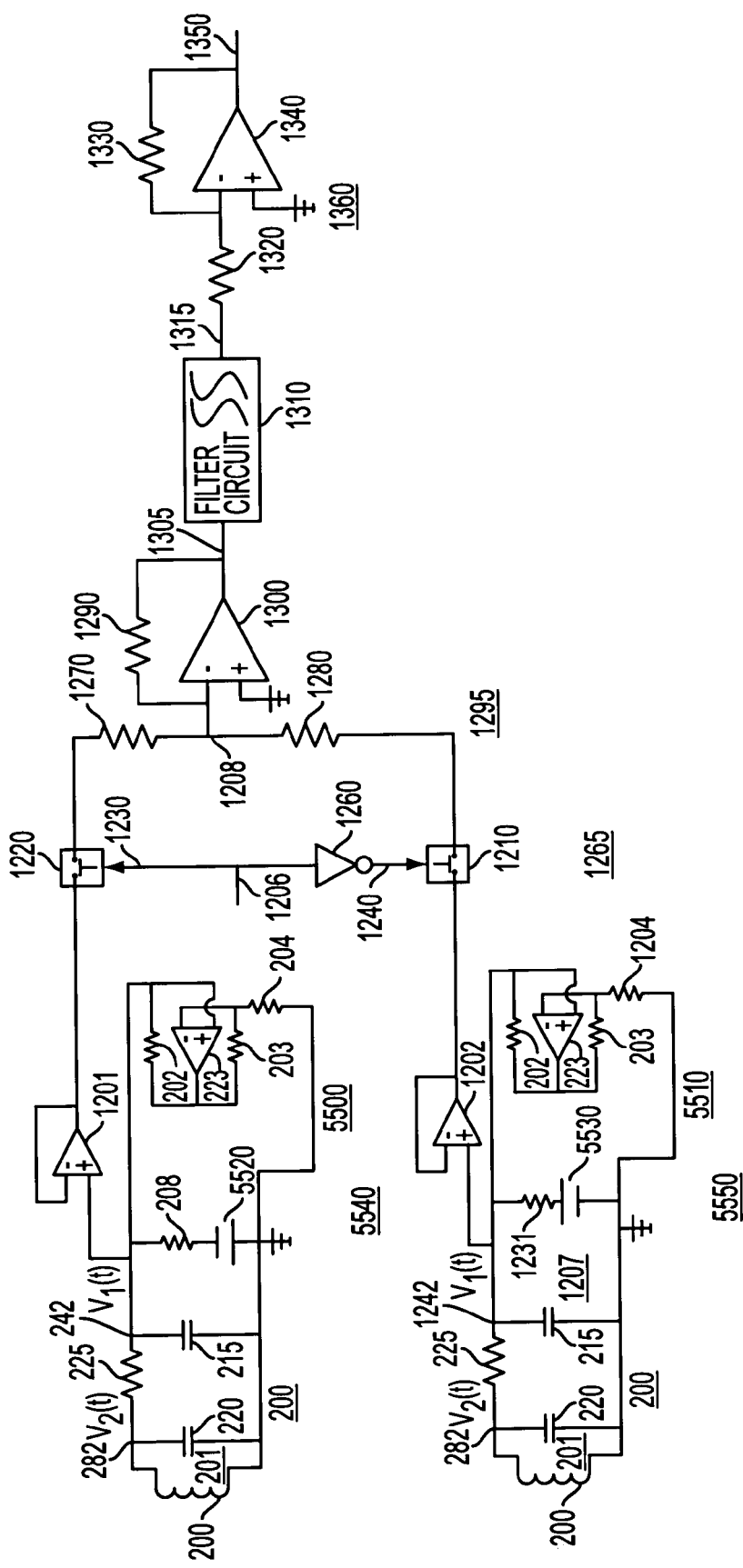
FIG. 44 shows a dual-transmitter system that modulates only the slope Gb.

FIG. 44 shows a dual Gb transmitter. It is similar to the dual transmitter of FIG. 24 except the nonlinear diode subsections have been replaced by Gb-only negative resistance sections 5500 and 5510. The upper Gb curve 5200 is implemented in subsection 5500 and the lower Gb curve 5210 is implemented in subsection 5510 as shown in FIG. 40. The voltage sources 5520 and 5530 represent points 5240 and 5250 on FIG. 40 respectively. The switching subsection 1265, summing amplifier subsection 1295, filter 1310, and attenuator subsection 1360 perform the same function as in FIG. 24 of switching between the upper and lower Gb subsections 5540 and 5550 and buffering the signals 1350 before they are injected into a baseband channel of a transceiver. The transmitter filtering methods and circuit elements described previously are applicable to the Gb-only transmitter embodiments and are incorporated therein.

T. Positive Slope Transmitters and Receivers

According to other embodiments of the present invention, positive-slope circuit elements are substituted for various negative-slope elements described previously. Some of these embodiments are illustrated in FIGS. 46 through 52.

Figure 46:
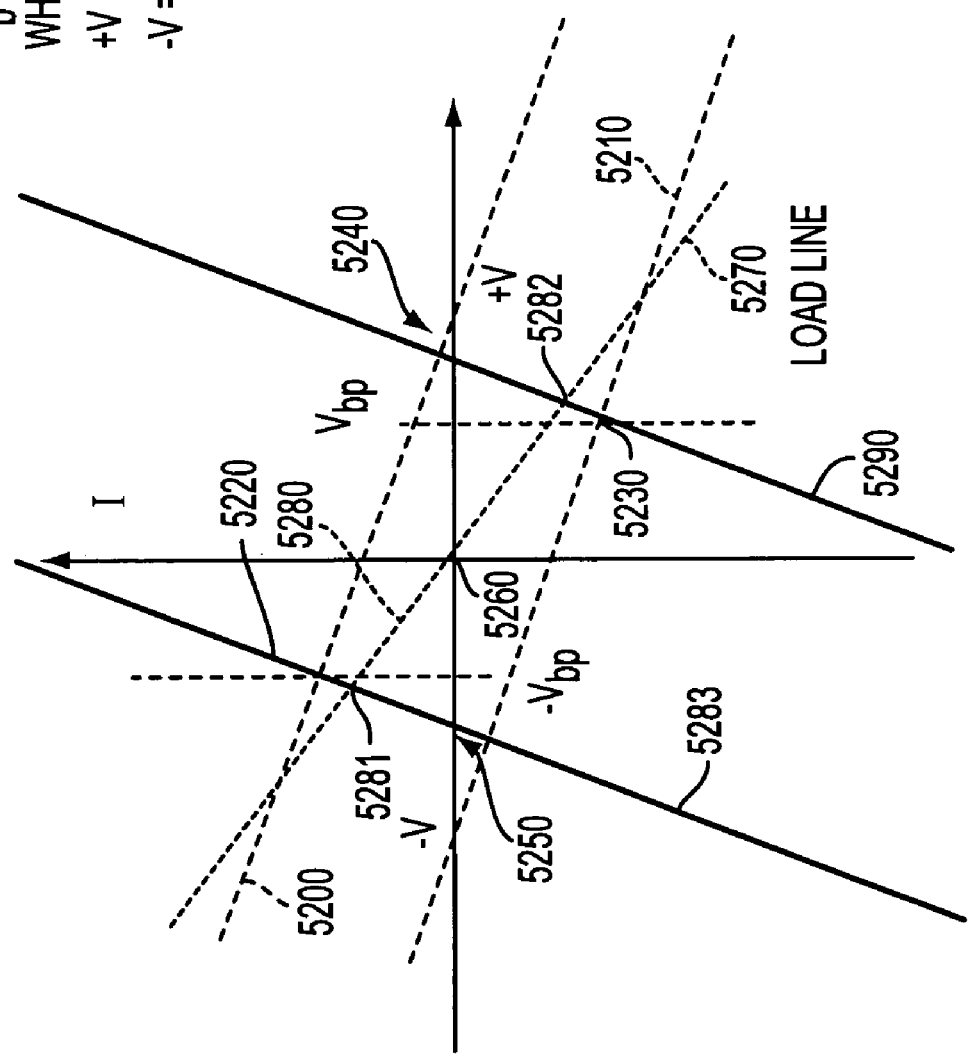
FIG. 46 shows a current-voltage characteristic curve for certain embodiments of the invention that modulate and detect a positive slope.
Figure 47:
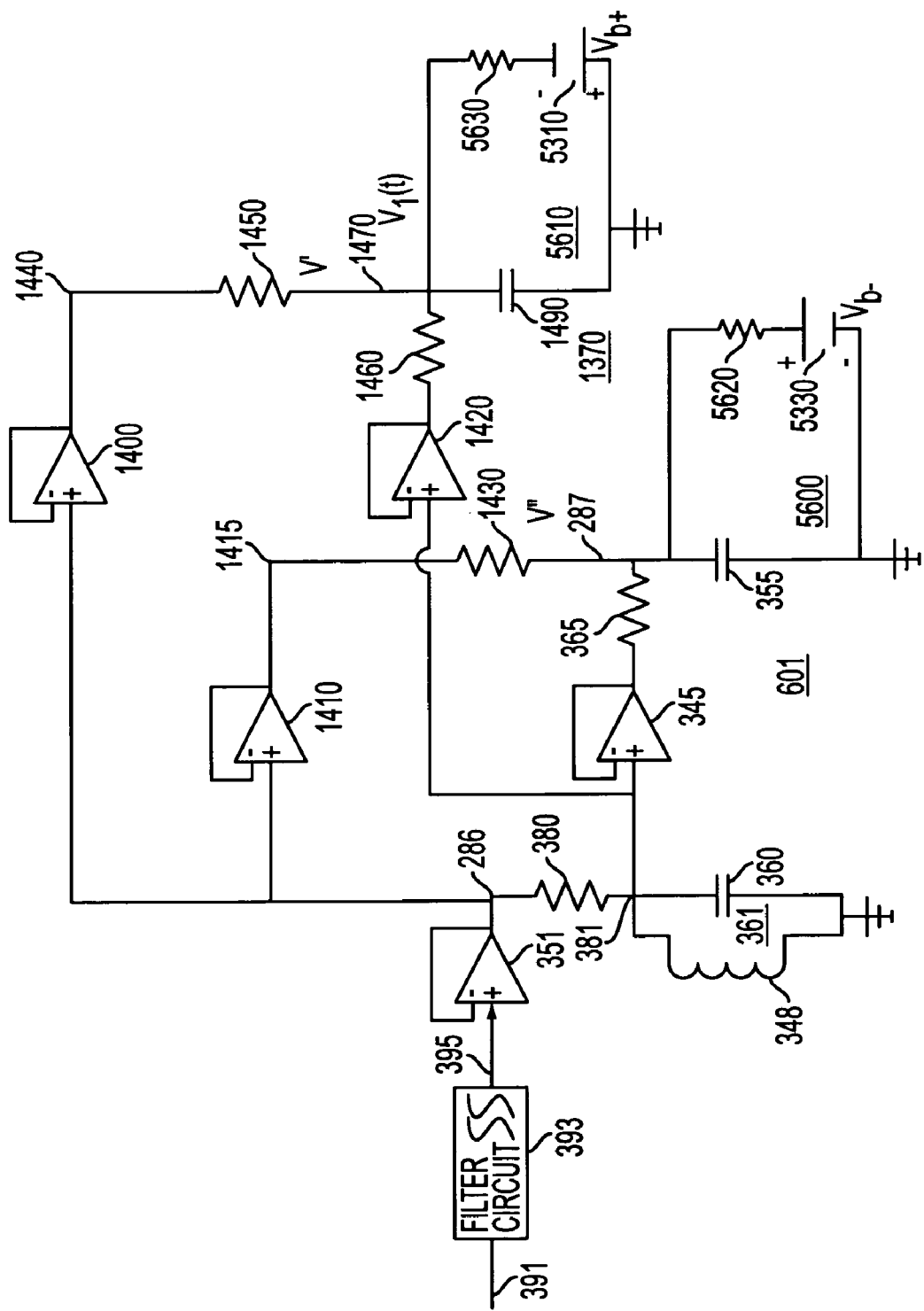
FIG. 47 shows a receiver in which a nonlinear diode is replaced with a Gb+ detector.
Figure 48:
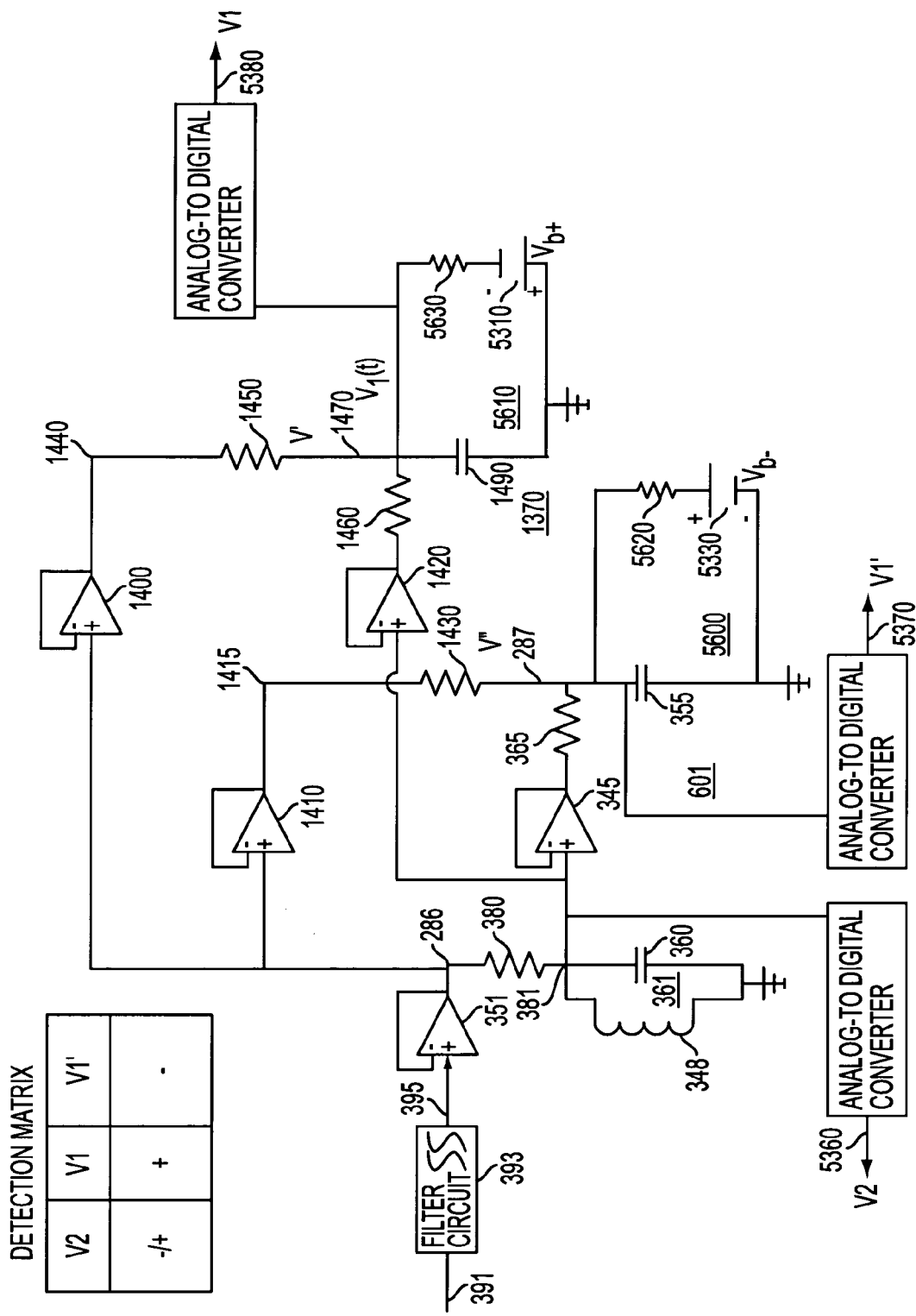
FIG. 48 shows a Gb+ dual receiver design including a sample and hold circuit.

FIG. 46 shows a positive slope (Gb+) current-voltage characteristic curve for resistive elements 5600 and 5610 of FIGS. 47 and 48 (the characteristic curves are lines 5283 and 5290). Both lines have a positive slope as opposed to a negative Gb slope (compare with FIG. 40).

To design positive slope curves as shown in FIG. 46, the techniques discussed for the chaotic systems discussed herein can be applied to determine the maximum and minimum circuit components as shown in FIGS. 19A through 19F. The difference is that the sign of Gb is changed from a negative sign to a positive sign. This shifts the −Gb slopes 5200 and 5210 of FIG. 40 by ninety degrees. The −Gb slopes are rotated about the break points 5220 and 5230. The intersection of the +Gb slope with the load line 5270 defines asymptotically stable points to a specific voltage level applied to the input to the receiver of FIG. 47.

Any incoming voltage in the receiver that is not matched to these voltage points generates a voltage difference across resistors 1450 and 1430 in the embodiments of FIG. 47. In effect, this represents a high "Q" circuit to matched voltage levels established by the intersection of lines 5283 and 5290 with the load line 5270 at the input to the Gb+ receiver of FIG. 47. The voltage cross points with the load line can be changed by moving the breakpoint voltage points 5220 and 5230 in FIG. 46 on the voltage axis thus changing the voltage sources +V 5240 and −V 5250 as shown in FIG. 46. This can be done by changing voltage sources 5310 and 5330 of FIG. 47.

Voltage sources 5310 and 5330 in the receiver of FIG. 47 are changed to match these voltage crossings in accordance with the equations for FIG. 41 above, except the sign of Gb remains positive to create the positive slope Gb+. M-ary voltage levels can be created where elements 1370 and 601 are reproduced $2^N$ times as in the M-ary waveform discussion above. In this case, the discriminating element is the equilibrium point voltage 5281 and 5282 formed by the high "Q" circuit consisting of tank circuit 361 and resistive elements 5600 and 5610. This receiver system, when coupled with the transmitters of FIG. 49 and FIG. 50 and the detector circuits discussed above, operates within 0.25 dB of the Eb/No curve for coherent optimum BPSK. However, it has characteristics that distinguish it from BPSK. First, the receiver does not need a phase circuit. Second, the receiver still works through a filter even with 30% of a bit period time delay. Third, M-ary level operation is possible with the break point voltages adjusted. This system provides a self-synchronizing system while BPSK is not self-synchronizing.

FIG. 48 shows a Gb+ implementation of the dual receiver of FIG. 42 using a positive Gb slope characteristic curve implementation as shown in FIG. 46. The system can be implemented in a similar manner to that of FIG. 42. The analog-to-digital converters perform the same function as they do in FIG. 42 above. This implementation allows a digital system to sample and process the signal in a computer.

Figure 49:
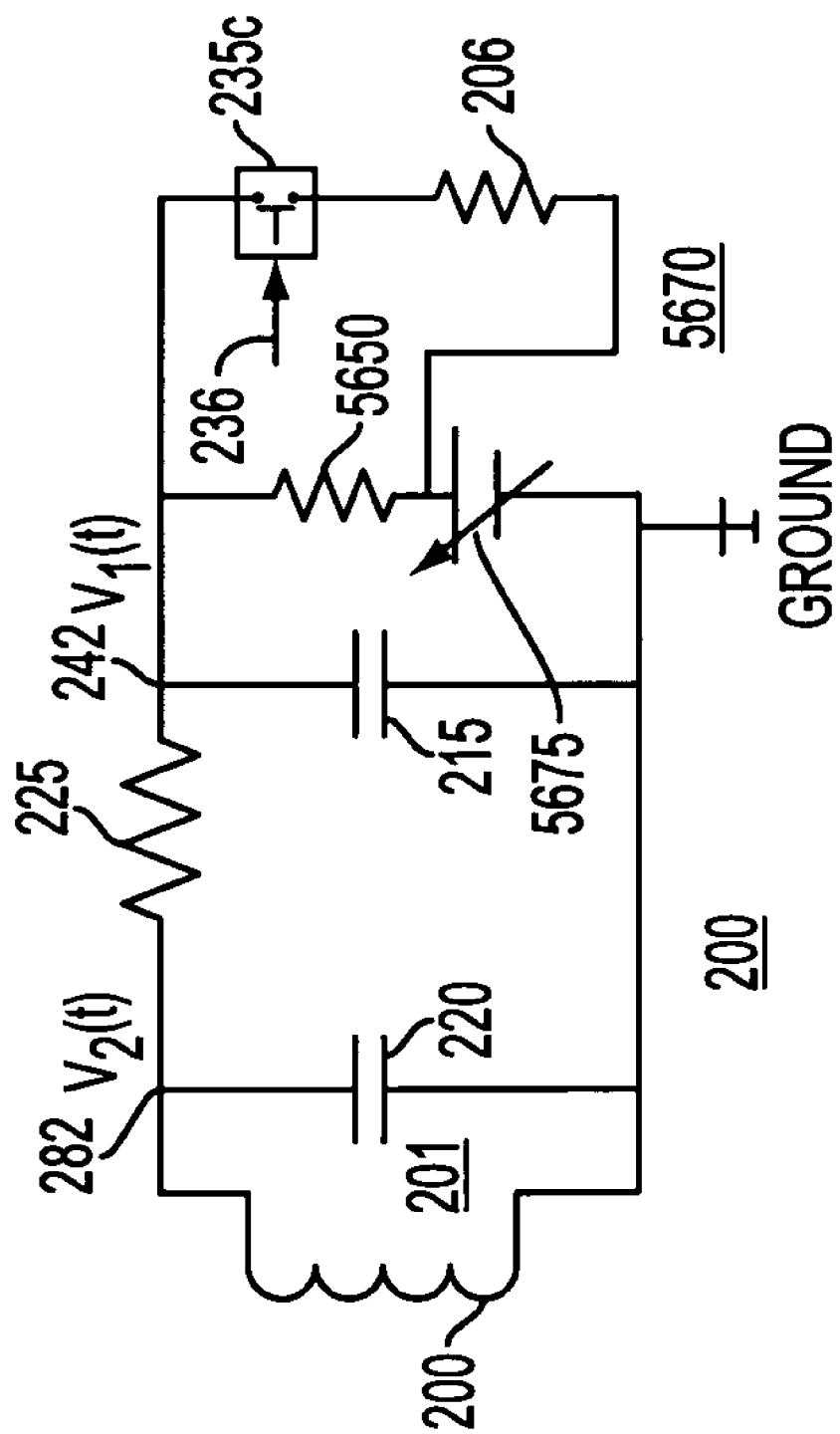
FIG. 49 shows a Gb+ only transmitter using Gb+ slope modulation and voltage modulation.
Figure 51:
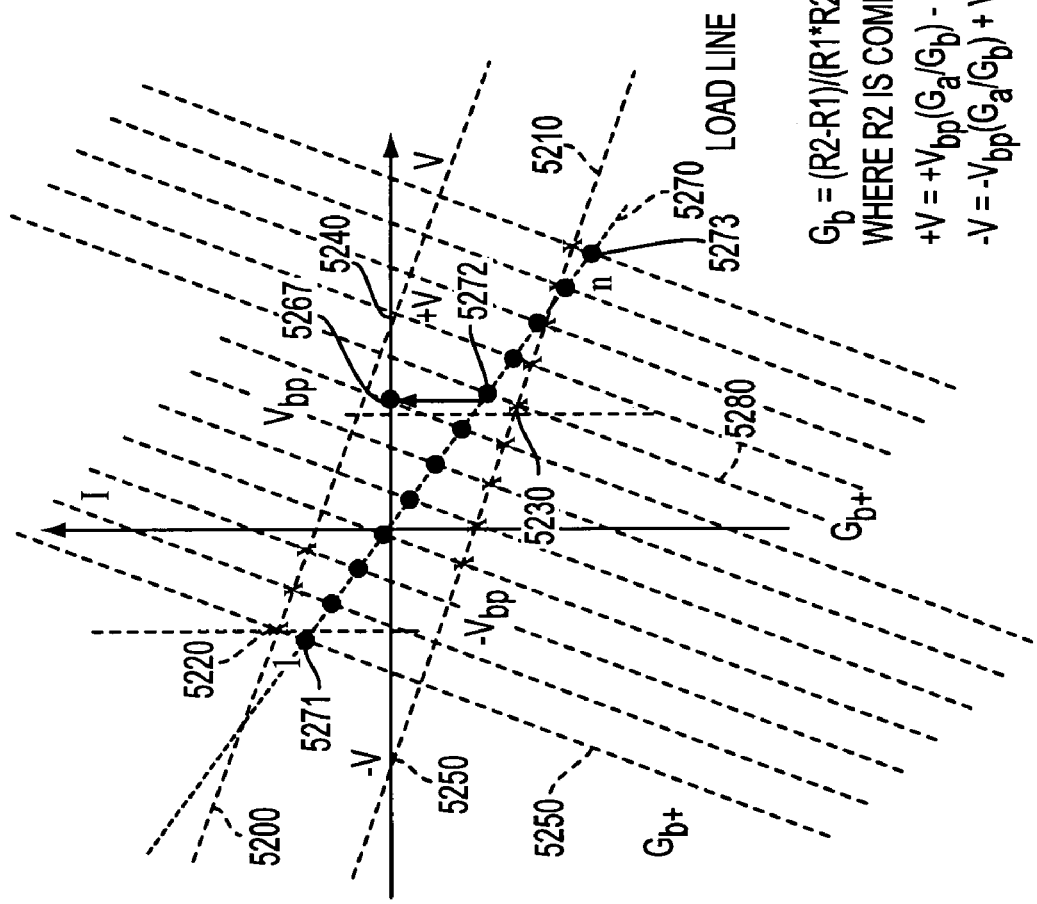
FIG. 51 shows a current-voltage characteristic curve for certain embodiments of the invention.

FIG. 49 shows a positive Gb slope transmitter. This embodiment of a Gb+ transmitter can be modulated by switching resistor 5650 using a switch 235c and a resistor in parallel with resistor 5650. This changes the equilibrium point voltages 5281 and 5282 crossings on the load line of FIG. 46 without changing the breakpoint position points 5220 and 5230. The Gb+ slope rotates about the old breakpoint. Another way to modulate the transmitter is to change the voltage source 5675. This source moves the zero current crossing of the characteristic curve without changing the slope of the Gb+ element as shown in FIG. 51 (i.e., the breakpoint voltage is moved). Also, the new Gb+ line is parallel to the old Gb+ line. At the same time, it changes the Gb+ characteristic curve crossing point of the load line in FIG. 46. This sets new equilibrium points. This allows M-ary equilibrium points to be set as discussed below.

Figure 50:
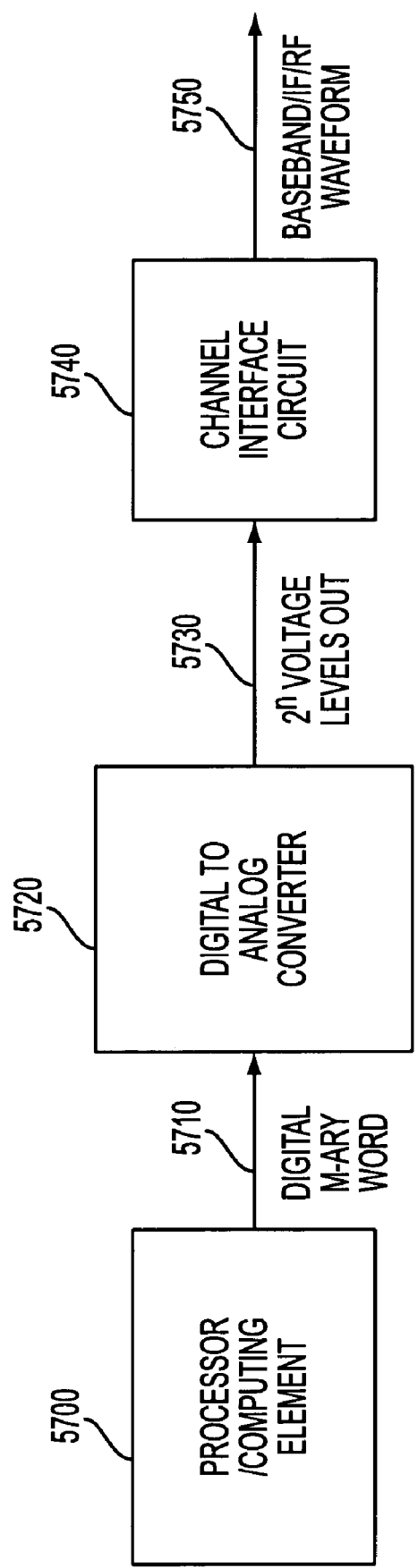
FIG. 50 shows a digital to analog Gb+ only transmitter.

FIG. 50 illustrates the use of a digital-to-analog converter to implement a positive Gb+ slope transmitter. In this embodiment, the Gb+ voltage levels are selected along the load line of FIG. 51 in accordance with the voltage levels that can be generated by the digital to analog converter (D/A) converter. This yields $2^N$ voltage levels where N is the D/A converters' binary level capability. There are currently D/A converters capable of 2 to 16 levels. This embodiment allows levels to be set to less than 0.01 volts or better.

The impulse response can also be applied through the D/A converter to exactly mimic a Gb+ transmitter. This D/A implementation confirms that the system looks like baseband BPSK with a direct current offset at the transmitter. It is at the receiver that the new detector characteristics are manifest. The receiver system becomes a high "Q" matched filter and synchronizes on the equilibrium points in a binary or M-ary implementation. The ability to operate with $2^N$ levels shows that this system is not just a BPSK receiver as discussed above. It has significant new characteristics (i.e., immunity to phase distortion and signal delay).

The receiver of FIG. 47 is designed to have the same voltage crossings where there are $2^N$ receivers for each tank circuit. There can also be multiple tank circuits with multiple loadlines 5270 to change the equilibrium points. The circuit elements can be selected on the basis of various chaotic circuit implementations discussed herein with respect to the first and second-generation systems. The ability to define the equilibrium points allows large numbers of high "Q" circuit elements to be generated. The M-ary word sets can be based on equilibrium voltage levels instead of waveforms as discussed herein. The reaction of the receivers FIGS. 47 and 48 to a change in the incoming voltage level allows the energy per bit to noise per hertz of bandwidth for these non-coherent receivers to come within 0.25 to 0.5 dB of the ideal coherent binary phase shift keying systems. This results in a significant improvement in performance. This modulation technique will be referred to as "chaotic impulse response modulation coding" and the M-ary coding will be referred to as "SAIC amplitude impulse coding." The receiver acts like an impulse response circuit that quickly achieves the equilibrium level of the incoming waveform. In FIG. 50 the computing element 5700 generates an information signal and loads the D/A converter with an M-ary word 5710. The D/A converter 5720 then converts the M-ary word 5710 to an analog output 5730 where there are $2^N$ possible amplitude levels 5730 based on the capability of the D/A converter 5720. The output is interfaced to the channel by the channel interface circuit 5740. Element 5740 is the channel interface circuits discussed in FIGS. 31 and 32. The output goes to the channels designated by 5750.

FIG. 51 shows one implementation of an M-ary SAIC coded signal. There are 1 to $2^N$ level points 5271 through 5273. For example, the Gb+ slopes 5250 and 5283 set equilibrium points 5271 and 5272. Equilibrium point 5272 generates a voltage 5267 on the V-axis. This voltage is the voltage that is transmitted over the radio channel and represents the SAIC coding of the modulating signal that changes the voltage source 5675 in FIG. 49 or is produced by the D/A circuit 5720 in FIG. 50. The load line can also be varied to change the voltage crossings with the Gb+ curves.

Figure 52:
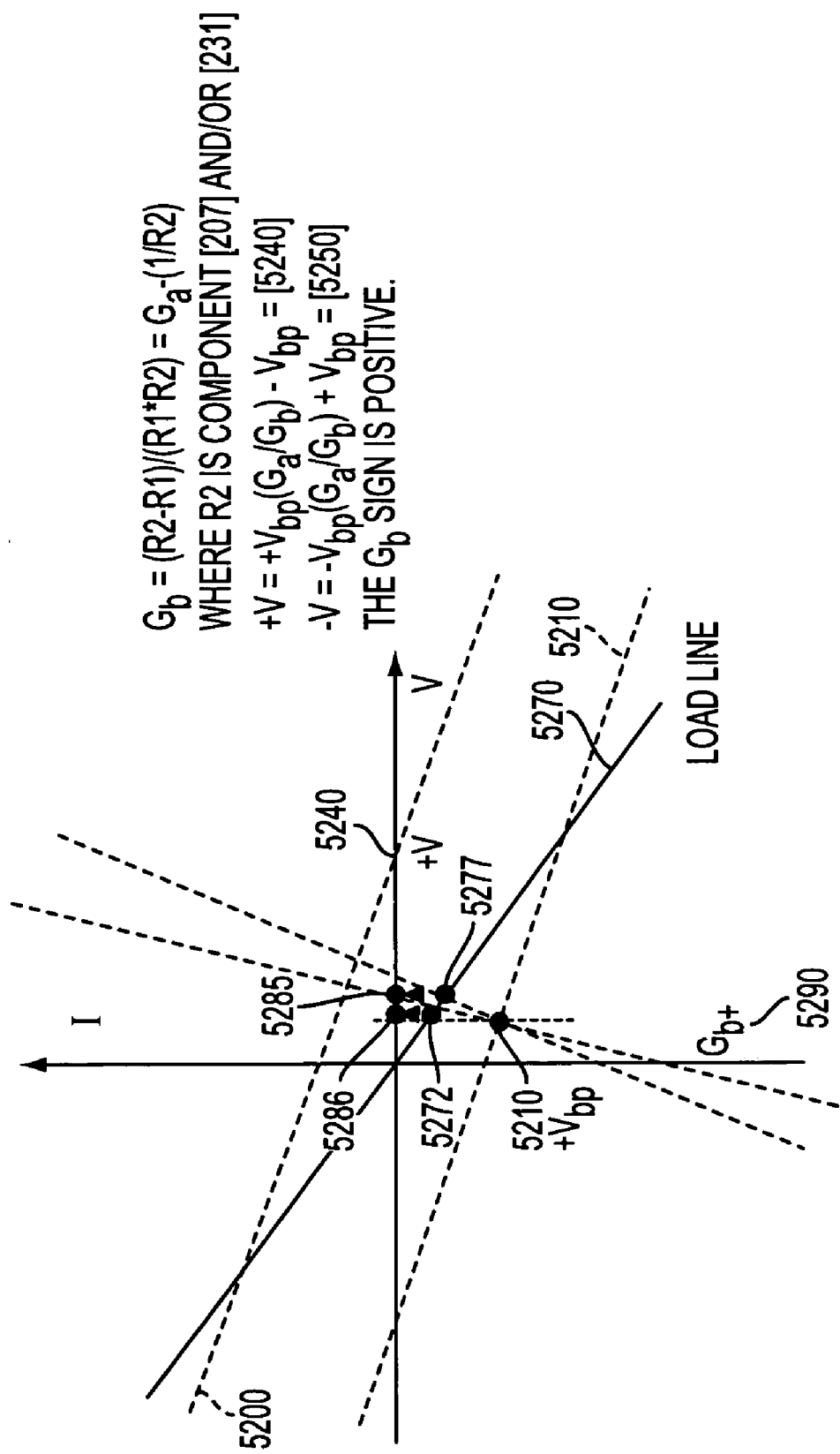
FIG. 52 shows a current-voltage characteristic curve for a positive Gb voltage current M-ary modulation system.

FIG. 52 shows an example of a Gb+ slope being varied to change the equilibrium point; in this case, resistor 5650 FIG. 49 is varied within the chaotic stable range discussed above while breakpoint 5210 remains at the same position. As the Gb+ slope is varied, the equilibrium point is moved from 5272 to 5277 and the V-axis crossing is moved from 5285 to 5286. This M-ary method can be implemented by increasing the number of elements 5610 and 5600 in FIGS. 47 and 48 to $2^N$, one for each level to be detected. The shifting of the Gb+ characteristic curve and the load line is done by moving the breakpoint voltage across the −Gb slope line 5200 and 5210 of FIG. 52.

CONCLUSION

Thus has been described various systems, methods, and apparati for modulating and demodulating chaotic signals. It is apparent that many of the embodiments can be implemented using digital signal processing techniques rather than analog circuits or discrete elements. Consequently, the claims should be interpreted to encompass such circuits and elements without limitation. No claim limitation appearing in the claims of this application should be interpreted to be in "means plus function" format unless it explicitly recites "means for" performing a specified function.

We claim:

1. A method of transmitting information, comprising the steps of:
    (1) generating a chaotic carrier signal that causes a voltage to oscillate chaotically about a first equilibrium point in a current-voltage phase space of a circuit that exhibits a current-voltage characteristic curve on which the first equilibrium point falls; and (2) changing, in response to an information signal, a non-reactive resistive value in the circuit and thereby causing the first equilibrium point to shift to a shifted first equilibrium point in the current-voltage phase space, wherein the circuit exhibits a piecewise-linear current-voltage characteristic comprising three linear segments, two of the linear segments having a first slope in the phase space and the third linear segment having a second slope in the phase space; and wherein step (2) comprises the step of changing either the first slope or the second slope but not both slopes in response to the information signal.

2. A method of transmitting information, comprising the steps of:
(1) generating a chaotic carrier signal that causes a voltage to oscillate chaotically about a first equilibrium point in a current-voltage phase space of a circuit that exhibits a current-voltage characteristic curve on which the first equilibrium point falls; and
(2) changing, in response to an information signal, a non-reactive resistive value in the circuit and thereby causing the first equilibrium point to shift to a shifted first equilibrium point in the current-voltage phase space, wherein the circuit exhibits a piecewise-linear current-voltage characteristic comprising three linear segments, two of the linear segments having a first slope in the phase space and the third linear segment having a second slope in the phase space; and wherein step (2) comprises the step of changing both the first slope and the second slope in response to the information signal.

3. A chaotic transmitting circuit, comprising:
an oscillator circuit;
a resistor coupled to the oscillator circuit;
a chaotic circuit, coupled to the oscillator circuit through the resistor, wherein the chaotic circuit exhibits a current-voltage characteristic shape having a slope that intersects a load line defined by the resistor and provides an equilibrium point about which a voltage oscillates chaotically; and
means for changing the slope exhibited by the chaotic circuit in accordance with an information signal,
wherein the oscillator circuit comprises an inductance and a first capacitance;
wherein the chaotic circuit comprises a second capacitance; and
wherein the values of the first capacitance, the second capacitance, the inductance, and the resistance are selected so as to cause the chaotic transmitting circuit to oscillate in a single-scroll attractor mode.

4. A chaotic transmitting circuit, comprising:
an oscillator circuit;
a resistor coupled to the oscillator circuit;
a chaotic circuit, coupled to the oscillator circuit through the resistor, wherein the chaotic circuit exhibits a current-voltage characteristic shape having a slope that intersects a load line defined by the resistor and provides an equilibrium point about which a voltage oscillates chaotically; and
means for changing the slope exhibited by the chaotic circuit in accordance with an information signal,
wherein the oscillator circuit comprises an inductance and a first capacitance;
wherein the chaotic circuit comprises a second capacitance; and
wherein the values of the first capacitance, the second capacitance, the inductance, and the resistance are selected so as to cause the chaotic transmitting circuit to oscillate in a double-scroll attractor mode.

5. A chaotic transmitting circuit, comprising:
an oscillator circuit;
a resistor coupled to the oscillator circuit;
a chaotic circuit, coupled to the oscillator circuit through the resistor, wherein the chaotic circuit exhibits a current-voltage characteristic shape having a slope that intersects a load line defined by the resistor and provides an equilibrium point about which a voltage oscillates chaotically; and
means for changing the slope exhibited by the chaotic circuit in accordance with an information signal,
wherein the chaotic circuit comprises circuit elements having values selected so as to cause the chaotic transmitting circuit to oscillate about a single-scroll attractor,
wherein the means for switching shifts an equilibrium point of the single-scroll attractor among at least three different positions on the current-voltage characteristic shape, each position corresponding to a different information symbol contained in the information signal.

6. A chaotic transmitting circuit, comprising:
an oscillator circuit;
a resistor coupled to the oscillator circuit;
a chaotic circuit coupled to the oscillator circuit through the resistor, wherein the chaotic circuit exhibits a current-voltage characteristic shape having a slope that intersects a load line defined by the resistor and provides an equilibrium point about which a voltage oscillates chaotically; and
a switch coupled to the chaotic circuit, wherein the switch changes a nonreactive resistive value in the chaotic circuit in accordance with an information signal and thereby causes the first equilibrium point to shift to a shifted first equilibrium point,
wherein the chaotic circuit comprises:
a first op amp coupled across the oscillator circuit through the resistor, wherein the first op amp is further coupled to a first group of three resistors, a first of which is coupled between an output of the first op amp and a positive input terminal thereof; a second of which is coupled between the output of the first op amp and a negative input terminal thereof; and a third of which is coupled between the negative input terminal and a ground; and
a second op amp coupled across the oscillator circuit through the resistor, wherein the second op amp is further coupled to a second group of three resistors, a first of which is coupled between an output of the second op amp and a positive input terminal thereof; a second of which is coupled between the output of the second op amp and a negative input terminal thereof; and a third of which is coupled between the negative input terminal and the ground.

7. The chaotic transmitting circuit of claim 6, wherein the switch changes a non-reactive resistive value between the negative input terminal of the second op amp and the ground.

8. A communication system comprising a transmitter and a receiver, wherein the transmitter comprises
an oscillator circuit;
a resistor coupled to the oscillator circuit;
a chaotic circuit coupled to the oscillator circuit through the resistor, wherein the chaotic circuit causes a voltage to oscillate about a first equilibrium point on a current-voltage characteristic curve of the chaotic circuit element; and a switch coupled to the chaotic circuit element, wherein the switch changes a nonreactive resistive value in the chaotic circuit in accordance with an information signal and thereby causes the first equilibrium point to shift to a shifted first equilibrium point; and wherein the receiver comprises a second oscillator circuit;

a second resistor coupled to the second oscillator circuit;

a second chaotic circuit coupled to the second oscillator circuit through the second resistor; and a detector coupled to the second oscillator circuit and the second chaotic circuit;

wherein the second oscillator circuit and the second chaotic circuit comprise circuit components selected such that they cause the receiver to synchronize with the transmitter when the transmitter transmits according to the first equilibrium point; and wherein the detector detects whether the receiver is synchronized and, in response to detecting synchronization, generates a signal.

9. The system of claim 8, wherein the transmitter and the receiver each oscillate chaotically about a single-scroll attractor.

10. The system of claim 8, wherein the transmitter and the receiver each oscillate chaotically about double-scroll attractors.

11. A chaotic receiver comprising:

an input terminal for receiving a chaotically modulated signal;

an oscillating circuit coupled to the input terminal;

a chaotic circuit comprising a capacitor and a negative resistance element, wherein the chaotic circuit is coupled to the oscillating circuit through a resistor, wherein the chaotic circuit causes a voltage to oscillate about an equilibrium point corresponding to a current-voltage characteristic curve of the negative resistance element;

a synchronizing resistor coupled between the input terminal and the negative resistance element; and a comparator, coupled across the synchronizing resistor, wherein the comparator generates an output signal when a voltage drop across the synchronizing resistor reaches a predetermined level; and wherein the synchronizing resistor has a value that satisfies the relation $Rsync \leq (1/(2f_{LC} \times C_1))$ where $f_{LC}$ is the fundamental frequency of the oscillator circuit, and where $C_1$ is the capacitance of the capacitor.

12. A chaotic receiver comprising:

an input terminal that receives a modulated chaotic signal;

an oscillator coupled to the input terminal;

a chaotic circuit comprising a capacitor and a negative resistance circuit;

a gain control amplifier coupled between the oscillator and the chaotic circuit, wherein the gain control amplifier amplifies a voltage present at the oscillator before it reaches the chaotic circuit;

a synchronizing resistor coupled between the input terminal and the chaotic circuit; and a detection circuit, coupled to the synchronizing resistor, wherein the detection circuit detects periods of synchronization and non-synchronization between the modulated chaotic signal and the chaotic circuit and generates an output corresponding to periods of synchronization and non-synchronization, wherein the gain control amplifier provides an amplification of between 2.4 dB to 3 dB.

13. A chaotic communication system comprising:

a transmitter that generates a chaotic carrier signal modulated in accordance with an information signal; and a receiving system having an input terminal that receives the chaotic carrier signal modulated by the transmitter, wherein the receiving system comprises an oscillator subsystem coupled to the input terminal;

a gain control amplifier coupled to the output of the oscillator subsystem;

a chaotic subsystem coupled to the output of the gain control amplifier;

a synchronizing subsystem coupled to the chaotic subsystem and to the input terminal, which causes the chaotic subsystem to synchronize to the chaotic carrier signal; and a detector coupled to the chaotic subsystem and the input terminal, wherein the detector detects periods of synchronization and non-synchronization;

wherein the gain control amplifier amplifies a signal produced by the oscillator subsystem and drives the chaotic subsystem with the amplified signal, and wherein the chaotic subsystem generates a signal that synchronizes with the modulated chaotic signal when the transmitter transmits a symbol of information.

14. A chaotic transmitter, comprising:

an oscillator;

a resistor coupled to the oscillator;

a chaotic circuit comprising a negative resistance, wherein the chaotic circuit is coupled to the oscillator circuit through the resistor;

an isolation amplifier coupled to the chaotic circuit;

a filter coupled to the output of the isolation amplifier that limits a frequency bandwidth present at the chaotic circuit; and means for modulating a circuit element of the chaotic transmitter in accordance with an information signal, wherein the means for modulating comprises a switch that switches a reactive component in the oscillator, thereby changing a strange attractor trajectory generated by the transmitter.

15. A chaotic transmitter, comprising:

an oscillator;

a resistor coupled to the oscillator;

a chaotic circuit comprising a negative resistance, wherein the chaotic circuit is coupled to the oscillator circuit through the resistor;

an isolation amplifier coupled to the chaotic circuit;

a filter coupled to the output of the isolation amplifier that limits a frequency bandwidth present at the chaotic circuit; and means for modulating a circuit element of the chaotic transmitter in accordance with an information signal, wherein the means for modulating comprises a switch that switches a reactive component in the chaotic circuit, thereby changing a strange attractor trajectory generated by the transmitter.

16. A chaotic transmitter, comprising:

an oscillator;

a resistor coupled to the oscillator;

a chaotic circuit comprising a negative resistance, wherein the chaotic circuit is coupled to the oscillator circuit through the resistor;

an isolation amplifier coupled to the chaotic circuit;
a filter coupled to the output of the isolation amplifier that limits a frequency bandwidth present at the chaotic circuit; and
means for modulating a circuit element of the chaotic transmitter in accordance with an information signal,
wherein the means for modulating comprises a switch that changes a non-reactive resistive value in the chaotic circuit, thereby changing a current-voltage characteristic of the negative resistive element.

17. The chaotic transmitter of claim 16, wherein the transmitter oscillates about a single-scroll attractor.

18. The chaotic transmitter of claim 16, wherein the transmitter oscillates about a double-scroll attractor.

19. A chaotic receiver, comprising:
an input terminal that receives a modulated chaotic signal;
a first filter, coupled to the input terminal, which filters the modulated chaotic signal and produces a filtered modulated chaotic signal;
an oscillator coupled to an output of the first filter;
a chaotic circuit comprising a negative resistor, wherein the chaotic circuit is coupled to the oscillator;
a synchronizing circuit coupled between the first filter and the chaotic circuit, wherein the synchronizing circuit generates a voltage difference in response to an out-of-synchronization condition between the filtered modulated chaotic signal and the chaotic circuit;
a second filter, coupled to a first portion of the synchronizing circuit, which filters a buffered version of the filtered modulated chaotic signal;
a third filter, coupled to a second portion of the synchronizing circuit, which filters a signal generated by the chaotic circuit; and
a detection circuit, coupled to the second and third filters, wherein the detection circuit detects periods of synchronization and non-synchronization between the modulated chaotic signal and the chaotic circuit and generates an output corresponding to periods of synchronization and non-synchronization.

20. A chaotic receiver, comprising:
an input terminal that receives a modulated chaotic signal;
a first filter, coupled to the input terminal, which filters the modulated chaotic signal and produces a filtered modulated chaotic signal;
an oscillator coupled to the input terminal;
a chaotic circuit comprising a circuit element that exhibits a nonlinear current-voltage characteristic, wherein the chaotic circuit is coupled to the oscillator;
a synchronizing circuit coupled between the first filter and the chaotic circuit, wherein the synchronizing circuit generates a voltage difference in response to an out-of-synchronization condition between the filtered modulated chaotic signal and the chaotic circuit;
a second filter, coupled to a first portion of the synchronizing circuit, which filters a buffered version of the filtered modulated chaotic signal;
a third filter, coupled to a second portion of the synchronizing circuit, which filters a signal generated by the chaotic circuit; and
a detection circuit, coupled to the second and third filters, wherein the detection circuit detects periods of synchronization and non-synchronization between the modulated chaotic signal and the chaotic circuit and generates an output corresponding to periods of synchronization and non-synchronization.

21. A chaotic receiver, comprising:
an input terminal that receives a modulated chaotic signal;
a first filter, coupled to the input terminal, which filters the modulated chaotic signal and produces a filtered modulated chaotic signal;
an oscillating circuit coupled to the first filter;
a chaotic circuit comprising a circuit element that exhibits a nonlinear current-voltage characteristic, wherein the chaotic circuit is coupled to the oscillating circuit through a second filter;
a third filter, coupled to the output of the first filter, which further filters the output of the first filter;
a synchronizing circuit coupled between the third filter and the chaotic circuit, wherein the synchronizing circuit generates a voltage difference in response to an out-of-synchronization condition between a signal from the third filter and the chaotic circuit;
a fourth filter, coupled to a first portion of the synchronizing circuit, which filters a buffered version of the filtered modulated chaotic signal;
a fifth filter, coupled to a second portion of the synchronizing circuit, which filters a signal generated by the chaotic circuit; and
a detection circuit, coupled to the fourth and fifth filters, wherein the detection circuit detects periods of synchronization and non-synchronization between the modulated chaotic signal and the chaotic circuit and generates an output corresponding to periods of synchronization and non-synchronization.

22. A chaotic telephone device comprising:
a chaotic transmitter that receives a first information signal and generates in response thereto a first chaotic trajectory shifted signal modulated in accordance with the first information signal;
a chaotic receiver that receives a second chaotic trajectory shifted signal modulated in accordance with a second information signal and generates in response thereto a demodulated version of the second chaotic trajectory shifted signal; and
an interface circuit that couples the chaotic transmitter and chaotic receiver to a radio-frequency telephone circuit, wherein the radio-frequency telephone circuit communicates with a ground-based telephone network through one or more radio frequency transmission stations,
wherein the chaotic transmitter modulates using a first set of strange attractor parameters that match a set of strange attractor parameters in a corresponding receiver associated with the one or more radio frequency transmission stations; and wherein the chaotic receiver demodulates using a second set of strange attractor parameters in a corresponding transmitter associated with the one or more radio frequency transmission stations.

23. A chaotic telephone device comprising:
a chaotic transmitter that receives a first information signal and generates in response thereto a first chaotic trajectory shifted signal modulated in accordance with the first information signal;
a chaotic receiver that receives a second chaotic trajectory shifted signal modulated in accordance with a second information signal and generates in response thereto a demodulated version of the second chaotic trajectory shifted signal; and
an interface circuit that couples the chaotic transmitter and chaotic receiver to a radio-frequency telephone circuit, wherein the radio-frequency telephone circuit communicates with a ground-based telephone network through one or more radio frequency transmission stations, wherein the chaotic receiver comprises:
- an oscillator;
- a chaotic circuit comprising a circuit element that exhibits a nonlinear current-voltage characteristic; and
- a gain control amplifier coupled between the oscillator and the chaotic circuit, wherein the gain control amplifier amplifies a voltage present at the oscillator before it reaches the chaotic circuit.

24. A chaotic telephone device comprising:
a chaotic transmitter that receives a first information signal and generates in response thereto a first chaotic trajectory shifted signal modulated in accordance with the first information signal;
a chaotic receiver that receives a second chaotic trajectory shifted signal modulated in accordance with a second information signal and generates in response thereto a demodulated version of the second chaotic trajectory shifted signal; and an interface circuit that couples the chaotic transmitter and chaotic receiver to a radio-frequency telephone circuit, wherein the radio-frequency telephone circuit communicates with a ground-based telephone network through one or more radio frequency transmission stations, wherein the chaotic receiver further comprises a synchronizing resistor coupled between an input of the chaotic receiver and the chaotic circuit; and
further comprising a detection circuit, coupled to the synchronizing resistor, wherein the detection circuit detects periods of synchronization and non-synchronization between the second modulated chaotic signal and the chaotic circuit and generates an output corresponding to periods of synchronization and non-synchronization.

25. A chaotic telephone device comprising:
a chaotic transmitter that receives a first information signal and generates in response thereto a first chaotic trajectory shifted signal modulated in accordance with the first information signal;
a chaotic receiver that receives a second chaotic trajectory shifted signal modulated in accordance with a second information signal and generates in response thereto a demodulated version of the second chaotic trajectory shifted signal; and
an interface circuit that couples the chaotic transmitter and chaotic receiver to a radio-frequency telephone circuit, wherein the radio-frequency telephone circuit communicates with a ground-based telephone network through one or more radio frequency transmission stations, wherein the chaotic transmitter comprises:
- an oscillator circuit;
- a resistor coupled to the oscillator circuit;
- a chaotic circuit comprising a circuit element that exhibits a nonlinear current-voltage characteristic, wherein the chaotic circuit is coupled to the oscillator circuit through the resistor;
- an isolation amplifier coupled to the chaotic circuit;
- a filter coupled to the output of the isolation amplifier that limits a frequency bandwidth present at the chaotic circuit; and
- means for modulating a circuit element of the chaotic transmitter in accordance with the first information signal.

26. A method of communicating between a portable telephone device and a base station, comprising the steps of:
(1) generating an information signal at the portable telephone device;
(2) modulating a chaotic carrier signal with the information signal using a chaotic trajectory shifting technique;
(3) transmitting the chaotic trajectory shift-keyed signal generated in step (2) to the base station; and
(4) in the base station, demodulating the transmitted signal to recover the information signal,
wherein step (2) comprises the step of using a nonlinear circuit element that exhibits a piecewise linear current-voltage characteristic comprising three linear segments, two of the segments having a first slope in the phase space and the third segment having a second slope in the phase space, and where step (2) comprises the step of changing either the first slope or the second slope but not both slopes in response to the information signal.

27. A chaotic receiver, comprising:
an input terminal that receives a modulated chaotic signal;
an oscillator circuit coupled to the input terminal;
a first chaotic circuit coupled to the oscillator circuit and tuned to a first strange attractor;
a second chaotic circuit coupled to the oscillator circuit and tuned to a second strange attractor; and
means for detecting a difference between the modulated chaotic signal received at the input terminal and respective signals generated by the first and second chaotic circuits,
further comprising a third chaotic circuit coupled to the oscillator circuit and tuned to a third strange attractor; wherein the means for detecting a difference further detects a difference between the modulated chaotic signal received at the input terminal and a signal generated by the third chaotic circuit.

28. A method of demodulating a signal modulated according to a chaotic trajectory shift-keying technique, comprising the steps of:
(1) receiving a modulated chaotic signal modulated according to a chaotic trajectory shift-keying technique;
(2) using the modulated chaotic signal to drive an oscillator;
(3) using the modulated chaotic signal and an output of the oscillator to drive a first chaotic circuit tuned to a first strange attractor;
(4) using the modulated chaotic signal and an output of the oscillator circuit to drive a second chaotic circuit tuned to a second strange attractor; and
(5) detecting a difference between the modulated chaotic signal and respective signals generated by the first and second chaotic circuits,
further comprising the step of using the modulated chaotic signal and an output of the oscillator circuit to drive a third chaotic circuit tuned to a third strange attractor, and wherein step (5) comprises the step of detecting a difference between the modulated chaotic signal and a signal generated by the third chaotic circuit.

29. A chaotic receiver, comprising:
an input terminal that receives a modulated chaotic signal;
an oscillator circuit coupled to the input terminal;
a first chaotic circuit coupled to the oscillator circuit and tuned to a first strange attractor;
a second chaotic circuit coupled to the oscillator circuit and tuned to a second strange attractor; and means for detecting a difference between the modulated chaotic signal received at the input terminal and respective signals generated by the first and second chaotic circuits, wherein the means for detecting comprises:
a plurality of synchronizing resistors each of which generates a voltage drop in response to a difference between the modulated chaotic signal and a corresponding one of the first and second chaotic circuits;
means for buffering the plurality of synchronizing resistors and generating buffered outputs therefrom;
means for attenuating the buffered outputs; and
means for subtracting the buffered outputs to generate a detected signal.

30. A method of demodulating a signal modulated according to a chaotic trajectory shift-keying technique, comprising the steps of:
(1) receiving a modulated chaotic signal modulated according to a chaotic trajectory shift-keying technique;
(2) using the modulated chaotic signal to drive an oscillator;
(3) using the modulated chaotic signal and an output of the oscillator to drive a first chaotic circuit tuned to a first strange attractor;
(4) using the modulated chaotic signal and an output of the oscillator circuit to drive a second chaotic circuit tuned to a second strange attractor; and
(5) detecting a difference between the modulated chaotic signal and respective signals generated by the first and second chaotic circuits,
wherein step (5) comprises the steps of:
(a) generating a voltage drop in response to a difference between the modulated chaotic signal and a corresponding one of the first and second chaotic circuits;
(b) buffering the plurality of synchronizing resistors and generating buffered outputs therefrom;
(c) attenuating the buffered outputs; and
(d) subtracting the buffered outputs to generate a detected signal.

31. A chaotic receiver, comprising:
an input terminal that receives a modulated chaotic signal;
an oscillator circuit coupled to the input terminal;
a first chaotic circuit coupled to the oscillator circuit and tuned to a first strange attractor;
a second chaotic circuit coupled to the oscillator circuit and tuned to a second strange attractor; and
means for detecting a difference between the modulated chaotic signal received at the input terminal and respective signals generated by the first and second chaotic circuits,
wherein the means for detecting a difference comprises at least two synchronizing resistors, each respectively coupled between the oscillator and one of the first and second chaotic circuits, the chaotic receiver further comprising:
first and second subtractor circuits, each coupled across a corresponding one of the two synchronizing resistors;
a third subtractor circuit, coupled to the first and second subtractor circuits, wherein the third subtractor circuit generates a difference signal from the first and second subtractor circuits;
an absolute value circuit, coupled to the third subtractor circuit, which generates an absolute value signal from the third subtractor circuit; and
a squaring circuit that generates a squared version of the absolute value signal.

32. A method of demodulating a signal modulated according to a chaotic trajectory shift-keying technique, comprising the steps of:
(1) receiving a modulated chaotic signal modulated according to a chaotic trajectory shift-keying technique;
(2) using the modulated chaotic signal to drive an oscillator;
(3) using the modulated chaotic signal and an output of the oscillator to drive a first chaotic circuit tuned to a first strange attractor;
(4) using the modulated chaotic signal and an output of the oscillator circuit to drive a second chaotic circuit tuned to a second strange attractor; and
(5) detecting a difference between the modulated chaotic signal and respective signals generated by the first and second chaotic circuits,
wherein step (5) comprises the step of generating a voltage drop in response to a difference between the modulated chaotic signal and a corresponding one of the first and second chaotic circuits, the method further comprising the steps of:
(6) generating first and second difference signals corresponding to first and second voltage drops from the first and second chaotic circuits;
(7) subtracting the first and second difference signals and generating a third difference signal therefrom;
(9) generating an absolute value signal from the third difference signal; and
(10) generating a squared version of the absolute value signal.

33. A chaotic receiver, comprising:
an input terminal that receives a modulated chaotic signal;
an oscillator circuit coupled to the input terminal;
a first chaotic circuit coupled to the oscillator circuit and tuned to a first strange attractor;
a second chaotic circuit coupled to the oscillator circuit and tuned to a second strange attractor; and
means for detecting a difference between the modulated chaotic signal received at the input terminal and respective signals generated by the first and second chaotic circuits,
wherein the means for detecting a difference comprises at least two synchronizing resistors, each respectively coupled between the oscillator and one of the first and second chaotic circuits, the chaotic receiver further comprising:
first and second subtractor circuits, each coupled across a corresponding one of the two synchronizing resistors;
first and second absolute value circuits, each coupled to a corresponding one of the first and second subtractor circuits;
a third subtractor circuit, coupled to the first and second absolute value circuits, which generates a subtracted absolute value signal; and
a squaring circuit that generates a squared version of the subtracted absolute value signal.

34. A method of demodulating a signal modulated according to a chaotic trajectory shift-keying technique, comprising the steps of:
(1) receiving a modulated chaotic signal modulated according to a chaotic trajectory shift-keying technique;

(2) using the modulated chaotic signal to drive an oscillator;

(3) using the modulated chaotic signal and an output of the oscillator to drive a first chaotic circuit tuned to a first strange attractor;

(4) using the modulated chaotic signal and an output of the oscillator circuit to drive a second chaotic circuit tuned to a second strange attractor; and (5) detecting a difference between the modulated chaotic signal and respective signals generated by the first and second chaotic circuits, wherein step (5) comprises the step of generating a voltage drop in response to a difference between the modulated chaotic signal and a corresponding one of the first and second chaotic circuits, the method further comprising the steps of:

(6) generating first and second difference signals corresponding to first and second voltage drops from the first and second chaotic circuits;

(7) generating first and second absolute value signals from the first and second difference signals;

(8) subtracting the first and second first and second absolute value signals and generating therefrom a subtracted absolute value signal; and (9) generating a squared version of the subtracted absolute value signal.

35. A method of transmitting information, comprising the steps of:

(1) generating a chaotic carrier signal that causes a voltage to oscillate chaotically about a first equilibrium point in a current-voltage phase space of a circuit that exhibits a current-voltage characteristic curve on which the first equilibrium point falls; and (2) changing, in response to an information signal, a non-reactive resistive value in the circuit and thereby causing the first equilibrium point to shift to a shifted first equilibrium point in the current-voltage phase space, wherein step (2) comprises the step of changing the non-reactive resistive value to one of a plurality of uniquely coded vectors within a chaotic operating region which, when received at a matched receiver, will generate a corresponding unique code.

36. A chaotic transmitting circuit, comprising:

an oscillator circuit;

a resistor coupled to the oscillator circuit;

a chaotic circuit, coupled to the oscillator circuit through the resistor, wherein the chaotic circuit exhibits a current-voltage characteristic shape having a slope that intersects a load line defined by the resistor and provides an equilibrium point about which a voltage oscillates chaotically; and means for changing the slope exhibited by the chaotic circuit in accordance with an information signal, wherein the means for changing sets the non-reactive resistive value to one of a plurality of uniquely coded vectors within a chaotic operating region which, when received at a matched receiver, will generate a corresponding unique code.

37. A chaotic transmitting circuit, comprising:

an oscillator circuit;

a resistor coupled to the oscillator circuit;

a chaotic circuit coupled to the oscillator circuit through the resistor, wherein the chaotic circuit exhibits a current-voltage characteristic shape having a slope that intersects a load line defined by the resistor and provides an equilibrium point about which a voltage oscillates chaotically; and a switch coupled to the chaotic circuit, wherein the switch chances a nonreactive resistive value in the chaotic circuit in accordance with an information signal and thereby causes the first equilibrium point to shift to a shifted first equilibrium point, wherein the switch sets the non-reactive resistive value to one of a plurality of uniquely coded vectors within a chaotic operating region which, when received at a matched receiver, will generate a corresponding unique code.

38. A method of transmitting information, comprising the steps of:

(1) in response to receiving a time-varying N-bit code representing a unit of information, selecting a corresponding one of a Plurality of $2^N$ transmitters each of which generates a chaotic strange attractor signal that is distinct from others in the Plurality of $2^N$ transmitters;

(2) transmitting through a communications channel the chaotic strange attractor signal selected in step (1);

(3) receiving the chaotic strange attractor signal transmitted in step (2);

(4) matching the signal received in step (3) to one of a plurality of $2^N$ receivers each of which is matched to a corresponding one of the plurality of $2^N$ transmitters; and (5) on the basis of the receiver matched in step (4), recovering the N-bit code received in step (1).

39. A receiving system comprising:

a receiving circuit that receives a time-varying signal comprising a plurality of discrete portions of each of a plurality of chaotic strange attractor signals;

a plurality of $2^N$ receivers each of which is tuned to one of a corresponding number of $2^N$ transmitters;

a plurality of detectors each of which detects whether a corresponding one of the plurality of $2^N$ receivers has received a matching signal; and a switching circuit which, in response to one of the detectors detecting a corresponding match, generates an N-bit code representing a transmitted unit of information.

40. A system comprising:

a transmitting system capable of transmitting N bits of information, comprising:

a plurality of $2^N$ transmitters each of which generates a chaotic strange attractor signal that is distinct from others in the plurality of $2^N$ transmitters;

a switch which, in response to receiving a time-varying N-bit code representing a unit of information, selects a corresponding one of the Plurality of $2^N$ transmitters; and a transmission circuit that transmits the selected chaotic strange attractor signal across a transmission channel, and a receiving system, comprising:

a receiving circuit that receives a time-varying signal comprising a plurality of discrete portions of each of a plurality of chaotic strange attractor signals;

a plurality of $2^N$ receivers each of which is tuned to one of the $2^N$ transmitters;

a plurality of detectors each of which detects whether a corresponding one of the plurality of $2^N$ receivers has received a matching signal; and a switching circuit which, in response to one of the detectors detecting a corresponding match, generates an N-bit code representing a transmitted unit of information.

41. A chaotic receiver comprising:

an input terminal that receives a modulated chaotic signal;

an oscillator circuit coupled to the input terminal and driven by the modulated chaotic signal;

a chaotic circuit comprising an upper slope circuit that implements a first current-voltage function in an upper quadrant of a current-voltage response plane and a lower slope circuit that implements a second current-voltage function in a lower quadrant of the current-voltage response plane, wherein the first and second current-voltage functions have a different voltage offset, and wherein the upper and lower slope circuits cooperate with the oscillator circuit to generate a local chaotic signal;

a synchronizing circuit, coupled to the oscillator circuit and the chaotic circuit, wherein the synchronizing circuit detects differences between the modulated chaotic signal at the input terminal and the local chaotic signal;

a detector coupled to the synchronizing circuit which detects periods of synchronization and non-synchronization;

a first analog-to-digital converter coupled to the oscillator circuit;

a second analog-to-digital converter coupled to the upper slope circuit; and a third analog-to-digital converter coupled to the lower slope circuit;

wherein the detector detects periods of synchronization and non-synchronization with respect to the output of each of the first, second, and third analog-to-digital converters.

42. A chaotic receiver comprising:

an input terminal that receives a modulated chaotic signal;

an oscillator circuit coupled to the input terminal and driven by the modulated chaotic signal;

a chaotic circuit comprising an upper slope circuit that implements a first current-voltage function in an upper quadrant of a current-voltage response plane and a lower slope circuit that implements a second current-voltage function in a lower quadrant of the current-voltage response plane, wherein the first and second current-voltage functions have a different voltage offset, and wherein the upper and lower slope circuits cooperate with the oscillator circuit to generate a local chaotic signal;

a synchronizing circuit, coupled to the oscillator circuit and the chaotic circuit, wherein the synchronizing circuit detects differences between the modulated chaotic signal at the input terminal and the local chaotic signal;

a detector coupled to the synchronizing circuit which detects periods of synchronization and non-synchronization;

a first filter, coupled between the input terminal and the oscillator circuit, wherein the first filter filters the modulated chaotic signal and produces a filtered modulated chaotic signal;

a second filter, coupled to a first portion of the synchronizing circuit, wherein the second filter filters a buffered version of the filtered modulated chaotic signal; and a third filter, coupled to a second portion of the synchronizing circuit, wherein the third filter filters a signal generated by the chaotic circuit; and wherein the detector is coupled to respective outputs of the second and third filters.

43. A chaotic receiver comprising:

an input terminal that receives a modulated chaotic signal;

an oscillator circuit coupled to the input terminal and driven by the modulated chaotic signal;

a chaotic circuit comprising an upper slope circuit that implements a first current-voltage function in an upper quadrant of a current-voltage response plane and a lower slope circuit that implements a second current-voltage function in a lower quadrant of the current-voltage response plane, wherein the first and second current-voltage functions have a different voltage offset, and wherein the upper and lower slope circuits cooperate with the oscillator circuit to generate a local chaotic signal;

a synchronizing circuit, coupled to the oscillator circuit and the chaotic circuit, wherein the synchronizing circuit detects differences between the modulated chaotic signal at the input terminal and the local chaotic signal;

a detector coupled to the synchronizing circuit which detects Periods of synchronization and non-synchronization;

a first filter, coupled between the input terminal and the synchronizing circuit, wherein the first filter filters the modulated chaotic signal and produces a filtered modulated chaotic signal;

a second filter, coupled to a first portion of the synchronizing circuit, wherein the second filter filters a buffered version of the filtered modulated chaotic signal; and a third filter, coupled to a second portion of the synchronizing circuit, wherein the third filter filters a signal generated by the chaotic circuit; and wherein the detector is coupled to respective outputs of the second and third filters.

44. A chaotic receiver comprising:

an input terminal that receives a modulated chaotic signal;

an oscillator circuit coupled to the input terminal and driven by the modulated chaotic signal;

a chaotic circuit comprising an upper slope circuit that implements a first current-voltage function in an upper quadrant of a current-voltage response plane and a lower slope circuit that implements a second current-voltage function in a lower quadrant of the current-voltage response plane, wherein the first and second current-voltage functions have a different voltage offset, and wherein the upper and lower slope circuits cooperate with the oscillator circuit to generate a local chaotic signal;

a synchronizing circuit, coupled to the oscillator circuit and the chaotic circuit, wherein the synchronizing circuit detects differences between the modulated chaotic signal at the input terminal and the local chaotic signal;

a detector coupled to the synchronizing circuit which detects periods of synchronization and non-synchronization;

a first filter, coupled between the input terminal and the oscillator circuit, wherein the first filter filters the modulated chaotic signal and produces a filtered modulated chaotic signal;

a second filter coupled between the chaotic circuit and the oscillating circuit;

a third filter, coupled to an output of the first filter, which further filters the output of the first filter;

wherein the synchronizing circuit is coupled between the third filter and the chaotic circuit, and wherein the synchronizing circuit generates a voltage difference in response to an out-of-synchronization condition between a signal from the third filter and the chaotic circuit;

a fourth filter, coupled to a first portion of the synchronizing circuit, which filters a buffered version of the filtered modulated chaotic signal; and a fifth filter, coupled to a second portion of the synchronizing circuit, which filters a signal generated by the chaotic circuit;

wherein the detection circuit is coupled to respective outputs of the fourth and fifth filters.

45. A chaotic receiver comprising:

an input terminal that receives a modulated chaotic signal;

an oscillator circuit coupled to the input terminal and driven by the modulated chaotic signal;

a chaotic circuit comprising an upper slope circuit that implements a first current-voltage function in an upper quadrant of a current-voltage response plane and a lower slope circuit that implements a second current-voltage function in a lower quadrant of the current-voltage response plane, wherein the first and second current-voltage functions have a different voltage offset, and wherein the upper and lower slope circuits cooperate with the oscillator circuit to generate a local chaotic signal;

a synchronizing circuit, coupled to the oscillator circuit and the chaotic circuit, wherein the synchronizing circuit detects differences between the modulated chaotic signal at the input terminal and the local chaotic signal; and a detector coupled to the synchronizing circuit which detects periods of synchronization and non-synchronization;

wherein the upper slope circuit satisfies the relation I=GbV+GaVbp−GbVbp; wherein the lower slope circuit satisfies the relation I=GbV−GaVbp+GbVb, where I is the current through each respective slope circuit, Gb is a first slope constant, V is the voltage across the respective slope circuit, Ga is a second slope constant, and Vbp is a breakpoint voltage.

46. A chaotic transmitter, comprising:

a first chaotic circuit that generates a first chaotic signal having a first strange attractor trajectory;

a second chaotic circuit that generates a second chaotic signal having a second strange attractor trajectory different from that of the first strange attractor trajectory;

a switch coupled to the first and second chaotic circuits, wherein the switch selects either the first chaotic signal or the second chaotic signal in response to an information signal; and a low-pass filter coupled to the output of the switch wherein the first chaotic circuit exhibits a first current slope that is offset to intersect a load line in an upper quadrant of a current-voltage characteristic curve; and wherein the second chaotic circuit exhibits a second current slope that is offset to intersect the load line in a lower quadrant of the current-voltage characteristic curve.

47. A method of transmitting an information signal, comprising the steps of:

(1) generating a first chaotic signal comprising at least one strange attractor that oscillates about a first equilibrium point;

(2) generating a second chaotic signal comprising at least a second strange attractor that oscillates about a second equilibrium point;

(3) in response to the information signal, selecting an output of either the first chaotic signal or the second chaotic signal; and (4) transmitting the selected output from step (3), wherein step (1) comprises the step of generating a first chaotic signal that oscillates about a first equilibrium point in an upper quadrant of a current-voltage phase space of a chaotic circuit element, and wherein step (2) comprises the step of generating a second chaotic signal that oscillates about a second equilibrium point in a lower quadrant of the current-voltage phase space.

48. A chaotic receiving circuit, comprising:

an input terminal that receives a chaotically modulated signal;

a resistor coupled to the input terminal, wherein the resistor defines a current-voltage load line;

an oscillator circuit coupled to the input terminal through the resistor and driven by the chaotically modulated signal;

a chaotic circuit comprising an upper slope circuit that implements a first current-voltage function in an upper quadrant of a current-voltage response plane and a lower slope circuit that implements a second current-voltage function in a lower quadrant of the current-voltage response plane, wherein the first and second current-voltage functions have a positive slope but are offset by a voltage difference and respectively intersect the current-voltage load line in the upper and lower quadrants of the current-voltage response plane;

a synchronizing circuit, coupled to the oscillator circuit and the chaotic circuit, wherein the synchronizing circuit detects differences between the chaotically modulated signal and signals respectively present at the upper and lower slope circuits; and a detector coupled to the synchronizing circuit which recovers an information signal on the basis of the differences.

49. The chaotic receiving circuit of claim 48, further comprising a plurality of upper slope detector circuits and a plurality of lower slope detector circuits, wherein each upper slope circuit and each lower slope circuit intersects the current-voltage load line at a different point, each point corresponding to a symbol of information.

50. The chaotic receiving circuit of claim 48, wherein the detector comprises a first analog-to-digital converter coupled to an output of the oscillator circuit, a second analog-to-digital converter coupled to upper slope circuit, and a third analog-to-digital converter coupled to the lower slope circuit, wherein the outputs of the first, second, and third analog-to-digital converters are used to recover the information signal.

51. A chaotic transmitter, comprising:

a first chaotic circuit that generates a first chaotic signal having a first strange attractor trajectory;

a second chaotic circuit that generates a second chaotic signal having a second strange attractor trajectory different from that of the first strange attractor trajectory;

a switch coupled to the first and second chaotic circuits, wherein the switch selects either the first chaotic signal or the second chaotic signal in response to an information signal; and a low-pass filter coupled to the output of the switch, wherein the first chaotic circuit exhibits a first positive linear current slope that is offset to intersect a load line in an upper quadrant of a current-voltage characteristic curve; and wherein the second chaotic circuit exhibits a second positive linear current slope that is offset to intersect the load line in a lower quadrant of the current-voltage characteristic curve.

52. A method of interfacing a chaotic transmitting circuit to a communications channel without using a frequency filter, comprising the steps of:

(1) buffering an output of the chaotic transmitting circuit to isolate the chaotic transmitting circuit from the communications channel;

(2) removing a direct current voltage component from the buffered output obtained in step (1); and (3) matching the amplitude and impedance of the signal obtained from step (2) to the communications channel, wherein step (3) comprises the step of matching the amplitude and impedance of the signal obtained from step (2) to a light emitting diode.

53. A method of interfacing a chaotic receiving circuit to a communications channel without using a frequency filter, comprising the steps of:

(1) buffering a modulated chaotic signal received from the communications channel to isolate the chaotic receiving circuit from the communications channel;

(2) amplifying the buffered signal; and (3) adding a direct current component to the amplified buffered signal obtained in step (2), wherein the direct current component corresponds to a direct current component subtracted at a corresponding transmitter, further comprising the step of, prior to step (1), passing the modulated chaotic signal through a balanced input buffer/amplifier that matches electrical characteristics of a dual conductor communications channel to the chaotic receiving circuit.

54. Apparatus for interfacing a chaotic receiving circuit to a communications channel without using a frequency filter, comprising:

a buffering circuit that buffers a modulated chaotic signal received from the communications channel to isolate the chaotic receiving circuit from the communications channel;

an amplifier coupled to the buffering circuit that amplifies an output of the buffering circuit; and a direct current voltage offset circuit coupled to the amplifier, wherein the direct current voltage offset circuit adds a direct current component to the amplified buffered signal, wherein the direct current component corresponds to a direct current component subtracted at a corresponding transmitter, further comprising a differential input amplifier, coupled to the buffering circuit, wherein the differential input amplifier rejects common-mode input components and amplifies differential components.

\* \* \* \* \*

UNITED STATES PATENT AND TRADEMARK OFFICE
CERTIFICATE OF CORRECTION

PATENT NO. : 6,980,656 B1  
APPLICATION NO. : 09/317124  
DATED : December 27, 2005  
INVENTOR(S) : Daniel E. Hinton et al.

It is certified that error appears in the above-identified patent and that said Letters Patent is hereby corrected as shown below:

In Column 59, Claim 11, Line 52:
    Pleae replace "C," with --$C_1$--

In Column 68, Claim 37, Line 5:
    Please replace "chances" with --changes--

In Column 68, Claim 40, Line 53:
    Please replace "Plurality" with --plurality--

In Column 70, Claim 43, Line 26:
    Please replace "Periods" with --periods--

Signed and Sealed this

Twenty-second Day of August, 2006

JON W. DUDAS  
*Director of the United States Patent and Trademark Office*